US012452075B2

(12) United States Patent
Alwar et al.

(10) Patent No.: US 12,452,075 B2
(45) Date of Patent: Oct. 21, 2025

(54) ASYNCHRONOUS CRYPTO ASSET TRANSFER AND SOCIAL AGGREGATING, FRACTIONALLY EFFICIENT TRANSFER GUIDANCE, CONDITIONAL TRIGGERED TRANSACTION, DATASTRUCTURES, APPARATUSES, METHODS AND SYSTEMS

(71) Applicant: FMR LLC, Boston, MA (US)

(72) Inventors: Vijaya Subhash Alwar, Kerala (IN); Ibrahim El-Kassem, Raleigh, NC (US); Leon Landau, Brooklyn, NY (US); Ajay Kumar, Bangalore (IN); Thomas Stephen McGuire, County Galway (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/898,220

(22) Filed: Feb. 15, 2018

(65) Prior Publication Data

US 2018/0191503 A1 Jul. 5, 2018

Related U.S. Application Data

(63) Continuation-in-part of application No. 15/844,375, filed on Dec. 15, 2017, now Pat. No. 11,636,471, and (Continued)

(51) Int. Cl.

*H04L 9/32* (2006.01)
*G06F 9/54* (2006.01)

(Continued)

(52) U.S. Cl.

CPC ............ *H04L 9/3242* (2013.01); *G06F 9/547* (2013.01); *G06Q 20/065* (2013.01); *G06Q 20/10* (2013.01);

(Continued)

(58) Field of Classification Search

CPC ....... H04L 9/3242; H04L 9/14; H04L 9/3213; H04L 9/30; H04L 9/0637; H04L 2209/56;

(Continued)

(56) References Cited

U.S. PATENT DOCUMENTS

| | | | | | |
|---|---|---|---|---|---|
| 5,839,119 | A * | 11/1998 | Krsul | G06Q 20/10 | 705/40 |
| RE40,444 | E * | 7/2008 | Linehan | G06Q 20/02 | 705/65 |

(Continued)

FOREIGN PATENT DOCUMENTS

| | | |
|---|---|---|
| CA | 2870844 | 5/2015 |
| CA | 2843034 | 8/2015 |

(Continued)

OTHER PUBLICATIONS

White, "How Computers Work," 2003, Que Publishing, 7th Ed., p. 4 (Year: 2003).*

(Continued)

*Primary Examiner* — Zeshan Qayyum
(74) *Attorney, Agent, or Firm* — Hanchuk Kheit LLP.; Walter G. Hanchuk

(57) ABSTRACT

The Asynchronous Crypto Asset Transfer and Social Aggregating, Fractionally Efficient Transfer Guidance, Conditional Triggered Transaction, Datastructures, Apparatuses, Methods and Systems ("SOCOACT") transforms transfer of assets (TOA) initiation request inputs via SOCOACT components into TOA confirmation outputs. A crypto asset transfer notification is sent to a first entity from a second entity. Account verification data generated by the second entity is determined. A set of account data stored by the first entity is retrieved and used to generate a hash. It is verified that the determined account verification data matches the generated hash. A requested asset is determined. An API call to generate a crypto token asset for the requested asset in a (Continued)

SOCOACT TOA Blockchain Process

EXEMPLARY SOCOACT MODEL socially aggregated blockchain datastructure is made. An address of an aggregated crypto transaction trigger entry is determined. Oracle data that satisfies the crypto smart rule is provided.

18 Claims, 82 Drawing Sheets

Related U.S. Application Data a continuation-in-part of application No. 15/844,404, filed on Dec. 15, 2017, now Pat. No. 11,436,598, and a continuation-in-part of application No. 15/844,387, filed on Dec. 15, 2017, and a continuation-in-part of application No. 15/486,243, filed on Apr. 12, 2017, now Pat. No. 11,488,147, and a continuation-in-part of application No. 15/210,807, filed on Jul. 14, 2016, and a continuation-in-part of application No. 15/210,817, filed on Jul. 14, 2016, and a continuation-in-part of application No. 15/210,795, filed on Jul. 14, 2016, now abandoned, and a continuation-in-part of application No. 15/210,813, filed on Jul. 14, 2016, now abandoned, and a continuation-in-part of application No. 15/210,821, filed on Jul. 14, 2016, now abandoned, and a continuation-in-part of application No. 15/210,781, filed on Jul. 14, 2016, now abandoned, and a continuation-in-part of application No. 15/209,701, filed on Jul. 13, 2016, now abandoned, and a continuation-in-part of application No. 15/209,714, filed on Jul. 13, 2016, now Pat. No. 10,339,523, and a continuation-in-part of application No. 15/209,709, filed on Jul. 13, 2016, and a continuation-in-part of application No. 15/019,926, filed on Feb. 9, 2016, now abandoned, and a continuation-in-part of application No. 14/963,165, filed on Dec. 8, 2015, now Pat. No. 10,504,179, and a continuation-in-part of application No. 14/799,229, filed on Jul. 14, 2015, now abandoned, and a continuation-in-part of application No. 14/799,282, filed on Jul. 14, 2015, now abandoned, and a continuation-in-part of application No. 14/799,242, filed on Jul. 14, 2015, now abandoned.

(60) Provisional application No. 62/273,450, filed on Dec. 31, 2015, provisional application No. 62/273,452, filed on Dec. 31, 2015, provisional application No. 62/273,449, filed on Dec. 31, 2015, provisional application No. 62/273,447, filed on Dec. 31, 2015, provisional application No. 62/273,453, filed on Dec. 31, 2015.

(51) Int. Cl.

| | |
|---|---|
| ***G06Q 20/06*** | (2012.01) |
| ***G06Q 20/10*** | (2012.01) |
| ***G06Q 20/36*** | (2012.01) |
| ***G06Q 20/38*** | (2012.01) |
| ***H04L 9/06*** | (2006.01) |
| ***H04L 9/14*** | (2006.01) |
| ***H04L 9/30*** | (2006.01) |
| *H04L 9/00* | (2022.01) |

(52) U.S. Cl.

CPC ......... *G06Q 20/36* (2013.01); *G06Q 20/3829* (2013.01); *H04L 9/0637* (2013.01); *H04L 9/14* (2013.01); *H04L 9/30* (2013.01); *H04L 9/3213* (2013.01); *H04L 9/3236* (2013.01); *H04L 9/3297* (2013.01); *G06Q 2220/00* (2013.01); *H04L 9/50* (2022.05); *H04L 2209/56* (2013.01)

(58) Field of Classification Search

CPC . H04L 9/3236; H04L 9/3297; H04L 2209/38; G06F 9/547; G06Q 2220/00; G06Q 20/065; G06Q 20/10; G06Q 20/36; G06Q 20/3829

USPC ............................................................ 705/50

See application file for complete search history.

(56) References Cited

U.S. PATENT DOCUMENTS

| | | | | |
|---|---|---|---|---|
| 8,838,982 | B2 * | 9/2014 | Carlson | H04L 67/10 726/28 |
| 9,076,290 | B2 | 7/2015 | Griffin | |
| 9,082,113 | B2 | 7/2015 | Shea et al. | |
| 9,087,326 | B2 | 7/2015 | Shea et al. | |
| 9,098,190 | B2 | 8/2015 | Zhou | |
| 9,098,387 | B1 | 8/2015 | Curtis et al. | |
| 9,098,874 | B2 | 8/2015 | Chandra et al. | |
| 9,117,341 | B2 | 8/2015 | Marantelli | |
| 9,122,749 | B2 | 9/2015 | Elmore et al. | |
| 9,129,338 | B2 | 9/2015 | Liu | |
| 9,129,339 | B2 | 9/2015 | Liu | |
| 9,135,616 | B2 | 9/2015 | Hirson et al. | |
| 9,135,787 | B1 | 9/2015 | Russell | |
| 9,144,742 | B1 | 9/2015 | Curtis et al. | |
| 9,153,088 | B2 | 10/2015 | Spencer, II | |
| 9,160,717 | B2 | 10/2015 | Bhanoo et al. | |
| 9,704,143 | B2 * | 7/2017 | Walker | G06Q 20/06 |
| 10,171,245 | B2 * | 1/2019 | Wilkins | G06Q 40/04 |
| 10,269,009 | B1 * | 4/2019 | Winklevoss | G06Q 20/105 |
| 2003/0191709 | A1 | 10/2003 | Elston | |
| 2007/0215695 | A1 | 9/2007 | Trane | |
| 2009/0106125 | A1 | 4/2009 | Rock | |
| 2014/0074497 | A1 | 3/2014 | Griffin | |
| 2015/0018084 | A1 | 1/2015 | Gatto | |
| 2015/0195099 | A1 | 7/2015 | Imes | |
| 2015/0205929 | A1 | 7/2015 | Brama | |
| 2015/0206106 | A1 | 7/2015 | Yago | |
| 2015/0206240 | A1 | 7/2015 | Baker | |
| 2015/0213008 | A1 | 7/2015 | Orsini et al. | |
| 2015/0213351 | A1 | 7/2015 | Wyatt | |
| 2015/0213419 | A1 | 7/2015 | Lyons et al. | |
| 2015/0213437 | A1 | 7/2015 | Wyatt | |
| 2015/0220892 | A1 | 8/2015 | Allen | |
| 2015/0220928 | A1 | 8/2015 | Allen | |
| 2015/0227897 | A1 | 8/2015 | Loera | |
| 2015/0227898 | A1 | 8/2015 | Ballout | |
| 2015/0227913 | A1 | 8/2015 | Ballout | |
| 2015/0245084 | A1 | 8/2015 | Downing et al. | |
| 2015/0248672 | A1 | 9/2015 | Bayer | |
| 2015/0254640 | A1 | 9/2015 | Cassano et al. | |
| 2015/0254768 | A1 | 9/2015 | Menon et al. | |
| 2015/0261269 | A1 | 9/2015 | Bruscoe | |
| 2015/0262137 | A1 | 9/2015 | Armstrong | |
| 2015/0262138 | A1 | 9/2015 | Hudon | |
| 2015/0262139 | A1 | 9/2015 | Shtylman | |
| 2015/0262140 | A1 | 9/2015 | Armstrong | |
| 2015/0262141 | A1 | 9/2015 | Rebernik et al. | |
| 2015/0262168 | A1 | 9/2015 | Armstrong | |
| 2015/0262171 | A1 | 9/2015 | Langschaedel et al. | |
| 2015/0262172 | A1 | 9/2015 | Rebernik | |
| 2015/0262173 | A1 | 9/2015 | Durbin et al. | |
| 2015/0262176 | A1 | 9/2015 | Langschaedel et al. | |
| 2015/0262251 | A1 | 9/2015 | Knobel | |
| 2015/0269538 | A1 | 9/2015 | Stanchfield | |
| 2015/0269539 | A1 | 9/2015 | MacGregor et al. | |
| 2015/0269541 | A1 | 9/2015 | MacGregor et al. | |
| 2015/0269570 | A1 | 9/2015 | Phan | |
| 2015/0271183 | A1 | 9/2015 | MacGregor et al. | |
| 2015/0278820 | A1 | 10/2015 | Meadows | |
| 2015/0286995 | A1 | 10/2015 | Korosec | |
| 2015/0287026 | A1 | 10/2015 | Yang et al. | |

(56) References Cited

U.S. PATENT DOCUMENTS

| | | | |
|---|---|---|---|
| 2015/0294308 A1 | 10/2015 | Pauker et al. | |
| 2015/0294424 A1 | 10/2015 | Hakim | |
| 2015/0294425 A1 | 10/2015 | Benson | |
| 2015/0302357 A1 | 10/2015 | Chandra | |
| 2015/0302400 A1 | 10/2015 | Metral | |
| 2015/0302401 A1 | 10/2015 | Metral | |
| 2015/0302441 A1 | 10/2015 | Katsuyama et al. | |
| 2015/0302446 A1 | 10/2015 | Park et al. | |
| 2016/0019522 A1 | 1/2016 | Granbery | |
| 2016/0210632 A1 | 7/2016 | Li | |
| 2016/0335397 A1* | 11/2016 | Blum | G16H 10/60 |
| 2017/0011460 A1* | 1/2017 | Molinari | H04L 9/3247 |

FOREIGN PATENT DOCUMENTS

| | | | |
|---|---|---|---|
| CA | 2845648 | | 9/2015 |
| EP | 2820797 | | 1/2015 |
| EP | 2831823 | | 2/2015 |
| EP | 2874112 | | 3/2015 |
| EP | 2896001 | | 7/2015 |
| WO | 2008065345 | A1 | 6/2008 |
| WO | 2012142521 | A2 | 10/2012 |
| WO | 2013078990 | A1 | 6/2013 |
| WO | 2014201059 | A1 | 12/2014 |
| WO | 2015004820 | A1 | 1/2015 |
| WO | 2015016356 | A1 | 2/2015 |
| WO | 2015024129 | A1 | 2/2015 |
| WO | 2015051692 | A1 | 4/2015 |
| WO | 2015058282 | A1 | 4/2015 |
| WO | 2015059669 | A1 | 4/2015 |
| WO | 2015077378 | A1 | 5/2015 |
| WO | 2015085393 | A1 | 6/2015 |
| WO | 2015095761 | A1 | 6/2015 |
| WO | 2015106285 | A1 | 7/2015 |
| WO | 2015113519 | A1 | 8/2015 |
| WO | 2015116998 | A2 | 8/2015 |
| WO | 2015120606 | A1 | 8/2015 |
| WO | 2015134890 | | 9/2015 |
| WO | 2015135018 | | 9/2015 |
| WO | 2015142765 | | 9/2015 |
| WO | 2015143068 | | 9/2015 |
| WO | 2015144971 | | 10/2015 |
| WO | 2015148725 | | 10/2015 |
| WO | 2016025990 | | 2/2016 |

OTHER PUBLICATIONS

Third party submission filed in related U.S. Appl. No. 14/799,242.

* cited by examiner

EXEMPLARY SOCOACT MODEL

FIGURE 1A2
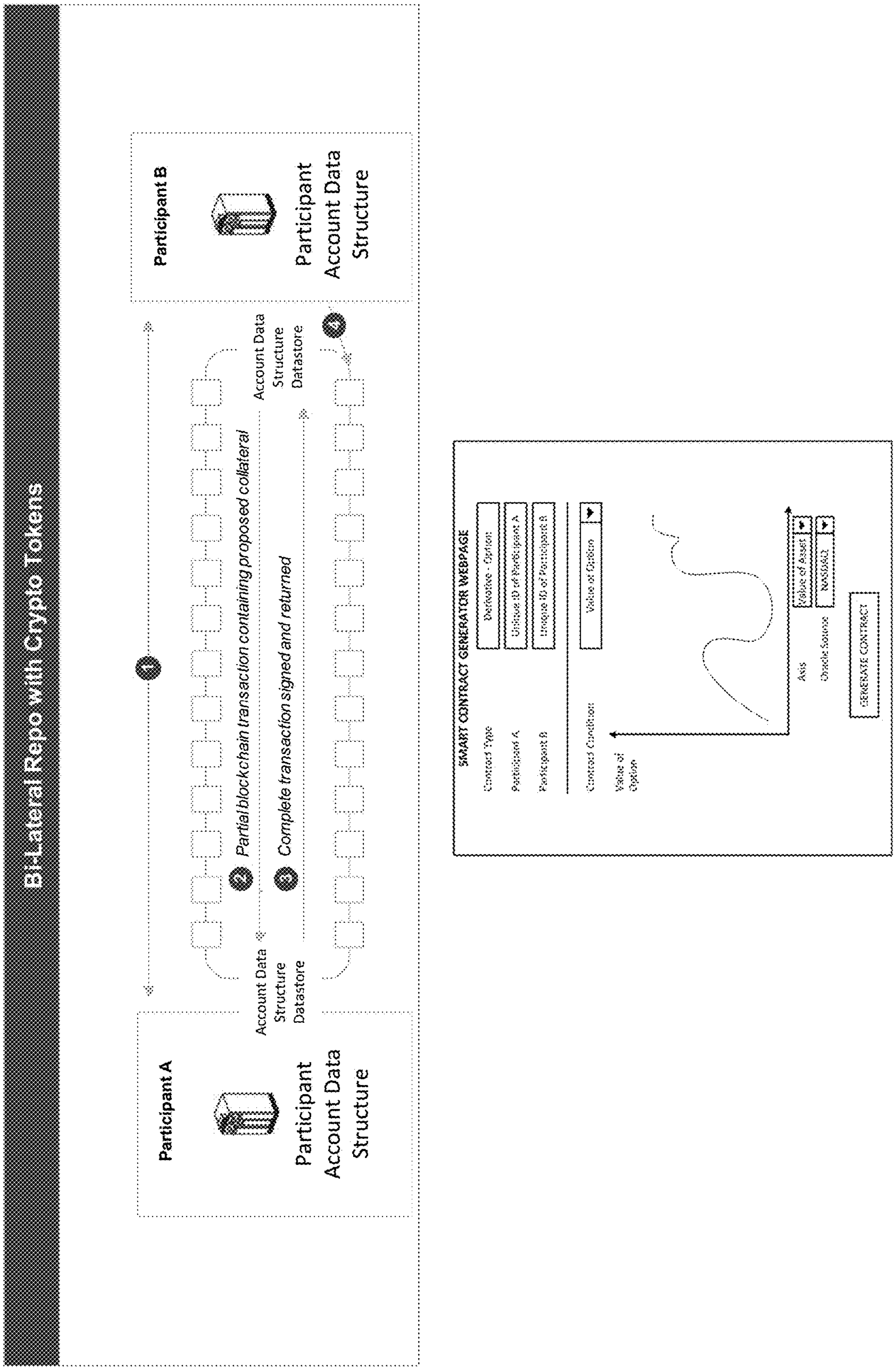
EXEMPLARY SOCOACT MODEL

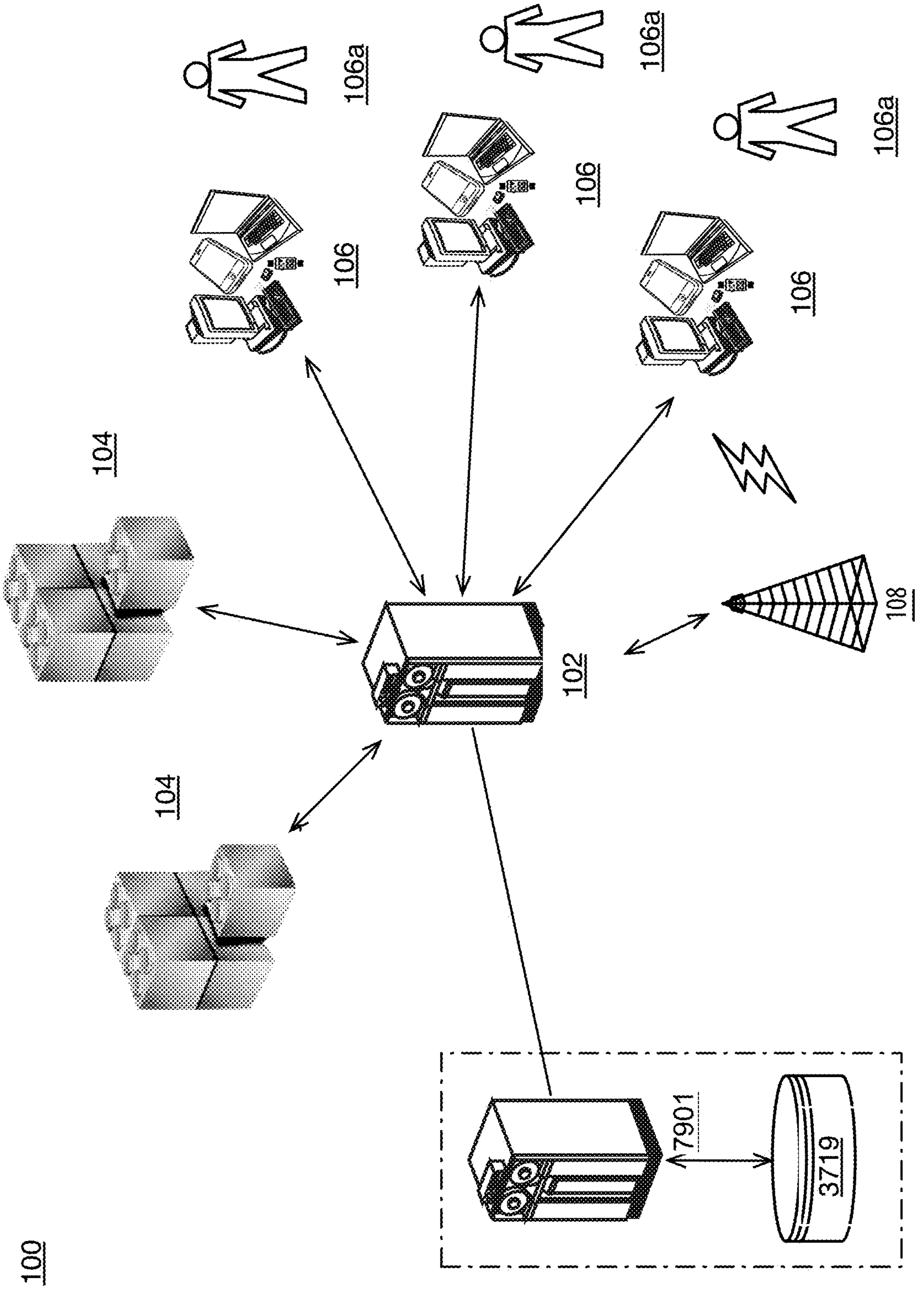
Fig. 1B:SOCOACT —Network Environment

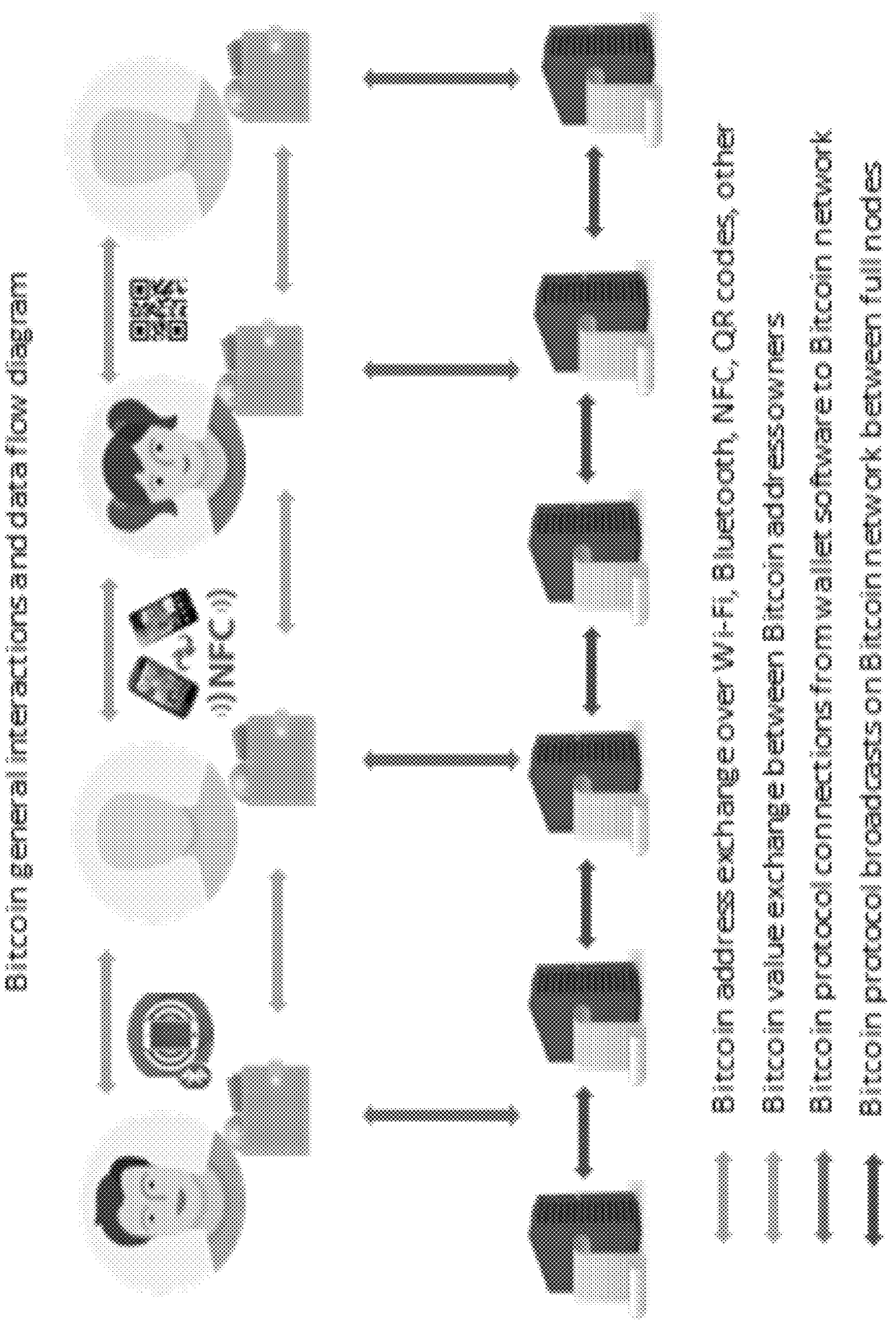
Fig.2: SOCOACT—General Flow

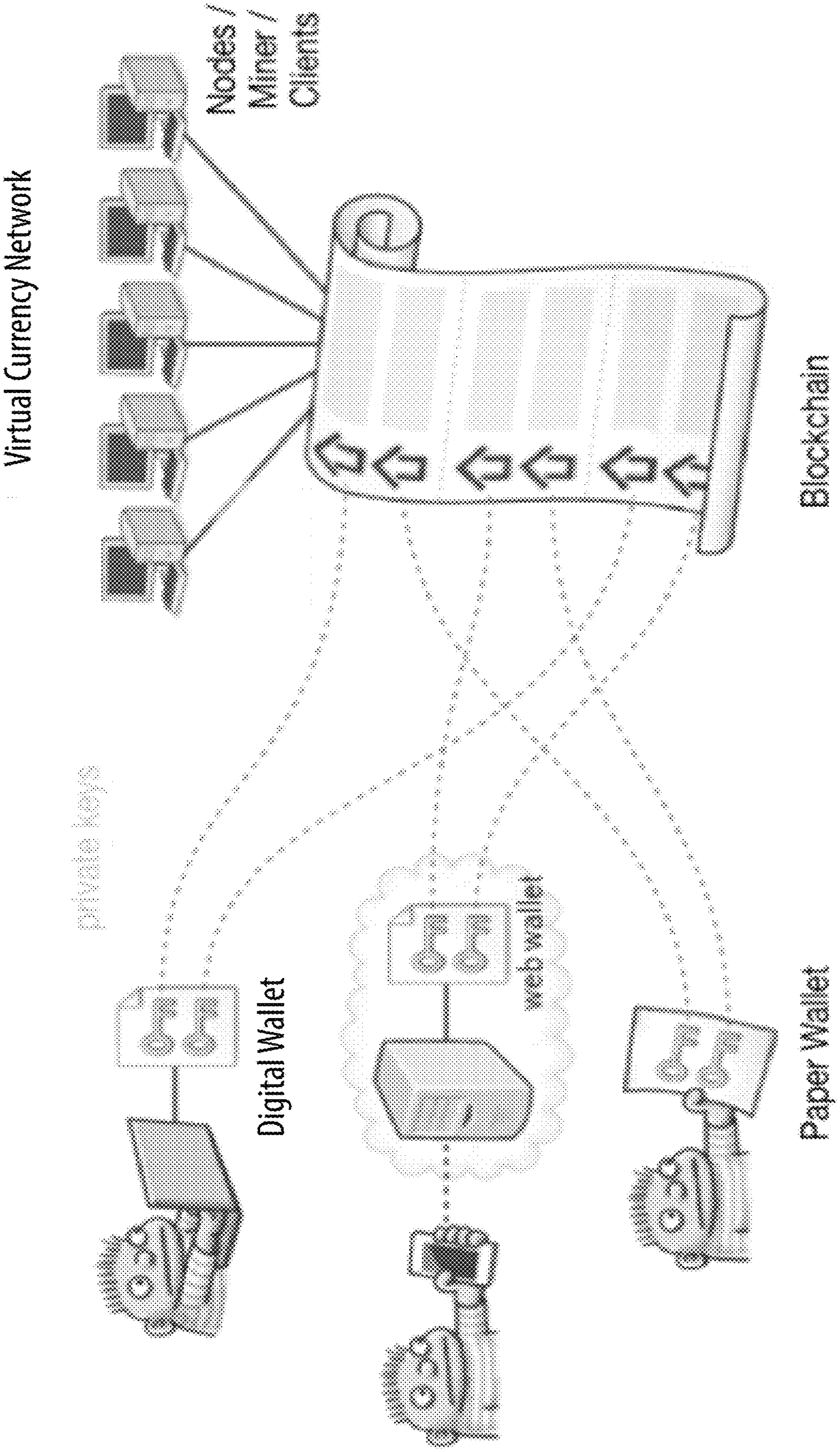
Fig.3: SOCOACT—Blockchain entry

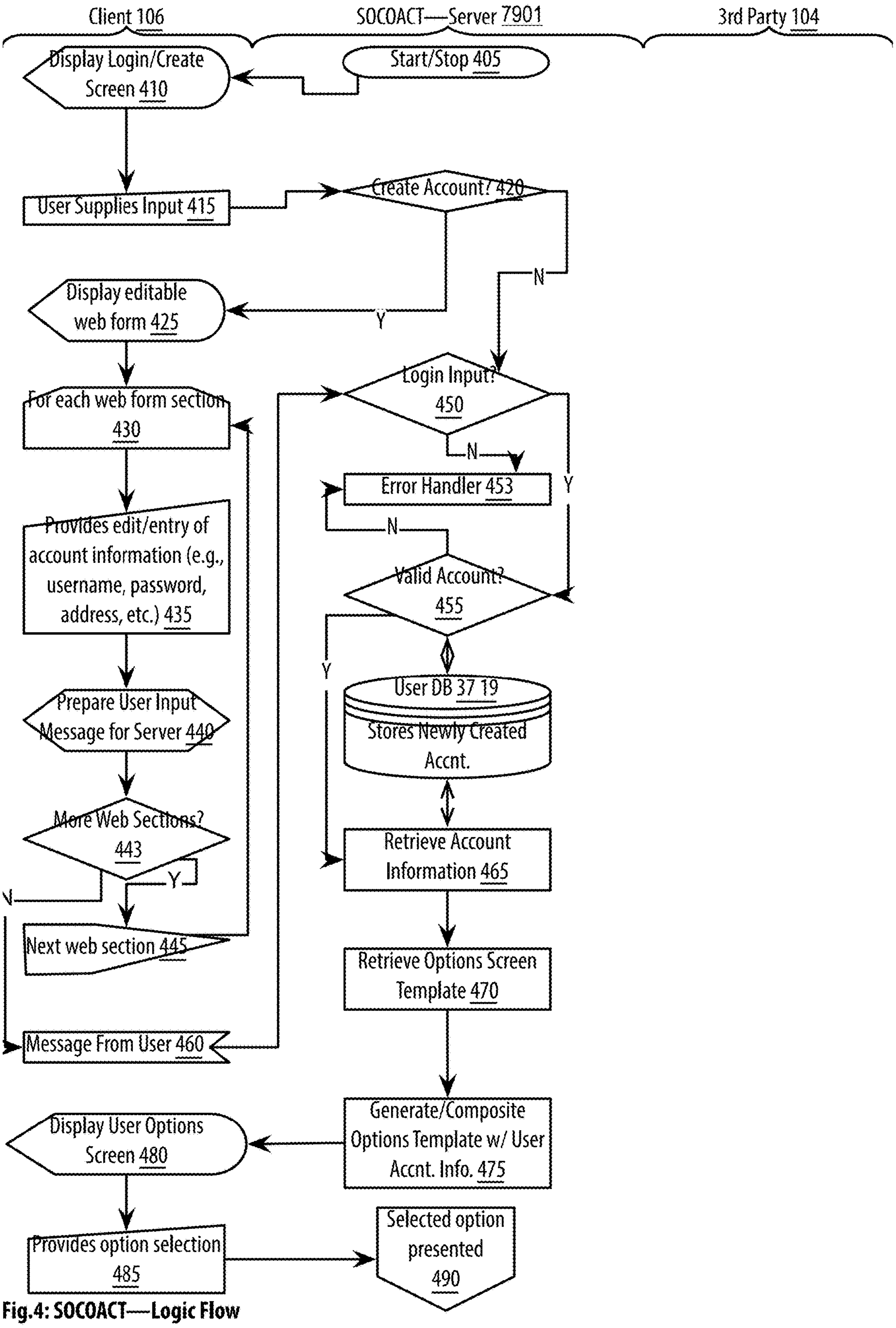
Fig.4: SOCOACT—Logic Flow

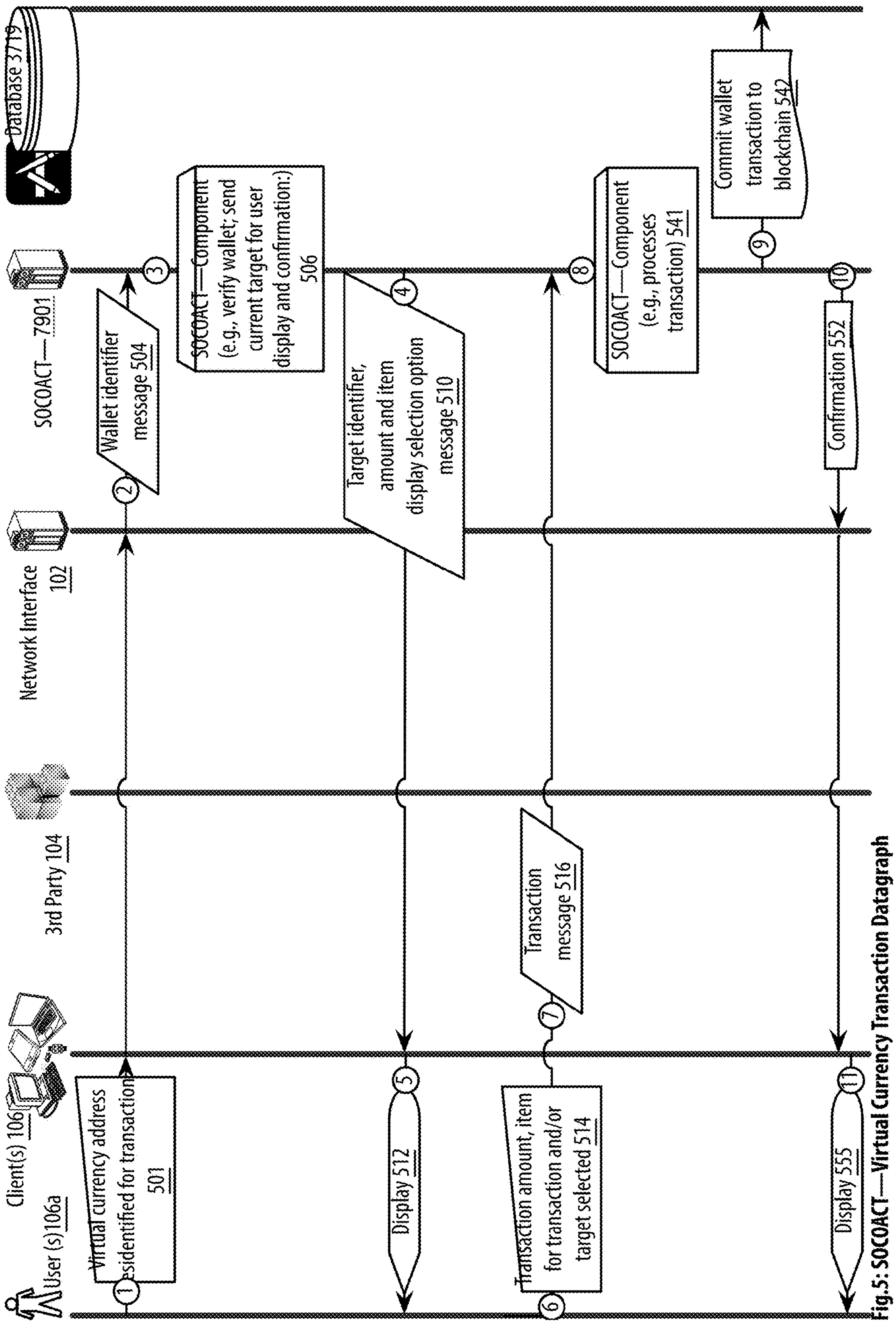
Fig.5: SOCOACT—Virtual Currency Transaction Datagraph

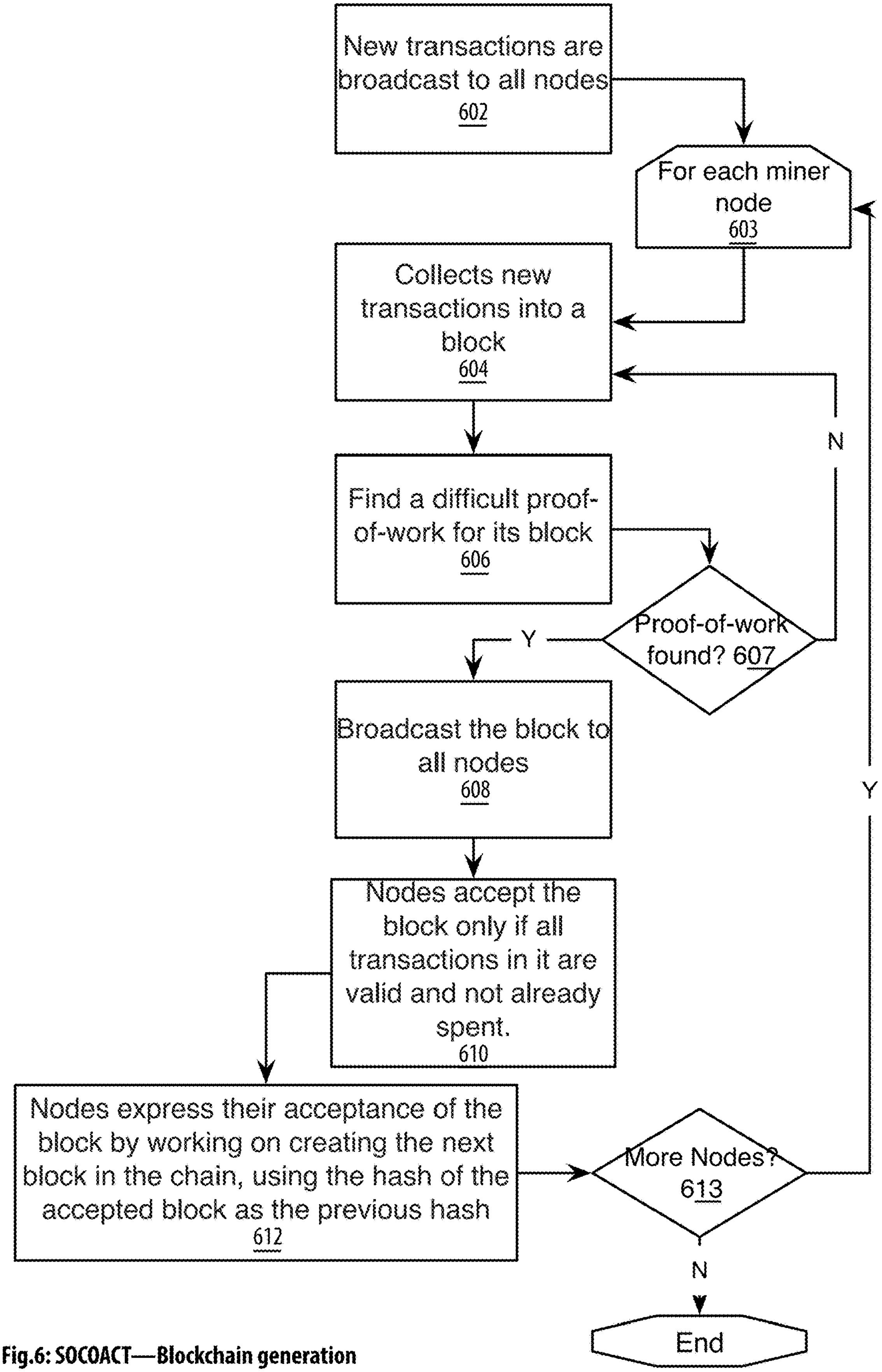
Fig.6: SOCOACT—Blockchain generation

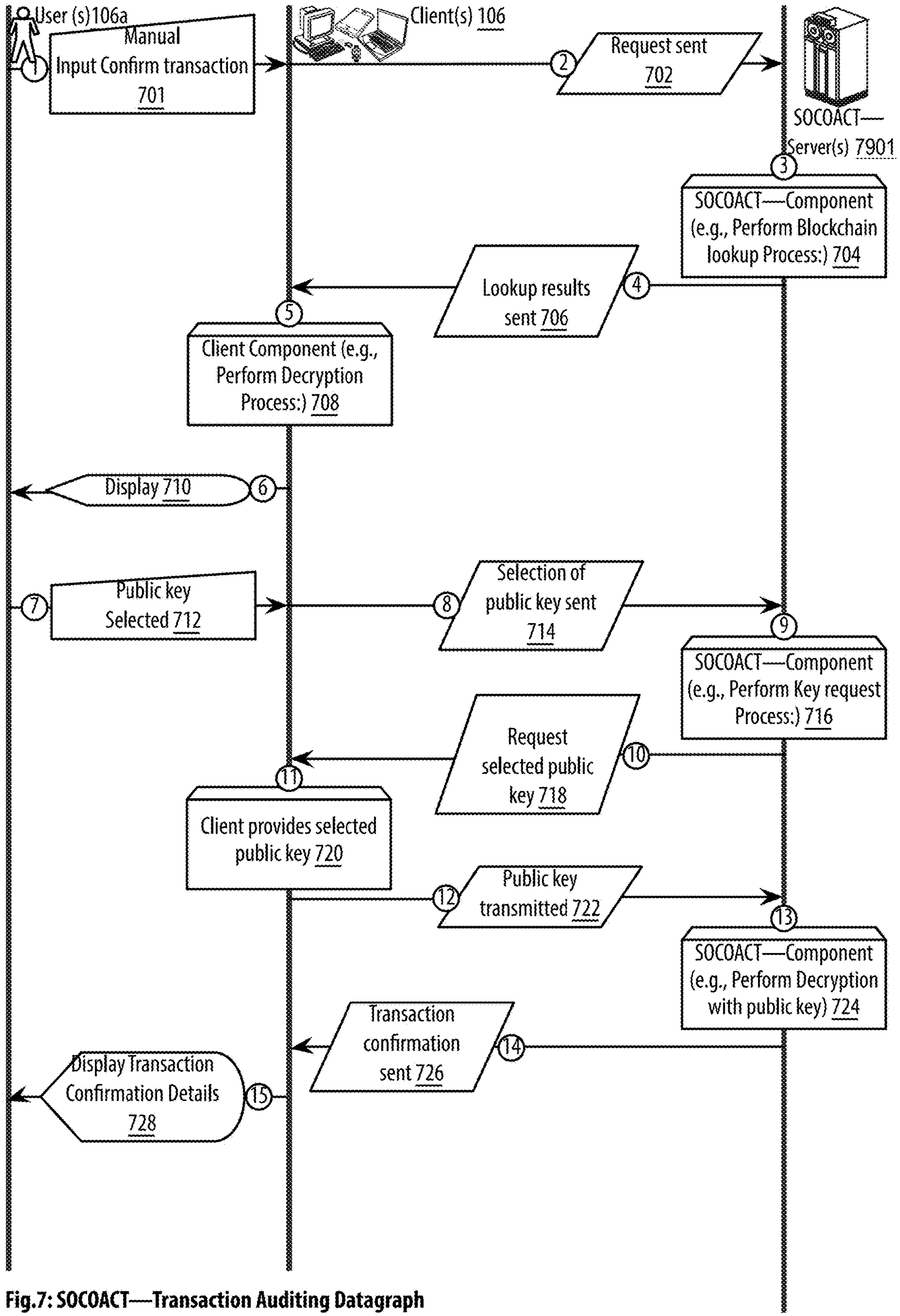
Fig.7: SOCOACT—Transaction Auditing Datagraph

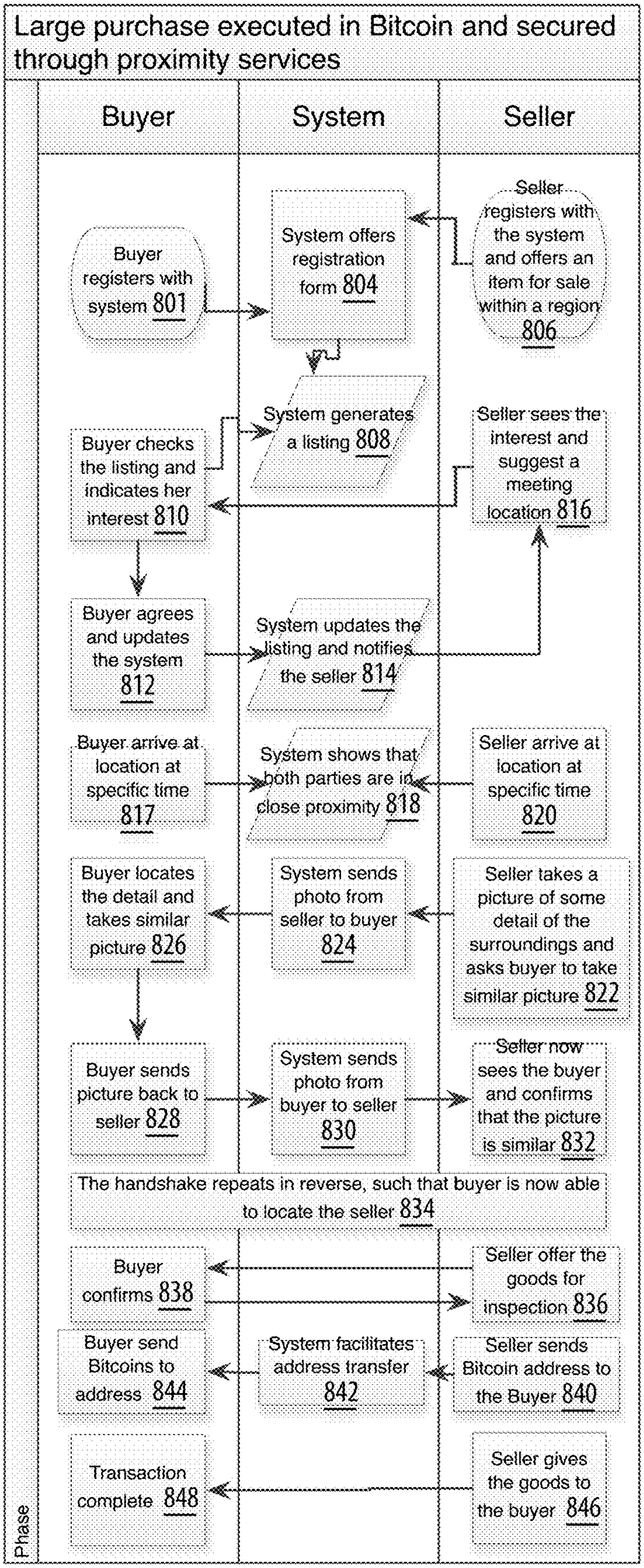
Fig.8: SOCOACT—Transactions

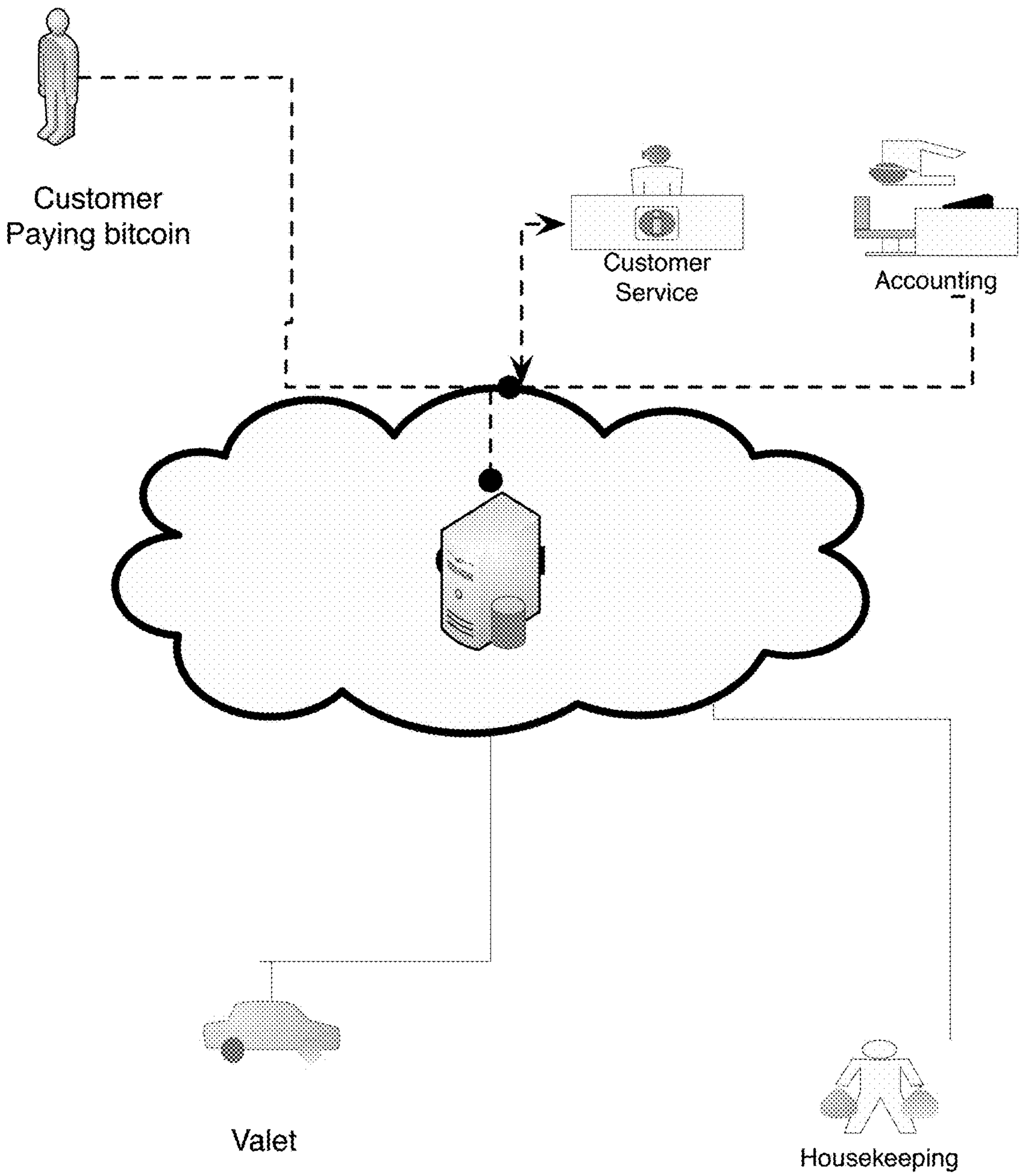
Fig.9: SOCOACT—Bluetooth/NFC Environment

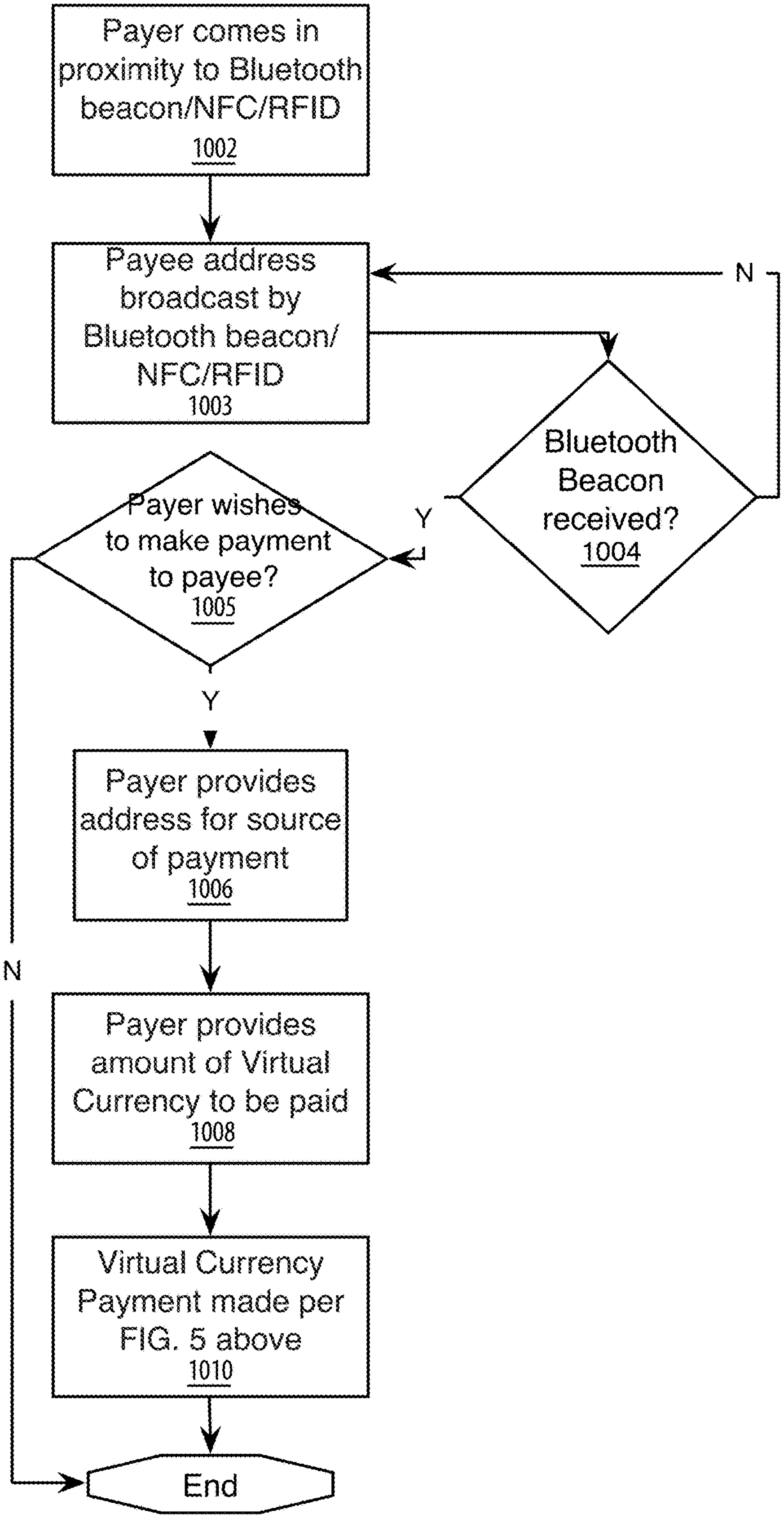
Fig.10: SOCOACT—Bluetooth Payment Flowchart

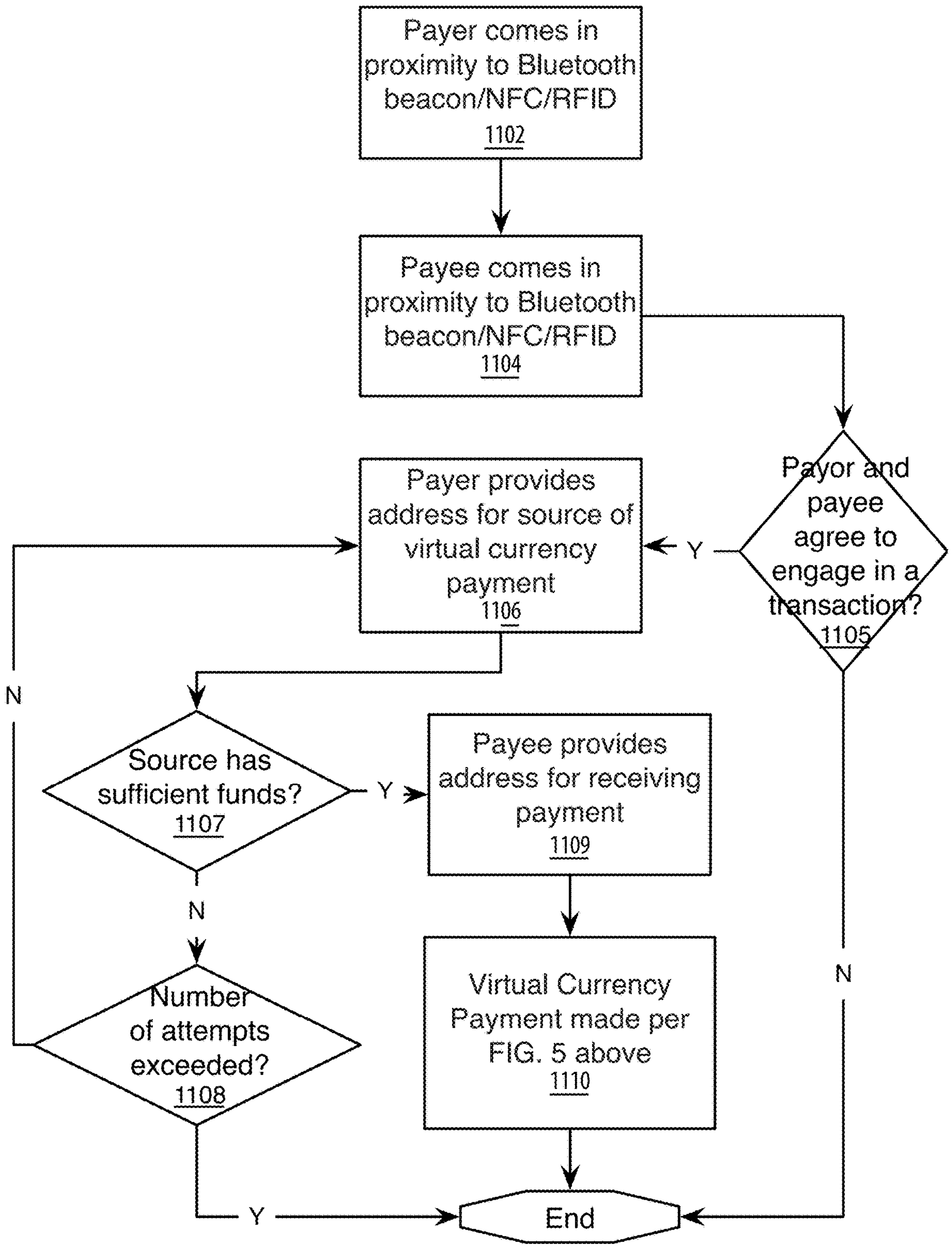
Fig.11: SOCOACT—Bluetooth two-party transfer

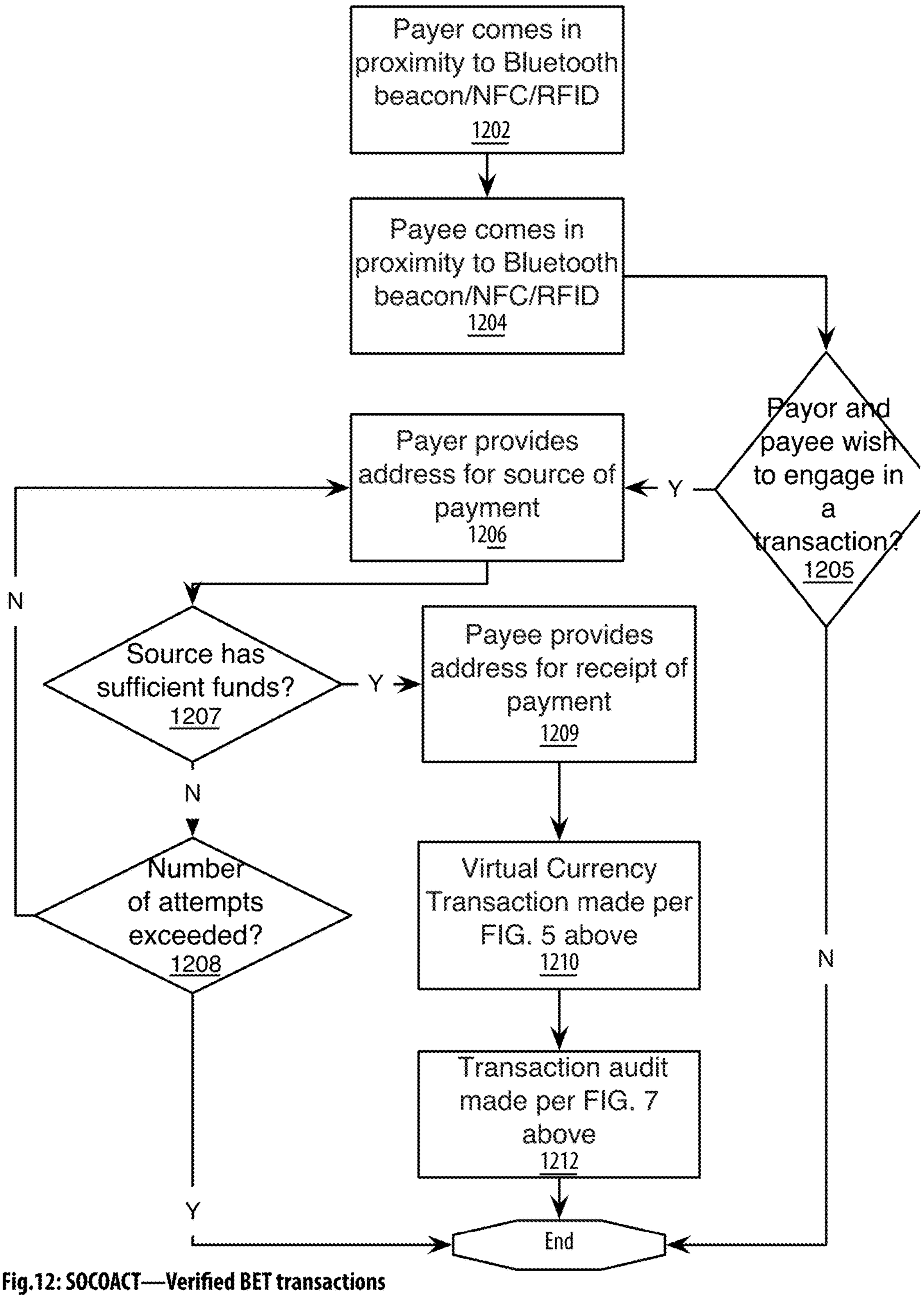
Fig.12: SOCOACT—Verified BET transactions

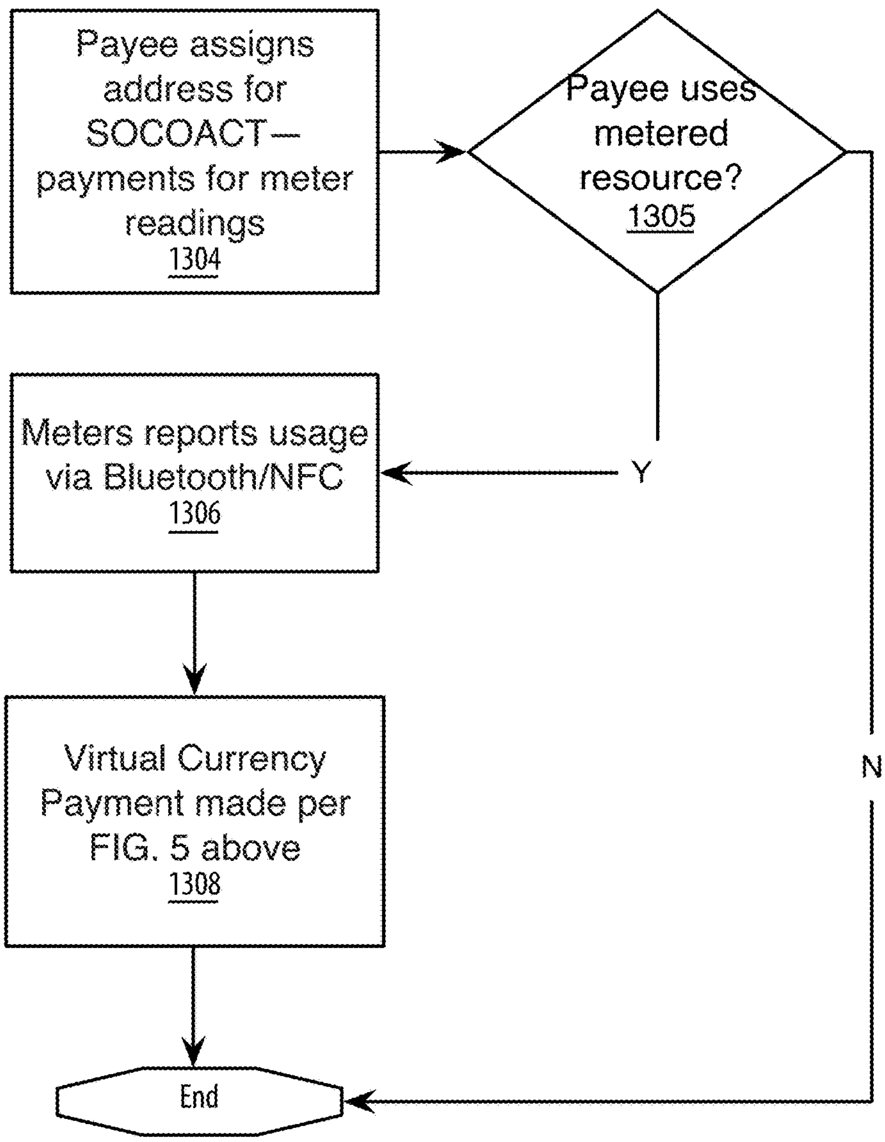
Fig.13: SOCOACT—Meter Readings Flowchart

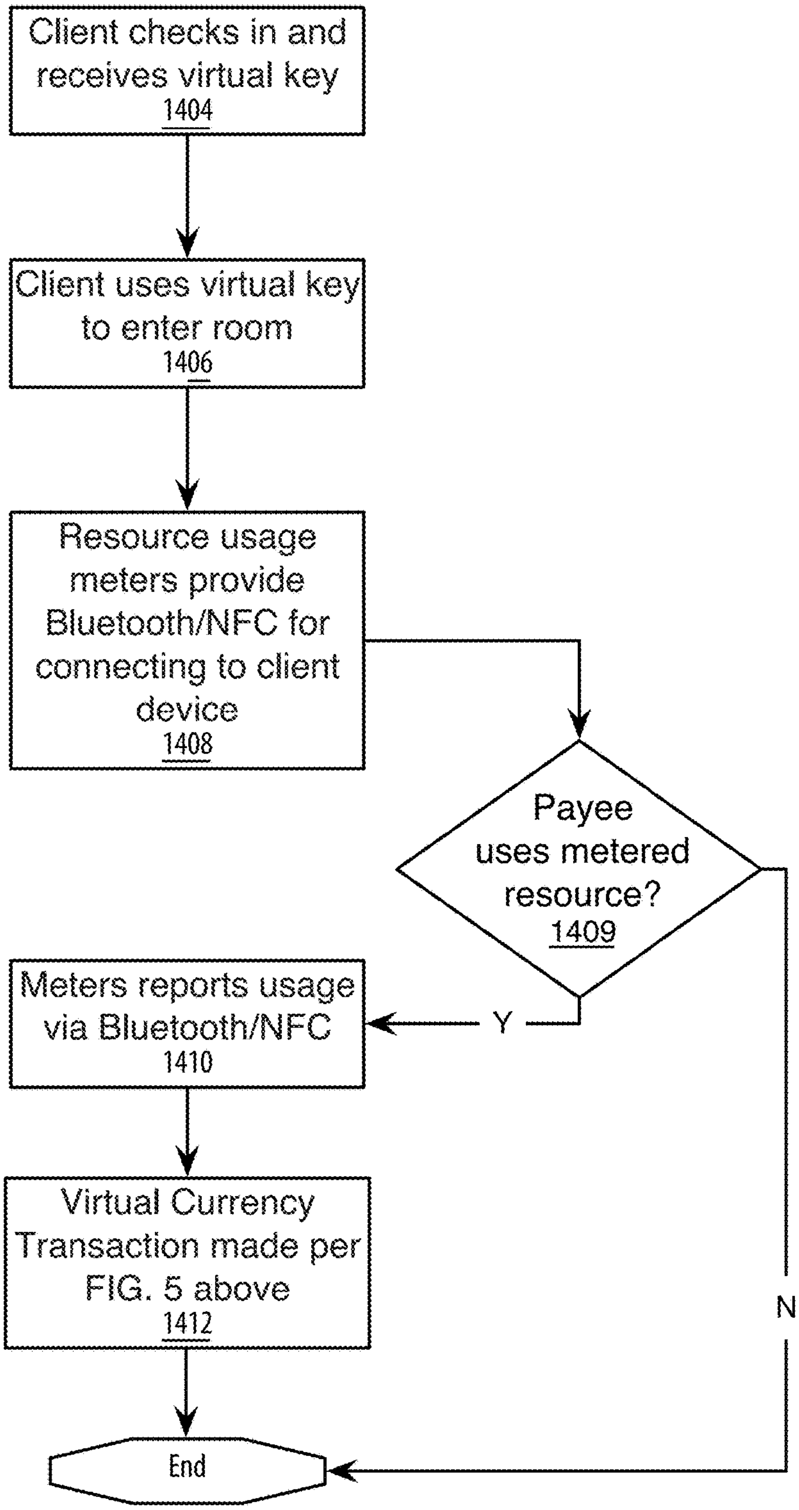
Fig.14: SOCOACT—Resources flowchart

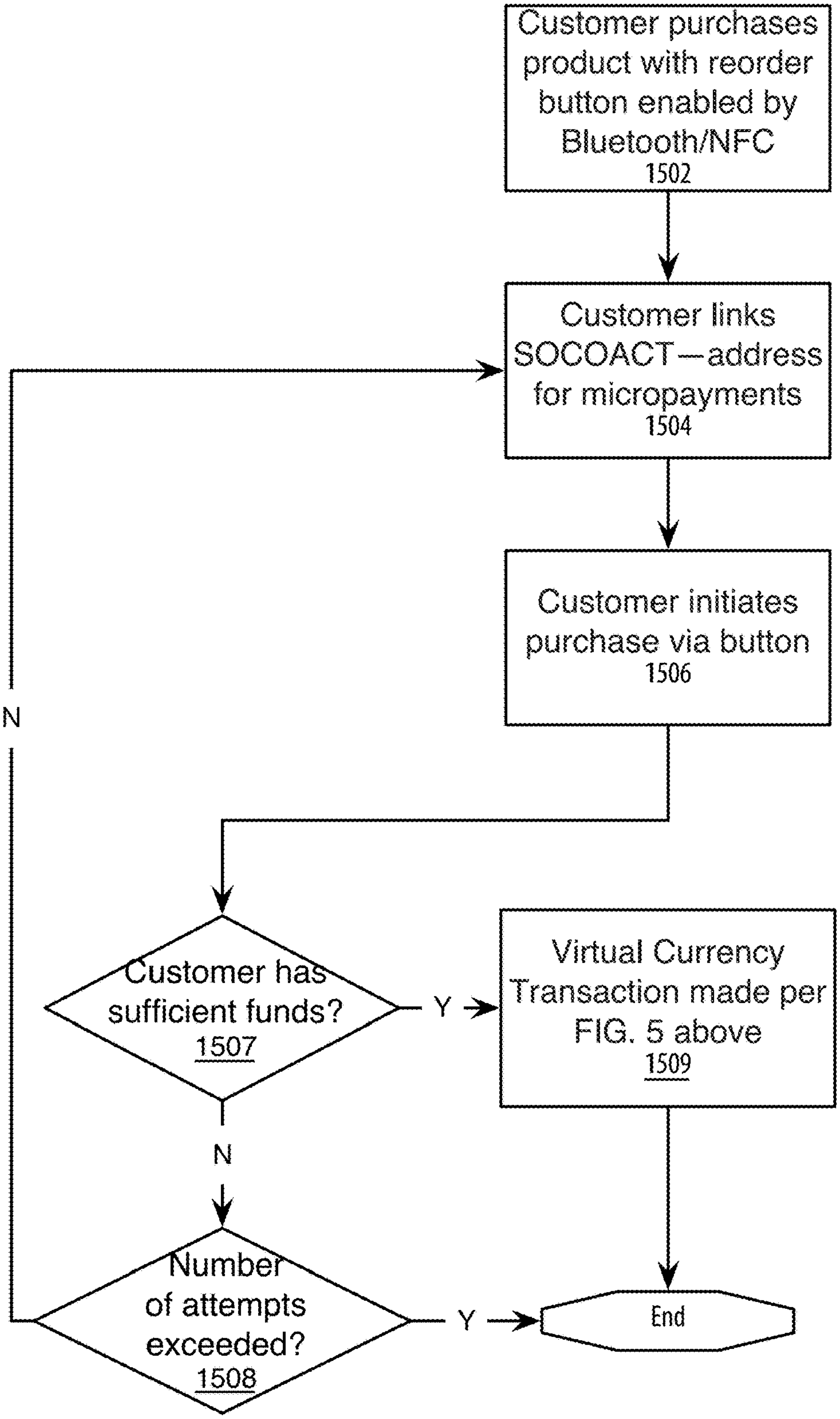
Fig.15: SOCOACT—Button Micropayments Flowchart

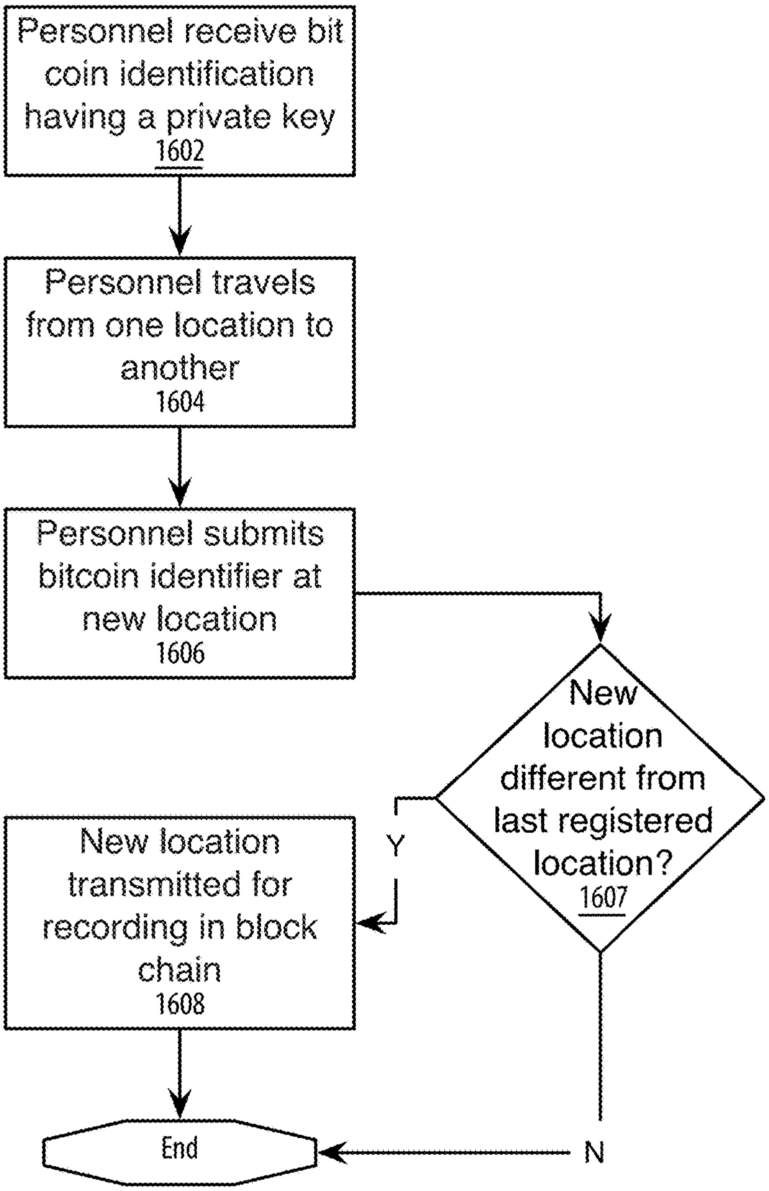
Fig.16: SOCOACT—Personnel/Migration Tracking by BET flowchart

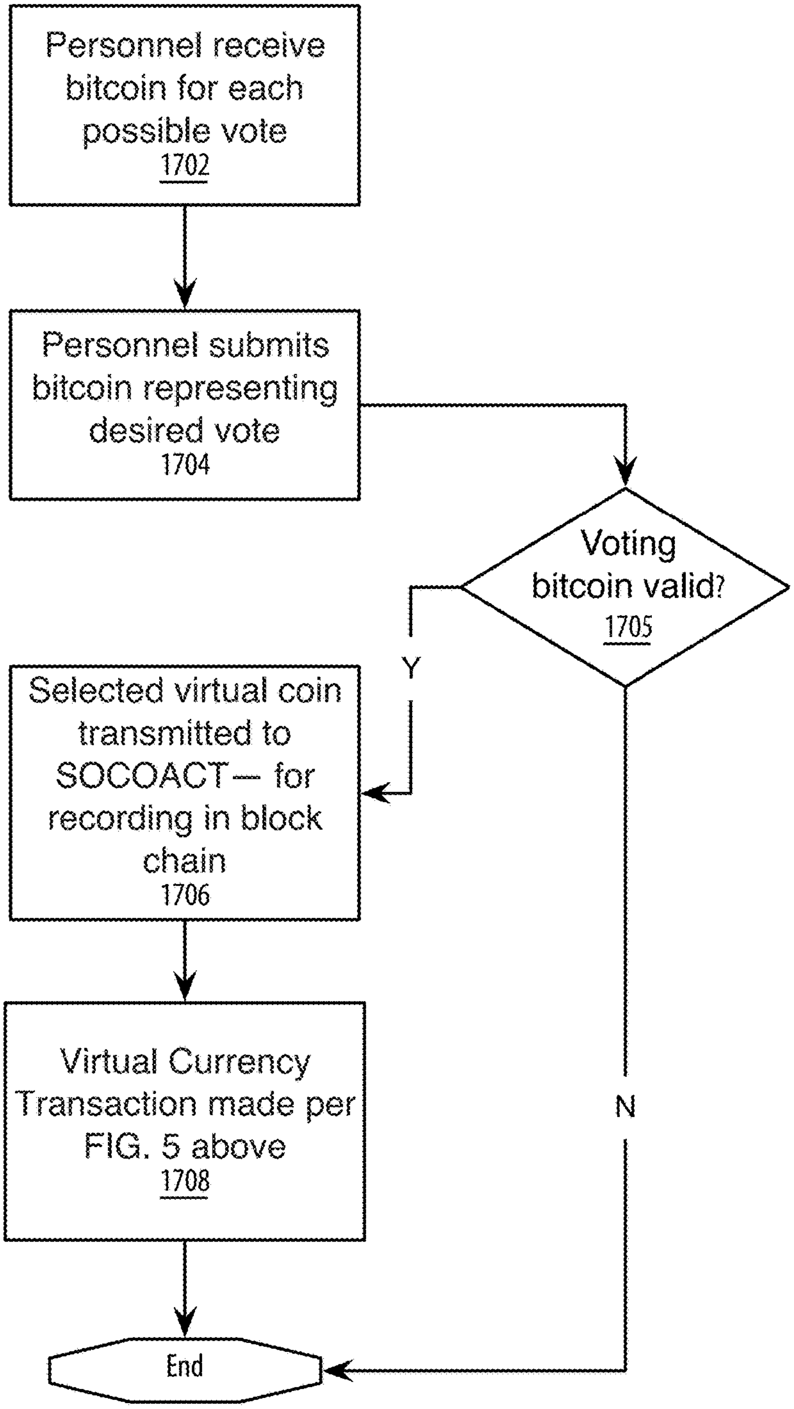
Fig.17: SOCOACT—Voting flowchart

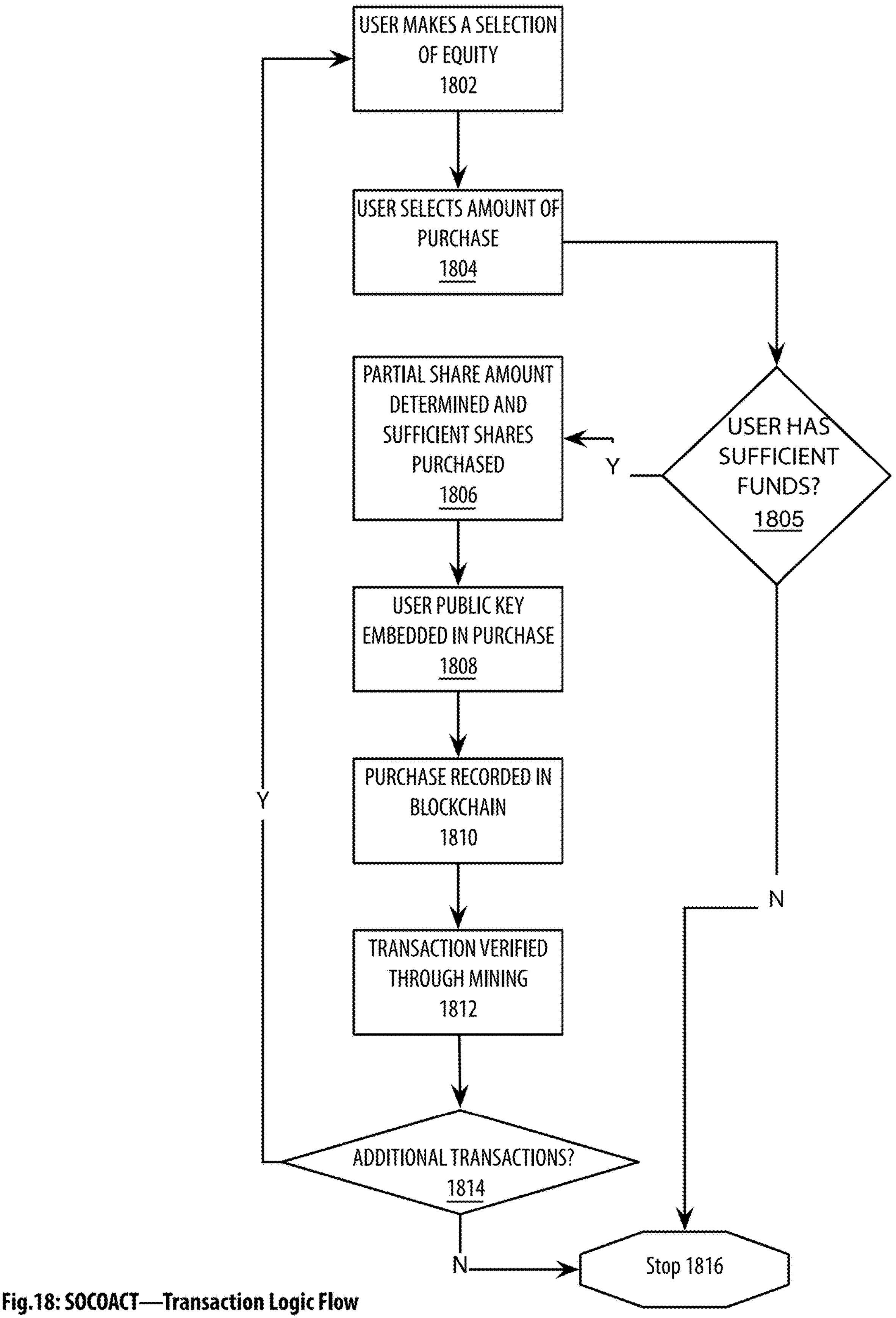
Fig.18: SOCOACT—Transaction Logic Flow

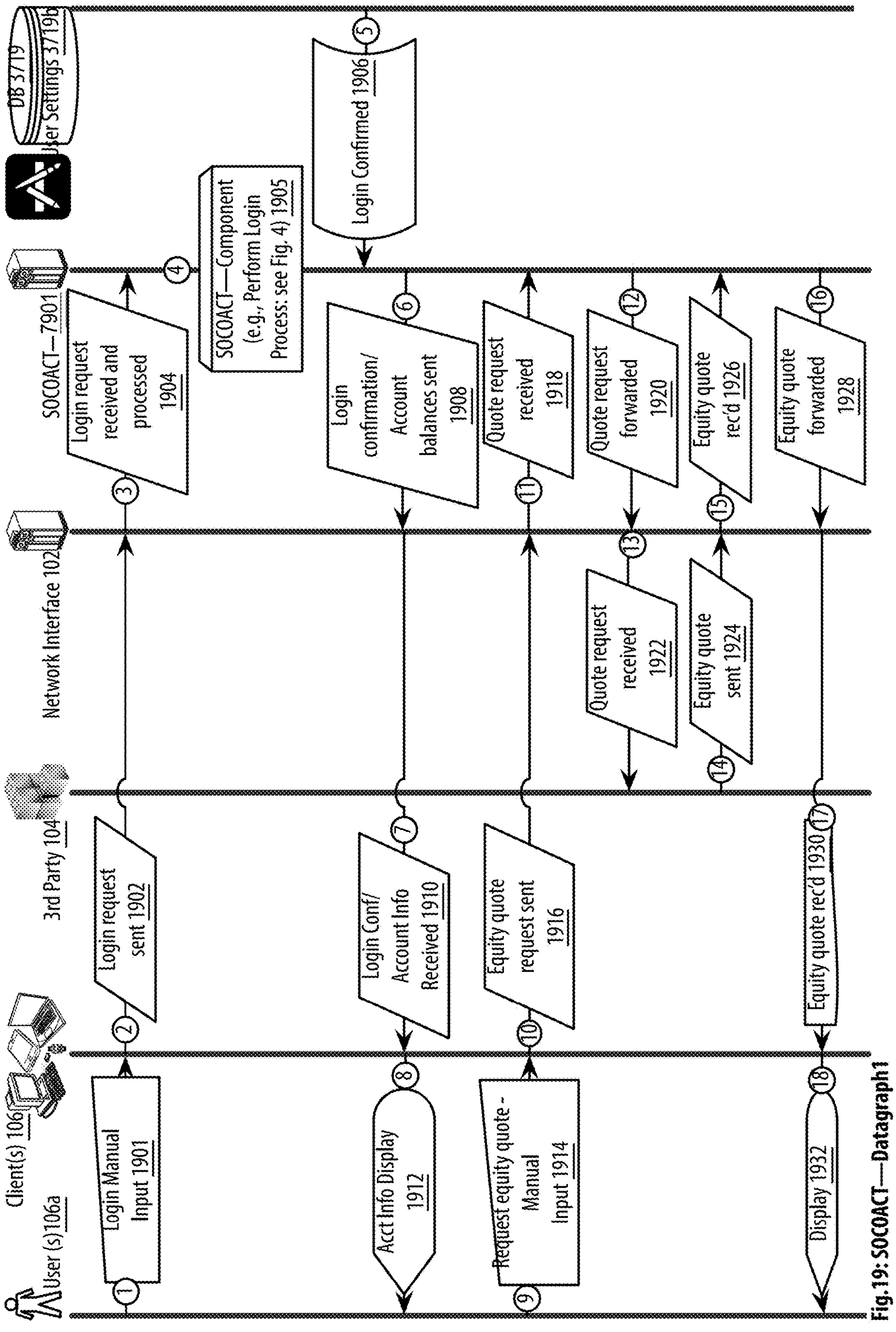
Fig. 19: SOCOACT—Datagraph1

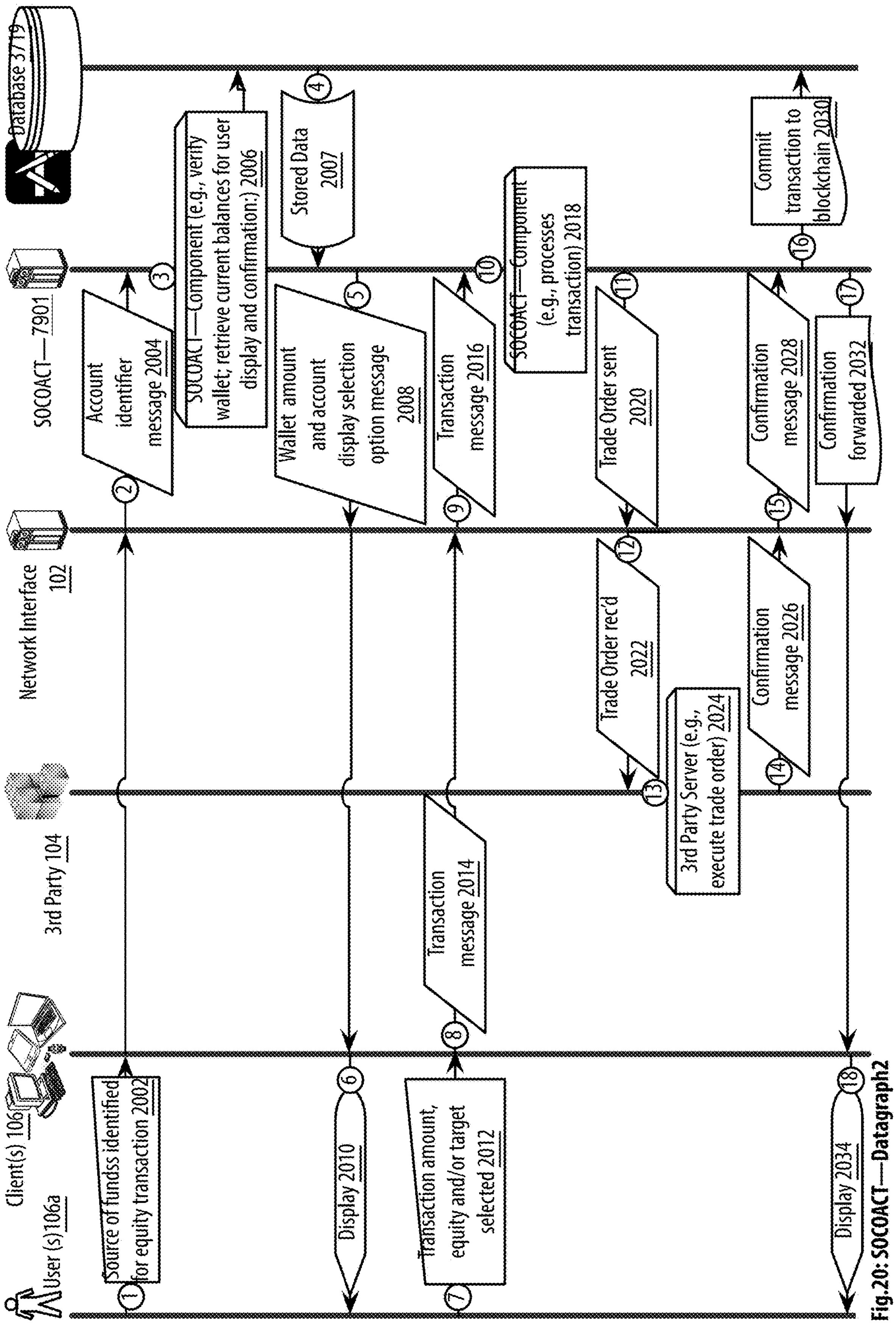
Fig.20: SOCOACT—Datagraph2

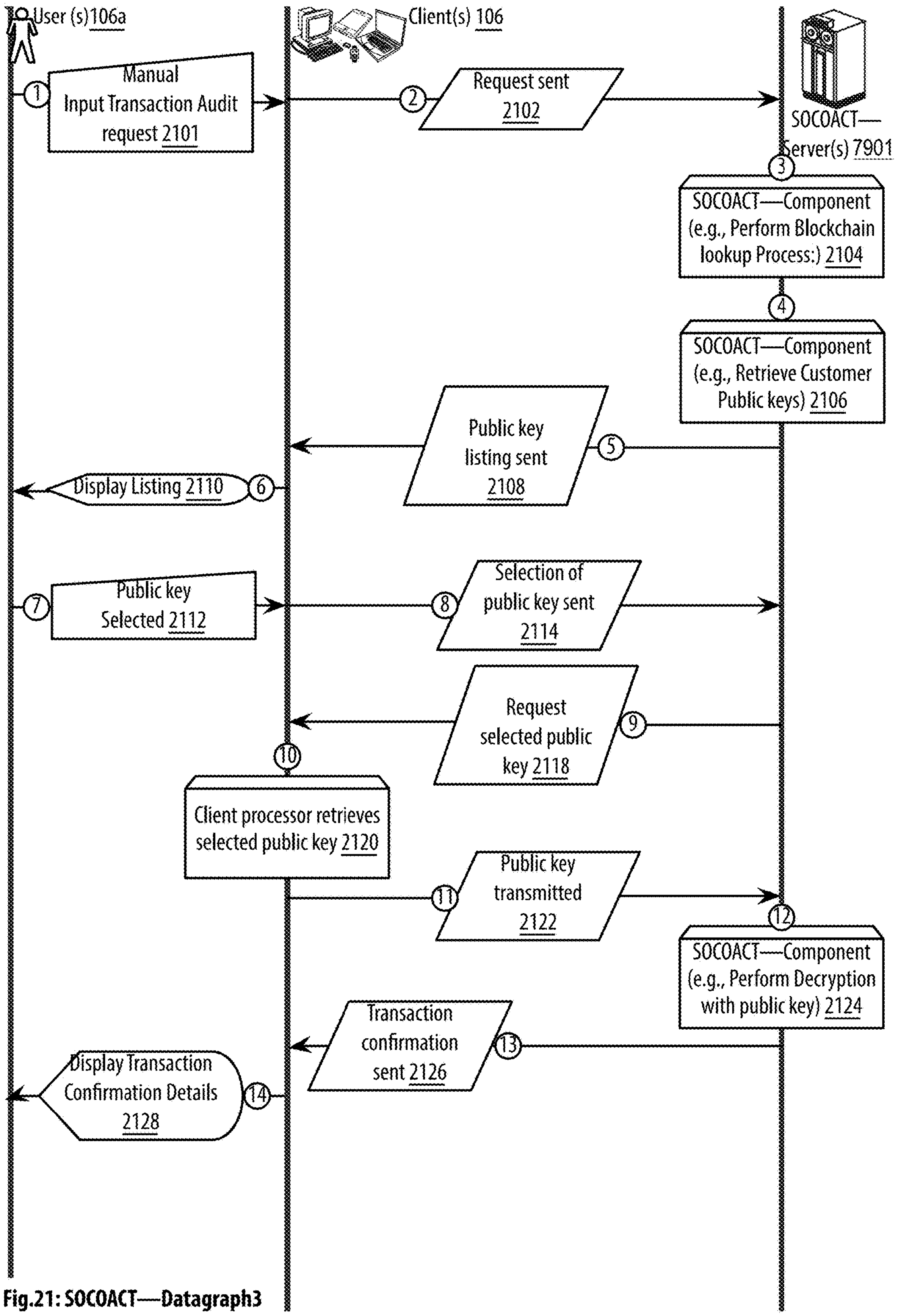
Fig.21: SOCOACT—Datagraph3

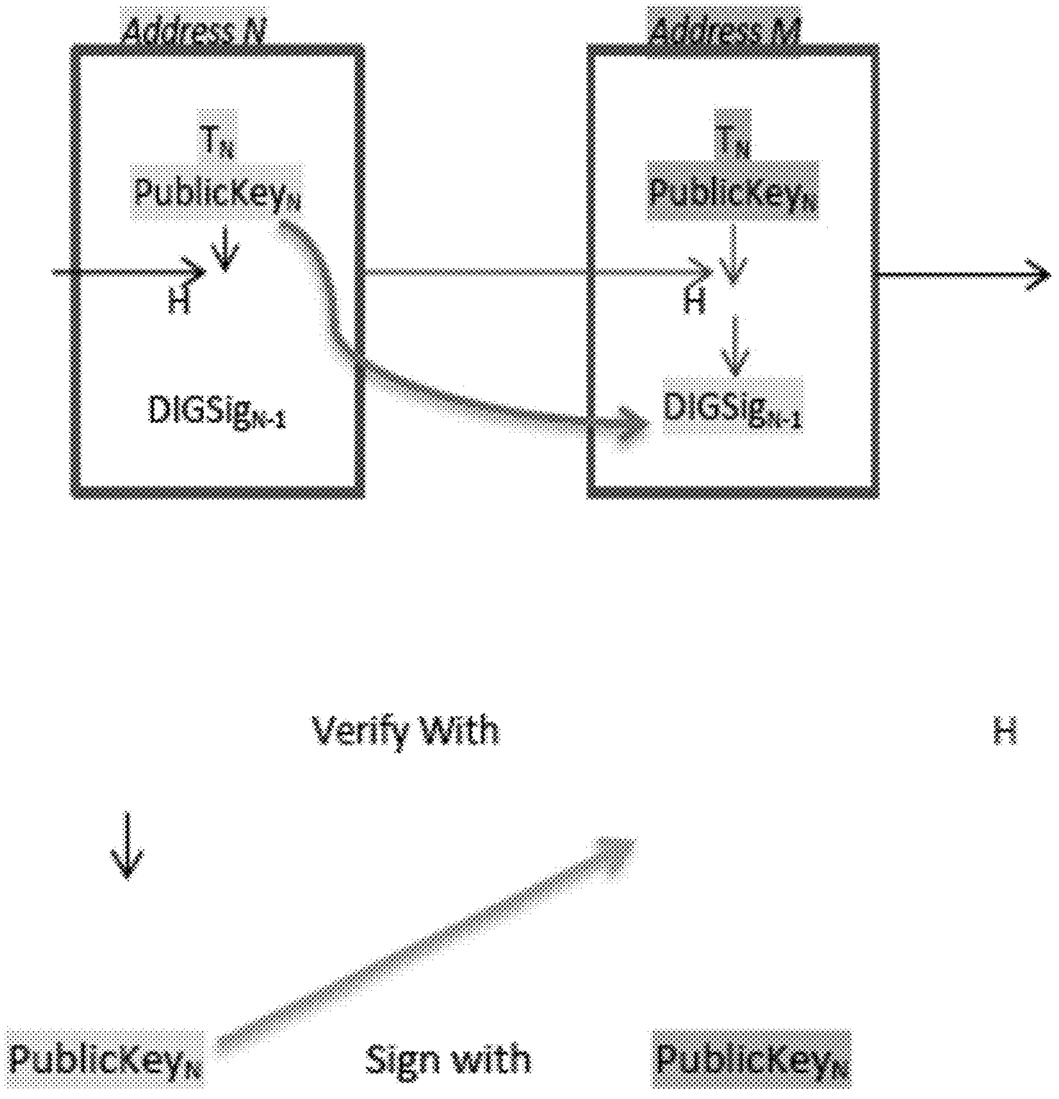
Fig.22: SOCOACT—Fig.22

| Field | Description | Size |
|---|---|---|
| Magic No | Value always 0xD9B4BEF9 | 4 bytes |
| Blocksize | Number of bytes following up to end of block | 4 bytes |
| Blockheader | Consists of 6 items | 80 bytes |
| Transaction counter | Positive integer VI = Varint | 1-9 bytes |
| transactions | The (non empty) list of transactions | <Transaction counter>-many transactions |

Fig.23: SOCOACT—Fig.23

| Field | Purpose | Updated when ... | Size |
|---|---|---|---|
| Version | Block version number | When software upgraded | 4 |
| hashPrevBlock | 256-bit hash of the previous block header | A new block comes in | 32 |
| hashMerkleRoot | 256-bit hash based on all of the transactions in the block (aka checksum) | A transaction is accepted | 32 |
| Time | Current timestamp as seconds since 1970-01-01T00:00 UTC | Every few seconds | 4 |
| Bits | Current target in compact format | The difficulty is adjusted | 4 |
| Nonce | 32-bit number (starts at 0) | A hash is tried (increments) | 4 |

Fig.24: SOCOACT—Fig.24

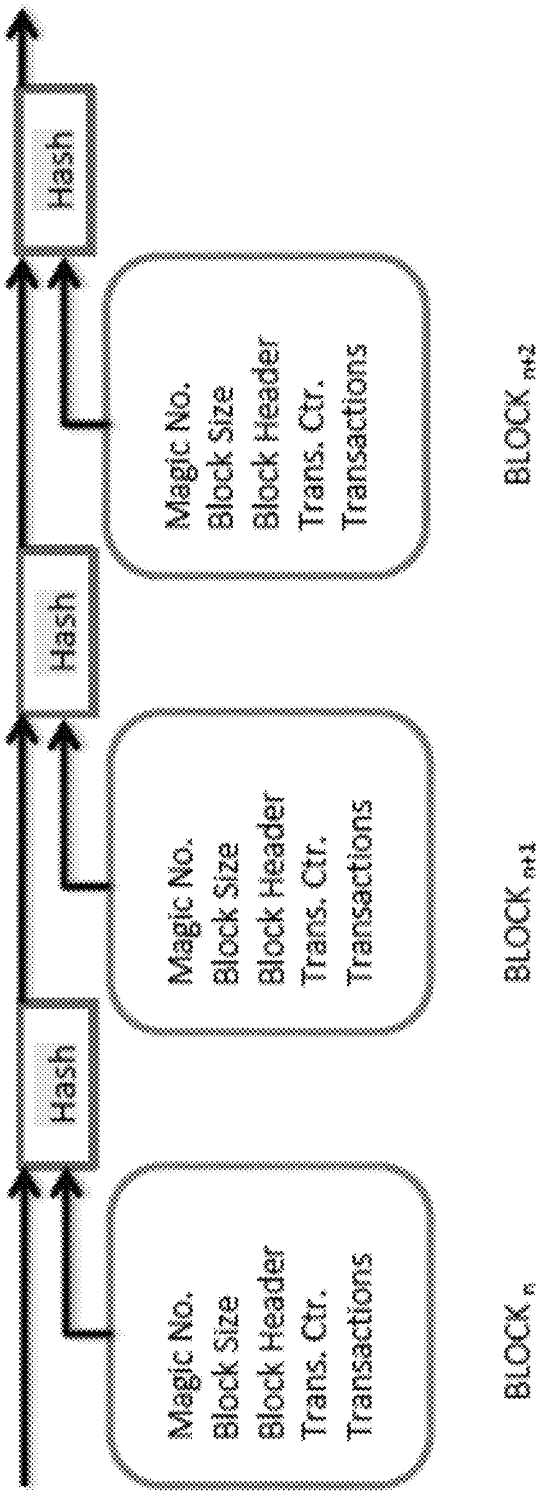
Fig.25: SOCOACT—Fig.25

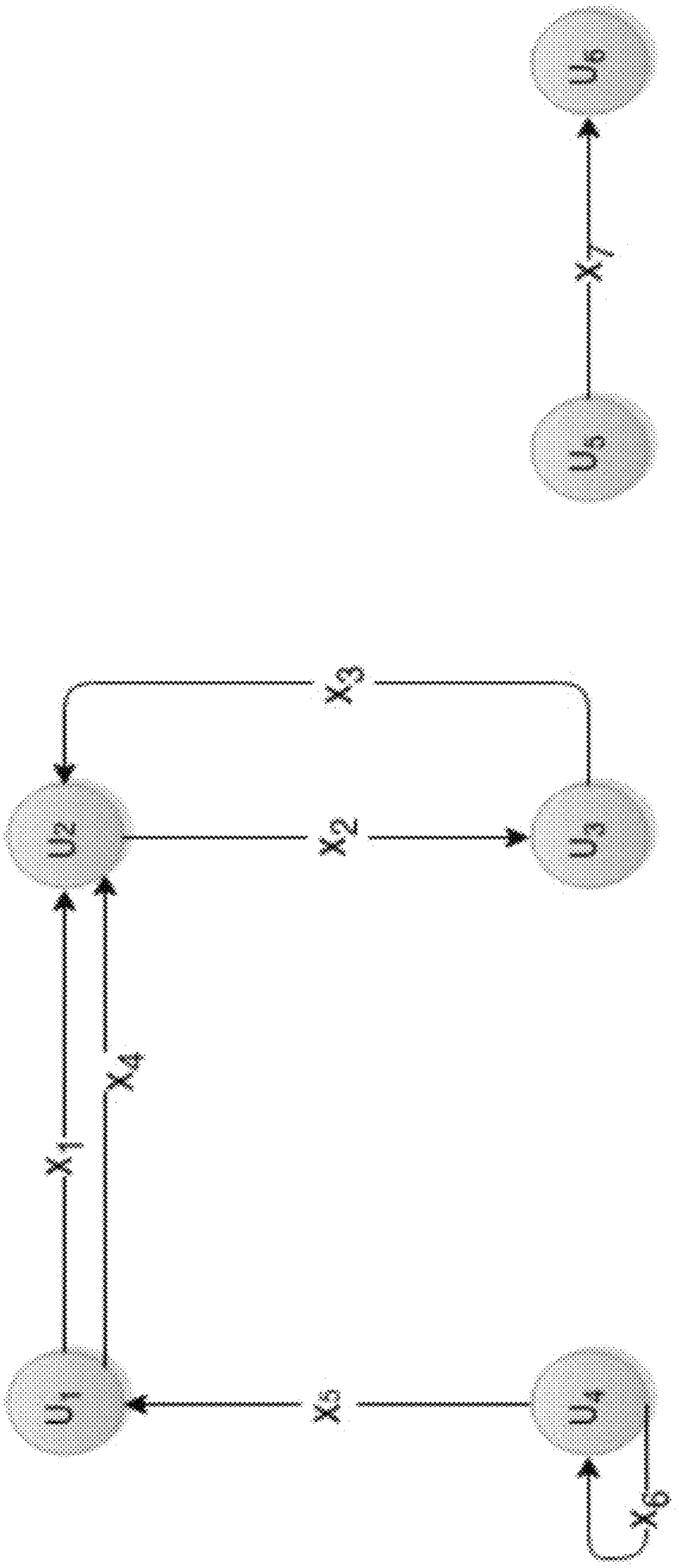
Fig.26: SOCOACT—Transaction Diagram

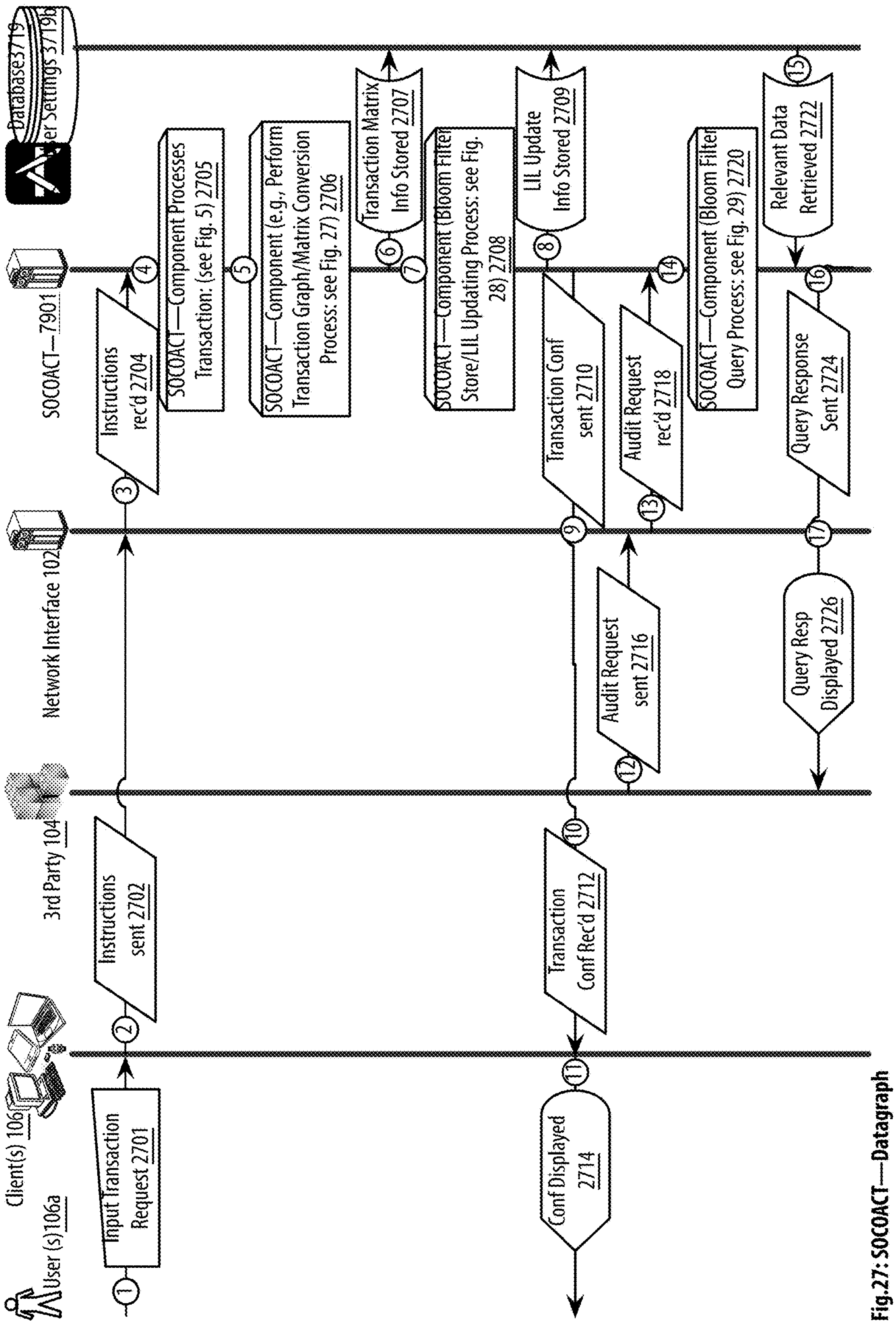
Fig.27: SOCOACT—Datagraph

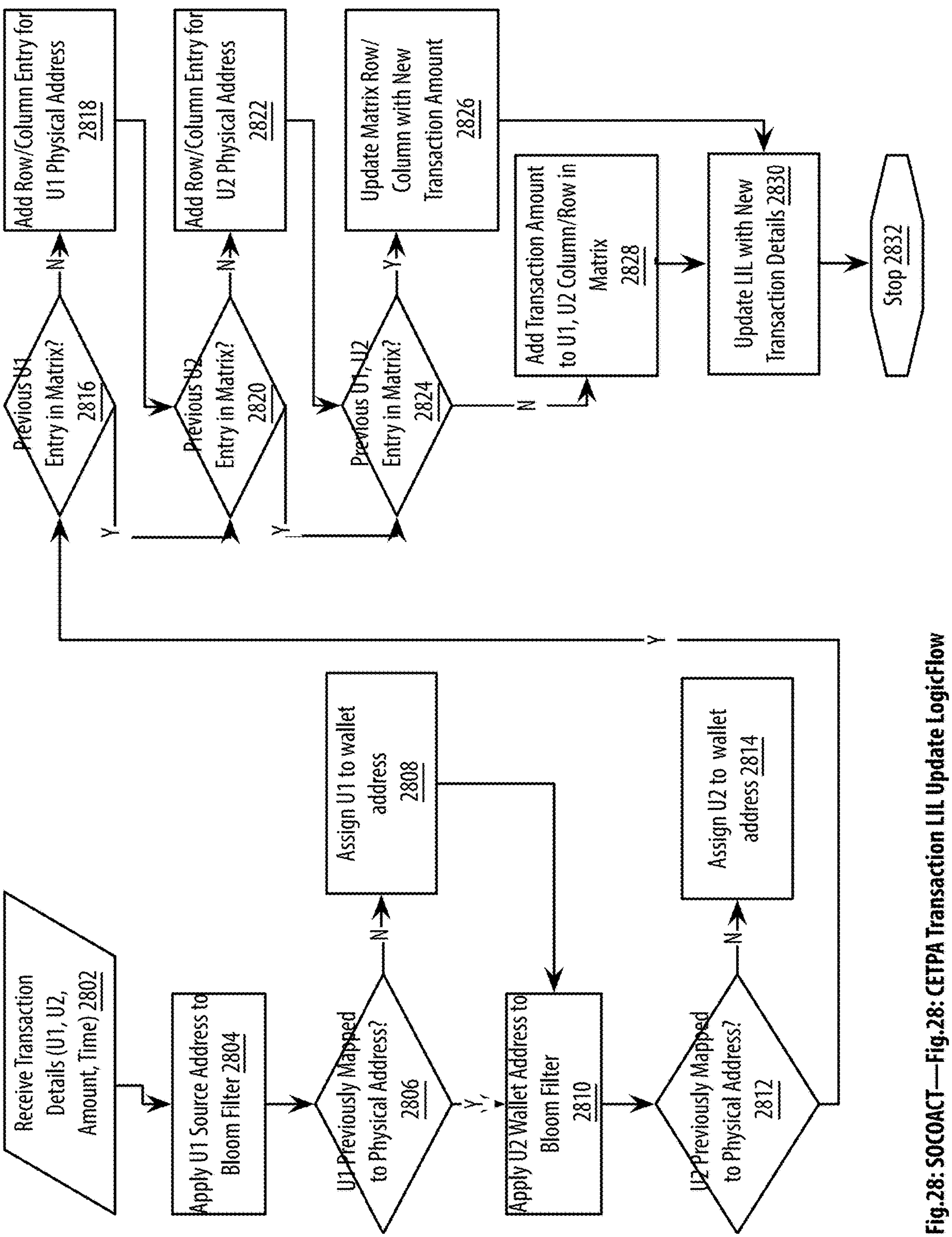
Fig.28: SOCOACT—Fig.28: CETPA Transaction LIL Update LogicFlow

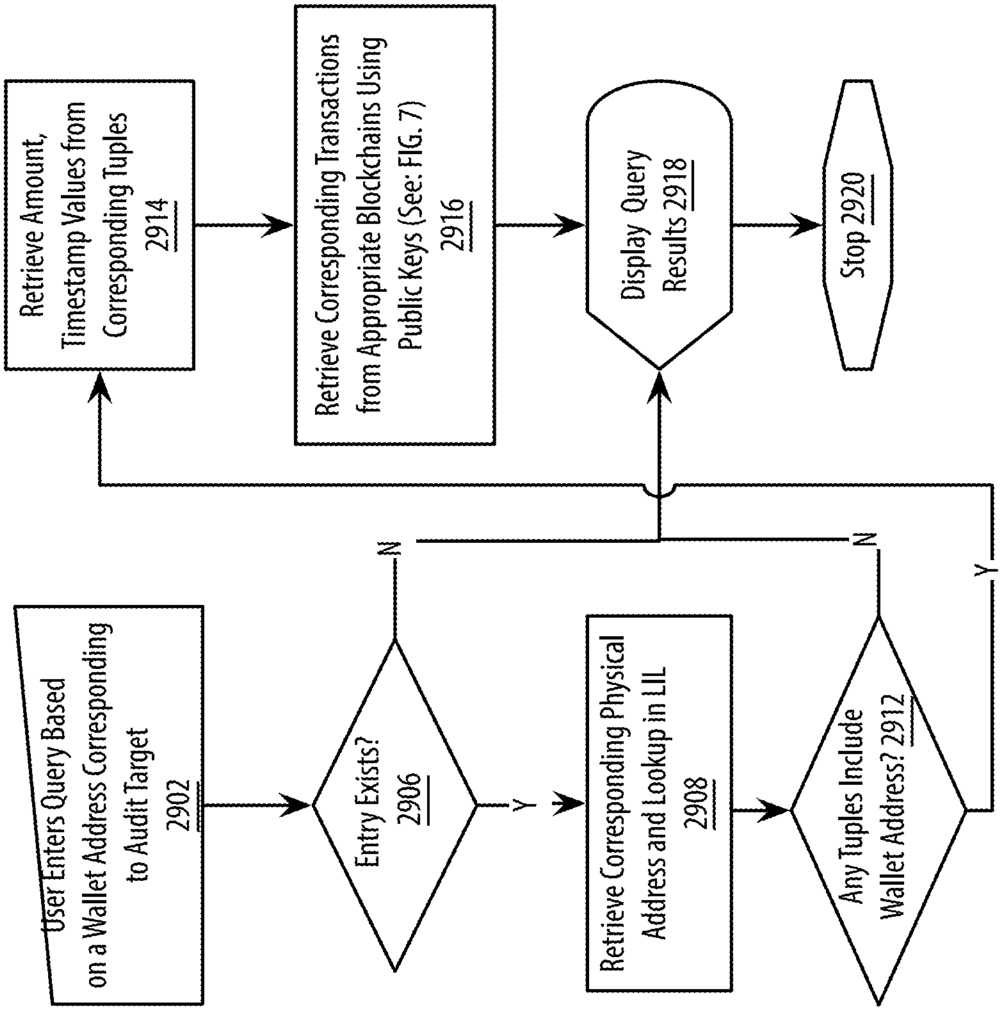
Fig.29: SOCOACT—LIL Query Logic Flow

| Field | Description | Size |
|---|---|---|
| Previous Transaction hash | doubled SHA256-hashed of a (previous) to-be-used transaction | 32 bytes |
| Previous Txout-index | non negative integer indexing an output of the to-be-used transaction | 4 bytes |
| Txin-script length | non negative integer VI = VarInt | 1 - 9 bytes |
| Txin-script / scriptSig | Script | <in-script length>-many bytes |
| sequence_no | normally 0xFFFFFFFF; irrelevant unless transaction's lock_time is > 0 | 4 bytes |

Fig.30: SOCOACT—Data Structure $$
\begin{pmatrix}
 & u_1 & u_2 & u_3 & u_4 & u_5 & u_6 \\
u_1 & 0 & x_1 + x_4 & 0 & 0 & 0 & 0 \\
u_2 & 0 & 0 & x_2 & 0 & 0 & 0 \\
u_3 & 0 & x_3 & 0 & 0 & 0 & 0 \\
u_4 & x_5 & 0 & 0 & 0 & 0 & 0 \\
u_5 & 0 & 0 & 0 & 0 & 0 & x_7 \\
u_6 & 0 & 0 & 0 & 0 & 0 & 0
\end{pmatrix}
$$

Fig.31: SOCOACT—Distance Matrix $$
\begin{pmatrix}
 & u_1 & u_2 & u_3 & u_4 & u_5 & u_6 & \cdots & u_n \\
u_1 & 0 & x_1 + x_4 & 0 & 0 & 0 & 0 & \cdots & 0 \\
u_2 & 0 & 0 & x_2 & 0 & 0 & 0 & \cdots & 0 \\
u_3 & 0 & x_3 & 0 & 0 & 0 & 0 & \cdots & 0 \\
u_4 & x_5 & 0 & 0 & 0 & 0 & 0 & \cdots & 0 \\
u_5 & 0 & 0 & 0 & 0 & 0 & x_7 & \cdots & 0 \\
u_6 & 0 & 0 & 0 & 0 & 0 & 0 & \cdots & 0 \\
\vdots & \vdots & \vdots & \vdots & \vdots & \vdots & \vdots & \ddots & \vdots \\
u_n & 0 & 0 & 0 & 0 & 0 & 0 & \cdots & 0
\end{pmatrix}
$$

Fig.32: SOCOACT—Distance Matrix Outflow $$
\begin{pmatrix}
 & u_1 & u_2 & u_3 & u_4 & u_5 & u_6 & \cdots & u_n \\
u_1 & 0 & 0 & 0 & x_5 & 0 & 0 & \cdots & 0 \\
u_2 & x_1 + x_4 & 0 & x_3 & 0 & 0 & 0 & \cdots & 0 \\
u_3 & 0 & x_2 & 0 & 0 & 0 & 0 & \cdots & 0 \\
u_4 & 0 & 0 & 0 & 0 & 0 & 0 & \cdots & 0 \\
u_5 & 0 & 0 & 0 & 0 & 0 & 0 & \cdots & 0 \\
u_6 & 0 & 0 & 0 & 0 & x_7 & 0 & \cdots & 0 \\
\vdots & \vdots & \vdots & \vdots & \vdots & \vdots & \vdots & \ddots & \vdots \\
u_n & 0 & 0 & 0 & 0 & 0 & 0 & \cdots & 0
\end{pmatrix}
$$

Fig.33: SOCOACT—Distance Matrix Inflow $$\begin{pmatrix} [row, column, value] \\ u_1, u_2, x_1 + x_4 \\ u_2, u_3, x_2 \\ u_3, u_2, x_3 \\ u_4, u_1, x_5 \\ u_5, u_6, x_7 \\ \vdots \end{pmatrix}$$

Fig.34: SOCOACT—Sparse Matrix Storage

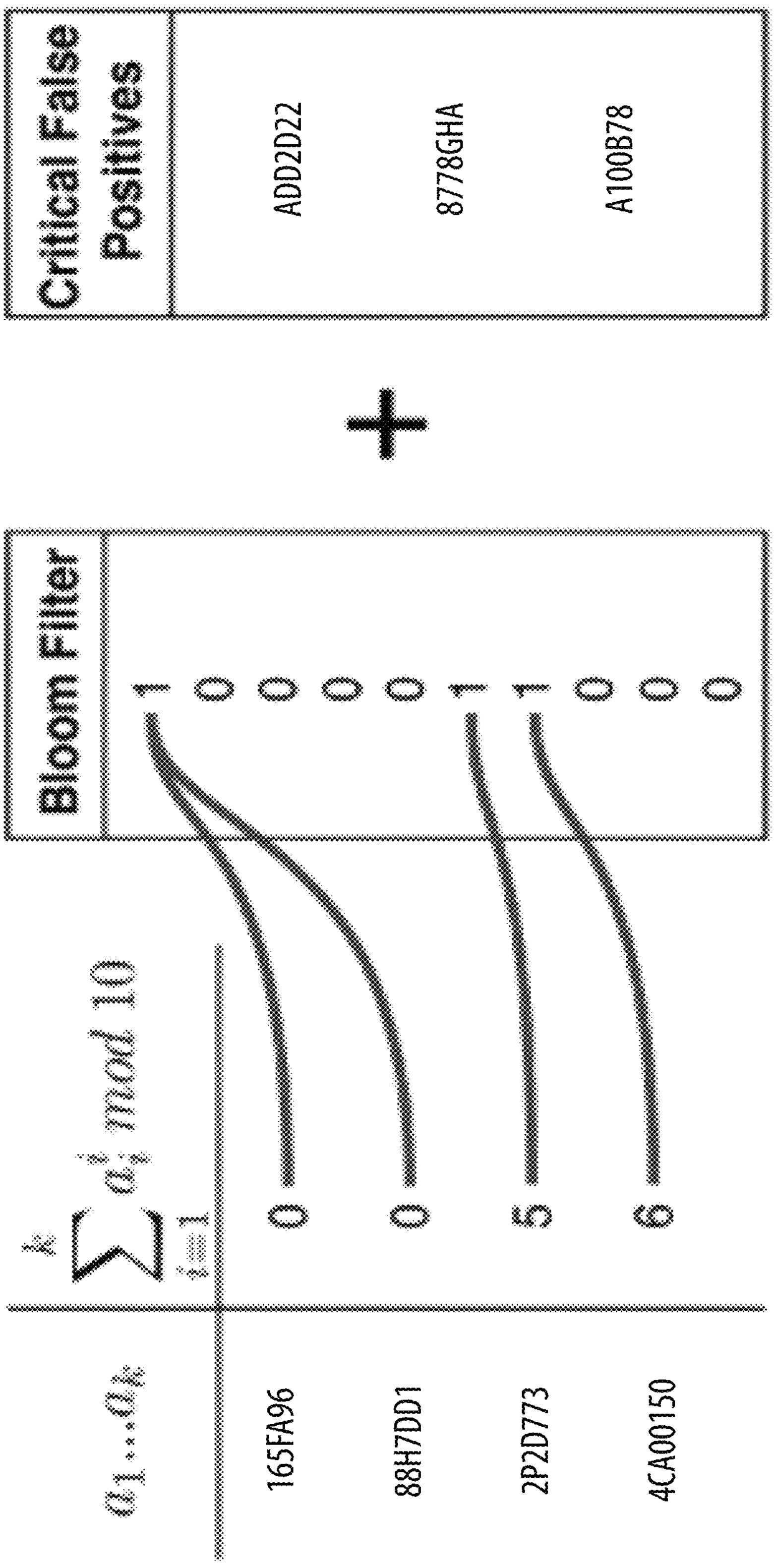
Fig.35: SOCOACT—Bloom Filter

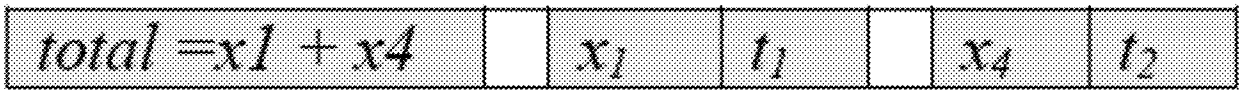
Fig.36: SOCOACT—Value Storage Tuple Example

EXEMPLARY SOCOACT MODEL

EXEMPLARY SOCOACT MODEL

EXEMPLARY SOCOACT USAGE SCENARIO

EXEMPLARY SOCOACT DATA FLOW

EXEMPLARY SOCOACT DATA FLOW

EXEMPLARY SOCOACT SMART CONTRACT GENERATING (SCG) COMPONENT

EXEMPLARY SOCOACT SMART CONTRACT FULFILLMENT (SCF) COMPONENT

EXEMPLARY SOCOACT SCREENSHOT

SMART CONTRACT GENERATOR WEBPAGE

| Contract Type | Repo |
| Duration | 1 Day |

| Participant A | Unique ID of Participant A |
| Crypto Currency Amount | $1,000,000,000 |
| Oracle A Source | Authority A |

| Participant B | Unique ID of Participant B |
| Collateral Type | Shares of NASDAQ:AAPL |
| Collateral Amount | 9,174,312 Shares |
| Oracle B Source | Authority B |

| Other Conditions | Stay within 2% |
| Oracle Source | NASDAQ |

[GENERATE CONTRACT]

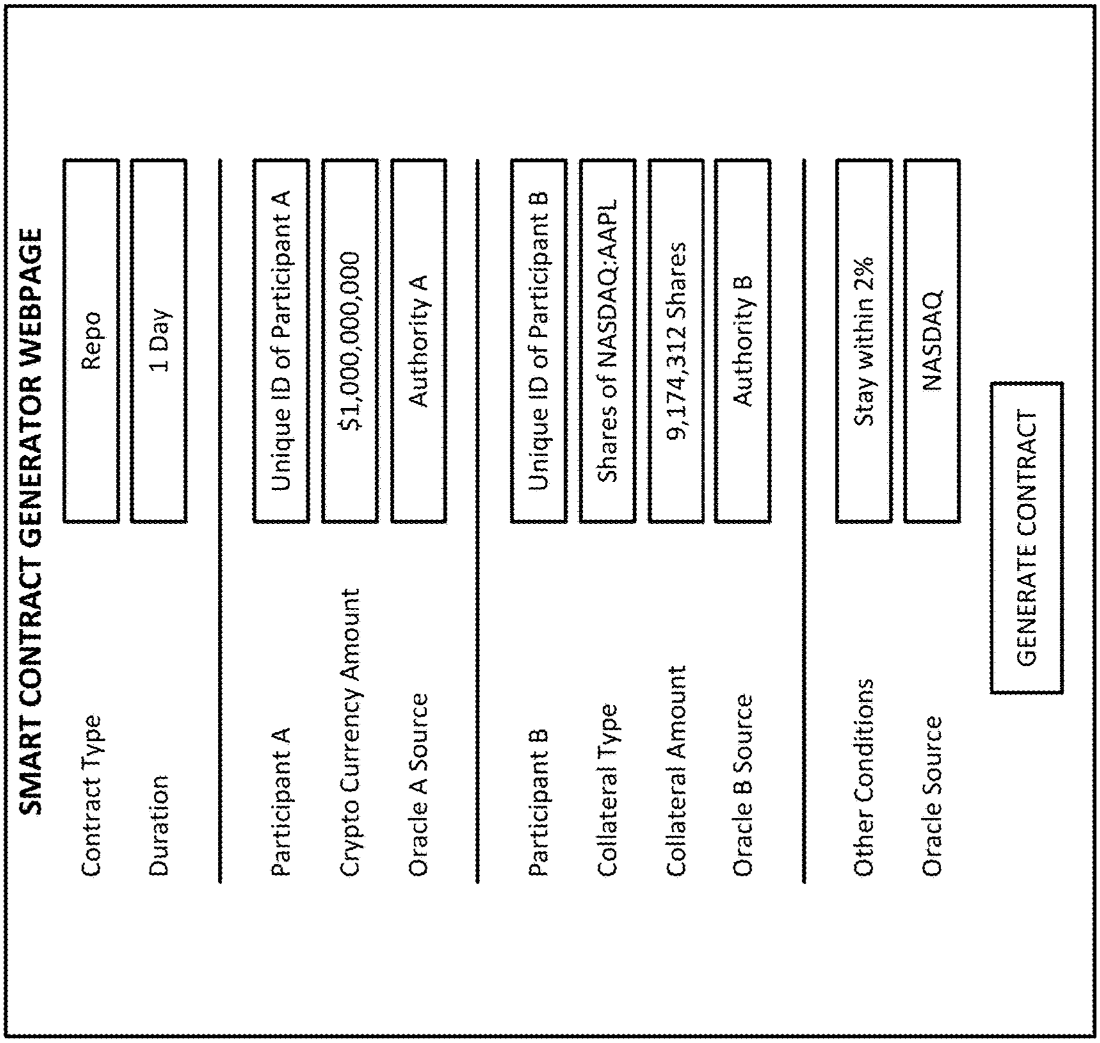

FIGURE 43

EXEMPLARY SOCOACT SCREENSHOT

EXEMPLARY SOCOACT SCREENSHOT

EXEMPLARY SOCOACT DATA FLOW

EXEMPLARY SOCOACT MKADSD GENERATING (MKADSDG) COMPONENT

EXEMPLARY SOCOACT CRYPTO KEY RECOVERY (CKR) COMPONENT

EXEMPLARY SOCOACT DATA FLOW

EXEMPLARY SOCOACT VOTER AUTHENTICATION (VA) COMPONENT

EXEMPLARY SOCOACT VOTE PROCESSING (VP) COMPONENT

EXEMPLARY SOCOACT SCREENSHOT

EXEMPLARY SOCOACT SCREENSHOT

EXEMPLARY SOCOACT SCREENSHOT

EXEMPLARY SOCOACT DATA FLOW

EXEMPLARY SOCOACT VERIFICATION PROCESSING (VEP) COMPONENT

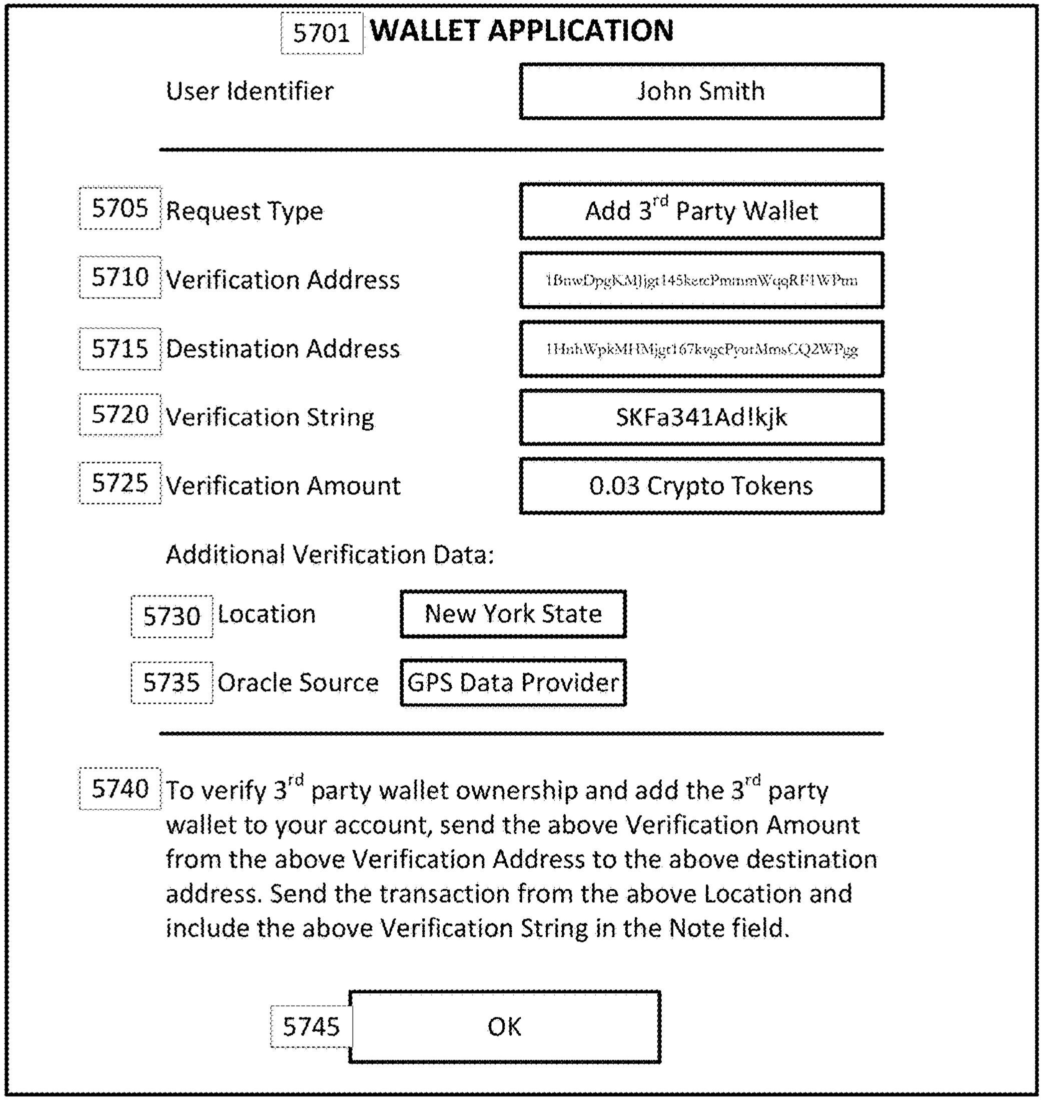

FIGURE 57

EXEMPLARY SOCOACT SCREENSHOT

| 5701 | WALLET APPLICATION |

User Identifier: John Smith

---

5705 Request Type: Add 3rd Party Wallet

5710 Verification Address: 1BmeDpgKMlgt145keecPmmmWqpRf1WPm

5715 Destination Address: 1HnIWpkMfrMtjgt167kvgePyotMmsCQ2WPgg

5720 Verification String: SkFa341Adlkjk

5725 Verification Amount: 0.03 Crypto Tokens

Additional Verification Data:

5730 Location: New York State

5735 Oracle Source: GPS Data Provider

---

5740 To verify 3rd party wallet ownership and add the 3rd party wallet to your account, send the above Verification Amount from the above Verification Address to the above destination address. Send the transaction from the above Location and include the above Verification String in the Note field.

5745 OK

EXEMPLARY SOCOACT TOA INTEGRATION MODEL

EXEMPLARY SOCOACT TOA MODEL

EXEMPLARY SOCOACT ARCHITECTURE

EXEMPLARY SOCOACT BROKER TO BROKER API CALLS MODEL

EXEMPLARY SOCOACT BROKER TO BROKER API CALLS MODEL

EXEMPLARY SOCOACT SMART CONTRACTS MODEL

EXEMPLARY SOCOACT SMART CONTRACTS MODEL

EXEMPLARY SOCOACT DATA FLOW

EXEMPLARY SOCOACT TOA TRANSACTION INITIATING (TTI) COMPONENT

EXEMPLARY SOCOACT TOA TRANSACTION PROCESSING (TTP) COMPONENT

EXEMPLARY SOCOACT SCREENSHOT

EXEMPLARY SOCOACT SCREENSHOT

EXEMPLARY SOCOACT IDENTITY VERIFICATION MODEL

EXEMPLARY SOCOACT HASH CALCULATION

EXEMPLARY SOCOACT ASSET CREATION MODEL

EXEMPLARY SOCOACT ASSET CREATION MODEL

EXEMPLARY SOCOACT ASSET ISSUANCE MODEL

EXEMPLARY SOCOACT ASSET ISSUANCE MODEL

EXEMPLARY SOCOACT WALLET ADMINISTRATION MODEL

EXEMPLARY SOCOACT TOA BLOCKCHAIN TRANSACTION

FIGURE 78

```
pragma solidity ^0.4.8;
contract MyToken {
  /* This creates an array with all balances */
  struct balance{
    uint256 balanceamt;
  }

  struct myasset{
    string symbol;
    uint256 supply;
    mapping (address => balance) balances;
  }

  mapping (bytes24 => myasset) public assets;


  /* Initializes contract with initial supply tokens to the creator of the contract */
  function MyToken(bytes24 _symb,string _symbol, uint256 _supply ) {
    assets[_symb].symbol = _symbol;
    assets[_symb].balances[0xec71532174993db43b863fe29673bc6B8fA9E10E].balanceamt = _supply ;
    assets[_symb].supply = _supply;
  }


  /* Check Balances */
  function checkBalance(bytes24 _symb,address _at) constant returns(uint256 _bal, string _symbol){
    _symbol = assets[_symb].symbol;
    _bal = assets[_symb].balances[_at].balanceamt;
    return (_bal,_symbol);

  }

  /*Add More assets */
  function addIssue(bytes24 _symb,string _symbol, uint256 _supply, address _at){
    assets[_symb].symbol = _symbol;
    assets[_symb].balances[_at].balanceamt = _supply;
    assets[_symb].supply = _supply;
  }

  /*Send assets*/
  function sendCoins(address _from,address _to,bytes24 _symb,uint256 _amt){
    if (assets[_symb].balances[_from].balanceamt < _amt) throw;
    assets[_symb].balances[_from].balanceamt -= _amt;
    assets[_symb].balances[_to].balanceamt += _amt;
  }
}
```

EXEMPLARY SOCOACT TOA SMART CONTRACT

ASYNCHRONOUS CRYPTO ASSET TRANSFER AND SOCIAL AGGREGATING, FRACTIONALLY EFFICIENT TRANSFER GUIDANCE, CONDITIONAL TRIGGERED TRANSACTION, DATASTRUCTURES, APPARATUSES, METHODS AND SYSTEMS

PRIORITY CLAIM

Applicant hereby claims benefit to priority under 35 USC § 120 as a continuation-in-part of: U.S. patent application Ser. No. 15/210,813, filed Jul. 14, 2016, entitled "Crypto Key Recovery and Social Aggregating, Fractionally Efficient Transfer Guidance, Conditional Triggered Transaction, Datastructures, Apparatuses, Methods and Systems," and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems".

Applicant hereby claims benefit to priority under 35 USC § 120 as a continuation-in-part of U.S. patent application Ser. No. 15/210,817, filed Jul. 14, 2016, entitled "Crypto Voting and Social Aggregating, Fractionally Efficient Transfer Guidance, Conditional Triggered Transaction, Datastructures, Apparatuses, Methods and Systems," and which in turn claims benefit to priority under 35 USC § 119 as a non-provisional conversion of U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems".

Applicant hereby claims benefit to priority under 35 USC § 120 as a continuation-in-part of: U.S. patent application Ser. No. 15/210,807, filed Jul. 14, 2016, entitled "Smart Rules and Social Aggregating, Fractionally Efficient Transfer Guidance, Conditional Triggered Transaction, Datastructures, Apparatuses, Methods and Systems," and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems".

Applicant hereby claims benefit to priority under 35 USC § 120 as a continuation-in-part of: U.S. patent application Ser. No. 15/210,795, filed Jul. 14, 2016, entitled "Social Aggregating, Fractionally Efficient Transfer Guidance, Conditional Triggered Transaction, Datastructures, Apparatuses, Methods and Systems," and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems".

Applicant hereby claims benefit to priority under 35 USC § 120 as a continuation-in-part of: U.S. patent application Ser. No. 15/210,821, filed Jul. 14, 2016, entitled "Crypto Captcha and Social Aggregating, Fractionally Efficient Transfer Guidance, Conditional Triggered Transaction, Datastructures, Apparatuses, Methods and Systems," and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems," US provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems," U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems".

Applicant hereby claims benefit to priority under 35 USC § 120 as a continuation-in-part of: U.S. patent application Ser. No. 14/799,282, filed Jul. 14, 2015, entitled "Point-to-Point Transaction Guidance Apparatuses, Methods and Systems".

Applicant hereby claims benefit to priority under 35 USC § 120 as a continuation-in-part of: U.S. patent application Ser. No. 14/799,242, filed Jul. 14, 2015, entitled "Point-to-Point Transaction Guidance Apparatuses, Methods and Systems".

Applicant hereby claims benefit to priority under 35 USC § 120 as a continuation-in-part of: U.S. patent application Ser. No. 14/799,229, filed Jul. 14, 2015, entitled "Point-to-Point Transaction Guidance Apparatuses, Methods and Systems".

Applicant hereby claims benefit to priority under 35 USC § 120 as a continuation-in-part of: U.S. patent application Ser. No. 14/963,165, filed Dec. 8, 2015, entitled "Social Aggregated Fractional Equity Transaction Partitioned Acquisition Apparatuses, Methods and Systems".

Applicant hereby claims benefit to priority under 35 USC § 120 as a continuation-in-part of: U.S. patent application Ser. No. 15/019,926, filed Feb. 9, 2016, entitled "Computationally Efficient Transfer Processing and Auditing Apparatuses, Methods and Systems".

Applicant hereby claims benefit to priority under 35 USC § 120 as a continuation-in-part of: U.S. patent application Ser. No. 15/209,701, filed Jul. 13, 2016, entitled "Point-to-Point Transaction Guidance Apparatuses, Methods and Systems".

Applicant hereby claims benefit to priority under 35 USC § 120 as a continuation-in-part of: U.S. patent application Ser. No. 15/209,709, filed Jul. 13, 2016, entitled "Point-to-Point Transaction Guidance Apparatuses, Methods and Systems".

Applicant hereby claims benefit to priority under 35 USC § 120 as a continuation-in-part of: U.S. patent application Ser. No. 15/209,714, filed Jul. 13, 2016, entitled "Point-to-Point Transaction Guidance Apparatuses, Methods and Systems".

Applicant hereby claims benefit to priority under 35 USC § 120 as a continuation-in-part of: Patent Cooperation Treaty application serial no. PCT/US16/42169, filed Jul. 13, 2016, entitled "Computationally Efficient Transfer Processing, Auditing, and Search Apparatuses, Methods and Systems".

Applicant hereby claims benefit to priority under 35 USC § 120 as a continuation-in-part of: U.S. patent application Ser. No. 15/210,781, filed Jul. 14, 2016, entitled "Computationally Efficient Transfer Processing, Auditing, and Search Apparatuses, Methods and Systems".

Applicant hereby claims benefit to priority under 35 USC § 120 as a continuation-in-part of: U.S. patent application Ser. No. 15/486,243, filed Apr. 12, 2017, entitled "Computationally Efficient Transfer Processing, Auditing, and Search Apparatuses, Methods and Systems".

Applicant hereby claims benefit to priority under 35 USC § 120 as a continuation-in-part of: U.S. patent application Ser. No. 15/844,375, filed Dec. 15, 2017, entitled "Social Data Tracking Datastructures, Apparatuses, Methods and Systems".

Applicant hereby claims benefit to priority under 35 USC § 120 as a continuation-in-part of: U.S. patent application Ser. No. 15/844,404, filed Dec. 15, 2017, entitled "Social Data Tracking Datastructures, Apparatuses, Methods and Systems".

Applicant hereby claims benefit to priority under 35 USC § 120 as a continuation-in-part of: U.S. patent application Ser. No. 15/844,387, filed Dec. 15, 2017, entitled "Social Data Tracking Datastructures, Apparatuses, Methods and Systems".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address Guided Target Transactions and Encrypted Transaction Processing and Verification, and more particularly, include Asynchronous Crypto Asset Transfer and Social Aggregating, Fractionally Efficient Transfer Guidance, Conditional Triggered Transaction, Datastructures, Apparatuses, Methods and Systems.

As such, the present innovations include (at least) the following distinct areas, including: Electrical Communications with Selective Electrical Authentication of Communications (with a suggested Class/Subclass of 340/5.8); Data Processing Using Cryptography for Secure Transactions including Transaction Verification and Electronic Credentials (with a suggested Class/Subclass of 705/64, 74, 75); and Electronic Funds Transfer with Protection of Transmitted Data by Encryption and Decryption (with a suggested Class/Subclass of 902/2).

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Bitcoin is the first successful implementation of a distributed crypto-currency. Bitcoin is more correctly described as the first decentralized digital currency. It is the largest of its kind in terms of total market value and is built upon the notion that money is any object, or any sort of record, accepted as payment for goods and services and repayment of debts. Bitcoin is designed around the idea of using cryptography to control the creation and of money. Bitcoin enables instant payments to anyone, anywhere in the world. Bitcoin uses peer-to-peer technology to operate with no central authority. Transaction management and money issuance are carried out collectively by the network via consensus.

Bitcoin is an open source software application and a shared protocol. It allows users to anonymously and instantaneously transact Bitcoin, a digital currency, without needing to trust counterparties or separate intermediaries. Bitcoin achieves this trustless anonymous network using public/private key pairs, a popular encryption technique.

Bitcoin, a cryptographically secure decentralized peer-to-peer (P2P) electronic payment system enables transactions involving virtual currency in the form of digital tokens. Such digital tokens, Bitcoin coins (BTCs), are a type of crypto-currency whose implementation relies on cryptography to generate the tokens as well as validate related transactions. Bitcoin solves counterfeiting and double-spending problems without any centralized authority. It replaces trust in a third-party such as a bank with a cryptographic proof using a public digital ledger accessible to all network nodes in which all BTC balances and transactions are announced, agreed upon, and recorded. Transactions are time-stamped by hashing them into an ongoing chain of hash-based proof-of-work (PoW) forming a record that can't be changed without redoing the entire chain. Anonymity is maintained through public-key cryptography by using peer-to-peer (P2P) addresses without revealing user identity.

Bitcoin coin (BTC) is essentially a hashed chain of digital signatures based upon asymmetric or public key cryptography. Each participating Bitcoin address in the P2P network is associated with a matching public key and private key wherein a message signed by private key can be verified by others using the matching public key. A Bitcoin address corresponds to the public key which is a string of 27-34 alphanumeric characters (such as: 1BZ9aCZ4hHX7rnnrt2uHTfYAS4hRbph3UN or 181TK6dMSy88SvjNlmmoDkjB9TmvXRqCCv) and occupies about 500 bytes. The address is not a public key. An Address is a RIPEMD-160 hash of an SHA256 hash of a public key. If that public key hashes (RIPEMD160) to the Bitcoin Address in a previously unclaimed transaction, it can be spent. Users are encouraged to create a new address for every transaction to increase privacy for both sender and receiver. While this creates anonymity for both sender and receiver, however, given irreversibility of transactions, non-repudiation may be compromised. Addresses can be created using Bitcoin clients or 'wallets'. The sender uses his or her private key to assign payments to receiver's public key or address. Characters within the address also serve as checksum to validate any typographical errors in typing the address. The private key is the secret key that is necessary to access BTCs assigned to the corresponding public key address. Private keys start with first character '1' or '3,' where '1' implies use of one key while '3' denotes multiple private keys for 'unlocking' a payment. Bitcoin addresses and associated private keys are stored in encrypted wallet data files typically backed up offline for security. If a wallet or a private key is lost, related BTCs are then also irretrievably lost.

BRIEF DESCRIPTION OF THE DRAWINGS

Appendices and/or drawings illustrating various, non-limiting, example, innovative aspects of the Asynchronous Crypto Asset Transfer and Social Aggregating, Fractionally Efficient Transfer Guidance, Conditional Triggered Transaction, Datastructures, Apparatuses, Methods and Systems (hereinafter "SOCOACT") disclosure, include:

FIG. 1A2 shows an exemplary model for the SOCOACT;

FIG. 1B shows a block diagram illustrating embodiments of a network environment including the SOCOACT;

FIG. 2 shows a block diagram illustrating embodiments of a network environment including the SOCOACT;

FIG. 3 shows a block diagram illustrating embodiments of a network nodes of the SOCOACT FIG. 4 shows a datagraph diagram illustrating embodiments of a login process for the SOCOACT;

FIG. 5 shows a datagraph illustrating embodiments of an event trace for a typical transaction for the SOCOACT;

FIG. 6 shows a flowchart of a blockchain generation process for the SOCOACT;

FIG. 7 shows a flowchart of a blockchain auditing process for the SOCOACT;

FIG. 8 shows a flowchart of a virtual currency transaction process for the SOCOACT;

FIG. 9 shows a Bluetooth or NFC-enabled environment for enabling a SOCOACT transaction;

FIG. 10 shows a flowchart of a Bluetooth payment process for the SOCOACT;

FIG. 11 shows a flowchart of a Bluetooth inter-party payment process for the SOCOACT;

FIG. 12 shows a flowchart of a verified payment process for the SOCOACT;

FIG. 13 shows a flowchart of a meter reading process for the SOCOACT;

FIG. 14 shows a flowchart of a resource monitoring process for the SOCOACT;

FIG. 15 shows a flowchart of a micropayment button payment process for the SOCOACT;

FIG. 16 shows a flowchart of a personnel tracking process for the SOCOACT;

FIG. 17 shows a flowchart of a voting process for the SOCOACT;

FIG. 18 shows a logic flow diagram illustrating embodiments of a fractional ownership equity purchase process for the SOCOACT;

FIG. 19 shows a datagraph diagram illustrating embodiments of an equity research process for the SOCOACT;

FIG. 20 shows a datagraph diagram illustrating embodiments of a fractional ownership equity transaction process for the SOCOACT;

FIG. 21 shows a datagraph diagram illustrating embodiments of an equity ownership audit process for the SOCOACT;

FIG. 22 shows a schematic representation of generating an ownership block for the blockchain maintained by the SOCOACT;

FIG. 23 shows a schematic representation of the data structure of an equity ownership transaction block in the blockchain maintained by the SOCOACT;

FIG. 24 shows a schematic representation of the data structure of the blockheader field of the ownership transaction block in the blockchain maintained by the SOCOACT;

FIG. 25 shows a schematic representation of the creation of a blockchain from individual blocks as may be performed by the SOCOACT;

FIG. 26 is a schematic graphical representation of possible transactions between multiple parties that may be performed via the SOCOACT;

FIG. 27 shows a datagraph of a general matrix determination and tuple storage process as may be performed by the SOCOACT in various embodiments;

FIG. 28 shows a flow chart of a general matrix determination and LIL tuple storage process as may be performed by the SOCOACT in various embodiments;

FIG. 29 shows a flow chart of a general transaction query process as may be performed via the SOCOACT in various embodiments;

FIG. 30 shows a schematic representation of the data structure of the inputs and outputs for Bitcoin-like transactions performed by the SOCOACT;

FIG. 31 is an exemplary representation of a distance matrix generated by the SOCOACT to represent the various transactions depicted in FIG. 30;

FIG. 32 is an exemplary representation of a distance matrix generated by the SOCOACT to represent BTC outflow from the various vertices of FIG. 30;

FIG. 33 is an exemplary representation of a distance matrix generated by the SOCOACT to represent BTC inflow from the various vertices of FIG. 30;

FIG. 34 is an exemplary representation of a sparse matrix generated by the SOCOACT from the distance matrix of FIG. 31;

FIG. 35 is a schematic representation of a Bloom Filter as may be used by the SOCOACT for string storage and query;

FIG. 36 is a schematic representation the data structure of transaction tuples stored by the SOCOACT;

FIG. 43 shows a screenshot diagram illustrating embodiments of the SOCOACT;

FIG. 57 shows a screenshot diagram illustrating embodiments of the SOCOACT;

FIG. 78 shows an exemplary TOA smart contract for the SOCOACT; and

Figure 1A:
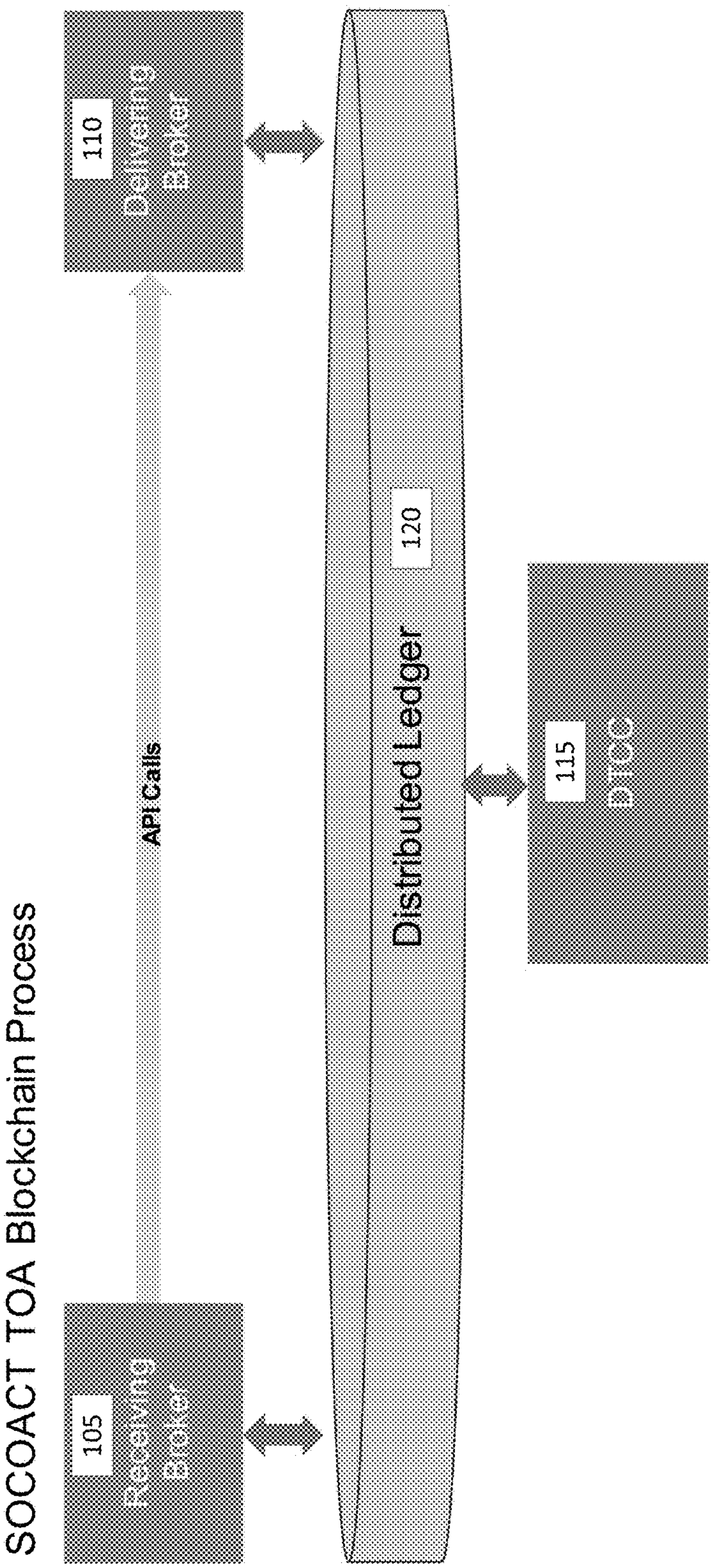
FIG. 1A shows an exemplary model for the SOCOACT.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Asynchronous Crypto Asset Transfer and Social Aggregating, Fractionally Efficient Transfer Guidance, Conditional Triggered Transaction, Datastructures, Apparatuses, Methods and Systems (hereinafter "SOCOACT") transforms transfer of assets (TOA) initiation request inputs, via SOCOACT components (e.g., Virtual Currency Component, Blockchain Component, Transaction Confirmation Component, TTI, TTP, etc.), into TOA confirmation outputs. The components, in various embodiments, implement advantageous features as set forth below.

Introduction

Bitcoin transactions are typically posted on a public, distributed ledger called a blockchain. The Bitcoin network stores complete copies of the blockchain on nodes that are distributed around the world. Anyone can install the Bitcoin software on a networked computer to begin running a node. Because the blockchain is public, anyone can see the complete history of Bitcoin transactions and the public addresses that are currently "storing" Bitcoin.

In order to move Bitcoin between public addresses, a user must prove that he owns the sending address that is storing the Bitcoin to be sent, and know the receiving address where the Bitcoin is to be transferred.

Before Bitcoin can be transferred out of a public address, the owner of that address must prove that he owns the address by signing the transaction with the same private key that was used to generate the public address. Upon successfully doing so, the transaction is then broadcast to the Bitcoin network. The network groups transactions into blocks, confirms that the transactions are valid, and adds the block to the blockchain.

Bitcoin as a form of payment for products and services has grown, and merchants have an incentive to accept it because fees are lower than the 2-3% typically imposed by credit card processors. Unlike credit cards, any fees are paid by the purchaser, not the vendor. The European Banking Authority and other authorities have warned that, at present, Bitcoin users are not protected by refund rights or an ability to obtain chargebacks with respect to fraudulent or erroneous transactions. These and other limitations in the previous implementation of Bitcoin are now readily addressed.

Implementation Variations

One possible non-monetary implementation for the SOCOACT is as a shared (virtual) ledger used to monitor, track and account for actual people that may go missing. Social media systems could use SOCOACT as a more secure and flexible way to keep track of people, identities and personas.

Using a SOCOACT as a way to store the identities will enable broad access to authorized users and can be implemented in a publicly-available way. Each and every addition or deletion to the ledger of identities will be traceable and viewable within the SOCOACT's Blockchain ledger.

This can be done by defining a few fields, with size and other attributes, publicly sharing the definition and allowing those skilled in the art to access and update, delete, change entries via tracing and auditing.

Implementations such as this could be used, for example with universities or governments and allow greater transparency. For instance, imagine there is a migration of peoples out of one country, say, in response to war or natural disaster. Typically, in historical cases there has been no feasible way to quickly track migrants during their relocation. A non-governmental organization (NGO) could use SOCOACT to create a Blockchain ledger of all displaced persons and that ledger could be used to track them through resettlement. The ledger could be referenced by individuals who could compare their credentials with those that are encrypted and stored through the ledger at a specific time and date in a Bitcoin-like format.

The SOCOACT system could also be used for voting in places where there may not be well developed voting tabulation systems and where voting tallies are suspect. For example, it can be used to build a voting system in a developing country. By using the blockchain technology, an immutable ledger is created that records the votes of each citizen. The record would allow for unique identification of each voting individual and allow for tabulation of votes. One could easily tell if people actually voted, for whom they voted, and confirms that no one voted twice. A virtual fingerprinting or other biometrics could be added to the ledger to help avoid fraud, as described herein in more detail with respect to additional embodiments.

SOCOACT may also be used for Proxy Voting for stocks or Corporations Annual Meetings that have questions put to a vote or for directors. The Blockchain adds transparency, speed and access to the information—and it can be verified and interrogated by many people. Accordingly, no one source needs to be trusted, as anyone in the public can see the ledger.

In underdeveloped areas the transport method could easily be 3G\LTE\4G\Mesh Networks with TCP\IP or other protocols used to transport the messages from a remote area, serviced by Mobile phone service—to the cloud where the accessible, shared Blockchain ledgers are maintained and made publicly available.

Implementations for better tracking of usage of resources can be enabled through the SOCOACT. For example, water meters, electric & gas meters, as well as environmental monitoring devices such as C02 emitter meters can be used to inform enable a Bitcoin-style a transaction involving resource usage or pollution emission. Using measurement devices that track the usage of these household resources or industrial pollutants, a Bitcoin-enabled marketplace between individuals, corporations and government entities can be created.

Suppose Alex lives a community or state that taxes greenhouse gases. By using the SOCOACT, both government waste as well as friction in the financial system can be mitigated. Alex may instantly receive a credit or a surcharge based on his use of resources. Micro transactions, which are not practical today because of the relatively high transaction costs, are easily accommodated as SOCOACT-enabled transactions, on the other hand, and can be moved daily, hourly or weekly with little transaction overhead.

For example, Alex makes a payment via SOCOACT that can be placed on the block chain for the tax amount due, but which may not be valid until a certain date (e.g. end of the month). When the transaction becomes valid, Bitcoin-like virtual currency is transferred to the town treasury and the town immediately credits some amount back, based on the meter reading.

Alex may have a $500 carbon surcharge on his taxes today. The monitors on Alex's furnace, his gas meter and electric meter can sum up all his uses resulting in carbon emissions and then net them out—all using the blockchain. Then because the blockchain is accessible by his local town he can get the surcharged reduced by, for example, $250 per year in response to Alex's environmentally friendly actions. Whereas in previous systems, Alex would have had to write out a check and mail it in, now, with SOCOACT, a simple entry in the blockchain is created, read by the town hall and a corresponding entry is made in the town hall ledger. By moving virtual currency between the two ledgers (could be the same ledger but different accounts) we have "monies"

moved without the mailing of a check, without the meter reader coming by, and without the bank processing as in prior systems.

Much like in home uses of SOCOACT, the SOCOACT may create a new paradigm for costs and billings of hotels, residences, dormitories, or other housings and lodgings having resources that are metered and billed to its occupants. The Blockchain may be used to track usage of resources such as water, electricity, TV charges, movie rentals, items taken from the refrigerator or mini-bar, heat and room temperature controls and the like. Hotel customers, resident, students or the like residing in individual or mass housing or lodging may then be credited or surcharged for their stay based on Bitcoin-enabled transactions and monitoring of their use of resources.

Monitors can be setup on appliances, heaters, a room-by-room water meter, and the like. The monitors can communicate with each other via Bluetooth, Zigbee, X.10, NFC, Wifi or other known means. Since low power consumption is generally preferred, the monitors may be coordinated by a single device in the room.

Through a hotel's use of SOCOACT, a client may check in, get a room assignment and receive a virtual key to enter the assigned room. The virtual key may be sent to the client's SOCOACT ledger, stored on his smartphone or other portable electronic device, and may be used to open the door when the phone is placed in proximity to the hotel room door lock, for example, where the smartphone or other device is Bluetooth or NFC-enabled and is in communication range of a corresponding reader in the room. This reader then connects with each measuring device for TV, heat, room service, water usage, etc. Throughout the client's stay, it tracks when the lights or air conditioning are left on, when in-room movies are rented, water usage for bath, sink and toilet and other chargeable room uses. A hotel client's bill upon check out can be reduced or enhanced with the hotel client's usage. Blockchain technology may also be used to record check-in and check-out times in order to more quickly free up the room to be rented again.

Also, SOCOACT may be used to enable a seamless checkout process. When a client checks in, a smart contract is created to move Bitcoin-like virtual currency after his checkout date. Since the address that the client provides at the time of check-out might not contain enough funds as it did on check-in, the projected funds for this transaction may remain locked by the SOCOACT, which can become valid and transferrable at a later time, i.e. upon check-out date. The hotel will immediately send credits or debits based on the actual usage of the hotel's amenities.

A consumer focused creation for SOCOACT could be using a Bluetooth Beacon as a method for determining where to send a payment from a virtual currency wallet. The housekeeper could tag a hotel room with her Bluetooth beacon. A client staying in the room could use their mobile device to pick up that Beacon, receive a virtual id of the housekeeper, and transfer an amount to the virtual id as a tip. In the same manner, the SOCOACT system could be used for the valet who retrieves the client's car, as well as other service providers at the hotel that may receive gratuities or the like.

Clients could also pay for Pay Per View Movies by Bluetooth/NFC sync and pay using their SOCOACT wallet.

Currently the Bluetooth Beacon is of a size that does not physically allow all uses, but over time it will shrink in size and allow uses on many devices and many purposes. Paying the housekeeper, the dog walker, the valet, and possibly tipping your waitress. The blockchain technology provides many ways to pay someone without having to even talk to them and without the exchange of cash or credit card number, thus reducing the potential for fraud that commonly results from such transactions presently.

Another implementation of SOCOACT is transactions involving a high value. For example, two persons which to make a face-to face transaction may meet in proximity of a Bluetooth beacon, where the Bluetooth or NFC chips in their respective electronic devices are matched. SOCOACT can enable the transaction of a large sum of money and micro-payments from the SOCOACT address of a payer to the SOCOACT address of the payee via the Bluetooth beacon or NFC reader, while avoiding the transaction fees that may render such transactions traditionally infeasible.

Using alternative, electronic currencies supported by Blockchain technology, individuals can carry all the funds needed in a currency that is not susceptible to local changes—allowing the seller to get paid and transfer his monies back into dollars or another currency.

Another example is using a pre-built device that is used to order small amounts of relatively inexpensive items in a fast and convenient way. SOCOACT could make these micro transactions feasible. For instance, a product or its packaging could include a button connected via Bluetooth or WiFi, Radio Frequencies or NFC (see, e.g., AMAZON DASH). This button could be re-usable and disposable. Once pushed the button will result in an order to a vendor or fulfillment house for a replacement of the individual product. On the back end, the shipping of the items could be aggregated through new or existing systems.

However, on the payment processing side there is an overhead percentage that must be paid to credit- or debit-payment processing facilities that facilitate a traditional currency-based transaction. When payment is made with virtual currency via SOCOACT in place of traditional currency transaction, the actual transaction cost is much lower.

Unlike prior Bitcoin implementations, the SOCOACT also provides a centralized source for transaction processing, clearance and auditing. AS such the operator of the SOCOACT, for example, may collect transaction fees associated with use of the SOCOACT network. The operator may also be a guarantor of the accuracy of the transactions, and may reimburse a user in case of fraud or erroneous processing.

In some implementations, the SOCOACT includes features such as:

Crypto (e.g., Bitcoin) Voting and Conditional Actions. For example, SOCOACT allows for electronic voting where votes are recorded on blockchain, and conditional and fractional voting is also enabled (at least in part) on block chain. If candidate A is losing, vote A, but if candidate A is winning vote C, if candidate B is winning vote half for A and half for B.

Also, action voting with conditional evaluation (and where a result can be a 'vote' or an action like a stock purchase); for example, based on my usage of Coke, or McDonalds, buy the stock of same. Part of the action could include tracking of action via email javascript to register activity.

UI Triggerable Crypto (e.g., Blockchain) Smart Rules Engine (e.g., Contract) Generator. The SOCOACT can include a custom exotic derivatives UI where value of option vs value of asset plot is drawn and creates a blockchain smart contract. The slope and (e.g., polynomial) path of the curve can be reversed into a constraints function that is generated from a user simply drawing a curve.

In another embodiment, SOCOACT allows for UI having GPS map that allows a user to draw a geofence, with a list of options to, e.g., settle smart contracts, restrict bitcoin wallet access, release extra key, buy stock, vote, etc. upon triggering the geofence as prescribed.

SOCOACT also can provide time range fencing with a list of options to, e.g., settle smart contracts like restrict bitcoin wallet access, release extra key, buy stock, vote, etc. For example, providing a slider timeline UI representing years, months, weeks, days, hours, etc. as the bounding time line fence.

In another embodiment, SOCOACT includes an anti-ping mechanism with a list of options to, e.g., settle smart contracts like: restrict bitcoin wallet access, release extra key, buy stock, vote, etc. when SOCOACT does not receive the requisite number/frequency/timely ping.

In another embodiment, SOCOACT includes a crowd-source (e.g., weather from smartphones) to inform a block-chain oracle to act as trigger for actions, with a list of options to, e.g., settle smart contracts like: restrict bitcoin wallet access, release extra key, buy stock, vote, etc. For example, if lots of sales of corn, buy counter stock/hedge. Or, for example, if lots of corn producers weather reports drought, buy corn futures.

Transaction/consumption tracking with a list of options to, e.g., settle smart contracts like restrict bitcoin wallet access, release extra key, buy stock, vote, etc.

This triggerable SOCOACT system may be used in all number of application, e.g., crypto voting above, and other features noted below, etc.

Crypto Wallet Currency (e.g., Bitcoin) Recovery Key. In one embodiment, the SOCOACT may generate a 2nd key for a crypto wallet so that if customer loses their crypto (e.g., Bitcoin) wallet, their financial services institution (e.g., Fidelity) account will offer another key to gain access to their crypto wallet corpus.

In one embodiment, SOCOACT provides the triggerable smart rules engine, already discussed, which may include the following examples:

151.1. Anti-ping (detecting a lack of activity)
151.2. Time of day, only accessible at certain times
151.3. GPS if outside or inside a certain region would make keys (in) accessible
  151.3.1. e.g., kids or people don't want wallet accessible when they are not at home.
151.4. Other atmospherics
151.5. Helps for fraud detection and key hiding under unscrupulous circumstances
151.6. 2nd machine/escrow/encryption system with password access. Could be a 3rd party providing the backup store Crypto Asset Digitization/Tokenization on Blockchain. In one embodiment, SOCOACT allows for the creation of digital assets such that, for example, the Fed may issues funds on the blockchain. Upon creating a 'trust' between counterparts with special encrypted token/smart contracts. Financial institutions would make a permissioned block chain where all counter parties know each other. Then counter parties can go to the SOCOACT facility and exchange existing assets, e.g., treasuries/money, and go to Fed and exchange existing assets for digitized versions issued on the block chain, and have the Fed put them on a wallet on the block chain. If desired, digitized versions may be exchanged by the Fed back into existing assets.

Once asset digitized, then bilateral exchange doable on block chain significantly faster, more efficiently, and securely. SOCOACT could allow the following features on such an exchange, including: check collateral, set where you want assets delivered to, wallet updating, obtaining results in quicker and much more efficient exchange of asset.

Crypto "Captcha" Account Owner/Wallet Verification. In one embodiment, SOCOACT allows a user to login on and see a captcha verification/test phrase. The user then initiates a micro bitcoin transaction, puts a challenge word in field. Then the target verifies account upon detecting match of field. In another embodiment, optionally, metadata, GPS, time of data, UI triggerables, etc. may be added as part of the passphrase transaction. For example, send $0.03 first, and then send $0.11 back to help verify the account.

Crypto Asset Transfer. In one embodiment, the SOCOACT facilitates broker to broker account transfers. Instead of following a Depository Trust & Clearing Corporation (DTCC) cycle called Automated Customer Account Transfer Service (ACATS), which takes 5 to 6 business days for asset transfers, the SOCOACT allows brokers to interact directly, reducing the delay introduced by a middle man and allowing transfer settlement to be substantially real time. Benefits associated with crypto asset transfer may include accelerated settlement of assets, improved customer experience, collateral elimination, reduced system complexity, and reduced number of reject cases.

SOCOACT

FIG. 1A shows an exemplary model for the SOCOACT. As shown in FIG. 1A, the SOCOACT may be used to facilitate crypto asset transfer. Crypto asset transfer may be utilized in areas such as broker to broker direct asset transfer systems in financial services, token transfers between two entities that are part of the same chain (e.g., transfer of reward points from Starbucks to Chase), digital cash transfer, and/or the like. For example, a customer may initiate a broker to broker transfer of assets (TOA) for various reasons, such as the customer may be unhappy with the current broker, the customer's stockbroker has taken a job with a new broker and the customer wishes to remain a client of the stockbroker, and/or the like.

As shown in FIG. 1A, brokers (e.g., including a receiving broker 105 and a delivering broker 110) and/or agencies (e.g., including a regulatory body such as the DTCC 115) may utilize a permissioned ledger 120 (e.g., on a permissioned blockchain) to facilitate crypto asset transfer. In one embodiment, the receiving broker may utilize API calls to request TOA from the delivering broker to a delivery address. The delivering broker may communicate with the DTCC to exchange assets associated with the customer for digitized versions issued on the block chain (e.g., crypto tokens), and/or may update the block chain ledger by depositing the digitized crypto assets to the delivery address. Once the broker to broker transfer transaction is validated, the transaction is distributed to participating nodes in the permissioned ledger. The transaction may be encrypted, such that the identities of the customer and/or of the brokers are not revealed.

FIG. 1A2 shows an exemplary model for the SOCOACT. As shown in FIG. 1A2, the SOCOACT may be used to facilitate transactions (e.g., a bilateral repo transaction) between participants using crypto tokens. Each of the participants, Participant A and Participant B, may be associated with a participant account data structure (e.g., which may include cryptographic data associated with the participant) that facilitates blockchain transactions, and with an account data structure datastore (e.g., an electronic wallet with crypto tokens) that is modified in accordance with blockchain transactions. In one embodiment, the participants may engage in a bilateral transaction using a user interface triggerable smart contract, which may be generated using a GUI illustrated in the figure. The GUI may facilitate specifying data (e.g., terms) associated with the smart contract, which may then be transformed into a form usable on the blockchain.

FIG. 1B shows a block diagram illustrating networked embodiments of the SOCOACT.

The network environment 100 may include a SOCOACT Server 7901, the functions and components of which described in detail below with respect to FIG. 79. The SOCOACT Server 7901 may comprise one or many servers, which may collectively be included in the SOCOACT System.

The network environment 100 may further include a SOCOACT Database 7919, which may be provided to store various information used by the SOCOACT Server 7901 including client portfolio data, financial transaction data, and any other data as described, contemplated and used herein.

The network environment 100 may further include a Network Interface Server 102, which, for example, enables data network communication between the SOCOACT Server 7901, Third Party Server(s) 104, wireless beacon 108 and Client Terminal(s) 106, in accordance with the interactions as described herein.

The one or more Client Terminals 106 may be any type of computing device that may be used by Clients 106*a* to connect with the SOCOACT Server 7901 over a data communications network. Clients 106*a*, in turn, may be customers who hold financial accounts with financial or investing institutions, as described further herein.

The Third Party Server(s) 104 may be operated by any other party that is involved in a transaction. Accordingly, the third party server 104 may be any type of computing device described herein as may be operated by a vendor, a payment processor, an individual, a corporation, a government agency, a financial institution, and the like.

The wireless beacon 108 may be any type of wireless transceiver for relaying information between client devices 106 for sending or receiving payment information within a localized geographic area. Accordingly, the wireless beacon 108 may be Bluetooth, Near Field Communication (NFC), WiFi (such as IEEE 802.11) wireless routers, and the like.

The servers and terminals represented in FIG. 1B cooperate via network communications hardware and software to initiate the collection of data for use in the SOCOACT system, the processes involving which will now be described in more detail.

FIG. 2 shows a second block diagram illustrating embodiments of a network environment including the SOCOACT. This includes the interactions between various parties using the SOCOACT system.

FIG. 3 shows a block diagram illustrating embodiments of network nodes of the SOCOACT, in which virtual currency wallet transactions are recorded in Bitcoin-style blockchains.

Virtual currency users manage their virtual currency addresses by using either a digital or paper "wallet." Wallets let users send or receive virtual currency payments, calculate the total balance of addresses in use, and generate new addresses as needed. Wallets may include precautions to keep the private keys secret, for example by encrypting the wallet data with a password or by requiring two-factor authenticated logins.

Virtual wallets provide the following functionality: Storage of virtual currency addresses and corresponding public/private keys on user's computer in a wallet.dat file; conducting transactions of obtaining and transferring virtual currency, also without connection to the Internet; and provide information about the virtual balances in all available addresses, prior transactions, spare keys. Virtual wallets are implemented as stand-alone software applications, web applications, and even printed documents or memorized passphrases.

Virtual wallets that directly connect to the peer-to-peer virtual currency network include bitcoind and Bitcoin-Qt, the bitcoind GUI counterparts available for Linux, Windows, and Mac OS X. Other less resource intensive virtual wallets have been developed, including mobile apps for iOS and Android devices that display and scan QR codes to simplify transactions between buyers and sellers. Theoretically, the services typically provided by an application on a general purpose computer could be built into a stand-alone hardware device, and several projects aim to bring such a device to market.

Virtual wallets provide addresses associated with an online account to hold virtual currency funds on the user's behalf, similar to traditional bank accounts that hold real currency. Other sites function primarily as real-time markets, facilitating the sale and purchase of virtual currency with established real currencies, such as US dollars or Euros. Users of this kind of wallet are not obliged to download all blocks of the block chain, and can manage one wallet with any device, regardless of location. Some wallets offer additional services. Wallet privacy is provided by the website operator. This "online" option is often preferred for the first acquaintance with a virtual currency system and short-term storage of small virtual currency amounts and denominations.

Any valid virtual currency address keys may be printed on paper, i.e., as paper wallets, and used to store virtual currency offline. Compared with "hot wallets"—those that are connected to the Internet—these non-digital offline paper wallets are considered a "cold storage" mechanism better suited for safekeeping virtual currency. It is safe to use only if one has possession of the printed the paper itself. Every such paper wallet obtained from a second party as a present, gift, or payment should be immediately transferred to a safer wallet because the private key could have been copied and preserved by a grantor.

Various vendors offer tangible banknotes, coins, cards, and other physical objects denominated in bitcoins. In such cases, a Bitcoin balance is bound to the private key printed on the banknote or embedded within the coin. Some of these instruments employ a tamper-evident seal that hides the private key. It is generally an insecure "cold storage" because one can't be sure that the producer of a banknote or a coin had destroyed the private key after the end of a printing process and doesn't preserve it. A tamper-evident seal in this case doesn't provide the needed level of security because the private key could be copied before the seal was applied on a coin. Some vendors will allow the user to verify the balance of a physical coin on their website, but that requires trusting that the vendor did not store the private key, which would allow them to transfer the same balance again at a future date before the holder of the physical coin.

To ensure safety of a virtual wallet in the SOCOACT system, on the other hand, the following measures are implemented: wallet backup with printing or storing on flash drive in text editor without connection to Internet; encryption of the wallet with the installation of a strong password; and prudence when choosing a quality service.

FIG. 4 shows a datagraph diagram illustrating embodiments of a login process a for the SOCOACT. Commencing at step 405, the SOCOACT Controller 7901 responds to a user's (i.e., a recruiter's or candidate's) login request and displays a login/create account screen on the Client Terminal 106 (step 410). The user responsively enters an input (step 415) comprising either a login request to an existing account, or a request to create a new account. At step 420, if the user is requesting to create an account, the process continues to step 425 below. If instead, the user is requesting access to an existing account, the process continues to step 435 below.

When the user's entry comprises a request to create a new account, the SOCOACT Controller 7901 prepares and transmits a web form and fields for creating a new account (step 425).

Next, at step 430, the user enters any requisite information in the displayed web form fields. Such web form may include fields for entering the user's full name, address, contact information, a chosen username, a chosen password and/or any other useful identification information to associate with the account (step 435). The user's inputs are then prepared for transmission to the SOCOACT Controller 7901 (step 440). The Client Terminal 106 confirms whether there are more web sections or forms to complete (step 443). If so, the next web section is presented (step 445) and the process returns to step 430 above. Otherwise, the process continues to step 460, where the entered account information is transmitted to the SOCOACT Controller 7901 for storage in, for example, the maintained Account Database 7919*a*, as described in more detail later below.

From either step 420 or 460 above, the process continues to step 450, wherein the SOCOACT Controller 7901 determines whether a login input has been received. If so, the process continues to step 455 below. Otherwise, the process continues to an error handling routine (step 453), wherein the user may be given a limited number of attempts to enter a login input that corresponds to a valid stored investment account. If no valid login is presented within the given number of allowed attempts, the user is denied access to the r SOCOACT Controller 7901.

At step 455, the SOCOACT Controller 7901 determines whether a valid login input has been received, for example by comparing the received login input to data stored in the SOCOACT Database 7919. If the received login credentials are valid, the process continues to step 465 below. Otherwise the process returns to step 453 above.

At step 465, when valid login credentials have been received from the Client Terminal 106, the SOCOACT Controller 7901 retrieves account information appropriate for the user. Next, at step 470, the SOCOACT Controller 7901 retrieves an options screen template based on the user, and then generates a composite options screen with the user's account information (step 475), which is transmitted to the client terminal 106 for display to a user on a display device thereof (step 480). The user then provides inputs representing options selections (step 485) and the selected option (which may represent commencement of one of the later processes described herein below) may be initiated and presented for display to the user (step 490).

FIG. 5 shows a datagraph illustrating embodiments of a virtual currency transaction performed by the SOCOACT. A user 106*a* may engage their client 106 such that their virtual wallet interacts with the SOCOACT to affect a transfer of virtual currency to a third party. The third party may confirm the transaction via third-party device 104. In one example, the network interface 102 includes a beacon that may be attached to another device (e.g., a utility monitoring device, a consumable item, another mobile client device, a smartphone, computer, etc.). The beacon may provide a destination virtual currency address to which a transfer of virtual currency is to be completed. Alternatively, or in addition thereto, the third party device 104 may provide the destination address for a transaction in place of a beacon, according to the various implementations described herein. Likewise, the client may provide the destination address with the transaction request when it is otherwise known to the client 106. The network device 102 may be configured to enable network communication between at least one SOCOACT server 7901 and the client terminal 106 and/or third party device 104.

To commence a transaction, the client terminal 106 forwards a wallet identifier message (step 504) to the server 7901. In one embodiment, the SOCOACT server may have instantiated a SOCOACT component 7941, which in turn may verify that the wallet identifier is valid. In one embodiment, the SOCOACT component will determine that the client's 106 unique identifying address matches and is a valid source of sufficient virtual currency and is properly associated with the wallet identifier (e.g., by checking with a blockchain database 7919*j*, a wallet database 7919*n*, and/or the like)(step 506). If the wallet identifier is a non-invalid identifier, the SOCOACT may generate a user interface prompt to allow a user to specify a target for payment proceeds, a selection mechanism for the target (e.g., a person, organization, cause, etc.), an amount to pay (e.g., in various electronic and/or real currencies), an item specification for the transaction (e.g., goods, services, equities, derivatives, etc.). In one embodiment, the SOCOACT will search a database to determine what target wallets are currently associated with the client terminal 106. For example, in one embodiment, a hotel cleaning employee may have registered a room, or a valet may have registered with a valet parking beacon, etc., and their digital wallet will be retrieved and an address therefrom specified as a target for a transaction. Upon generating the interface (e.g., by retrieving an HTML template from the SOCOACT database and compositing retrieved information, etc.), the SOCOACT server 7901 may provide the user's client 106 with an interaction interface message (step 510) (e.g., allowing the user to see the target payment/transaction identifier (e.g., hotel valet, and/or hotel organization name, etc.), specify and amount to pay (e.g., a tip amount), an item for transaction (e.g., a towel), and a mechanism to instantiate the transaction (e.g., a 'pay' button) for display (step 512). Upon obtaining inputs for these UI selection mechanisms (step 514), the network device 102 may further on the user's transaction message with selections (step 516) to the SOCOACT server 7901 for transaction processing by the SOCOACT component (step 541).

In one embodiment, the client may provide the following example guidance transaction request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
```

-continued

```
Content-Length: 667
<?XML version = “1.0” encoding = “UTF-8”?>
<guidanceTransactionRequest>
  <timestamp>2020-12-31 23:59:59</timestamp>
  <user_accounts_details>
    <user_account_credentials>
      <user_name>JohnDaDoeDoeDoooe@gmail.com</account_name>
      <password>abc123</password>
      //OPTIONAL <cookie>cookieID</cookie>
      //OPTIONAL <digital_cert_link>www.mydigitalcertificate.com/
JohnDoeDaDoeDoe@gmail.com/mycertifcate.dc</digital_cert_link>
      //OPTIONAL <digital_certificate>_DATA_</digital_certificate>
    </user_account_credentials>
  </user_accounts_details>
  <client_details> //iOS Client with App and Webkit
      //it should be noted that although several client details
      //sections are provided to show example variants of client
      //sources, further messages will include only on to save
      //space
    <client_IP>10.0.0.123</client_IP>
    <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>SOCOACT.app</app_name>
    <app_version>1.0 </app_version>
    <app_webkit_name>Mobile Safari</client_webkit_name>
    <client_version>537.51.2</client_version>
  </client_details>
  <client_details>//iOS Client with Webbrowser
    <client_IP>10.0.0.123</client_IP>
    <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
  </client_details>
  <client_details> //Android Client with Webbrowser
    <client_IP>10.0.0.123</client_IP>
    <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-XXXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
  </client_details>
  <client_details>//Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-XXXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <walletID>abc123456789</walletID>
  <walletType>source</walletType>
```

-continued

```
  <currencyType>Bitcoin</currencyType>
  <targetWalletID>xyz98876543</targetWalletID>
  <targetWalletConfirmed>TRUE</targetWalletConfirmed>
  <targetWalletIdentifierDisplayed>John Doe, Hotel Inc.
Valet</targetWalletIdentifierDisplayed>
  <transactionDescription1>Tip</transactionDescription1>
  <transactionDescription2>
    <item>Air Freshner</item>
    <itemManufacturer>Acme Freshner Inc.</itemManufacturer>
    <itemSerialNo>123456</itemSerialNo>
    <itemModelNo>abc123</itemModelNo>
    <itemPrice>$2.57</itemPrice>
    <currencyValue>0.01</currencyValue> //eg current bitcoin value
  </transactionDescription2>
</guidanceTransactionRequest>
```

In one embodiment, the SOCOACT component 541 may then provide a commit transaction as between the target wallet identifier (e.g., the hotel valet) and the source wallet identifier (e.g., the initiating user 106) and eventually cause a blockchain entry of the transaction to be recorded (step 542). Thereafter, the SOCOACT server 7901 may provide a confirmation message (step 552) to the client 106 for display (step 555).

An electronic coin may be a chain of digital signatures. Each owner transfers the coin to the next by digitally signing a hash of the previous transaction and the public key of the next owner and adding these to the end of the coin. A payee can verify the signatures to verify the chain of ownership. So, effectively if BTC0 is the previous transaction, the new transaction is:

```
Kp(Owner1)
hash := H(BTC0,Kp(Owner1))
S(hash,Ks(Owner0)), where
Kp(Owner1) is the public key fo the recipient (Owner1)
hash := H(BTC0,Kp(Owner1)) is the hash of the previous transaction together with
the public key of the recipient; and
S(hash,Ks(Owner0)) is the previously computed hash, signed with the private key
sender (Owner0).
Principle example of a Bitcoin transaction with 1 input and 1 output only
Input:
Previous tx: f5d8ee39a430901c91a5917b9f2dc19d6d1a0e9cea205b009ca73dd04470b9a6
Index: 0
scriptSig: 304502206e21798a42fae0e854281abd38bacd1aeed3ee3738d9e1446618c4571d10
90db022100e2ac980643b0b82c0e88ffdfec6b64e3e6ba35e7ba5fdd7d5d6cc8d25c6b241501
Output:
Value: 5000000000
scriptPubKey: OP_DUP OP_HASH160 404371705fa9bd789a2fcd52d2c580b65d35549d
OP_EQUALVERIFY OP_CHECKSIG
```

The input in this transaction imports 50 denominations of virtual currency from output #0 for transaction number the transaction number starting with character f5d8 . . . above. Then the output sends 50 denominations of virtual currency to a specified target address (expressed here in hexadecimal string starting with 4043 . . . ). When the recipient wants to spend this money, he will reference output #0 of this transaction as an input of his next transaction.

An input is a reference to an output from a previous transaction. Multiple inputs are often listed in a transaction. All of the new transaction's input values (that is, the total coin value of the previous outputs referenced by the new transaction's inputs) are added up, and the total (less any transaction fee) is completely used by the outputs of the new transaction. According to blockchain technology, a transaction is a hash of previous valid transaction strings. Index is the specific output in the referenced transaction. ScriptSig is the first half of a script (discussed in more detail later).

The script contains two components, a signature and a public key. The public key must match the hash given in the script of the redeemed output. The public key is used to verify the redeemer's or payee's signature, which is the second component. More precisely, the second component may be an ECDSA signature over a hash of a simplified version of the transaction. It, combined with the public key, proves the transaction created by the real owner of the address in question. Various flags define how the transaction is simplified and can be used to create different types of payment.

Two consecutive SHA-256 hashes are used for transaction verification. RIPEMD-160 is used after a SHA-256 hash for virtual currency digital signatures or "addresses." A virtual currency address is the hash of an ECDSA public-key, which may be computed as follows:

Key hash=Version concatenated with RIPEMD-160 (SHA-256 (public key))

Checksum=1st 4 bytes of SHA-256 (SHA-256 (Key hash))

Bitcoin address=Base58Encode (Key hash concatenated with Checksum)

The virtual currency address within a wallet may include an identifier (account number), for example, starting with 1 or 3 and containing 27-34 alphanumeric Latin characters (except, typically: 0, O, I, and 1 to avoid possible confusion). The address can be also represented as the QR-code and is anonymous and does not contain information about the owner. It can be obtained for free, using SOCOACT.

The ability to transact virtual currency without the assistance of a central registry is facilitated in part by the availability of a virtually unlimited supply of unique addresses, which can be generated and disposed of at will. The balance of funds at a particular address can be ascertained by looking up the transactions to and from that address in the block chain. All valid transfers of virtual currency from an address are digitally signed using the private keys associated with it.

A private key in the context of virtual currency is a secret number that allows denominations of the virtual currency to be spent. Every address within a wallet has a matching private key, which is usually saved in the wallet file of the person who owns the balance, but may also be stored using other means and methods. The private key is mathematically related to the address, and is designed so that the address can be calculated from the private key while, importantly, the reverse cannot be done.

An output contains instructions for sending virtual currency. ScriptPubKey is the second half of a script. There can be more than one output that shares the combined value of the inputs. Because each output from one transaction can only ever be referenced once by an input of a subsequent transaction, the entire combined input value needs to be sent in an output to prevent its loss. If the input is worth 50 coins but one only wants to send 25 coins, a SOCOACT will create two outputs worth 25 coins, sending one to the destination and one back to the source. Any input not redeemed in an output is considered a transaction fee, and whoever operates the SOCOACT will get the transaction fee, if any.

To verify that inputs are authorized to collect the values of referenced outputs, SOCOACT uses a custom scripting system. The input's scriptSig and the referenced output's scriptPubKey are evaluated in that order, with scriptPubKey using the values left on the stack by scriptSig. The input is authorized if scriptPubKey returns true. Through the scripting system, the sender can create very complex conditions that people have to meet in order to claim the output's value. For example, it's possible to create an output that can be claimed by anyone without any authorization. It's also possible to require that an input be signed by ten different keys, or be redeemable with a password instead of a key.

SOCOACT transactions create two different scriptSig/scriptPubKey pairs. It is possible to design more complex types of transactions, and link them together into cryptographically enforced agreements. These are known as Contracts.

An exemplary Pay-to-PubkeyHash is as follows:

```
scriptPubKey: OP_DUP OP_HASH160 <pubKeyHash> OP_EQUALVERIFY OP_CHECKSIG
scriptSig: <sig> <pubKey>
```

An address is only a hash, so the sender can't provide a full public key in scriptPubKey. When redeeming coins that have been sent to an address, the recipient provides both the signature and the public key. The script verifies that the provided public key does hash to the hash in scriptPubKey, and then it also checks the signature against the public key.

FIG. 6 shows a flowchart of a blockchain generation process for the SOCOACT. New transactions are broadcast to all nodes (step 602). The steps of this process that follow are performed iteratively for each miner node (step 603). Each miner node collects new transactions into a block (step 604). Each miner node works on finding a difficult proof-of-work for its block (step 606). At step 607, the SOCOACT determines whether a proof of work is found. If so, the process continues to step 608. Otherwise, the process returns to step 604 above. When a node finds a proof-of-work, it broadcasts the block to all nodes (step 608). Nodes accept the block only if all transactions in it are valid and not already spent (step 610). Nodes express their acceptance of the block by working on creating the next block in the chain, using the hash of the accepted block as the previous hash (step 612).

Transaction confirmation is needed to prevent double spending of the same money. After a transaction is broadcast to the SOCOACT network, it may be included in a block that is published to the network. When that happens it is said that the transaction has been mined at a depth of one block. With each subsequent block that is found, the number of blocks deep is increased by one. To be secure against double spending, a transaction should not be considered as confirmed until it is a certain number of blocks deep. This feature was introduced to protect the system from repeated spending of the same coins (double-spending). Inclusion of transaction in the block happens along with the process of mining.

The SOCOACT server 7901 may show a transaction as "unconfirmed" until the transaction is, for example, six blocks deep in the blockchain. Sites or services that accept virtual currency as payment for their products or services can set their own limits on how many blocks are needed to be found to confirm a transaction. However, the number six was specified deliberately. It is based on a theory that there's low probability of wrongdoers being able to amass more than 10% of entire network's hash rate for purposes of transaction falsification and an insignificant risk (lower than 0.1%) is acceptable. For offenders who don't possess significant computing power, six confirmations are an insurmountable obstacle with readily accessible computing technology. In their turn people who possess more than 10% of network power aren't going to find it hard to get six confirmations in a row. However, to obtain such a power would require millions of dollars' worth of upfront investments, which significantly defers the undertaking of an attack. Virtual currency that is distributed by the network for finding a block can only be used after, e.g., one hundred discovered blocks.

FIG. 7 shows a flowchart of a blockchain auditing process for the SOCOACT. The process commences when a client inputs a request to confirm a transaction (step 701). The client may select, enter, retrieve or otherwise provide a public key corresponding to the payer or payee of a transaction or transactions to be audited.

Next, the request is transmitted to the SOCOACT (step 702). In response, the SOCOACT Component performs a Blockchain lookup Process using the public key and other information provided (step 704).

The lookup results are then sent to client (step 706). The client next transmits a Decryption Process request (step 708). Responsively, a request to select a public key is displayed to the client (step 710) before the decryption process can commence.

Next, at step 712, the user inputs a selection of a stored public key. The selection of the public key is then sent to SOCOACT (step 714). Responsively, the SOCOACT Component performs a Key Comparison Request process (step 716). The SOCOACT then requests the selected public key from the processor of the client 106 (step 718). The client 106 responsively retrieves the selected public key from a memory of the client 106 (step 720). The public key is then transmitted to the SOCOACT (step 722). The SOCOACT Component then decrypts the transaction record in the stored blockchain using the public key (step 724). The decryption results are transmitted to the client 106 (step 726), which, in turn, displays the transaction confirmation details to the user **106*a* on a display of the client 106 or the like (step 728**). This auditing process then ends.

FIG. 8 shows a flowchart of a virtual currency transaction process between a buyer and a seller using the SOCOACT. At a commencement of the process, a buyer (i.e., a payer) requests registration with the SOCOACT system (step 801). In response, the SOCOACT serves a registration form for completion by the buyer (step 804). The registration form may include an identification of the buyer, the buyers wallet, and a source of funds to be established in the wallet.

Likewise, a seller (i.e., a payee) registers with the system and offers an item for sale locally (step 806). The SOCOACT may generate a listing for the seller's item that is accessible to other users of the SOCOACT (step 808). Alternatively, or in addition thereto, the listing may provided at a physical or virtual location other than through the SOCOACT. The buyer, at any later point, checks the listing and indicates her interest in the item (step 810). The SOCOACT updates the listing and notifies the seller (step 814). The seller sees the interest and suggests a meeting location to the buyer via the SOCOACT (step 816). The buyer agrees and notifies the seller via the SOCOACT (step 812).

Next, the Buyer arrives at the agreed upon location at the designated time (step 817). Using a beacon or NFC, as described herein, or similar means, the SOCOACT may be able to determine when both parties are in close proximity (step 818) and begin the transaction there-between, for example, on their respective portable electronic devices.

Alternatively, the buyer and seller may determine their proximity directly in any of a variety of manners. For example, the seller may arrive or otherwise be established or open at physical location at a specified time (step 820). Seller takes a picture of some detail of the surroundings and asks buyer to take a similar picture (step 822). The SOCOACT sends the photo from the seller to the buyer (step 824). The buyer may then locate a detail in the received picture and take a similar picture of the detail (step 826). The buyer sends his/her picture back to the SOCOACT (step 828). The SOCOACT responsively sends the photo from the buyer to the seller (step 830). The seller confirms that the picture is similar and locates the buyer at the location (step 832). The handshake may also be repeated in reverse, such that buyer is able to locate the seller in a similar manner to the foregoing (step 834).

When the buyer and seller meet, the seller may then offer the goods for inspection by the buyer (step 836). The buyer then confirms that the item is acceptable (step 838). The seller then sends a virtual currency address from the seller's wallet to the Buyer via the SOCOACT (step 840). Responsively, the SOCOACT forwards the address to the buyer (step 842). The buyer then sends the agreed-upon denomination of virtual currency from the buyer's wallet address to the seller's address (step 844). Once the transaction is confirmed, for example, by auditing the SOCOACT blockchain according to FIG. 7, the seller gives the goods to the buyer (step 846). The transaction then ends (step 848).

FIG. 9 shows a Bluetooth or NFC-enabled environment for enabling a SOCOACT transaction, such as the transactions described in FIG. 8. Using Bluetooth or NFC beacons, various people and systems can be paid where real-world cash would normally be used, such as the valet, housekeeper at a hotel. In addition, by binding a smartphone or other portable electronic device to a hotel room upon entry, and then de-binding on exit, a hotel customer can keep very granular track of usage and payments with a seamless, friction-free payment and accounting system.

FIG. 10 shows a flowchart of a Bluetooth payment process for the SOCOACT in an environment such as FIG. 9, where the location of the payee is fixed to a particular locale or property. At a commencement of the process, a payer comes in proximity to a bluetooth or NFC beacon established on the property (step 1002), where a payee's virtual currency address is broadcast by the beacon (step 1003). Next, at step 1004, when the Bluetooth beacon is received by a payer, the process continues to step 1005. Otherwise, the process returns to step 1003 above. At step 1005, it is determined whether the payer wishes to make a payment to the payee. If so, the process continues to step 1006. Otherwise, the process ends. Next, the payer provides a source address for a virtual currency payment (step 1006). The payer authorizes an amount of payment to be made in denominations of the virtual currency (step 1008). This virtual currency payment may then be completed in accordance with FIG. 5 above (step 1010).

FIG. 11 shows a flowchart of a Bluetooth or NFC interparty payment process enabled by the SOCOACT. A payer comes in proximity to a third-party Bluetooth or NFC beacon (step 1102). A payee comes in proximity to the same beacon (step 1104). If the payer and payee wish to engage in a transaction (step 1105), the process continues to step 1106. Otherwise, the process ends. The payer provides his address as a source of virtual currency payment (step 1106). Next, at step 1107, the SOCOACT system confirms whether the payer source of funds has a sufficient balance for completing the transaction. This may be done by comparing the requested transaction amount to the balance stored in the source account or wallet. If the balance is sufficient, the process continues to step 1109 below. Otherwise, the process continues to step 1108, where it is determined whether the payer has exceeded any established number of attempts to provide a source of sufficient funds. If not, the process returns to step 1106 above. Otherwise, when the number of attempts has been exceeded, the process ends.

Continuing from step 1107 above, the payee next provides a destination address corresponding to the seller's wallet for receiving payment of the virtual currency (step 1109). The virtual currency payment may then be made in accordance with FIG. 5 above (step 1110).

FIG. 12 shows a flowchart of a verified payment process for the SOCOACT. A payer comes in proximity to a third-party Bluetooth or NFC beacon (step 1202). A payee comes in proximity to the same beacon (step 1204). If the payer and payee wish to engage in a transaction (step 1205), the process continues to step 1206. Otherwise, the process ends. The payer next provides his address as a source of virtual currency payment (step 1206). Next, at step 1207, the SOCOACT system confirms whether the payer source of funds has a sufficient balance for completing the transaction. If the balance is sufficient, the process continues to step 1209 below. Otherwise, the process continues to step 1208, where it is determined whether the payer has exceeded any established number of attempts to provide a source of sufficient funds. If not, the process returns to step 1206 above. Otherwise, when the number of attempts has been exceeded, the process ends.

Continuing from step 1207 above, the payee next provides a destination address corresponding to the seller's wallet for receiving payment of the virtual currency (step 1209). The virtual currency payment may then be made in accordance with FIG. 5 above (step 1210). The transaction may then be verified according to the auditing process described in FIG. 7 above.

FIG. 13 shows a flowchart of a meter reading process enabled by the SOCOACT. At a commencement of this process, a payee assigns a wallet address for SOCOACT payments for meter readings (step 1304). For instance, the meters may represent gas, oil, water, electricity and/or other residential or commercial resource monitors that may be established and installed by utility companies, government agencies and the like. Next, at step 1305, it is determined whether the payee has used one or more metered resources. If not, the process ends. Otherwise, the process continues to step 1306 where the meters reports usage via Bluetooth/NFC in communication or integrated with one or more of the meters. A virtual currency payment is then made periodically to cover resource usage in accordance with FIG. 5 above (step 1308).

FIG. 14 shows a flowchart of a hotel resource monitoring process enabled by the SOCOACT. At a commencement of this process, a hotel customer checks in and, after providing a wallet address for a source of virtual currency payment, receives on his smartphone or portable electronic device a virtual key that may be used in conjunction with Bluetooth or NFC beacons to gain access to the customer's hotel room (step 1404). Next, the customer uses virtual key to enter the room (Step 1406). Resource usage meters in the room provide a beacon for connecting to the customer's device (step 1408). Next, at step 1409, it is determined whether the payee has used one or more metered resources. If not, the process ends. Otherwise, the process continues to step 1410 where the meters report resource usage via Bluetooth/NFC to both the customer's device and to the SOCOACT. Upon check out, a payment based on resource usage may then be made in accordance with FIG. 5 above (step 1412).

FIG. 15 shows a flowchart of a micropayment button payment process for the SOCOACT. A customer may purchase a product having a re-order button enabled by Bluetooth/NFC (step 1502). One example of such functionality is provided by AMAZON DASH. As with the foregoing embodiments, such functionality may likewise be provided by Radio Frequency Identification (RFID) tags, NFC and other local code reading devices. The customer then links a SOCOACT address for issuing micropayments in order to replenish the product on demand (step 1504). The customer initiates a purchase via the button (step 1506). Next, at step 1507, the SOCOACT system confirms whether the payer source of funds has a sufficient balance for completing the transaction. If the balance is sufficient, the process continues to step 1509 below. Otherwise, the process continues to step 1508, where it is determined whether the payer has exceeded any established number of attempts to provide a source of sufficient funds. If not, the process returns to step 1504 above. Otherwise, when the number of attempts has been exceeded, the process ends. Continuing from step 1507, a virtual currency payment may then be made in accordance with FIG. 5 above (step 1509).

FIG. 16 shows a flowchart of a non-monetary personnel or item tracking process enabled by the SOCOACT. At the start of such process, a person or item is assigned a virtual identifier in the form of a private key (step 1602). In various embodiments involving the tracking of personnel, biometric data of a person can be used as the identifier, or otherwise incorporated into the identifier. The biometric data may include retinal scan or fingerprint scan data, facial recognition technology and other known and useful biometric identifications. All or a meaningful portion of the biometric data may be used in the public key assigned to the person. Other similar implementations are readily contemplated.

Next, the person or item then travels from one location to another (step 1604). The person or item then submits the virtual identifies at a new geographic location (step 1606). Next, at step 1607, the SOCOACT system determines whether the new location being registered is different from the last registered (i.e., within a different region, state or country). If not, the process ends. Otherwise, when the location is different, the new location is transmitted to the SOCOACT for recording in the block chain (step 1608). The process then ends.

In non-monetary transactions, a virtual token can convey particularized information using OP Return codes or the like. Such field can place bits of information into r the transaction's scriptSig value so that the irreversibility of the blockchain can be used to make that information verifiable at later times. OP_RETURN is a valid opcode to be used in a bitcoin transaction, which allows 80 arbitrary bytes to be used in an unspendable transaction.

An exemplary transaction which has an OP_RETURN in its scriptSig, the hash of which may be for example, a text string such as:

8bae12b5f4c088d940733dcd1455efc6a3a69cf9340e17a981286d3778615684

A command entered into a node of the SOCOACT, such as:

```
$> bitcoind getrawtransaction
8bae12b5f4c088d940733dcd1455efc6a3a69cf9340e17a981286d3778615684
```

would yield the following output.

{
"hex" :
"0100000001c858ba5f607d762fe5be1dfe97ddc121827895c2562c4348d69d02b91dbb408e0100
00008b4830450220446df4e6b875af246800c8c976de7cd6d7d95016c4a8f7bcdbba81679cbda24
2022100c1ccfacfeb5e83087894aa8d9e37b11f5c054a75d030d5bfd94d17c5bc953d4a01410459
01f6367ea950a5665335065342b952c5d5d60607b3cdc6c69a03df1a6b915aa02eb5e07095a2548
a98dcdd84d875c6a3e130bafadfd45e694a3474e71405a4ffffffff020000000000000000156a13
636861726c6579206c6f766573206865696469400d0300000000001976a914b8268ce4d481413c4
e848ff353cd16104291c45b88ac00000000", -continued

```
"txid" : "8bae12b5f4c088d940733dcd1455efc6a3a69cf9340e17a981286d3778615684",
"version" : 1,
"locktime" : 0,
"vin" : [
  {
    "txid" :
"8e40bb1db9029dd648432c56c295788221c1dd97fe1dbee52f767d605fba58c8",
    "vout" : 1,
    "scriptSig" : {
      "asm" :
"30450220446df4e6b875af246800c8c976de7cd6d7d95016c4a8f7bcdbba81679cbda242022100
c1ccfacfeb5e83087894aa8d9e37b11f5c054a75d030d5bfd94d17c5bc953d4a01
045901f6367ea950a5665335065342b952c5d5d60607b3cdc6c69a03df1a6b915aa02eb5e07095a
2548a98dcdd84d875c6a3e130bafadfd45e694a3474e71405a4",
      "hex" :
"4830450220446df4e6b875af246800c8c976de7cd6d7d95016c4a8f7bcdbba81679cbda2420221
00c1ccfacfeb5e83087894aa8d9e37b11f5c054a75d030d5bfd94d17c5bc953d4a0141045901f63
67ea950a5665335065342b952c5d5d60607b3cdc6c69a03df1a6b915aa02eb5e07095a2548a98dc
dd84d875c6a3e130bafadfd45e694a3474e71405a4"
    },
    "sequence" : 4294967295
  }
],
"vout" : [
  {
    "value" : 0.00000000,
    "n" : 0,
    "scriptPubKey" : {
      "asm" : "OP_RETURN 636861726c6579206c6f766573206865696469",
      "hex" : "6a13636861726c6579206c6f766573206865696469",
      "type" : "nulldata"
    }
  },
  {
    "value" : 0.00200000,
    "n" : 1,
    "scriptPubKey" : {
      "asm" : "OP_DUP OP_HASH160 b8268ce4d481413c4e848ff353cd16104291c45b
OP_EQUALVERIFY OP_CHECKSIG",
      "hex" : "76a914b8268ce4d481413c4e848ff353cd16104291c45b88ac",
      "reqSigs" : 1,
      "type" : "pubkeyhash",
      "addresses" : [
        "1HnhWpkMHMjgt167kvgcPyurMmsCQ2WPgg"
      ]
    }
  }
],
"blockhash" :
"000000000000000004c31376d7619bf0f0d65af6fb028d3b4a410ea39d22554c",
"confirmations" : 2655,
"time" : 1404107109,
"blocktime" : 1404107109
```

The OP_RETURN code above is represented by the hex value 0x6a. This first byte is followed by a byte that represents the length of the rest of the bytes in the scriptPubKey. In this case, the hex value is Ox13, which means there are 19 more bytes. These bytes comprise the arbitrary less-than-80 bytes one may be allowed to send in a transaction marked by the OP_RETURN opcode.

For purposes of personnel tracking, the virtual currency distributed by the SOCOACT system may include the following data fields in conjunction with OP Return Code mechanism:

| | |
|---|---|
| Unique Identifier (UN-ID) Code | 10 positions (non-rewriteable) |
| GPS start location | 20 positions (non-rewriteable) |
| GPS inter location | 20 positions (this field can keep changing) |
| GPS final location | 20 positions (cannot change) |
| Name | 14 positions |
| Gender | 1 position (M/F) |
| Age at assignment | 2 positions |

-continued

| Examples: | |
|---|---|
| UN-ID code | 0123456789 |
| GPS Start Location | 36.8166700, −1.2833300 |
| GPS inter location | 38.897709, −77.036543 |
| GPS final location | 41.283521, −70.099466 |
| Name | Doe, John |
| Gender | M |
| Age at assignment | 53 |

Each person is provided a unique identifier in addition to any government issued documentation associated with the person. The SOCOACT blockchain database **7919*j*** stores and maintains records from the person's departing country along with a photo, a recording, voiceprint, and/or other biometric identification of person along with the established identifier. At a later date, the SOCOACT can access the Block Chain publicly, and personnel location can be transparent and tracked.

In an additional example, the 80-byte header containing personnel tracking information recorded in the blockchain may take the following form in an XML-enabled format:

```
<?xml version="1.0"?>
<ROWSET>
<ROW>
<UN_ID_Code>GPS Start location (low precision)</UN_ID_Code>
<10_-_numeric>12 numeric</10_-_numeric>
<123456789>36.8166, −1.2833</123456789>
</ROW>
<ROW>
<UN_ID_Code>GPS inter location</UN_ID_Code>
<10_-_numeric>12 numeric</10_-_numeric>
<123456789>38.8977,−77.0363</123456789>
</ROW>
<ROW>
<UN_ID_Code>GPS final location </UN_ID_Code>
<10_-_numeric>12 numeric</10_-_numeric>
<123456789>41.283521,−70.0999</123456789>
</ROW>
<ROW>
<UN_ID_Code>Name</UN_ID_Code>
<10_-_numeric>14 alpa</10_-_numeric>
<123456789>Obama,Barack,H</123456789>
</ROW>
<ROW>
<UN_ID_Code>Gender</UN_ID_Code>
<10_-_numeric>M/F</10_-_numeric>
<123456789>M</123456789>
</ROW>
<ROW>
<UN_ID_Code>Age at Assignment</UN_ID_Code>
<10_-_numeric>2 numeric</10_-_numeric>
<123456789>53</123456789>
</ROW>
<ROW>
<UN_ID_Code>Filler</UN_ID_Code>
<10_-_numeric>17 blank</10_-_numeric>
<123456789></123456789>
</ROW>
<ROW>
<UN_ID_Code></UN_ID_Code>
<10_-_numeric>63 positions</10_-_numeric>
<123456789></123456789>
</ROW>
</ROWSET>
```

The foregoing exemplary XML datastructure can be represented by the following table of its field names, field types, field sizes and field data:

| Field Name | Field size/type | Field Data |
|---|---|---|
| UN ID Code | 10 numeric | 123456789 |
| GPS Start location (low precision) | 12 numeric | 36.81, −1.28 |
| GPS inter location | 12 numeric | 38.89, −77.03 |
| GPS final location | 12 numeric | 41.28, −70.09 |
| Name | 14 alpha | Obama, Barack, H |
| Gender | M/F | M |
| Age at Assignment | 2 numeric | 53 |
| Filler | 17 blank | |
| | 80 positions | |

In a further example, the 80-byte header containing personnel tracking information recorded in the blockchain may take the following form in an XML-enabled format

```
<?xml version="1.0"?>
<ROWSET>
<ROW>
<UN_ID_Code>GPS Start location (low precision)</UN_ID_Code>
<10_-_numeric>12 numeric</10_-_numeric>
```

-continued

```
<1323249990>35.8864, −78.8589</1323249990>
</ROW>
<ROW>
<UN_ID_Code>GPS inter location</UN_ID_Code>
<10_-_numeric>12 numeric</10_-_numeric>
<1323249990>53.1355, −57.6604</1323249990>
</ROW>
<ROW>
<UN_ID_Code>GPS final location </UN_ID_Code>
<10_-_numeric>12 numeric</10_-_numeric>
<1323249990>42.3330,−71.0487</1323249990>
</ROW>
<ROW>
<UN_ID_Code>Name</UN_ID_Code>
<10_-_numeric>20 alpa</10_-_numeric>
<1323249990>Fitzgerald, Michael</1323249990>
</ROW>
<ROW>
<UN_ID_Code>Gender</UN_ID_Code>
<10_-_numeric>M/F</10_-_numeric>
<1323249990>M</1323249990>
</ROW>
<ROW>
<UN_ID_Code>Age at Assignment</UN_ID_Code>
<10_-_numeric>2 numeric</10_-_numeric>
<1323249990>12</1323249990>
</ROW>
<ROW>
<UN_ID_Code>Filler</UN_ID_Code>
<10_-_numeric>11 blank</10_-_numeric>
<1323249990></1323249990>
</ROW>
<ROW>
<UN_ID_Code></UN_ID_Code>
<10_-_numeric>80 positions</10_-_numeric>
<1323249990></1323249990>
</ROW>
</ROWSET>
```

The foregoing exemplary XML datastructure can be represented by the following table of its field names, field types, field sizes and field data:

| Field Name | Field size/type | Field Data |
|---|---|---|
| UN ID Code | 10 numeric | 1323249990 |
| GPS Start location (low precision) | 12 numeric | 35.88, −78.85 |
| GPS inter location | 12 numeric | 53.13, −57.66 |
| GPS final location | 12 numeric | 42.33, −71.04 |
| Name | 20 alpha | Fitzgerald, Michael |
| Gender | M/F | M |
| Age at Assignment | 2 numeric | 12 |
| Filler | 11 blank | |
| | 80 positions | |

In a still further example, the 80-byte header containing personnel tracking information recorded in the blockchain may take the following form in an XML-enabled format:

```
<?xml version="1.0"?>
<ROWSET>
<ROW>
<UN_ID_Code>GPS Start location (low orecision)</UN_ID_Code>
<10_-_numeric>12 numeric</10_-_numeric>
<3102521980>37.5629, −122.325</3102521980>
</ROW>
<ROW>
<UN_ID_Code>GPS inter location</UN_ID_Code>
<10_-_numeric>12 numeric</10_-_numeric>
<3102521980>42.2808, −83.7430</3102521980>
</ROW>
<ROW>
<UN_ID_Code>GPS final location </UN_ID_Code>
```

-continued

```
<10_-_numeric>12 numeric</10_-_numeric>
<3102521980>42.3317, −71.1211</3102521980>
</ROW>
<ROW>
<UN_ID_Code>Name</UN_ID_Code>
<10_-_numeric>20 alpa</10_-_numeric>
<3102521980>Brady, Thomas </3102521980>
</ROW>
<ROW>
<UN_ID_Code>Gender</UN_ID_Code>
<10_-_numeric>M/F</10_-_numeric>
<3102521980>M</3102521980>
</ROW>
<ROW>
<UN_ID_Code>Age at Assignment</UN_ID_Code>
<10_-_numeric>2 numeric</10_-_numeric>
<3102521980>38</3102521980>
</ROW>
<ROW>
<UN_ID_Code>Filler</UN_ID_Code>
<10_-_numeric>11 blank</10_-_numeric>
<3102521980></3102521980>
</ROW>
<ROW>
<UN_ID_Code></UN_ID_Code>
<10_-_numeric>80 positions</10_-_numeric>
<3102521980></3102521980>
</ROW>
</ROWSET>
```

The foregoing exemplary XML datastructure can be represented by the following table of its field names, field types, field sizes and field data:

| Field Name | Field size/type | Field Data |
|---|---|---|
| UN ID Code | 10 numeric | 3102521980 |
| GPS Start location (low precision) | 12 numeric | 37.56, −122.32 |
| GPS inter location | 12 numeric | 42.08, −83.74 |
| GPS final location | 12 numeric | 42.37, −71.12 |
| Name | 20 alpha | Brady, Thomas |
| Gender | M/F | M |
| Age at Assignment | 2 numeric | 38 |
| Filler | 11 blank | |
| | 80 positions | |

Another useful datastructure for personnel tracking can be represented by the following exemplary table of field names, field types, field sizes and field data (the corresponding XML datastructure is similar to those examples provided in the foregoing):

| Field | Purpose | Updated when . . . | Type | Size | Example |
|---|---|---|---|---|---|
| UN-ID Code | 10 positions (should not change) | Never changes | Integer | 10 | 123456789 |
| GPS start location | 20 positions (cannot change) | Never changes | Double Int | 20 | 38.897709, −77.036543 |
| GPS Inter location | 20 positions (this field can keep changing) | Per update on location | Double Int | 20 | −1.81508, −3.0306 |
| GPS final location | 20 positions (this field can keep changing) | Per update on location | Double Int | 20 | 40.712784, −74.005941 |
| Name | Current target in compact format | Never changes | Char | 14 | John S Smith |
| Gender | Gender M/F | Gender change | Bolean | 1 | M |
| Age at assignment | 16-bit number (starts at 0) | At assignement | Integer | 2 | 42 |

In an additional monetary example, an 80-byte header containing transaction information to be recorded in the blockchain may take the following form in an XML-enabled format:

```
<?xml version="1.0"?>
<ROWSET>
<ROW>
<Field></Field>
<Purpose></Purpose>
<Updated_when_></Updated_when_>
<FIELD4>Type</FIELD4>
<Size></Size>
<Example></Example>
</ROW>
<ROW>
<Field>Version</Field>
<Purpose>Block version number</Purpose>
<Updated_when_>When software upgraded</Updated_when_>
<FIELD4>Integer</FIELD4>
<Size>4</Size>
<Example>1012</Example>
</ROW>
<ROW>
<Field></Field>
<Purpose></Purpose>
<Updated_when_></Updated_when_>
<FIELD4></FIELD4>
```

-continued

```
<Size></Size>
<Example></Example>
</ROW>
<ROW>
<Field>Stock Code</Field>
<Purpose>256-bit hash of the previous block header</Purpose>
<Updated_when_>Stock Symbol; Exchange; Amount (% share)</Updated_when_>
<FIELD4>Char</FIELD4>
<Size>32</Size>
<Example>GOOG.;NASDAQ: 0.00023</Example>
</ROW>
<ROW>
<Field></Field>
<Purpose></Purpose>
<Updated_when_❂></Updated_when_❂>
<FIELD4></FIELD4>
<Size></Size>
<Example></Example>
</ROW>
<ROW>
<Field>Op_Return </Field>
<Purpose>256-bit hash based on all of the transactions in the block (aka
checksum)</Purpose>
<Updated_when_>A transaction is accepted</Updated_when_>
<FIELD4>Double Int</FIELD4>
<Size>32</Size>
<Example>0x444f4350524f4f46</Example>
</ROW>
<ROW>
<Field></Field>
<Purpose></Purpose>
<Updated_when_></Updated_when_>
<FIELD4></FIELD4>
<Size></Size>
<Example></Example>
</ROW>
<ROW>
<Field>Time</Field>
<Purpose>Current timestamp as seconds since 1970-01-01T00:00 UTC</Purpose>
<Updated_when_>Every few seconds</Updated_when_>
<FIELD4>Int</FIELD4>
<Size>4</Size>
<Example>1444655572</Example>
</ROW>
<ROW>
<Field></Field>
<Purpose></Purpose>
<Updated_when_❂></Updated_when_❂>
<FIELD4></FIELD4>
<Size></Size>
<Example></Example>
</ROW>
<ROW>
<Field>Bits</Field>
<Purpose>Current target in compact format</Purpose>
<Updated_when_❂>The difficulty is adjusted</Updated_when_❂>
<FIELD4></FIELD4>
<Size>4</Size>
<Example>484b4512</Example>
</ROW>
<ROW>
<Field></Field>
<Purpose></Purpose>
<Updated_when_❂></Updated_when_❂>
<FIELD4></FIELD4>
<Size></Size>
<Example></Example>
</ROW>
<ROW>
<Field>Nonce</Field>
<Purpose>32-bit number (starts at 0)</Purpose>
<Updated_when_❂>A hash is tried (increments)</Updated_when_❂>
<FIELD4></FIELD4>
<Size>4</Size>
<Example>67953845</Example>
</ROW>
<ROW>
<Field></Field>
<Purpose></Purpose>
```

-continued

<Updated_when_></Updated_when_>
<FIELD4></FIELD4>
<Size></Size>
<Example></Example>
</ROW>
</ROWSET>

The foregoing exemplary XML datastructure can be represented by the following table of its field names, field types, field sizes and field data:

| Field | Purpose | Updated when . . . | Type | Size | Example |
|---|---|---|---|---|---|
| Version | Block version number | When software upgraded | Integer | 4 | |
| Stock Code | 256-bit hash of the previous block header | Stock Symbol; Exchange; Amount (% share) | Char | 32 | GOOG.; NASDAQ: 0.00023 |
| Op_Return | 256-bit hash based on all of the transactions in the block (aka checksum) | A transaction is accepted | Double Int | 32 | 0x444f4350524f4f46 |
| Time | Current timestamp as seconds since 1970-01-01T00:00 UTC | Every few seconds | Int | 4 | 1444655572 |
| Bits | Current target in compact format | The difficulty is adjusted | | 4 | |
| Nonce | 32-bit number (starts at 0) | A hash is tried (increments) | | 4 | |

Another useful datastructure for accomplishing transactions as described herein can be represented by the following exemplary table of field names, field types, field sizes and field data (the corresponding XML datastructure of which is similar to those examples provided in the foregoing):

Another useful datastructure for accomplishing transactions as described herein can be represented by the following exemplary table of field names, field types, field sizes and field data (the corresponding XML datastructure of which is similar to those examples provided in the foregoing):

| Field | Purpose | Updated when . . . | Type | Size | Example |
|---|---|---|---|---|---|
| Sender Wireless ID | Block version number | MAC address IP v6 | 128 bit | 16 | 2001:0D88:AC10:FD01:0000:0000:0000:0000 (Hex) |
| Receiver Wireless ID | Block version number | MAC address IP v6 | 128 bit | 16 | 2001:0D88:AC10:FD01:0000:0000:0000:0000 (Hex) |
| SenderID | 256-bit hash of the previous block header | A new block comes in | Double | 10 | a7ffc6f8bf1ed76651c14756a061d662f580ff4de43b49fa82d80a4b80f8434a |
| Receiver Public Key | 256-bit hash based on all of the transactions in the block (aka checksum) | A transaction is accepted | Double | 10 | b7efc6f7bf1ed76441c146568f61d662f580ff4de43b49fa82d80a4b80f3245c |
| hashMerkleRoot | 256-bit hash based on all of the transactions in the block (aka checksum) | A transaction is accepted | Double | 16 | $20 |
| Time | Current timestamp as seconds since 1970-01-01T00:00 UTC | Every few seconds | Int | 4 | 1444655572 |
| Bits | Current target in compact format | The difficulty is adjusted | Int | 4 | 8 |
| Nonce | 32-bit number (starts at 0) | A hash is tried (increments) | Int | 4 | 25 |

| Field | Purpose | Updated when . . . | Type | Size | Example |
|---|---|---|---|---|---|
| Sender Wireless ID | Block version number | MAC address IP v6 | 128 bit | 16 | 2001:0D88:AC10:FD01:0000:0000:0000:0000 (Hex) |
| Receiver Wireless ID | Block version number | MAC address IP v6 | 128 bit | 16 | 2001:0D88:AC10:FD01:0000:0000:0000:0000 (Hex) |
| SenderID | 256-bit hash of the previous block header | A new block comes in | Double | 18 | a7ffc6f8bf1ed76651c14756a061d662f580ff4de43b49fa82d80a4b80f8434a |
| Receiver Public Key | 256-bit hash based on all of the transactions in the block (aka checksum) | A transaction is accepted | Double | 18 | b7efc6f7bf1ed76441c146568f61d662f580ff4de43b49fa82d80a4b80f3245c |
| hashMerkleRoot | 256-bit hash based on all of the transactions in the block (aka checksum) | A transaction is accepted | Double | 16 | $2,346 |
| Time | Current timestamp as seconds since 1970-01-01T00:00 UTC | Every few seconds | Int | 4 | 1444655572 |
| Bits | Current target in compact format | The difficulty is adjusted | Int | 4 | |
| Nonce | 32-bit number (starts at 0) | A hash is tried (increments) | Int | 4 | 25 |

Another useful datastructure for accomplishing transactions as described herein can be represented by the following exemplary table of field names, field types, field sizes and field data (the corresponding XML datastructure of which is similar to those examples provided in the foregoing):

| Field | Purpose | Updated when . . . | Type | Size | Example |
|---|---|---|---|---|---|
| Version | Block version number | When software upgraded | Integer | 4 | |
| hashNewAddr | 256-bit hash f New Address | A new block comes in | | 32 | a7ffc6f8bf1ed76651c14756a061d662f580ff4de43b49fa82d80a4b80f8434a |
| RandomNumHead | 256-bit hash based on all of the transactions in the block (aka checksum) | A transaction is accepted | | 32 | b7efc6f7bf1ed76441c146568f61d662f580ff4de43b49fa82d80a4b80f3245c |
| Time | Current timestamp as seconds since 1970-01-01T00:00 UTC | Every few seconds | Int | 4 | 1444655572 |
| Bits | Current target in compact format | The difficulty is adjusted | | 4 | |
| Nonce | 32-bit number (starts at 0) | A hash is tried (increments) | | 4 | |

FIG. 17 shows a flowchart of a voting process for the SOCOACT. At a commencement of this process, appropriate personnel may receive a virtual coin representing each possible vote (step 1702). Each virtual coin may contain a hash of the person's SOCOACT identifier and the desired vote. The virtual coin would have no real or virtual currency associated with it. Each person submits a single virtual coin representing his or her desired vote (step 1704). At step 1705, the SOCOACT determines whether the submitted voting Bitcoin is valid, for example, by comparing hashed or dehashed values against known, stored values that guarantee authenticity, as described elsewhere herein. If the voting Bitcoin is not valid, the process ends. Otherwise, the selected bit coin is transmitted to the SOCOACT for recording in the block chain established for the vote (step 1706). This coin-enabled transaction may then be made in a similar manner as virtual currency transaction as described with respect to FIG. 5 above (step 1708). In various embodiments, the unused voting coins may be invalidated by the SOCOACT upon the submission and validation of one of the virtual coins represented by the desired vote.

Referring to FIG. 18, therein is depicted a logic flow diagram illustrating an overview of a fractional ownership equity purchase process performed via the SOCOACT. At the commencement of this process, a user or client make a selection of an equity to be purchased (step 1802). The user selects an amount of share or monetary value of the equity to be purchased (step 1804). Next, at step 1805, the SOCOACT system determines whether the user has sufficient funds in the identified source to undertake the purchase transaction. If not, the process ends. Otherwise, the user may be presented with multiple options, such as to buy, sell, option, or trade with respect to the selected equity. Based on the user selections, a partial share amount for the transaction is determined. For example, a request to purchase 0.018559 shares of GOOGLE stock may be recorded in the blockchain as, e.g., "BUY 0.018559 GOOG" and sufficient shares are purchased by the SOCOACT to cover the order along with the orders of any other fractional share owners (step 1806). The user's public key is embedded in the block recording the fractional ownership purchase (step 1808). For example, the public key may be recorded in the blockchain as, e.g., 3J98t1WpEZ73CNmQviecrnyiWrnqRhWNLy. Next, at step 1810, the purchase is recorded in a blockchain maintained by the SOCOACT. The transaction may be thereafter verified through mining of the blockchain (step 1812). Finally, at step 1814, the user is asked whether there are any other fractional ownership transactions to be processed. If so, the process returns to step 1802 above. Otherwise, this instance of the process ends (step 1816).

The foregoing steps 1802-1810 are described in more detail below with respect to FIGS. 19-20. The foregoing step 1812 is described in more detail below with respect to FIG. 21.

Turning to FIG. 19, therein is depicted a datagraph diagram illustrating embodiments of an equity research process for the SOCOACT. This process commences at step 1901 where a client or user 106*a* using a client terminal 106 accesses the SOCOACT 7901 via the data communications network 100 in order to login. A login request is sent from the client terminal 106 to the SOCOACT 7901 via the data communication network 100 (step 1902). The datastructure of the login request may be of the general same form as previously presented above. The login request is then received and processed by the SOCOACT (step 1904). The SOCOACT then performs a login process, such as that depicted in FIG. 4 above (step 1905), after which the login is confirmed (step 1906).

Upon login confirmation, the SOCOACT retrieves the user's current account balances from, for example, Accounts database 7919*a* and forwards the account information to the client terminal 106 via the data communication network (step 1908). The querying of the database may include a datastructure in the same general form as discussed in the foregoing for other database retrieval requests. The login confirmation and account information is received by client terminal 106 (step 1910) and displayed to the client 106*a* on a display device of the client terminal 106 (step 1912).

Next, at step 1914, the client 106*a* using client terminal 106 may request a quote for the current price of an equity. The datastructure of this request is of the same general form as described above for other database queries. The equity quote request is sent to the SOCOACT by client terminal 106 via the data communications network 100 (step 1916). The quote request is received by the SOCOACT 7901 via network interface servers 102 (step 1918). The SOCOACT then forwarded the quote request to third-party trade execution servers 104 to obtain the current market price for the requested equity (step 1920). The trade execution servers 104 receive the quote request and determines the current price from available market data (step 1922). The equity quote is then sent from trade execution servers 104 to the SOCOACT 7901 via network interface server 102 over the data communication network (step 1924). The SOCOACT 7901 receives and stores the equity quote, for example in Market Feed database 7919*z* (step 1926). The SOCOACT then forwards the equity quote to the client terminal 106 via the data communications network (step 1928). The equity quote is then received by the client terminal 106 (step 1930) and displayed to the client 106*a* on a display device thereof (step 1932).

FIG. 20 shows a datagraph diagram illustrating embodiments of a fractional ownership equity transaction process for the SOCOACT. This process continues from the process of FIG. 19 and commences when a client 106*a* using client terminal 106 identifies a source of funds to be used to purchase a fractional share of an equity (step 2002). The source of funds may include a wallet address as described previously above, when the transaction involves payment via a virtual currency. The source of funds may include an identification of a financial account, such as a bank account or an investment account, when the purchase is to be made by real currency, i.e., dollars. The account identified by the client 106*a* is sent in an account identification message by the client terminal 106 to the SOCOACT 7901 via the data communications network 100 (step 2004). The SOCOACT 7901 then verifies the amount of funds in the wallet or current account balances available for an fractional equity purchase. (step 2006) by retrieve stored wallet/account data for example from Account database 7919*a* (step 2007). The retrieved wallet or account data is sent to the client terminal 106 via the network interface servers 102 and the data communications network 100 (step 2008). The wallet/account data is then displayed to the client 106*a* on a display device of the terminal 106 (step 2010).

Next, at step 2012, the client enters a selection of a transaction or equity purchase amount relating to a target equity to be purchased as part of trade execution request. The trade execution message is sent by the client terminal 106 (step 2014) and then received by the SOCOACT 7901 via the data communication network 100 and the network interface servers 102 (step 2016). The Order Generation Component 7945 of the SOCOACT 7901 then processes the transaction, which may include withdrawing funds from the client's account or virtual wallet prior to execution of the trade order (step 2018). Upon successful processing, the Order Placement Component 7946 of the SOCOACT 7901 sends the trade order to the third party trade execution servers 104 (step 2020). The trade order is received and verified by the servers 104 (step 2022), after which the servers 104 execute the trade order, for example, by placing a corresponding buy/sell order on a market exchange (step 2024). Upon successful execution of the trade order, the trade execution servers 104 transmit a trade confirmation message to the SOCOACT (step 2026). Once the confirmation message is received (step 2028), the Blockchain component 7943 of the SOCOACT 7901 commits the transaction to the blockchain (see, e.g., the process of FIG. 6) (step 2030). The trade order confirmation is then forwarded to the client terminal 106 (step 2032), where it is displayed to the client 106*a* on a display device thereof (step 2034). This instance of the process may then terminate.

The exchange and ownership of partial shares is certified via embedding its SHA256 digest in the Bitcoin-like blockchain maintained by the SOCOACT. This is done by generating a special bitcoin-like transaction that contains and encodes a hash value of the transaction data within an OP_RETURN script stored in the block generated by the SOCOACT (see FIGS. 22-25). The OP_RETURN is a scripting opcode that marks the transaction output as provably unspendable and allows a small amount of data to be inserted (for example, 80 bytes), which along with a transaction identification field or the like, becomes part of the block's hash.

Once the transaction is confirmed, the exchange/ownership is permanently certified and proven to exist at least as early as the time the transaction was entered in the blockchain. If the exchange/ownership of partial shares hadn't existed at the time the transaction entered the blockchain, it would have been impossible to embed its digest in the transaction. This is because of the hash function's property of being "second pre-image resistant." Embedding some hash and then adapting a future document to match the hash is also impossible due to the inherent pre-image resistance of hash functions. This is why once the SOCOACT blockchain confirms the transaction generated for the block, its existence is proven, permanently, with no trust required.

FIG. 21 shows a datagraph diagram illustrating embodiments of an equity ownership audit process for the SOCOACT, by which a blockchain may be searched to prove ownership of one or more fractional shares by any number of clients. This process commences at step 2101 where the client 106*a* enters an audit request into the client terminal 106. The client terminal forwards the audit request to the SOCOACT (step 2102). The SOCOACT's Blockchain component 7943 commences a blockchain lookup process (step 2104). The SOCOACT's Blockchain Component 7943 retrieves an identification of the a client's available public keys (step 2106). The SOCOACT then transmits the public key listing to the client terminal 106 via the data communication network 100 (step 2108). The public key listing is then displayed on the client terminal 106 (step 2110).

Next, at step 2112, the client 106*a* selects one or more of his/her available public keys via inputs to the client terminal 106. The selection of the public key is transmitted by the client terminal 106 to the SOCOACT 7901 (step 2114). The SOCOACT in turn requests the selected public key from the client terminal 106 (step 2118). The client terminal retrieves the selected public key from its internal memory (step 2120) and forwards it to the SOCOACT (step 2122). The SOCOACT's Blockchain Component 7943 perform decryption of relevant block chain data with the client's selected public key (step 2124). Transaction confirmations corresponding to the public key are retrieved and sent to the client terminal 106 (step 2126), and are then displayed to a client 106*a* on a display device thereof (step 2128), after which this instance of an audit process ends.

When a client 106 wants to confirm the transaction's existence at the time-stamped time, the following steps are performed as part of the blockchain lookup:

(i) the transaction's SHA256 digest is calculated.

(ii) A transaction in the SOCOACT blockchain containing an OP_RETURN output by which the transaction's hash is searched for.

Some online services like COIN SZECRETS or blockchain.info can easily be used to locate OP_RETURN transactions. The existence of a transaction in the blockchain proves that the document existed at the time the transaction got included into a block.

FIG. 22 shows a schematic representation of generating an ownership block for the blockchain maintained by the SOCOACT. SOCOACT's blockchain functionality is based upon elliptic curve cryptography, where addresses are derived from elliptic-curve public keys and transactions authenticated using digital signatures. Elliptic Curve Digital Signature Algorithm (ECDSA) is the cryptographic algorithm used by Bitcoin a to ensure that funds are spent by rightful owners. The private key, a single unsigned 256 bit integer of 32 bytes, is essentially a randomly generated 'secret' number, which is known only to the person that generated it. The range of valid private keys is governed by the "secp256k1 ECDSA standard" used by Bitcoin. The public key corresponds to a private key, but does not need to be kept secret.

A public key can be computed from a private key, but it is technologically infeasible to compute the private key from a public key. A public key can thus be used to authenticate or confirm the validity of the digital signature. As shown in FIG. 22, a source address N transfers a payment to destination address M by digitally signing, using its private key, the mathematically generated hash H of prior transaction TN and public key of address M. Also, as shown, the digital signature of address N can be verified by using N's public key without knowing its private key. The SOCOACT block chain contains all such transactions ever executed, wherein each block contains the SHA-256 hash of the previous block.

The elliptic curve over a finite field Fp, with most popular choice being prime fields GF(p) where all arithmetic is performed modulo a prime p, is the set of all pairs (x, y) Fp which fulfill E:

$$y^2 = x^3 + a \cdot x + b \bmod p$$

together with an imaginary point of infinity O, where p>3 is prime, and a, b ε Fp. The cryptographic signatures used in SOCOACT's blockchain are ECDSA signatures and use the curve 'secp256k1' defined over Fp where $p=2^{256}-2^{32}-977$, which has a 256-bit prime order. This choice deviates from National Institute of Standards and Technology (NIST) recommended "FIPS 186-4" standard in that the curve coefficients are different in order to to speed up scalar multiplication and computations of Pollard's rho algorithm for discrete logarithms.

Given ECDSA public-key K, a Bitcoin address is generated using the cryptographic hash functions SHA-256 and RIPEMD-160:

$$\text{HASH160} = \text{RIPEMD-160}(\text{SHA-256}(K)).$$

A SOCOACT address is computed directly from the HASH160 value as illustrated below, where base58 is a binary-to-text encoding scheme:

$$\text{base58}(0x00 \,\|\, \text{HASH160} \,\|\, [\text{SHA-256}(256(\text{SHA-256}(0x00 \,\|\, \text{HASH160}))/2^{224}])$$

However, ECDSA signatures may be susceptible to the following potential encryption related vulnerabilities and threats: (i) insufficient or poor randomness when the same public key is used for multiple transactions or the same key pair is used to protect different servers owned by the same entity; (ii) an invalid-curve attack in which an attacker obtains multiples with secret scalars of a point on the quadratic twist, e.g. via fault injection if the point doesn't satisfy the correct curve equation (iii) implementation issues such as side-channel attacks, software bugs, design or implementation flaws; (iv) hardness assumptions about number theoretic problems such as integer factorization and discrete logarithms computation in finite fields or in groups of points on an elliptic curve not applying as assumed in specific contexts. Recent recommendations by RSA SECURITY LLC, about withholding use of Dual Elliptic Curve Deterministic Random Bit Generation (or Dual EC DRBG) and the influence of DRBG compromise on consuming applications, such as DSA, also deserve attention.

A transaction is a signed section of data broadcast to the network and collected into blocks. It typically references prior transaction(s) and assigns a specific transaction value from it to one or more recipient addresses. Transactions are recorded in the network in form of files called blocks. Structures of the block and its corresponding blockheader are shown in FIGS. 23 and 24, respectively.

FIG. 23 shows a schematic representation of the data structure of an equity ownership transaction block in the blockchain maintained by the SOCOACT.

The block may contain the following fields as shown: a "Magic No." field that typically stores a constant and may be limited to 4 bytes in size, a "Block Size" field that typically stores the size in bytes of the current block as a 4 byte value, a "Blockheader" field that is described in more detail below with respect to FIG. 24, a "transaction counter" field that lists the number of transactions stored in the present block and may be limited in size to 1-9 bytes, and a transactions fields that may contain the OP_RETURN code values described previously above.

FIG. 24 shows a schematic representation of the data structure of the blockheader field of the ownership transaction block in the blockchain maintained by the SOCOACT. The blockheader field may contains the following sub-fields: a version field containing a block version number that may be four bytes, a "hashPrevBlock" field containing a 256-bit hash of the previous block in the blockchain, a "hashMerkelRoot" field containing a 256-bit hash based on a checksum of all of the transactions within a block, a "time" field containing the timestamp of the transaction, a "bits" field and a "nonce" field, containing the current target and a 32-bit number, respectively.

A block contains the most recent transactions sent to the network that have not yet been recorded in prior blocks. Each block includes in its blockheader, a record of some or all recent transactions and a reference to the prior block. It also contains the 'answer' to a difficult-to-solve mathematical problem related to the verification of transactions for the block. This problem relates to finding factors of a very large integer, which is computationally difficult to solve but thereafter easy to verify by other nodes once factors are found.

The chain of ownership is created by using a timestamp server that creates and widely publishes a hash of a block of items to be time-stamped, with each timestamp including previous timestamps in its hash value. To prevent double-spending, i.e., ensuring that the BTC payer didn't sign an earlier transaction for same BTC or already spent the BTC, a timestamp server is used to maintain a single chronological history in which each transaction was received. This process ensures that at the time of the transaction, the payee knows that majority of nodes agree to having received the current transaction as the first received. Subsequent transactions for the same BTC don't need to be recorded as they are rejected in the verification process.

FIG. 25 shows a schematic representation of the creation of a blockchain from individual blocks as maybe performed by the SOCOACT. As the only way to confirm absence of a transaction is to maintain a record of all transactions, as seen in FIG. 25, each timestamp includes the previous timestamp in its hash starting from first transaction.

The block chain makes double spending very difficult as each block is preceded by prior block in chronological order as well as is based upon its hash value. To prevent double-spending, i.e., spending of the same BTC twice, public keys and signatures are published as part of publicly available and audible block chain. To make it infeasible to falsify the block-chain, proof of work (PoW) is used to make addition of each block very costly.

The SOCOACT system provides the following benefits. It gives users a publically verifiable proof of purchase with transparency. The SOCOACT system provides a cost effective mechanism for partial or fractional share purchase, and opens the door to usage of blockchain technology beyond the initial Bitcoin realm.

The number of current world-wide Bitcoin transactions is enormous. Currently, there are about one hundred thousand transactions per minute. If a Bitcoin address receives money today and transfers money out three months later, there can be on the order of ten billion transactions that happen in between. Accordingly, tracing of Bitcoin-like virtual currency transactions present extreme computational difficulties, making large-scale monitoring of such transactions virtually impossible. Additionally, while BTC users may be identified by their public keys to the Blockchain and all transactions are identified by their source and/or destination addresses, not all public keys and addresses may be published and identifiable to a particular party.

The SOCOACT introduced herein includes data structures to simplify transaction recording in the BlockChain, thereby reducing transaction tracing operations to practical computation sizes and making large-scale auditing of billions of transaction easily a achievable in a reasonable amount of computing time.

However, in addition to BlockChain storage, which involves encryption, decryption and other computationally-intensive computing operations, the SOCOACT may additionally or alternatively include use of graph theory, matrix theory and Bloom filtering to create a record of transactions that are reduced in size as compared to the blockchain recording described above. Accordingly, such record allows for quicker verification and auditing of BTC transactions.

Bitcoin and other digital/virtual currency transactions can have different genres regarding the money movement and the user relations. FIG. 26 is a schematic representation of possible transactions between multiple parties that may be performed by the SOCOACT, where User 1 through User 6 are represented with the notation U1, U2, U3, U4, U5, U6, respectively. An example of a first genre In/Out Transaction is provided in FIG. 26 where it is shown that U1 transfers X1 amount of currency to U2. Namely, U1 has money flowing out in the transaction, and U2 has money flowing in the transaction A second genre, Circular Transactions, is likewise shown where U2 transfers X2 amount to U3 and later U3 transfer X3 amount to U2.

A third genre, multiple transactions with the same origin and target, is likewise shown where U1 transfers X1 amount to U2 and separately, U1 transfers X4 amount to U2 at some other time.

A fourth genre, a Self-Transaction, arises because of the nature of the Bitcoin and like virtual currency transactions. Suppose U4 wants to transfer X5 amount of money to U1, but U4 owns more than X5 in balance in his/her wallet. The transaction automatically be split in two, as described previously, with X5 going to U1, and the remaining balance X6 amount transferred to U4 by the SOCOACT.

A fifth and final genre of transactions are those occurring among disconnected user groups. As represented in FIG. 26, U5 transfers X7 amount to U6, and both of them do not have transactional relations with any other users in the entire system.

Note that the types of transactions illustrated above can be separated by millions of other transactions and millions of other users in like manner. The specially-programmed SOCOACT system will be able to process a vast plurality of such transactions at a time, with scalability to match the amount of users of the system.

FIG. 27 shows a datagraph of a general matrix determination and tuple storage process 2700 as may be performed by the SOCOACT in various embodiments to store transaction data such that it may be audited with greater computational efficiency. Such process commences when a user 106 enters a transaction request via client 106*a* (step 2701). The request is sent over a data communications network (step 2702) to a Network Interface 102, where it is forwarded to the SOCOACT system 7901 (step 2704). The VC Transaction Component 7942 of the SOCOACT system 7901 processes the transaction, for example, as described with respect to FIG. 5 above (step 2705).

Next, the Matrix Conversion Component 7947 of the SOCOACT system 7901 performs graph/matrix conversion of the transaction request (step 2706), as described in detail with respect to FIG. 28 below. The matrix information including the new transaction is stored, for example, in Matrix/LIL database 7919*q* of the SOCOACT system 7901 (step 2707).

Next, the Bloom Filter component 7948 of the SOCOACT system 7901 performs a physical address storage and LIL Update Process (step 2708), as described in more detail with respect to FIG. 29 below. The resulting physical addresses maybe stored in the Physical address database 7919*p* of the SOCOACT system 7901. The updates to the LIL representing all transactions in a matrix may be stored in Matrix/LIL database 7919*q* of the SOCOACT system 7901 (step 2709).

Upon completion of a transaction, the SOCOACT system sends a transaction confirmation (step 2710) via the data communications network, which is received by the client 106*a* (step 2712) and displayed to the user (step 2714).

Thereafter, a third party may request to audit transaction (step 2716). Such a request may come from a financial institution, a government agency, another user or the like, who wishes to audit transactions from the blockchain. Since the encrypted blockchain contents can be computationally intensive to search through directly, especially as the transaction approach magnitudes of millions or billions of transactions in size, the SOCOACT system 7901 enables auditing of transactions using the LIL storage of transactions described in further detail below.

The audit request is received by the SOCOACT system 7901 from the data communications network (step 2718). Responsively, the Bloom Filter component 7948 of the SOCOACT system 7901 performs a Transaction Query process 2720, as described in more detail below with respect to FIG. 29. The query results are determined from the data stored in the Matrix/LIL database 7919*q* and ultimately retrieved from the blockchain database 7919*j* (step 2722). A query response, including any retrieved data, is then transmitted by the SOCOACT system 7901 to the third party server 104 from whence the request originated (step 2724). The query results may then be displayed to the third party (step 2726), after which the process 2700 ends.

FIG. 28 shows a flow chart of a general matrix determination and tuple list storage process 2800 as may be performed by the SOCOACT system 7901 in accordance with the foregoing process 2700. The process 2800 will be explained in terms of the processing of a single transaction. However, it should be appreciated that the SOCOACT system is contemplated to process billions of transaction over its lifetime, and to process many transactions simultaneously, in accordance with demand for the system by users.

The process 2800 commences when the SOCOACT system receives a transaction request having transaction information (step 2802). Typically, within the context of a digital currency transfer, such transaction information includes at least the following data: a source address (U1) as a source of the funds, a destination address (U2) that is the destination for the funds, the amount of currency to transfer, and the time or timestamp of the transaction. As described previously, the source and destination addresses are typically based on the public keys held within a digital currency wallet of the respective users. In particular, such addresses are, in various embodiments, a RIPEMD-160 hash of an SHA256 hash of a public key. The hash operations and the large number of resulting bits (at least 160 bits) pragmatically guarantees the uniqueness of each address. However, it can be computationally intensive to electronically query and compare a large number of such addresses in the SOCOACT system directly.

There are different ways to store graphs in a computer system. The data structure used depends on both the graph structure and the algorithm used for manipulating the graph. Given the description of the transactions in FIG. 26, we can convert the transactional relations into a graph, according to well-known graph theory. The various users are represented as "vertices" (U1, U2 . . . ), with money flowing out represented as an "edge," or line, out of a vertex and money flowing in is an edge into a vertex. The transaction amount can be represented by the weight or length of an edge. All money movements through the SOCOACT can be represented as a weighted, directed, cyclic, non-connected graph. According to graph theory, a graph can be represented in an "adjacency matrix" and weighted graphs can be represented in a "distance matrix." An adjacency matrix is a means of representing those vertices that are transactionally adjacent to other vertices. An adjacency matrix is a square matrix used to represent a finite graph. The elements of the matrix indicate whether pairs of vertices are adjacent or not in the graph. If vertex 1 is adjacent to vertex 2, then the value (row, column) in the matrix is 1 (or true), otherwise, 0 (or false).

The distance matrix resembles the adjacency matrix. However, it records not only whether or not two vertices are connected, but if so, then the distance is the weight between the row/columns representing those vertices, rather than entry of a unit value. In a distance matrix, position (i,j) represents the distance between vertices Ui and Uj. The distance is the weight of a path connecting the vertices. In the case of the SOCOACT, the distance entry will correspond to the amount of a transaction between party Ui and party Uj. The distance matrix is accordingly used to record the money flow, so transactions with the same origin and target are combined, with a transaction timestamp recorded with the transaction amount. Self-Transactions are NOT included in the distance matrix, because there is no amount transacted between two parties. Because of this, all values on the diagonals of a distance matrix stored by the SOCOACT will be zeros.

In addition to BlockChain storage, which involves encryption, decryption and other computationally-intensive computing operations, the SOCOACT may additionally or alternatively include use of graph theory, matrix theory and Bloom filtering to create a record of transactions that are reduced in size as compared to the blockchain recording described above. Accordingly, such record allows for quicker verification and auditing of BTC transactions.

Bitcoin and other digital/virtual currency transactions can have different genres regarding the money movement and the user relations. FIG. 26 is a schematic representation of possible transactions between multiple parties that may be performed by the SOCOACT, where User 1 through User 6 are represented with the notation U1, U2, U3, U4, U5, U6, respectively. An example of a first genre In/Out Transaction is provided in FIG. 26 where it is shown that U1 transfers X1 amount of currency to U2. Namely, U1 has money flowing out in the transaction, and U2 has money flowing in the transaction A second genre, Circular Transactions, is likewise shown where U2 transfers X2 amount to U3 and later U3 transfer X3 amount to U2.

A third genre, multiple transactions with the same origin and target, is likewise shown where U1 transfers X1 amount to U2 and separately, U1 transfers X4 amount to U2 at some other time.

A fourth genre, a Self-Transaction, arises because of the nature of the Bitcoin and like virtual currency transactions. Suppose U4 wants to transfer X5 amount of money to U1, but U4 owns more than X5 in balance in his/her wallet. The transaction automatically be split in two, as described previously, with X5 going to U1, and the remaining balance X6 amount transferred to U4 by the SOCOACT.

A fifth and final genre of transactions are those occurring among disconnected user groups. As represented in FIG. 26, U5 transfers X7 amount to U6, and both of them do not have transactional relations with any other users in the entire system.

Note that the types of transactions illustrated above can be separated by millions of other transactions and millions of other users in like manner. The specially-programmed SOCOACT system will be able to process a vast plurality of such transactions at a time, with scalability to match the amount of users of the system.

In order to perform such searches quickly, Bloom Filters are used to hash addresses for more computationally feasible storage look up, thus solving a problem that is unique to computerized cryptographic functions. A Bloom filter (see, e.g., FIG. 35) is a space-efficient probabilistic data structure that is used to test whether a data element is a member of a set that may be stored in a database. As is well-known in the art, a Bloom filter itself does not store retrievable data. Instead, the Bloom filter indicates whether a given element of data is stored within a given database. A Bloom filter also typically stores an indication of the location of the element within the database, by storing pointers that may be used to fetch queried data elements from a specific location in a database. Accordingly, the Bloom filter is not a storage data structure for data elements themselves, but instead store simple "yes" or "no" indicators for the existence of a element within a database at each of a plurality of established filter positions. All positions in the Bloom filter store "0" (or false) when the filter and corresponding database are empty, or for those positions that do not relate to currently stored elements. One or multiple positions in the Bloom filter stores a binary "1" (or true) when a element stored in the database is mapped to that position according to the functions of the Bloom filter, which will be described in detail later below. One element can turn one or multiple positions into true. False positive matches are possible, but false negatives are not, thus a Bloom filter has a 100% recall rate. In other words, a given query for an element returns one of two answers: either "possibly in set" or "definitely not in set." Elements can be added to the set, but not removed. The more elements that are added to the set, the larger the probability of false positives. Bloom filters are typically appropriate for applications where the amount of source data would require an impractically large amount of memory if "conventional" error-free hashing techniques were applied, such as with large numbers of blockchain operations.

A Bloom filter needs only a constant number of bits per prospective element, independent from the size of the elements' universe. Both the insertion and look up time complexity are on the magnitude of O(1), according to "big O notation" in mathematics. This means that for increasing data storage, the computational requirements stay at a constant complexity level, rather than, say, increasing with the magnitude of the data storage size or exponentially or linearly, etc. As a result, where the total number of transaction is from, say, one to one billion, it may take only three to five hashing operations or false positive comparisons to add a transaction to a transaction matrix or query a transaction from a list of matrix tuples. Additionally, it is a mathematical property of blockchains that a hashed public key can not be recovered from the generated wallet address by using a reverse hashing algorithm. Multiple hash functions may be used to improve computational performance by lowering the false positive rate, but this is not necessarily so. Useful hash functions include known or equivalent encryption hashing functions, such as Murmur Hash or SHA-1. When dealing with large datasets and stored data elements, the possibility that different elements have the same hash value is expected to be extremely rare. Handling mechanisms have many options too, such as performing multiple additional hashes, storing known false positives for stored data elements, and padding data elements with extra binary 0's prior to storage. The Bloom Filter functions will be described in more detail with respect to FIG. 35 below.

Returning to the process 2800, the SOCOACT system applies a Bloom Filter to the source address (U1) (step 2804) and then determines whether U1 has been previously mapped to a physical address resulting from the application of the Bloom Filter (step 2806). This may be determined by look up within the Physical Address database **7919*p*. If U1 has not previously been assigned a physical address (i.e., when U1 has never before engaged in a transaction), U1 is assigned to the physical address that may result from application of the Bloom Filter (step 2808), which assigned address is then recorded in the database 7919*p* in conjunction with U1**'s cryptocurrency wallet address that is generated from public key.

If on the other hand, U1 has been previously assigned a physical address, the process 2800 continues to apply the Bloom Filter to destination address U2 (step 2810). The SOCOACT then determines whether U2 has been previously mapped to a physical address resulting from the application of the Bloom Filter (step 2812). This may be determined by Bloom Filter look-up. If the Bloom Filter look-up does not yield U2, the Bloom Filter look-upresult is false, and accordingly no database look up is necessary. If U2 has not previously been assigned a walletl address (i.e., when U2 has never before engaged in a transaction using the SOCOACT system), U2 is assigned to the wallet address that may result from application of the Bloom Filter (step 2814), which assigned address is then recorded in the database **7919*p***.

Next, the SOCOACT determines whether U1 entries exist in the column and row entries of a transaction matrix that is used to monitor all transactions occurring via the SOCO- ACT (step 2816). If no prior transactions have involved U1 then there will be no existing row, column entry in the transaction matrix, and in such case the SOCOACT will add a Row/Column Entry based on U1's wallet address (step 2818).

If, on the other hand, U1 entries already exist in the matrix, the process 2800 next determines whether U2 row/column entries exist in the transaction matrix (step 2820). If U2 entries do not exist, the SOCOACT adds a U2 row/column entry to the transaction distance matrix based on U2's wallet address (step 2822). From step 2820 or 2822 above, the process 2800 then continues to step 2824.

Next, at step 2824, the SOCOACT determines whether a previous transaction involving both U1 and U2 exist. If no such prior transaction exists, the SOCOACT will simply add the transaction amount to the U1, U2 row/column in the transaction matrix (step 2828). On the other hand, if prior entries exist in the (row, column) entry corresponding to (U1, U2) in the transaction matrix, the SOCOACT system will instead update the total transaction amount to include the new transaction amount (step 2826). In various embodiments, the total transaction amount will be the amount of all recorded transactions between U1 and U2. IN additional embodiments, the amount of each individual transaction between U1 and U2, along with the timestamp of each transaction is stored within the value stored in the transaction matrix.

The distance matrix is used to record the transactions that happen between every pair of users that have ever involved in any transactions. However, especially with a huge base of users, there will be a high percentage of the row/column entries in the distance matrix where the value zero, because there exist no transactions between such user pairs. When most of the elements are zero, the matrix is mathematically considered a "sparse matrix."

Graphs can be represented in a matrix concept. Storage of a matrix can be in different formats. Depending on the characteristics of matrix and storage data structure, matrix operation can be of different complexity.

There exist many ways to electronically store a sparse matrix, such as Dictionary of Keys (DOK), List of Lists (LIL), Coordinate List COO), Compressed Sparse Row (CSR) or Compressed Sparse Column (CSC), as these are known by those of ordinary skill in the art. LIL will be referenced in the examples described herein, although the remaining and other equivalent data structures may likewise be used.

In this embodiment, LIL stores one tuple per list, with each entry containing the row index, the column index and the value. It is a good format for incremental matrix construction, which fits the Bitcoin and virtual or digital currency transaction scenarios where new transactions come frequently and in large numbers. Accordingly, at step 2830, the updated matrix is stored as an updated LIL with the new transaction details. The process 2800 then ends with respect to this individual transaction (step 2832).

Once transactions are stored in the foregoing processes, it becomes computationally efficient to audit and search such transactions, in a manner that is quicker and less resource intensive than searching blockchains directly. FIG. 29 shows a flow chart of a general transaction query process 2900 as may be performed via the SOCOACT in various embodiments.

The process 2900 commences when a user 106 enters and transmits via client 106*a* a Transaction Query including an address corresponding to a user that is, for example, an audit target (step 2902).

Responsively, the SOCOACT determines whether there is an entry that corresponds to the address (step 2906). The SOCOACT may do this by applying the address to the Bloom Filter to determine if a wallet address is recorded without actually looking up the database. Alternatively, the SOCOACT may search the Physical Address database 7919*p* determine whether an entry for the wallet address exists. If no entry exists, the process 2900 continues to step 2918 below and the audit result is that the required wallet is not involved in a transaction. Otherwise, the SOCOACT retrieves the corresponding wallet address and performs a lookup in the LIL (step 2908).

The SOCOACT next determines whether any transaction record tuples in the LIL include the queried Wallet Address (step 2912). If not, the process continues at step 2918 below. Otherwise, if a corresponding tuple is found, the SOCOACT instead retrieves the transaction amounts and timestamp values from the corresponding transaction record tuples (step 2914).

Optionally, at step 2916, the SOCOACT than identifies the appropriate blockchain that was recorded at a time of the transaction identified in the tuple and retrieves the corresponding transactions from the appropriate blockchains by searching using the query target's address (See, e.g., the process described above with respect to FIG. 7) (step 2916).

When all transaction information has been retrieved from the blockchain(s), the query results are transmitted by the SOCOACT to the client for display to the querying user. (step 2918). The process 2900 then ends with respect to the individual query (step 2920).

In accordance with the foregoing, FIG. 30 shows a schematic representation of the data structure of the inputs and outputs for Bitcoin-like transactions performed by the SOCOACT. Like BTC, the SOCOACT uses a previous transaction hash that is added to the block chain for verification purposes and to reduce the possibility of entry of fraudulent transactions. The SOCOACT data structure may include a previous transactions hash field, which may be a double SHA-256 hash of a previous transaction record with an exemplary field length of 32 bytes. The transaction record data structure may also include a 4 byte Previous Transaction Out field storing a non-negative integer indexing an output of the to-be-used transaction. A 1-9 byte Transaction Script Length field contains a non-negative integer representing the data structure length of any accompanying script, for transmission verification purposes. Finally, there may be a four byte sequence number field, for recording the sequential number of this SOCOACT-processed transaction.

FIG. 31 is an exemplary representation of a distance matrix generated by the SOCOACT to represent the various transactions depicted in FIG. 26. The use of a distance matrix represents a significant improvement to prior art blockchain technologies. In this instance, only six users (U1 . . . U6) are represented. The transaction amounts, which correspond to the transactions graphed in FIG. 26, are shown in the appropriate column/row entries.

FIG. 32 is an exemplary representation of a distance matrix generated by the SOCOACT to represent outflow from the various vertices of FIG. 26, and which has been expanded to include any number of users. Suppose the transactions shown in FIG. 26 are a small subset of millions of transactions, the generic money flow can be represented with the matrix M of FIG. 32, which for every position (i,j), it shows money flowing out of vertex Ui and into vertex Uj.

To trace money flow in the other direction, the matrix M can transposed to a matrix $M^T$, in which for every position (i,j), it shows money flowing into vertex Ui and out of vertex Uj. FIG. 33 is an exemplary representation of a transposed distance matrix $M^T$a generated and used by the SOCOACT to represent inflow from the various vertices of FIG. 26. For the functions herein described with respect to matrices, it should be appreciated that the distance matrix M and transposed matrix $M^T$ may be simultaneously used and stored by the SOCOACT system 7901.

FIG. 34 is an exemplary representation of a LIL list generated from the sparse matrix M (and/or transposed matrix $M^T$) by the SOCOACT from the distance matrix of FIG. 31. The sparse matrix M can be stored in a list of (row, column, value) tuples. FIG. 34 shows how the tuples of the sparse matrix M are stored. Sparse matrix $M^T$ is similar and so a separate demonstration of $M^T$ is omitted. The storage space complexity of the LIL sparse matrix is on the magnitude of O(n), according to Big O notation, where n is the number of total transactions. Hence, the complexity of storage increases only in accordance with the magnitude of the data being stored, as would happen with cryptographic storage and retrieval.

FIG. 35 is a schematic representation of a Bloom Filter as may be used by the SOCOACT for transaction storage and query as described in the foregoing. For transaction tracing purposes, there are two major usages of the transaction records. The first is to insert a new transaction into the matrix M and, accordingly, the LIL used to represent M. The other is to look up the LIL for transaction tracing, given one address to start with.

As visually represented in FIG. 35, Bloom Filters can use one or more hashing algorithms. To pick out a proper hash algorithms, the following factors are to be considered: data format requirements for the array of tuples, data volume from the billions of transactions that grow with time, data usage (particularly, infrequent query compared to the data volume, i.e., only query when suspicious activities are suspected), update requirements (i.e., all new transactions need to be logged), performance expectations (given the amount of data and the expected data volume growth, algorithms that are independent of the data volume are preferred).

Given the uniqueness of the source and destination addresses, there are many hash algorithms in the field that can be applicable to these requirements. We use Linear Congruential Generators (LCG) here as an example to show how it works. An LCG is an algorithm that yields a sequence of pseudo-randomized numbers calculated with a discontinuous piecewise linear equation. One such useful LCG may be generally defined by the recurrence relation:

$$x_{n+1}=(ax_n+c)\bmod m$$

where x is the sequence of values, m is the modulus, a is a multiplier in the range 0<a<m, c is an incremental value in the range 0<=c<m. $X_0$ is the start value or "seed." The modulo operation, or modulus, finds the remainder after division of one number by another. An LCG of this form can calculate a pre-defined number one or more times to get the targeted value in a single hash operation. It should be appreciated that the LCG can be applied to an address value a sequential number of times to yield a physical address as used herein. Alternatively, or additionally, the LCG can be applied to separate segments of the hashed public key one or more times to yield a physical address.

It should be noted that LCGs are not typically used with cryptographic applications anymore. This is because when a linear congruential generator is seeded with a character and then iterated once, the result is a simple classical cipher that is easily broken by standard frequency analysis. However, since the physical addresses are never broadcast by the SOCOACT system to any outside party, there is no reason to fear its usage being cracked by hackers or other untrustworthy parties.

The following examples of an application of a Bloom Filter are for illustration purposes. Hashing algorithms that would create a conflict are deliberately chosen so as to show how conflicts are reconciled. With the right choice of hashing functions, conflicts are extremely rare. That's how the search or insertion performance can be nearly as good as O(1). The principles to choose hash functions for a Bloom Filter include: (1) Using multiple independent hash functions (MURMURHASH or SHA-1); (2) Using a cryptographic hash function such as SHA512; and (3) Using two independent hash functions that are then linearly combined.

The size (required number of bits, m) of the bloom filter and the number of hash functions to be used depends on the application and can be calculated using: m=−n*ln(p)/(ln(2) ^2 wherein n is the number of inserted elements and p is a desired (optimized) false positive probability.

This formula will provide the required number of bits m to use for the filter, given the number n of inserted elements in filter and the desired false positive probability p to be achieved. The formula represents that for a given false positive probability p, the length of a Bloom filter m is proportionate to the number of elements being filtered n. The ideal number of hash functions k is then calculates as: k=0.7*m/n If the values p and n are known for the required application, the above formula will yield the values of m and k, and how to appropriately choose the k hash functions.

As the volume of the data grows and the Bloom Filter false positive probability p grows, n*ln(p) gets bigger and bigger. Additional hash functions are expected to keep the false positive rate low. However, it may still reach a stage that the Bloom Filter needs a renovation—for example, by using a new hash function and re-arranging all the items stored inside. This effort, if needed at all, arises rarely, but can significantly improve the Bloom Filter performance when required.

An example ASCII to Hexidecimal (HEX) conversion table may be as follows:

| |
|---|
| A - 41 |
| B - 42 |
| C - 43 |
| M - 4D |
| N - 4E |

An exemplary first LCG hashing function and its parameter values may be as follows:

Hash Function 1: $x=(a*(\text{decimal element value})+c) \bmod m$ let a=5, c=8, m=17 (or other prime number)

For this example, the size of the Bloom Filter is set to be as big as the modulus value m, but this is not required. In practice the modulus is normally a large prime number, but this is not required either. In this example, the Bloom Filter may have seventeen positions, based on the mod value m selected above.

A second exemplary hashing function (which must be independent of the first hashing function above for satisfactory performance), maybe as follows:

Hash function #2: $x=(\text{add the value of the odd-positioned values in an element}) \bmod m$ let $m=11$ Bitcoin wallet addresses, including both "from" and "to", are represented in the form of Strings. Simplified example strings may be calculated from the first hashing function above as follows:

$$Element1 = \text{'}ABM\text{'}$$

$$\begin{aligned} ABM &= 41 + 42 + 4D \text{ (from } ASCII \text{ to } HEX \text{ conversion table above)} \\ &= D0 \text{ (in } HEX\text{, when foregoing } HEX \text{ values are added)} \\ &= 208 \text{ (when converted from } HEX \text{ to decimal form)} \end{aligned}$$

$$\text{Similarly, } Element2 = \text{'}BCN\text{'}$$

$$\begin{aligned} BCN &= 42 + 43 + 4E \\ &= 211 \end{aligned}$$

$$\text{And, } Element3 = \text{'}BAM\text{'}$$

$$\begin{aligned} BAM &= 42 + 41 + 4D \\ &= 208 \end{aligned}$$

Hash functions are then used to calculate a corresponding hash in the Bloom Filter for each of these elements.

$$Hash1(ABM) = (5 * 208 + 8)\bmod 17 = 11$$

$$\begin{aligned} Hash2(ABM) &= (\text{value "}A\text{"} + \text{value "}M\text{"})\bmod 11 \\ &= (41 + 4D)\bmod 11(Hex) \\ &= (65 + 77)\bmod 11(\text{Decimal}) \\ &= 10 \end{aligned}$$

Accordingly, as a result of the hash functions above, a binary "1" will be stored in positions 11 and 10 of the Bloom filter. A pointer to the element ABM's location in the database may be attached to the Hash2 index and so will be stored in association with position 10.

The following is an example of adding a second element ("BCN") into the Bloom Filter $$\text{Hash1}(BCN) = (5*211+8)\text{mod } 17 = 9$$

$$\text{Hash2}(BCN) = (\text{value "}B\text{"} + \text{value "}N\text{"})\text{mod } 11 = 1$$

Accordingly, as a result of the hash functions above, a binary "1" will be stored in positions 9 and 1 of the Bloom filter. A pointer to the element BCN's location in the database may be attached to the Hash2 index and so will be stored in association with position 1.

The following is an example of adding a third element ("BAM") into the Bloom filter:

$$\text{Hash1}(BAM) = (5*208+8)\text{mod } 17 = 11$$

$$\text{Hash2}(BAM) = (\text{value "}B\text{"} + \text{value "}M\text{"})\text{mod } 11 = 0$$

Accordingly, as a result of the hash functions above, a binary "1" should be stored in positions 11 and 0 of the Bloom filter, however, the position 11 is already populated with a binary 1 from the entry of the element ABM above. A pointer to the element ABM's location in the database may be attached to the Hash2 index and so will be stored in association with position 11.

The following is an example of conflict handling with a Bloom filter. Suppose there is an entry of an element X which results in Hash1(X)=10 and Hash2(X)=1. This creates a conflict with the entry of the previous elements above, since positions 1 and 10 have been previously occupied. There are many ways to handle this conflict. The first way is to add an additional independent hash function to generate a third value and using the third value as the index to the pointer for the storage of element X in the database. The second way is to pad the conflicted value to the existing value in storage.

The following is an example of a Bloom Filter look-up function of a fourth element Y in which Hash1(Y)=3 and Hash2(Y)=10. Since, according to the foregoing element entries and results, there is no "1" stored in position 3, there is 100% certainty that this element does not exist at all in the database.

The following is an example of false positive handling that may be encountered with use of a Bloom filter. For a lookup of an element T, assume that Hash1(T)=10 and Hash2(T)=1. This of course conflicts with the previous entries above for which positions 10 and 1 of the Bloom filter were occupied. Accordingly, the results of this search yields a false positive. In such case, the data is retrieved according to the pointer stored in position 1 (being the result of Hash2). From the foregoing elements, the element BCN stored in conjunction with position 1 and this element does not match the queried element T. The lookup query may then continue in accordance with the selected manner of conflict handling (i.e., by preforming a third hash function and looking for the data pointer stored win conjunction with the resulting value, or by looking in the padded field stored at position 1 of the Bloom filter.

According to the foregoing, during look-up, one or more hashing function are used to determine the existence of an element. If all bits corresponding to the hashes are turned on to be true, it may mean the element is in the database, or it is a false positive. But if any of the bit corresponding to the hashes is false, it means the element definitely does not exist in the database. In a large database of values, and particularly in real-world examples where much larger elements will be encountered, the use of a Bloom Filter greatly reduces the number of calculations needed to determine the presence or absence of a given element, resulting in computational efficiency.

Turning now to FIG. 36, an exemplary schematic representation the data structure of transaction tuples stored by the SOCOACT is presented. The (row, column, value) tuples are stored in the LIL. Row and column are the two parties involved in the transaction. The From and To addresses are stored and are ready for look up using the Bloom Filter as described herein. Matrix M may be used to trace money out, and transposed matrix $M^T$ may be used to trace money in to a specific user.

In various embodiments, the value in the tuple is not a numerical number to denote the amount of money in one transaction. It is instead a structure of an <amount, timestamp> pair. Transactions happening at different times can be separated from each other more readily in this manner, and used for precise tracing. The transactions between in between U1 and U2 in FIG. 26 are represented in the data structure shown in FIG. 36.

The innovation proposed a solution to trace BTC or other virtual or digital currency blockchain transactions in optimal computational efficiency. The storage is in the magnitude of O(n), where n is the number of total transactions, and therefore linear growth. The time complexity is in the magnitude of O(1), and therefore uses a constant-size lookup table. Once one transaction is identified as problematic, the entire money flow is completely traceable in optimal computational complexities, and therefore can be used to facilitate the prevention and prosecution of fraudulent transactions, such as money laundry, that may be attempted by users of the SOCOACT system.

Figure 37:
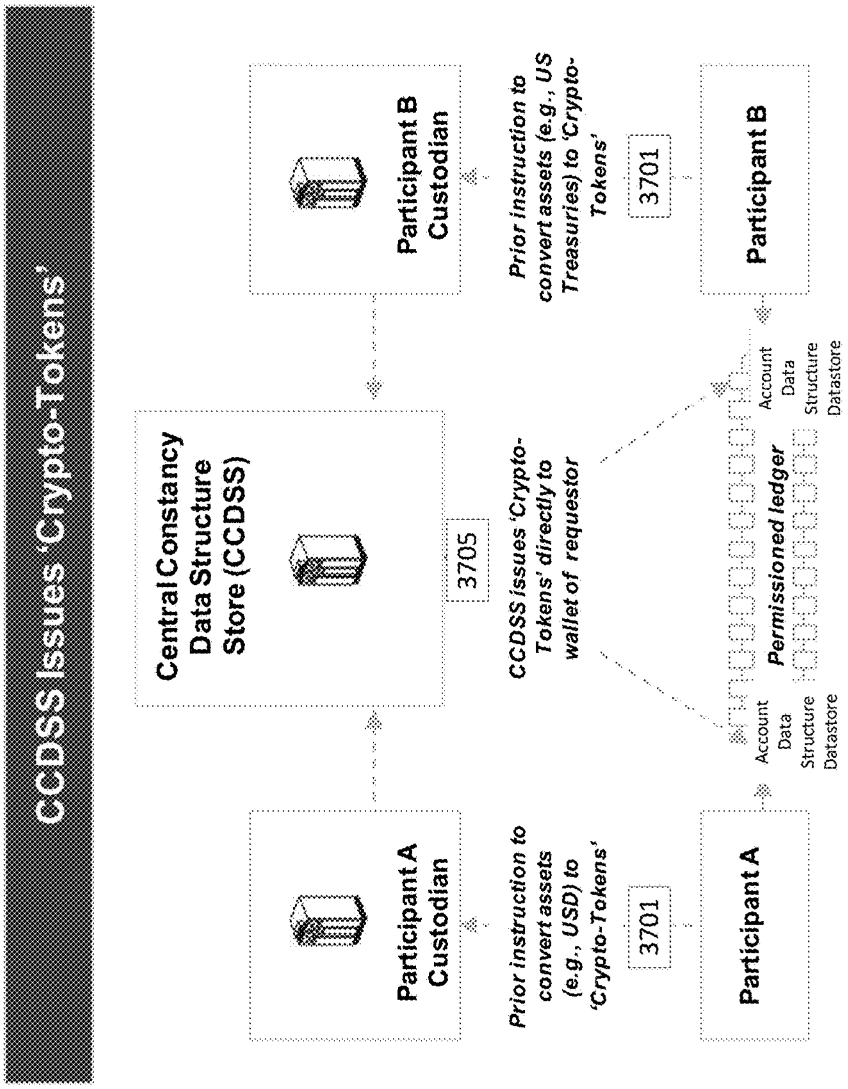
FIG. 37 shows an exemplary model for the SOCOACT.

FIG. 37 shows an exemplary model for the SOCOACT. In FIG. 37, a central constancy data structure store (CCDSS) issues crypto tokens that may be usable with a permissioned ledger (e.g., on the permissioned block chain). In various embodiments, crypto tokens may be issued for a variety of assets such as currency (e.g., US Dollars (USD)), securities (e.g., treasuries, equities, bonds, derivatives), real world items (e.g., a car), and/or the like. Participants (e.g., Participant A and Participant B) may convert assets into crypto tokens by issuing instructions to their respective custodians at 3701. For example, Participant A may issue instructions to convert USD into crypto tokens. In another example, Participant B may issue instructions to convert US Treasuries into crypto tokens. In some implementations, the assets may be deposited with or control over the assets may be transferred to the CCDSS in exchange for the crypto tokens (e.g., to guarantee the value of the crypto tokens). The CCDSS (e.g., the Fed) may issue crypto tokens to an account data structure datastore (e.g., an electronic wallet associated with a permissioned ledger) of the requesting participant at 3705. Crypto tokens may then be used (e.g., in bilateral transactions between Participant A and Participant B) with the benefit of eliminating risks such as counterparty risk (e.g., whether the funds are actually available), foreign currency risk (e.g., BTC value vs. USD may fluctuate, but USD crypto tokens value vs. USD does not), and timing risk (e.g., via simultaneous transactions facilitated via SCG and SCF components).

Figure 38:
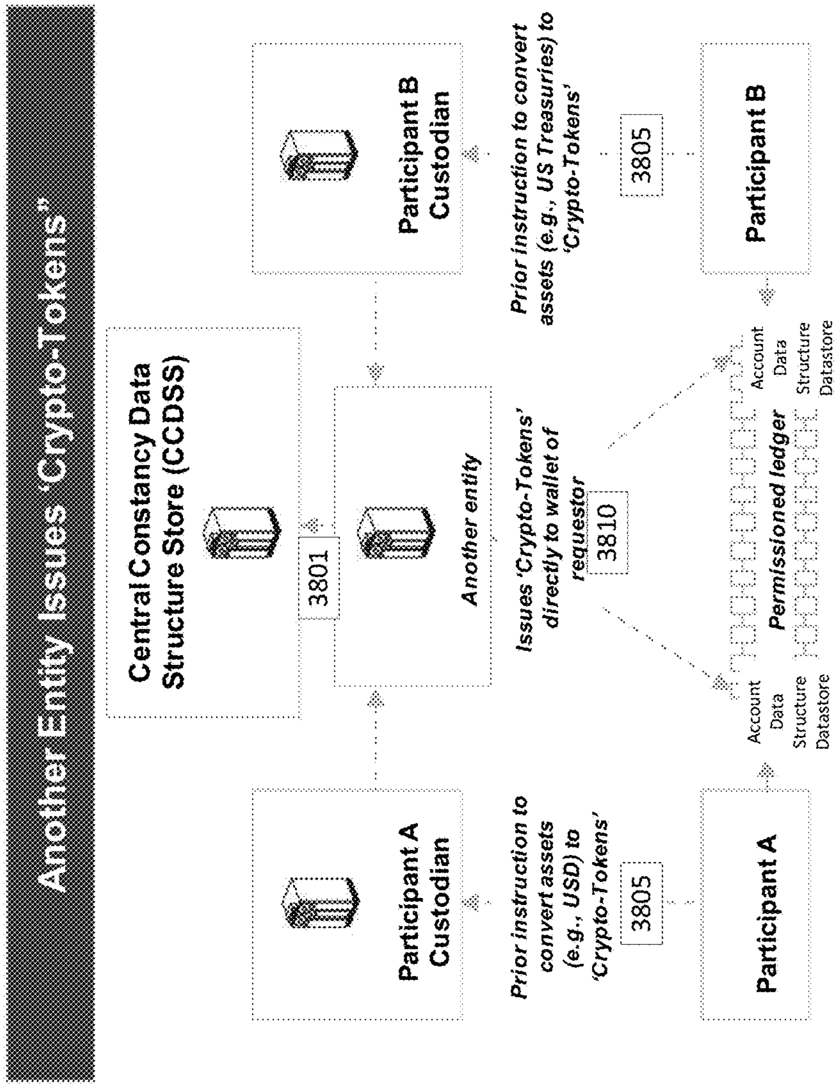
FIG. 38 shows an exemplary model for the SOCOACT.

FIG. 38 shows an exemplary model for the SOCOACT. In FIG. 38, another trusted entity (e.g., depository trust and clearing corporation (DTCC)) may issue crypto tokens instead of the CCDSS. In one embodiment, the trusted entity may establish an account with the CCDSS at 3801 for the purpose of immobilizing (e.g., depositing, transferring control) assets that are exchanged for crypto tokens. Participants (e.g., Participant A and Participant B) may convert assets into crypto tokens by issuing instructions to their respective custodians at 3805. For example, Participant A may issue instructions to convert USD into crypto tokens. In another example, Participant B may issue instructions to convert US Treasuries into crypto tokens. In some implementations, the assets may be deposited with or control over the assets may be transferred to the CCDSS via the trusted entity in exchange for the crypto tokens (e.g., to guarantee the value of the crypto tokens). The trusted entity (e.g., DTCC) may issue crypto tokens to an account data structure datastore (e.g., an electronic wallet associated with a permissioned ledger) of the requesting participant at 3810. Crypto tokens may then be used (e.g., in bilateral transactions between Participant A and Participant B) with the benefit of eliminating risks such as counterparty risk, foreign currency risk, and timing risk.

Figure 39:
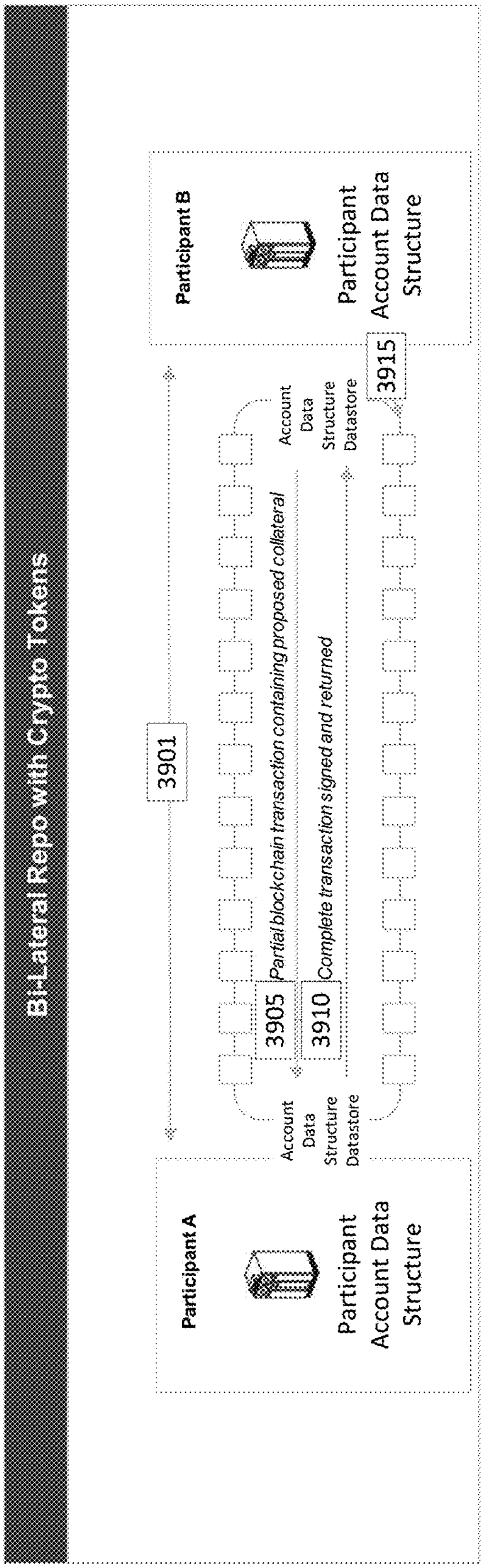
FIG. 39 shows an exemplary usage scenario for the SOCOACT.

FIG. 39 shows an exemplary usage scenario for the SOCOACT. In FIG. 39, a bilateral repo with crypto tokens is illustrated. Each of the participants, Participant A (e.g., a fund) and Participant B (e.g., a dealer), may be associated with a participant account data structure (e.g., which may include cryptographic data associated r with the participant, such as the participant's private key) that facilitates blockchain transactions, and with an account data structure datastore (e.g., an electronic wallet with crypto tokens) that is modified in accordance with blockchain transactions. At 3901, the participants may negotiate the size of a deal and assets to be exchanged (e.g., USD crypto tokens and collateral US Treasuries crypto tokens). In one implementation, Participant B (e.g., a dealer) may propose specific collateral and currency amounts at 3905. For example, Participant B may use a smart contractor generator GUI. Participant A (e.g., a fund) may agree to the proposed smart contract, and a smart contract may be submitted to the block chain via the SCG component at 3910. Crypto tokens specified in the smart contract may be deposited (e.g., with one or more authorities) by the participants and the exchange may be facilitated via the SCF component at 3915. The participants' account data structure datastores may be updated to reflect the exchange.

Figure 40A:
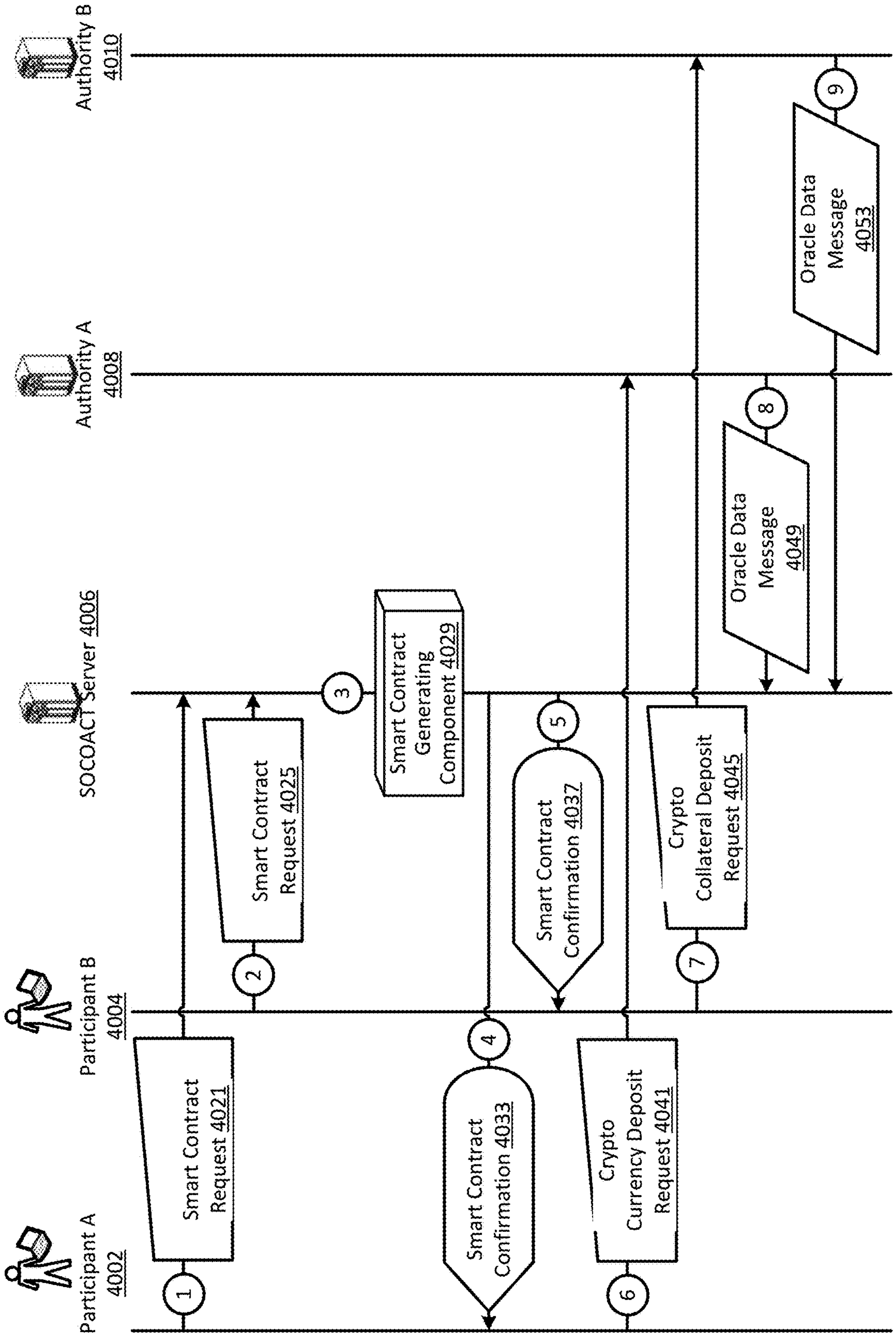
FIGS. 40A-40B show a datagraph diagram illustrating embodiments of a data flow for the SOCOACT.
Figure 40B:
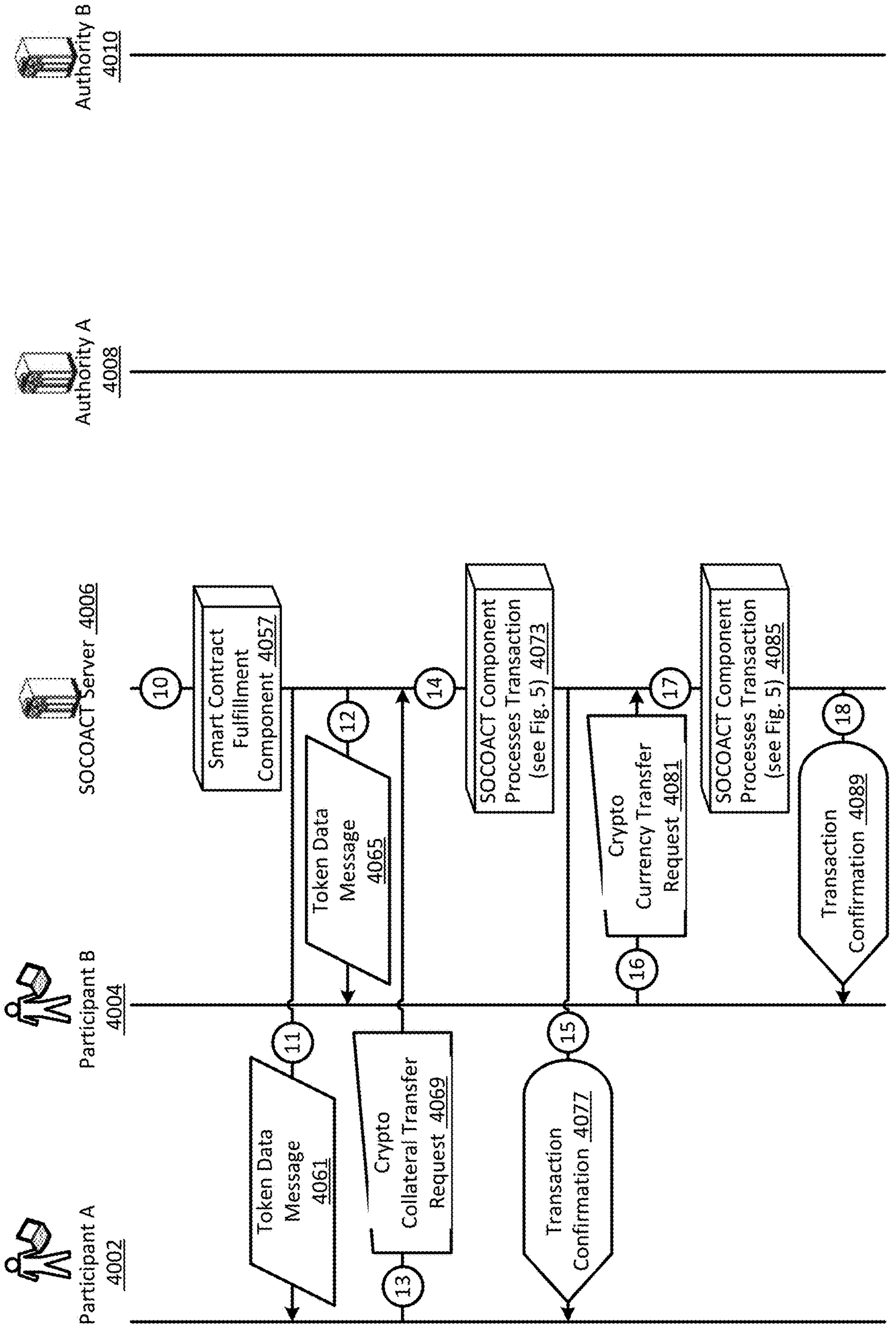

FIGS. 40A-40B show a datagraph diagram illustrating embodiments of a data flow for the SOCOACT. In FIGS. 40A-40B, Participant A 4002 may send a smart contract request 4021 to a SOCOACT Server 4006. For example, Participant A (e.g., a fund) may wish to engage in a repo transaction with Participant B 4004 (e.g., a dealer), and may use a client device (e.g., a desktop, a laptop, a tablet, a smartphone) to access a smart contract generator to define the terms of a smart contract for the repo transaction and/or to facilitate generating the smart contract request. In one implementation, the smart contract request may include data such as a request identifier, contract type, contract parties, contract terms, contract inputs, oracles for external inputs, a cryptographic signature, a smart contract address, and/or the like. For example, the client may provide the following example smart contract request, substantially in the form of a HTTP(S) POST message including XML-formatted data, as provided below:

```
POST /smart_contract_request.php HTTP/1.1
Host: www.server.com
Content-Type: Application/XML
Content-Length: 667
<?XML version = "1.0" encoding = "UTF-8"?>
<smart_contract_request>
  <request_identifier>ID_request_1</request_identifier>
  <contract_type>repo</contract_type>
  <contract_parties>Participant A, Participant B</contract_parties>
  <contract_terms>
    <duration>1 day</duration>
    <participant_obligation>
      <obligation_identifier>ID_obligation_1</obligation_identifier>
      <participant>Participant A</participant>
      <deliverable>crypto tokens - $1 Billion</deliverable>
    </participant_obligation>
    <participant_obligation>
      <obligation_identifier>ID_obligation_2</obligation_identifier>
      <participant>Participant B</participant>
```

-continued

```
        <deliverable>crypto tokens - 9,174,312 shares of
NASDAQ:AAPL</deliverable>
      </participant_obligation>
   </contract_terms>
   <contract_inputs>
      <input>
   <input_identifier>ID_obligation_1_confirm_input</input_identifier>
         <type>external</type>
         <oracle>ID_Authority_A</oracle>
      </input>
      <input>
   <input_identifier>ID_obligation_2_confirm_input</input_identifier>
         <type>external</type>
         <oracle>ID_Authority_B</oracle>
      </input>
   </contract_inputs>
   <signatures>
      <signature>Participant A signature</signature>
   </signatures>
   <contract_address>1HnhWpkMHMjgt167kvgcPyurMmsCQ2WPgg</contract_address>
</smart_contract_request>
```

Participant B 4004 may agree to the proposed smart contract for the repo transaction (e.g., borrow $1 Billion currency for 1 day using 9,174,312 shares of NASDAQ: AAPL as collateral), and may send a smart contract request 4025 to the SOCOACT Server 4006. For example, Participant B may use a client device to sign the proposed smart contract to indicate agreement and/or to facilitate generating the smart contract request. For example, the client may provide the following example smart contract request, substantially in the form of a HTTP(S) POST message including XML-formatted data, as provided below:

```
POST /smart_contract_request.php HTTP/1.1
Host: www.server.com
Content-Type: Application/XML
Content-Length: 667
<?XML version = "1.0" encoding = "UTF-8"?>
<smart_contract_request>
   <request_identifier>ID_request_2</request_identifier>
   <contract_type>repo</contract_type>
   <contract_parties>Participant A, Participant B</contract_parties>
   <contract_terms>
      <duration>1 day</duration>
      <participant_obligation>
         <obligation_identifier>ID_obligation_1</obligation_identifier>
         <participant>Participant A</participant>
         <deliverable>crypto tokens - $1 Billion</deliverable>
      </participant_obligation>
      <participant_obligation>
         <obligation_identifier>ID_obligation_2</obligation_identifier>
         <participant>Participant B</participant>
         <deliverable>crypto tokens - 9,174,312 shares of
NASDAQ:AAPL</deliverable>
      </participant_obligation>
   </contract_terms>
   <contract_inputs>
      <input>
   <input_identifier>ID_obligation_1_confirm_input</input_identifier>
         <type>external</type>
         <oracle>ID_Authority_A</oracle>
      </input>
      <input>
   <input_identifier>ID_obligation_2_confirm_input</input_identifier>
         <type>external</type>
         <oracle>ID_Authority_B</oracle>
      </input>
   </contract_inputs>
   <signatures>
      <signature>Participant A signature</signature>
      <signature>Participant B signature</signature>
   </signatures>
   <contract_address>1HnhWpkMHMjgt167kvgcPyurMmsCQ2WPgg</contract_address>
</smart_contract_request>
```

Smart contract request data may be used by a smart contract generating (SCG) component 4029 to facilitate generating a smart contract and/or submitting the smart contract to the block chain. See FIG. 41 for additional details regarding the SCG component.

The SOCOACT Server may notify Participant A and/or Participant B that the smart contract has been signed by both parties and submitted to the block chain using a smart contract confirmation 4033 and/or a smart contract confirmation 4037, respectively.

Participant A may send a crypto currency deposit request 4041 to Authority A 4008 to fulfill its obligation of delivering crypto tokens (e.g., previously obtained from the CCDSS or another trusted entity) worth $1 Billion. Authority A may be the CCDSS (e.g., the Fed), another trusted entity (e.g., DTCC), an escrow agent, a special account at Participant A, and/or the like. In one embodiment, the crypto currency deposit request may be a block chain transaction that transfers the crypto tokens from an account data structure datastore (e.g., an electronic wallet associated with a permissioned ledger) of Participant A to an account data structure datastore of Authority A.

Participant B may send a crypto collateral deposit request 4045 to Authority B 4010 to fulfill its obligation of delivering crypto tokens (e.g., previously obtained from the CCDSS or another trusted entity) worth 9,174,312 shares of NASDAQ:AAPL. Authority B may be the CCDSS (e.g., the Fed), another trusted entity (e.g., DTCC), an escrow agent, a special account at Participant B, and/or the like. It is to be understood that in some implementations Authority A and Authority B could be the same entity. In one embodiment, the crypto collateral deposit request may be a block chain transaction that transfers the crypto tokens from an account data structure datastore (e.g., an electronic wallet associated with a permissioned ledger) of Participant B to an account data structure datastore of Authority B.

Authority A may send an oracle data message 4049 to the SOCOACT Server to provide oracle data utilized by the smart contract. In one embodiment, the oracle data message may specify crypto tokens that have been deposited with Authority A (e.g., in a header with viewable metadata) in association with the smart contract (e.g., based on the address of the smart contract) and/or may include access token data (e.g., a password, a private key) that allows access to the deposited crypto tokens (e.g., not available to Participant B until the smart contract is unlocked). For example, Authority A may provide the following example oracle data message, substantially in the form of a HTTP(S) POST message including XML-formatted data, as provided below:

```
POST /oracle_data_message.php HTTP/1.1
Host: www.server.com
Content-Type: Application/XML
Content-Length: 667
<?XML version = "1.0" encoding = "UTF-8"?>
<oracle_data_message>
  <source>Authority A</source>
  <contract_address>1HnhWpkMHMjgt167kvgcPyurMmsCQ2WPgg</contract_address>
  <token_data>
    <header>crypto tokens - $1 Billion deposited</header>
    <access_token_data>encrypted access token data</access_token_data>
  </token_data>
</oracle_data_message>
```

Authority B may send an oracle data message 4053 to the SOCOACT Server to provide oracle data utilized by the smart contract. In one embodiment, the oracle data message may specify crypto tokens that have been deposited with Authority B (e.g., in a header with viewable metadata) in association with the smart contract (e.g., based on the address of the smart contract) and/or may include access token data (e.g., a password, a private key) that allows access to the deposited crypto tokens (e.g., not available to Participant A until the smart contract is unlocked). For example, Authority B may provide the following example oracle data message, substantially in the form of a HTTP(S) POST message including XML-formatted data, as provided below:

```
POST /oracle_data_message.php HTTP/1.1
Host: www.server.com
Content-Type: Application/XML
Content-Length: 667
<?XML version = "1.0" encoding = "UTF-8"?>
<oracle_data_message>
  <source>Authority B</source>
  <contract_address>1HnhWpkMHMjgt167kvgcPyurMmsCQ2WPgg</
  contract_address>
  <token_data>
      <header>crypto tokens - 9,174,312 shares of NASDAQ:AAPL
deposited</header>
      <access_token_data>encrypted token data</access_token_data>
  </token_data>
</oracle_data_message>
```

Oracle data may be used by a smart contract fulfillment (SCF) component 4057 to facilitate unlocking the smart contract and/or sending access token data to participants. See FIG. 42 for additional details regarding the SCF component.

The SOCOACT Server may send access token data to Participant A and/or Participant B that allows access to deposited crypto tokens using a token data message 4061 and/or token data message 4065, respectively. In one implementation, access token data for a participant may be secured by being encrypted with the participant's public key, and the participant may decrypt it using the participant's private key.

Participant A may send a crypto collateral transfer request 4069 (e.g., a block chain transaction) to the SOCOACT Server to transfer collateral crypto tokens associated with the repo transaction from the account data structure datastore of Authority B (e.g., an electronic wallet associated with a permissioned ledger) to the account data structure datastore of Participant A. The SOCOACT Server may facilitate this transaction in a similar manner as described with respect to FIG. 5 at 4073, and may send a transaction confirmation 4077 to Participant A.

Participant B may send a crypto currency transfer request 4081 (e.g., a block chain transaction) to the SOCOACT Server to transfer currency crypto tokens associated with the repo transaction from the account data structure datastore of Authority A (e.g., an electronic wallet associated with a permissioned ledger) to the account data structure datastore of Participant B. The SOCOACT Server may facilitate this transaction in a similar manner as described with respect to FIG. 5 at 4085, and may send a transaction confirmation 4089 to Participant B.

Figure 41:
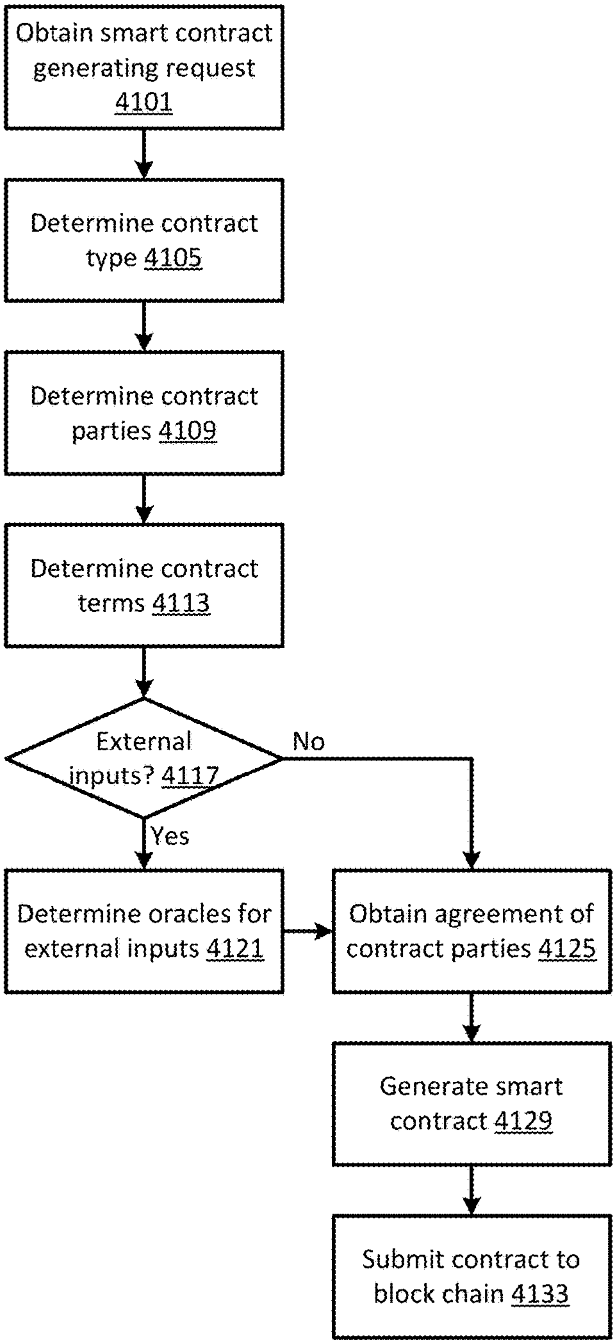
FIG. 41 shows a logic flow diagram illustrating embodiments of a smart contract generating (SCG) component for the SOCOACT.

FIG. 41 shows a logic flow diagram illustrating embodiments of a smart contract generating (SCG) component for the SOCOACT. In FIG. 41, a smart contract generating request may be obtained at 4101. For example, the smart contract generating request may be obtained as a result of a participant using a smart contract generator (e.g., a website, an application) to generate a smart contract. See FIGS. 43-45 for examples of smart contract generator GUIs that may be utilized by the participant.

A contract type associated with the smart contract may be determined at 4105. In various embodiments, smart contracts may be used to engage in a repo transaction (e.g., repo type), to define a derivative (e.g., derivative type), to transfer assets (e.g., transfer type), to vote (e.g., vote type), to restrict access to an account data structure datastore (e.g., restrict type), to release an extra key to an account data structure datastore (e.g., backup type), to purchase stock (e.g., purchase type), and/or the like. It is to be understood that a wide variety of contract types associated with various smart contract generator GUIs may be utilized. In one implementation, the contract type associated with the smart contract may be determined based on the value (e.g., specified by the participant) associated with Contract Type field of a smart contract generator GUI.

Contract parties associated with the smart contract may be determined at 4109. In one implementation, contract parties associated with the smart contract may be determined based on the values (e.g., specified by the participant) associated with Participant (e.g., Participant A, Participant B) fields of a smart contract generator GUI. It is to be understood that, in various embodiments, any number of participants (e.g., 1 participant, 2 participants, 3 or more participants) may be specified for the smart contract depending on the type and/or configuration of the smart contract.

Contract terms associated with the smart contract may be determined at 4113. In one embodiment, contract terms may include identifiers and/or amounts of assets to be exchanged. In another embodiment, contract terms may include a specification of the value of an asset based on data provided by an oracle source. In another embodiment, contract terms may include a specification of an action to take (e.g., restrict access, release an extra key, purchase stock, vote in a certain way) based on geofencing, time range fencing, anti-ping (e.g., lack of activity), transaction/consumption tracking (e.g., how crypto tokens are spent), weather, and/or the like (e.g., natural events such as flood, earthquake, volcanic eruption, lava flow; political events such as political unrest, war, terrorist attacks) conditions (e.g., based on data provided by an oracle source). In another embodiment, contract terms may include another smart contract (e.g., that acts as an oracle) resulting in a cascading smart contract. It is to be understood that a wide variety of contract terms associated with various smart contract generator GUIs may be utilized. In one implementation, contract terms associated with the smart contract may be determined based on the values (e.g., specified by the participant) associated with various fields, graphs, maps, and/or the like of one or more smart contract generator GUIs.

A determination may be made at 4117 whether the contract includes external inputs. If so, oracles for such external inputs may be determined at 4121. In one implementation, oracles associated with the smart contract may be determined based on the values (e.g., specified by the participant) associated with Oracle Source fields of a smart contract generator GUI. It is to be understood that a wide variety of oracles may be utilized (e.g., stock exchanges, GPS data providers, date/time providers, crowdsourced decentralized data providers, news providers, activity monitors, RSS feeds, and other oracle sources) for the smart contract In various embodiments, RSS feeds may be from sensor based devices such as a mobile phone (e.g., with data from many such devices aggregated into a feed), may be social network (e.g., Twitter, Facebook) or news feeds (e.g., which may be further filtered a down by various parameters), may be market data feeds (e.g., Bloomberg's PhatPipe, Consolidated Quote System (CQS), Consolidated Tape Association (CTA), Consolidated to Tape System (CTS), Dun & Bradstreet, OTC Montage Data Feed (OMDF), Reuter's Tib, Triarch, US equity trade and quote market data, Unlisted Trading Privileges (UTP) Trade Data Feed (UTDF), UTP Quotation Data Feed (UQDF), and/or the like feeds, e.g., via ITC 2.1 and/or respective feed protocols), and/or the like, and selecting an oracle may make a request to obtain the selected feed's data stream. In one implementation, a crowdsourced decentralized weather provider may obtain (e.g., from smartphones of participating users) crowdsourced weather data (e.g., temperature, humidity), and provide such (e.g., combined) weather data for the smart contract. For example, the smart contract may specify that an order for an asset (e.g., corn futures) should be placed if the crowdsourced weather data matches specifications.

Agreement of contract parties may be obtained at 4125. In one implementation, contract parties may provide cryptographic signatures to indicate that they agree to the smart contract.

The smart contract may be generated in a format compatible with a permissioned ledger at 4129 and submitted to the block chain at 4133 (e.g., stored in contracts database 7919*r*). In one embodiment, the smart contract may be generated by converting the determined contract data into the compatible format (e.g., via an API). In one implementation, the smart contract may be stored in an arbitrary 80-byte header one may be allowed to send in a blockchain transaction. For example, the 80-byte header containing smart contract information recorded in the blockchain may take the following form in an XML-enabled format:

```
<?xml version="1.0"?>
<FIELD>
<ROW>
<Field></Field>
<Purpose></Purpose>
<Updated_when_Ö></Updated_when_Ö>
<FIELD4>Type</FIELD4>
<Size></Size>
<Example></Example>
</ROW>
<ROW>
<Field>Version</Field>
<Purpose>Block version number</Purpose>
<Updated_when_Ö>When software upgraded</
Updated_when_Ö>
<FIELD4>Integer</FIELD4>
<Size>4</Size>
<Example></Example>
</ROW>
<ROW>
<Field></Field>
<Purpose></Purpose>
<Updated_when_Ö></Updated_when_Ö>
<FIELD4></FIELD4>
<Size></Size>
<Example></Example>
</ROW>
```

-continued

<ROW>
<Field>Stock Code</Field>
<Purpose>256-bit hash of the previous block header</Purpose>
<Updated_when_Ö>Stock Symbol; Exchange; Amount (% share)</Updated_when_Ö>
<FIELD4>Char</FIELD4>
<Size>32</Size>
<Example>GOOG.;NASDAQ: 0.00023</Example>
</ROW>
<ROW>
<Field></Field>
<Purpose></Purpose>
<Updated_when_Ö></Updated_when_Ö>
<FIELD4></FIELD4>
<Size></Size>
<Example></Example>
</ROW>
<ROW>
<Field>Op_Return </Field>
<Purpose>256-bit hash based on all of the transactions in the block (aka checksum)</Purpose>
<Updated_when_Ö>A transaction is accepted</Updated_when_Ö>
<FIELD4>Double Int</FIELD4>
<Size>32</Size>
<Example>0x444f4350524f4f46</Example>
</ROW>
<ROW>
<Field></Field>
<Purpose></Purpose>
<Updated_when_Ö></Updated_when_Ö>
<FIELD4></FIELD4>
<Size></Size>
<Example></Example>
</ROW>
<ROW>
<Field>Time</Field>
<Purpose>Current timestamp as seconds since 1970-01-01T00:00 UTC</Purpose>
<Updated_when_Ö>Every few seconds</Updated_when_Ö>
<FIELD4>Int</FIELD4>
<Size>4</Size>
<Example>1444655572</Example>
</ROW>
<ROW>
<Field></Field>
<Purpose></Purpose>
<Updated_when_Ö></Updated_when_Ö>
<FIELD4></FIELD4>
<Size></Size>
<Example></Example>
</ROW>
<ROW>
<Field>Bits</Field>
<Purpose>Current target in compact format</Purpose>
<Updated_when_Ö>The difficulty is adjusted</Updated_when_Ö>
<FIELD4></FIELD4>
<Size>4</Size>
<Example></Example>
</ROW>
<ROW>
<Field></Field>
<Purpose></Purpose>
<Updated_when_Ö></Updated_when_Ö>
<FIELD4></FIELD4>
<Size></Size>
<Example></Example>
</ROW>
<ROW>
<Field>Nonce</Field>
<Purpose>32-bit number (starts at 0)</Purpose>
<Updated_when_Ö>A hash is tried (increments)</Updated_when_Ö>
<FIELD4></FIELD4>
<Size>4</Size>
<Example></Example>
</ROW>
<ROW>
<Field></Field>
<Purpose></Purpose>

-continued

<Updated_when_Ö></Updated_when_Ö>
<FIELD4></FIELD4>
<Size></Size>
<Example></Example>
</ROW>
</FIELD>

The foregoing exemplary XML datastructure can be represented by the following table of its field names, field types, field sizes and field data:

| Field | Purpose | Updated when . . . | Type | Size |
|---|---|---|---|---|
| Version | Block version number | When software upgraded | Integer | 4 |
| Coefficient | 256-bit hash of Formula coefficient term N | Per formula of Nth polynomial | Int | 4 |
| Coefficient | 256-bit hash of Formula coefficient term a | Per Formula | Int | 4 |
| Coefficient | 256-bit hash of Formula coefficient term r | Per Formula | Int | 4 |
| SmartStart | Start address of Smart Contract | | | 32 |
| RandomNumHead | 256-bit hash based on all of the transactions in the block (aka checksum) | A transaction is accepted | | 16 |
| hashMerkleRoot | 256-bit hash based on all of the transactions in the block (aka checksum) | A transaction is accepted | Double | 16 |
| Bits | Current target in compact format | The difficulty is adjusted | | 4 |
| Nonce | 32-bit number (starts at 0) | A hash is tried (increments) | | 4 |

$$P(G; X)^n = \sum_{k=0}^{N} \binom{n}{k} x^k a^{n-k} = X^N - qX^{N-2} - 2r_3 3X^{N-3} - a_4 x^{N-4} + a_5 x^{N-5} + \ldots + a_{N-2} X^2 + a_{N-1} X + a_N$$

For example, the generated smart contract data may be represented by a data structure as illustrated below:

<?XML version = "1.0" encoding = "UTF-8"?>
<smart_contract>
<contract_type>repo</contract_type>
<contract_parties>Participant A, Participant B</contract_parties>
<contract_data>
<duration>1 day</duration>
<participant_obligation>
<participant>Participant A</participant>
<deliverable>crypto tokens - $1 Billion</deliverable>
<oracle>ID_Authority_A</oracle>
</participant_obligation>
<participant_obligation>
<participant>Participant B</participant>
<deliverable>crypto tokens - 9,174,312 shares of NASDAQ:AAPL</deliverable>
<oracle>ID_Authority_B</oracle>
</participant_obligation>

-continued

```
    </contract_data>
    <contract_address>1HnhWpkMHMjgt167kvgcPyurMmsCQ2WPgg</
    contract_address>
</smart_contract>
```

Figure 42:
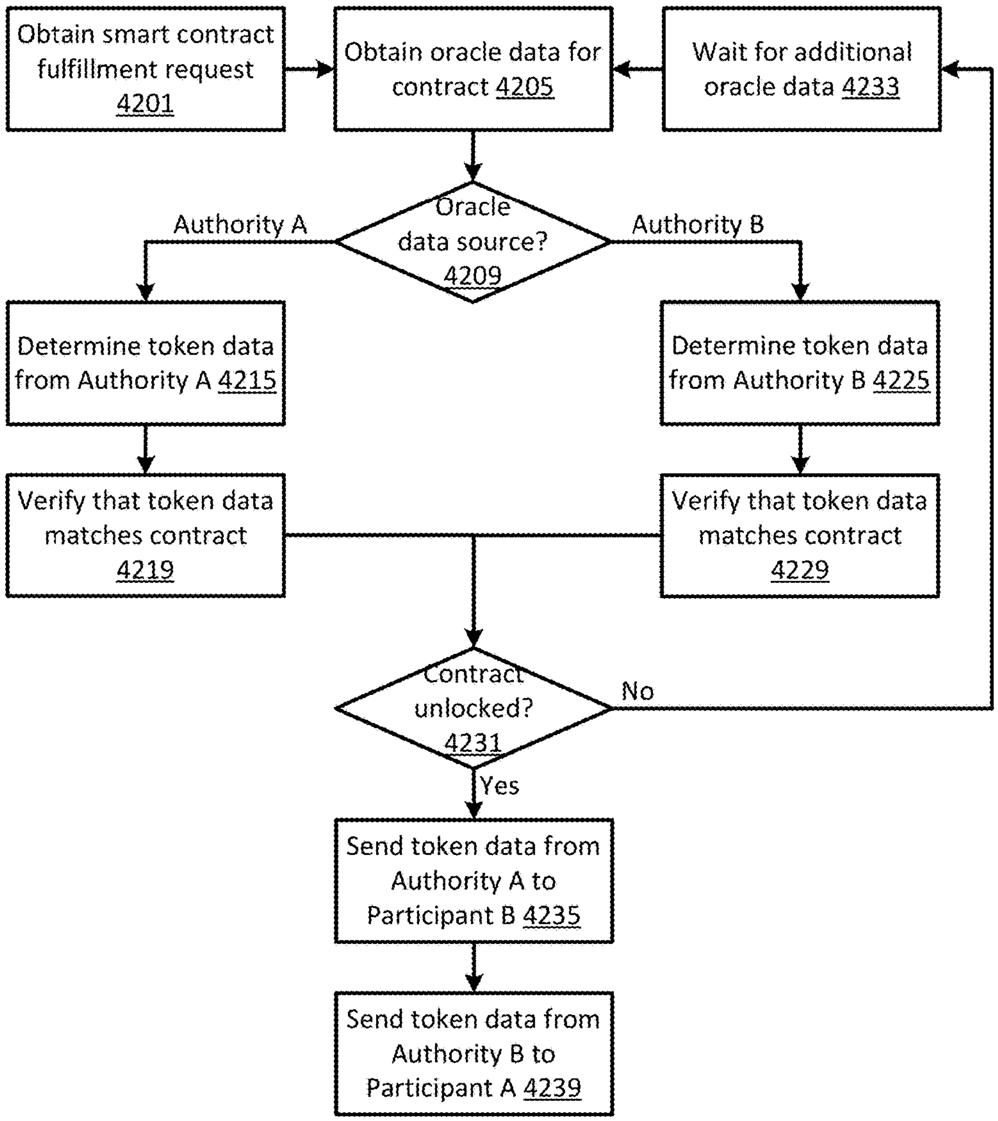
FIG. 42 shows a logic flow diagram illustrating embodiments of a smart contract fulfillment (SCF) component for the SOCOACT.

FIG. 42 shows a logic flow diagram illustrating embodiments of a smart contract fulfillment (SCF) component for the SOCOACT. In FIG. 42, a smart contract fulfillment request may be obtained at 4201. For example, the smart contract fulfillment request may be obtained to determine whether a smart contract should be unlocked.

Oracle data for the smart contract may be obtained at 4205. For example, for a repo smart contract oracle data may be obtained to confirm that both parties fulfilled their obligations (e.g., Participant A deposits crypto tokens worth $1 Billion and Participant B deposits crypto tokens worth 9,174,312 shares of NASDAQ:AAPL). In one implementation, an oracle (e.g., Authority A, Authority B) may send oracle data based on the address associated with the smart contract.

A determination may be made at 4209 regarding the source of the obtained oracle data. If the source is Authority A, token data from Authority A may be determined at 4215 (e.g., by parsing an oracle data message from Authority A). In one implementation, a header associated with the oracle data message may be parsed to determine what has been deposited with Authority A. The SOCOACT may verify that token data matches the corresponding smart contract obligation specification at 4219. For example, header data (e.g., crypto tokens—$1 Billion deposited) may be compared with obligation deliverable (e.g., crypto tokens—$1 Billion) to verify that the correct currency amount has been deposited with Authority A. In some embodiments, additional verification may be performed. For example, if the smart contract specifies that a real world item (e.g., a car with a specified VIN) should be delivered by Participant A, the real world item may be tracked (e.g., via a constant video stream). If the real world item is moved after it has been delivered to a designated location, token data associated with the real world item (e.g., linked based on the VIN) may be set to be invalid.

If the source is Authority B, token data from Authority B may be determined at 4225 (e.g., by parsing an oracle data message from Authority B). In one implementation, a header associated with the oracle data message may be parsed to determine what has been deposited with Authority B. The SOCOACT may verify that token data matches the corresponding smart contract obligation specification at 4229. For example, header data (e.g., crypto tokens—9,174,312 shares of NASDAQ:AAPL deposited) may be compared with obligation deliverable (e.g., crypto tokens—9,174,312 shares of NASDAQ:AAPL) to verify that the correct collateral has been deposited with Authority B. In some embodiments, additional verification may be performed (e.g., as described above with regard to real world items).

A determination may be made at 4231 whether the smart contract should be unlocked. In one implementation, the smart contract should be unlocked if data from specified oracles has been received and matches contract data. If some of the oracle data has not been received, the SOCOACT may wait for additional oracle data at 4233.

If oracle data has been received and matches contract data, access token data from Authority A may be sent to Participant B at 4235 and/or access token data from Authority B may be sent to Participant A at 4239. In one embodiment, access token data may be sent by the SOCOACT. In another embodiment, authorities (e.g., Authority A and Authority B) may be informed that that smart contract has been unlocked and may send access token data to appropriate participants.

FIG. 43 shows a screenshot diagram illustrating embodiments of the SOCOACT. Using the shown smart contract generator GUI, a repo smart contract may be generated. The smart contract may be configured to have a duration of 1 day and to be between two participants. Participant A may be obligated to deliver crypto tokens currency worth $1 Billion to Authority A, and Participant B may be obligated to deliver crypto tokens collateral worth 9,174,312 shares of NASDAQ:AAPL to Authority B. Further the smart contract may be configured to be a cascading smart contract that utilizes another smart contract to specify that if the value of the collateral changes (e.g., based on data from NASDAQ) by more than 2%, the amount of the deposited collateral should be adjusted to compensate for deviation in value. The Generate Contract button may be used to generate this smart contract.

Figure 44:
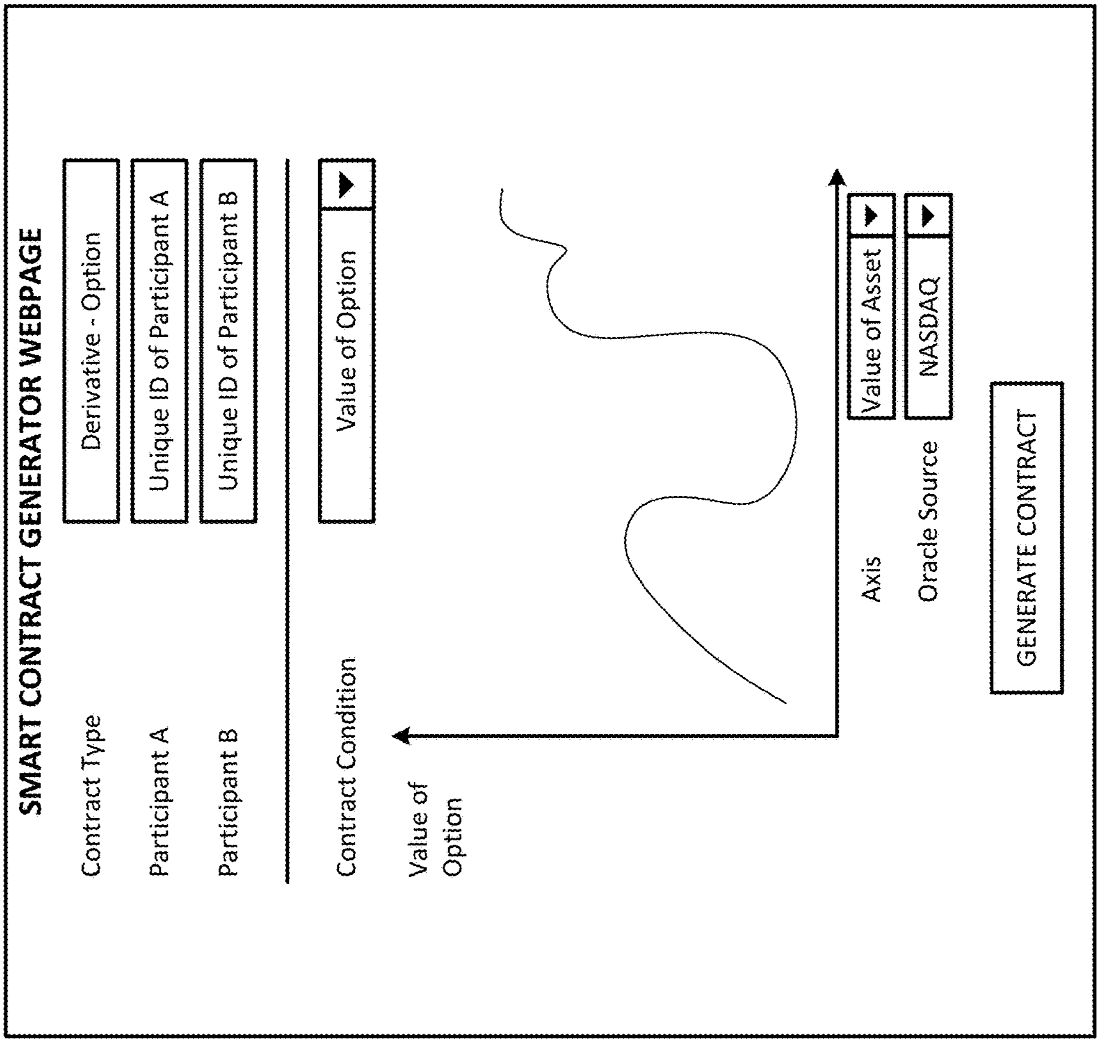
FIG. 44 shows a screenshot diagram illustrating embodiments of the SOCOACT.
Figure 45:
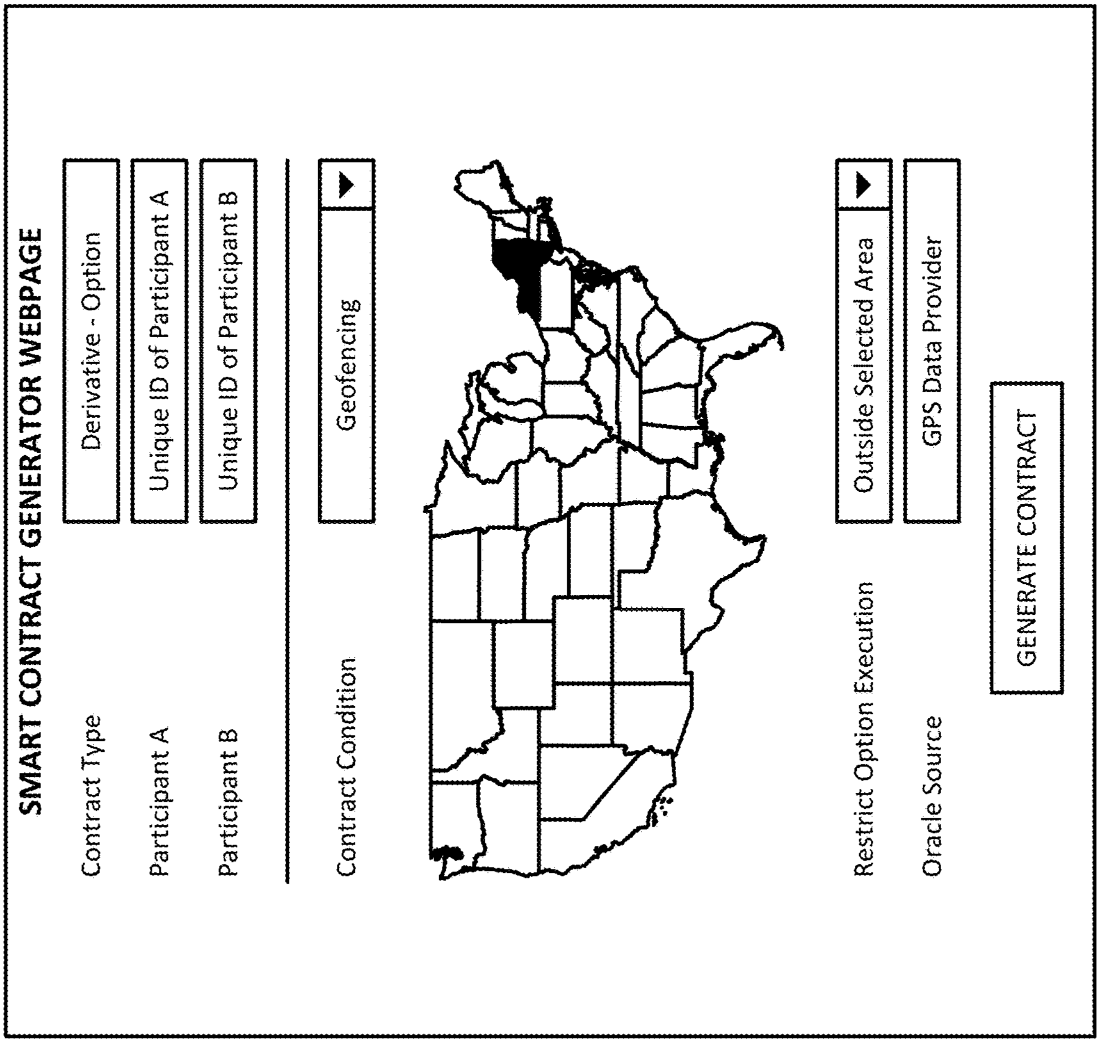
FIG. 45 shows a screenshot diagram illustrating embodiments of the SOCOACT.

FIG. 44 shows a screenshot diagram illustrating embodiments of the r SOCOACT. Using the shown smart contract generator GUI, an exotic derivative smart contract may be generated. The shown smart contract generator GUI lets a user draw a payout structure (e.g., a line, a curve) of how the value of an exotic derivative (e.g., an option) changes based on the value (e.g., based on data from NASDAQ) of an asset. The smart contract may specify that Participant A obtains this derivative from Participant B. FIG. 45 shows a screenshot diagram illustrating embodiments of the SOCOACT. Using the shown smart contract generator GUI, the smart contract may be further configured to specify that execution of the option described in FIG. 44 is restricted based on geofencing. Accordingly, Participant A users located in NY state (e.g., based on data regarding user locations from a GPS data provider) are allowed to execute the option, but other users are restricted from executing the option.

Figure 46:
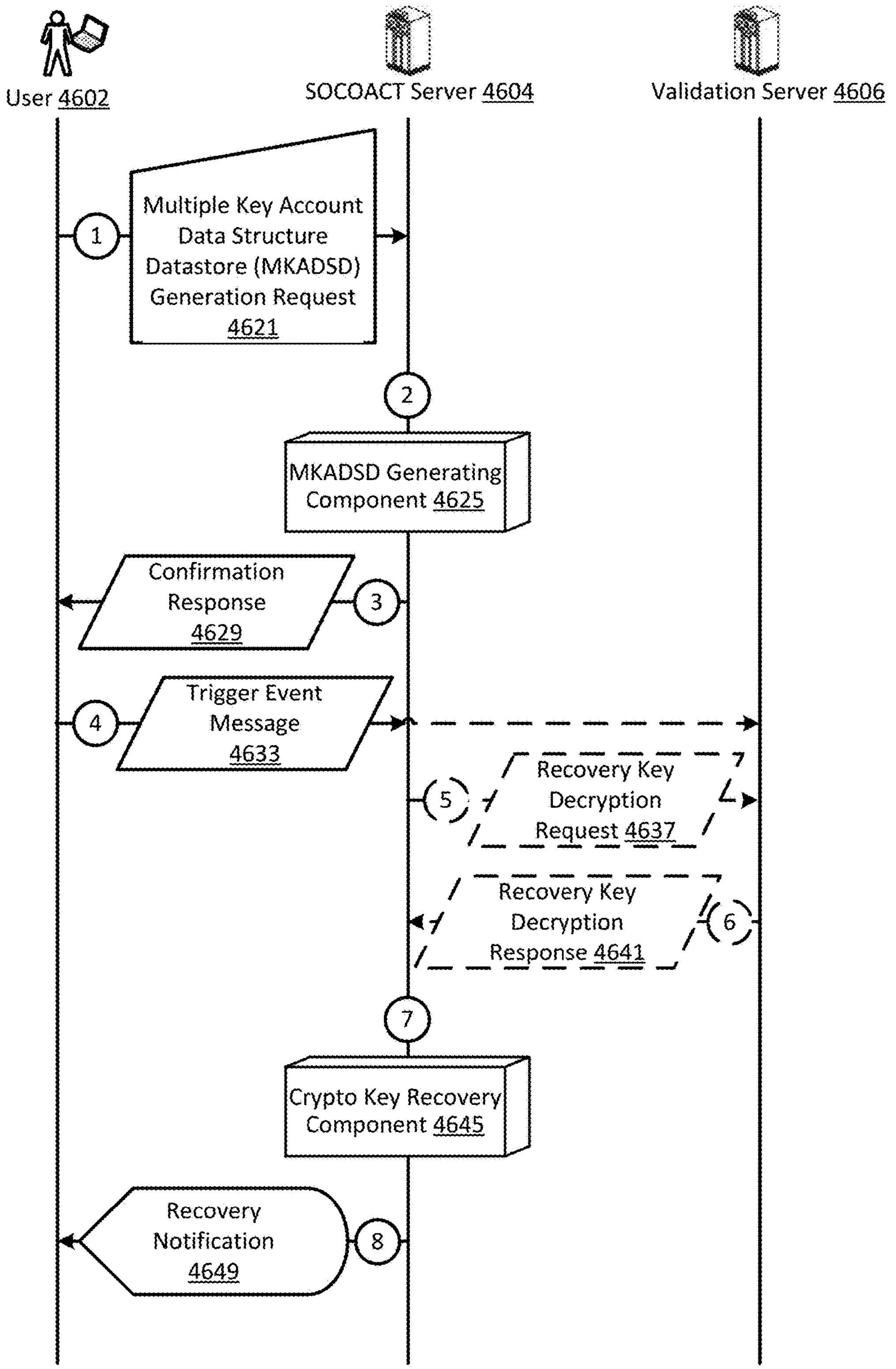
FIG. 46 shows a datagraph diagram illustrating embodiments of a data flow for the SOCOACT.

FIG. 46 shows a datagraph diagram illustrating embodiments of a data flow for the SOCOACT. In FIG. 46, dashed lines indicate data flow elements that may be more likely to be optional. In FIG. 46, a user 4602 (e.g., a person who wishes to use an electronic wallet with crypto tokens) may use a client device (e.g., a desktop, a laptop, a tablet, a smartphone) to send a multiple key account data structure datastore (MKADSD) generation request 4621 to a SOCOACT Server 4604. For example, a MKADSD (e.g., a multisignature electronic wallet) may be associated with one or more multisignature addresses, and crypto tokens associated with each of these multisignature addresses may be accessed using multiple private keys (e.g., crypto tokens associated with a 1-of-2 multisig address may be accessed using either one of the two associated private keys). In one implementation, the MKADSD generation request may include data such as a request identifier, a user identifier, a set of private keys, a set of public keys, validation server settings, recovery settings, and/or the like. For example, the client may provide the following example MKADSD generation request, substantially in the form of a HTTP(S) POST message including XML-formatted data, as provided below:

```
POST /MKADSD_generation_request.php HTTP/1.1
Host: www.server.com
Content-Type: Application/XML
Content-Length: 667
<?XML version = "1.0" encoding = "UTF-8"?>
```

-continued

```
<MKADSD_generation_request>
  <request_identifier>ID_request_1</request_identifier>
  <user_identifier>ID_user_1</user_identifier>
  <private_keys>
    <recovery_key>"recovery private key"</recovery_key>
    <recovery_key_encrypted>TRUE</recovery_key_encrypted>
  </private_keys>
  <public_keys>
    <normal_use_key>"normal use public key"</normal_use_key>
    <recovery_key>"recovery public key"</recovery_key>
  </public_keys>
  <validation_server_settings>
    <server_location>www.validation-server-location.com</
server_location>
  </validation_server_settings>
  <recovery_settings>
    <recovery_setting>
      <trigger_event>user lost private key</trigger_event>
      <trigger_event_type>TYPE_LOST</trigger_event_type>
      <action>recover crypto tokens</action>
    </recovery_setting>
    <recovery_setting>
      <trigger_event>child's client device left designated
geographic area</trigger_event>
  <trigger_event_type>TYPE_PARENTAL_PERMISSION</
  trigger_event_type>
      <action>recover child's crypto tokens to parent's
address</action>
      <address>3HnhWpkMHMjgt167kvgcPyurMmsCQ2WPgg</
      address>
    </recovery_setting>
  </recovery_settings>
</MKADSD_generation_request>
```

MKADSD generation request data may be used by a MKADSD generating (MKADSDG) component 4625 to facilitate generating a MKADSD and/or one or more addresses associated with the MKADSD. See FIG. 47 for additional details regarding the MKADSDG component.

The SOCOACT Server may send a confirmation response 4629 to the user to confirm that the MKADSD was generated successfully. For example, the SOCOACT Server may provide the following example confirmation response, substantially in the form of a HTTP(S) POST message including XML-formatted data, as provided below:

```
POST /confirmation_response.php HTTP/1.1
Host: www.server.com
Content-Type: Application/XML
Content-Length: 667
<?XML version = "1.0" encoding = "UTF-8"?>
<confirmation_response>
  <response_identifier>ID_response_1</response_identifier>
  <status>OK</status>
</confirmation_response>
```

The user may send a trigger event message 4633 to the SOCOACT Server upon occurrence of a trigger event. For example, the user may click on a "I lost my private key" widget of a SOCOACT website or application (e.g., a mobile app), and the trigger event message may be generated. In another example, the user's client may send the trigger event message upon detecting occurrence of a trigger event (e.g., the client was stolen and taken outside the allowed geofence). In one implementation, the trigger event message may include data such as a request identifier, a user identifier, a MKADSD identifier, trigger event data, and/or the like. For example, the client may provide the following example trigger event message, substantially in the form of a HTTP(S) POST message including XML-formatted data, as provided below:

```
POST /trigger_event_message.php HTTP/1.1
Host: www.server.com
Content-Type: Application/XML
Content-Length: 667
<?XML version = "1.0" encoding = "UTF-8"?>
<trigger_event_message>
  <request_identifier>ID_request_2</request_identifier>
  <user_identifier>ID_user_1</user_identifier>
  <MKADSD_identifier>ID_MKADSD_1</MKADSD_identifier>
  <trigger_event_data>
    <trigger_event_type>TYPE_LOST</trigger_event_type>
    <trigger_event_details>occurred on date/time</
trigger_event_details>
  </trigger_event_data>
</trigger_event_message>
```

In various implementations, a trigger event may be user request, occurrence of geofence constraint violation (e.g., a child leaves an approved store at the mall), anti-ping detection (e.g., lack of activity from the user's client), occurrence of time range fencing violation, occurrence of transaction/consumption constraint violation, occurrence of account balance constraint violation, occurrence of specified threshold oracle data value, occurrence of a smart contract generator GUI generated crypto smart rule violation, occurrence of specified weather and/or the like (e.g., natural events such as flood, earthquake, volcanic eruption, lava flow; political events such as political unrest, war, terrorist attacks) conditions, detection of fraud (e.g., an attempt to execute a fraudulent transaction by an attacker), detection of a specified vote (a vote outcome, a conditional vote), detection of a specified vote result, detection of a request to add an external feature to an account, detection of a specified crypto verification response (e.g., a valid crypto verification response, an invalid crypto verification response), and/or the like. It is to be understood that while in this embodiment the trigger event message is sent by the user, in other embodiments the trigger event message may be sent by other entities (e.g., by an oracle, by another device such as a client of the user's child). For example, the trigger event message may be an oracle data message from an oracle. In another example, the trigger event message may be generated by the SOCOACT Server (e.g., upon detection of fraud).

In some implementations, a recovery private key associated with the user's MKADSD may be encrypted, and a trigger event message may be sent (e.g., by the user, by other entities) to a validation server 4606 to inform the validation server that the SOCOACT Server is permitted to decrypt the recovery private key. The SOCOACT Server may send a recovery key decryption request 4637 to the validation server. For example, the recovery key decryption request may specify that a decryption key associated with the user is requested. The validation server may send a recovery key decryption response 4641 to the SOCOACT Server. For example, the recovery key decryption response may include the requested decryption key. In an alternative embodiment, the validation server may be provided with a the encrypted recovery private key and may return the decrypted recovery private key.

Trigger event message data and/or recovery key decryption response data may be used by a crypto key recovery (CKR) component 4645 to facilitate a recovery action associated with the trigger event. See FIG. 48 for additional details regarding the CKR component.

The SOCOACT Server may send a recovery notification 4649 to the user. The recovery notification may be used to inform the user regarding the recovery action that was facilitated. For example, the recovery notification may be displayed using a SOCOACT website or application (e.g., a mobile app), sent via email or SMS, and/or the like.

Figure 47:
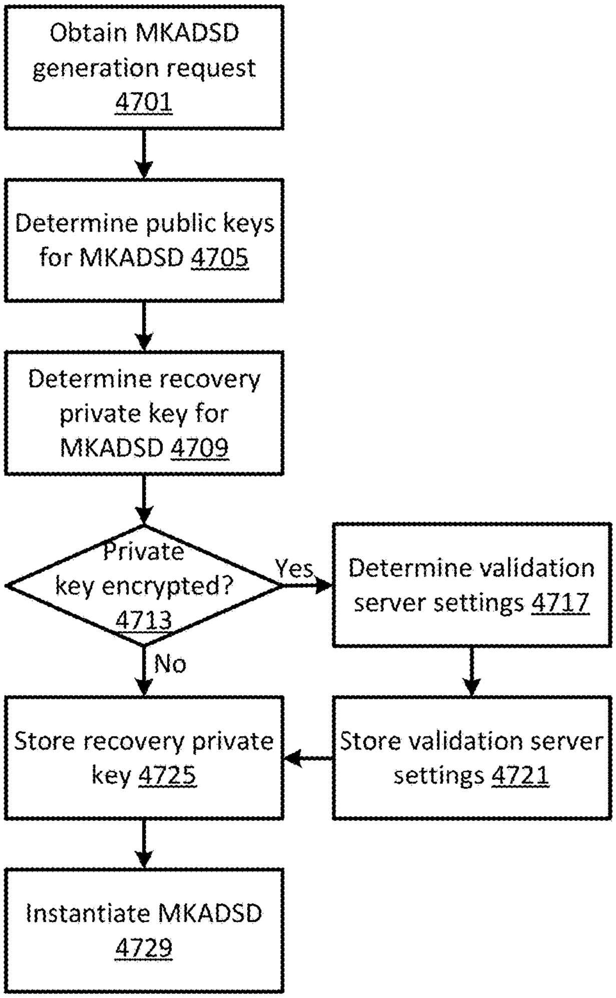
FIG. 47 shows a logic flow diagram illustrating embodiments of a MKADSD generating (MKADSDG) component for the SOCOACT.

FIG. 47 shows a logic flow diagram illustrating embodiments of a MKADSD generating (MKADSDG) component for the SOCOACT. In FIG. 47, a MKADSD generation request may be obtained at 4701. For example, the MKADSD generation request may be obtained as a result of a user using a SOCOACT website or application to request creation of a MKADSD for the user.

Public keys for the MKADSD may be determined at 4705. In one implementation, the MKADSD generation request may be parsed (e.g., using PHP commands) to determine the public keys (e.g., a normal use public key and a recovery public key). For example, the user may utilize a normal use private key corresponding to the normal use public key to engage in transactions using the MKADSD. In another implementation, the public keys may be generated by the SOCOACT Server. For example, the SOCOACT Server may provide the user with the generated normal use public key and with a normal use private key corresponding to the generated normal use public key (e.g., via the confirmation response 4629).

A recovery private key for the MKADSD may be determined at 4709. In one implementation, the MKADSD generation request may be parsed (e.g., using PHP commands) to determine the recovery private key. For example, the recovery private key may correspond to the recovery public key, and the SOCOACT may utilize the recovery private key to conduct recovery actions. In another implementation, the recovery private key may be generated by the SOCOACT Server.

A determination may be made at 4713 whether the recovery private key is encrypted. In one implementation, the MKADSD generation request may be parsed (e.g., using PHP commands) to make this determination. If the recovery private key is encrypted, validation server settings may be determined at 4717. In one implementation, the MKADSD generation request may be parsed (e.g., using PHP commands) to determine the validation server settings. For example, the validation server settings may include a URL of the validation server. The validation server settings may be stored at 4721. In one implementation, the validation server settings may be stored in the wallet database 7919*n*.

The recovery private key may be stored at 4725. In one implementation, the recovery private key may be stored in the wallet database 7919*n*. For example, the recovery private key may be set via a MySQL database command similar to the following:

```
UPDATE wallet
SET recoveryPrivateKey="determined recovery private
  key for the MKADSD"
WHERE accountID=ID_MKADSD_1;
```

The MKADSD may be instantiated at 4729. For example, the MKADSD may be created and assigned to the user. In one implementation, one or more multisig addresses associated with the MKADSD may be generated using a command similar to the following

```
addmultisigaddress 1
"
  [
     "normal use public key",
     "recovery public key"
  ]
"
```

In one implementation, transfer of crypto tokens via the MKADSD may be facilitated. For example, the user may add BTC crypto tokens to the MKADSD. In one implementation, trigger event recovery settings for the MKADSD may be set. For example, the user may specify trigger events and associated recovery settings for the MKADSD (e.g., using a crypto smart rule generated via the smart contract generator GUI and submitted to the block chain).

Figure 48:
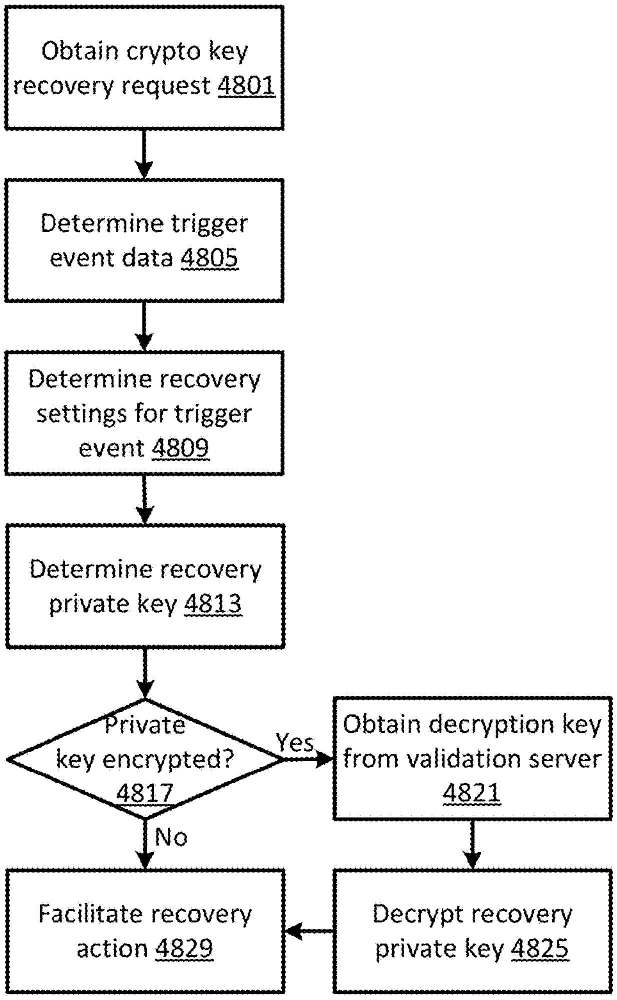
FIG. 48 shows a logic flow diagram illustrating embodiments of a crypto key recovery (CKR) component for the SOCOACT.

FIG. 48 shows a logic flow diagram illustrating embodiments of a crypto key recovery (CKR) component for the SOCOACT. In FIG. 48, a crypto key recovery request may be obtained at 4801. For example, the crypto key recovery request may be obtained as a result of receiving a trigger event message for a MKADSD of a user.

Trigger event data may be determined at 4805. In one implementation, the crypto key recovery request may be parsed (e.g., using PHP commands) to determine the trigger event data. For example, the type of the trigger event may be determined (e.g., TYPE_LOST). In another example, details associated with the trigger event (e.g., description, occurrence date and/or time) may be determined. In one implementation, different types of trigger events may have different details associated with them. For example, if the user lost the normal use private key associated with the MKADSD, event details may include information about when the user requested recovery of funds, which client device the user used, and/or the like. In another example, if a fraudulent transaction associated with the MKADSD has been detected, event details may include information about the transaction, location where the transaction originated, and/or the like.

Recovery settings for the trigger event may be determined at 4809. For example, recovery settings may specify a recovery action to take for each trigger event (e.g., based on the type of the trigger event, based on the details associated with the trigger event). In one implementation, the recovery settings for the trigger event may be retrieved from the wallet database 7919*n*. For example, the recovery settings for the trigger event may be retrieved via a MySQL database command similar to the following:

```
SELECT recoverySettings
FROM wallet
WHERE accountID = ID_MKADSD_1 AND triggerEventType =
TYPE_LOST;
```

Recovery private key for the MKADSD may be determined at 4813. In one implementation, the recovery private key for the MKADSD may be retrieved from the wallet database 7919*n*. For example, the recovery private key for the MKADSD may be retrieved via a MySQL database command similar to the following

```
SELECT recoveryPrivateKey
FROM wallet
WHERE accountID = ID_MKADSD_1;
```

A determination may be made at 4817 whether the recovery private key for the MKADSD is encrypted. For example, this determination may be made based on a setting stored in the wallet database 7919*n*. If the recovery private key is encrypted, a decryption key to decrypt the encrypted recovery private key may be obtained from a validation server at 4821 (e.g., based on validation server settings) and the encrypted recovery private key may be decrypted at 4825.

A recovery action associated with the trigger event may be facilitated at 4829. In one implementation, the recovery private key may be used to transfer crypto tokens from a multisig address associated with the MKADSD to a different address. For example, if the user lost the normal use private key for the MKADSD or if an attempt to make a fraudulent transaction has been detected, crypto tokens associated with the MKADSD may be transferred to a special SOCOACT recovery address from which the user may later retrieve the crypto tokens (e.g., upon providing proof of the user's identity and/or account ownership). In another example, if the user's child violates a geofence constraint by leaving an approved store at the mall, crypto tokens associated with the MKADSD of the child may be transferred to an address of the parent (e.g., to prevent the child from spending crypto tokens in a non-approved store). In another implementation, the recovery private key may be provided to the user (e.g., sent via a SOCOACT website or application, sent via email or SMS).

Figure 49:
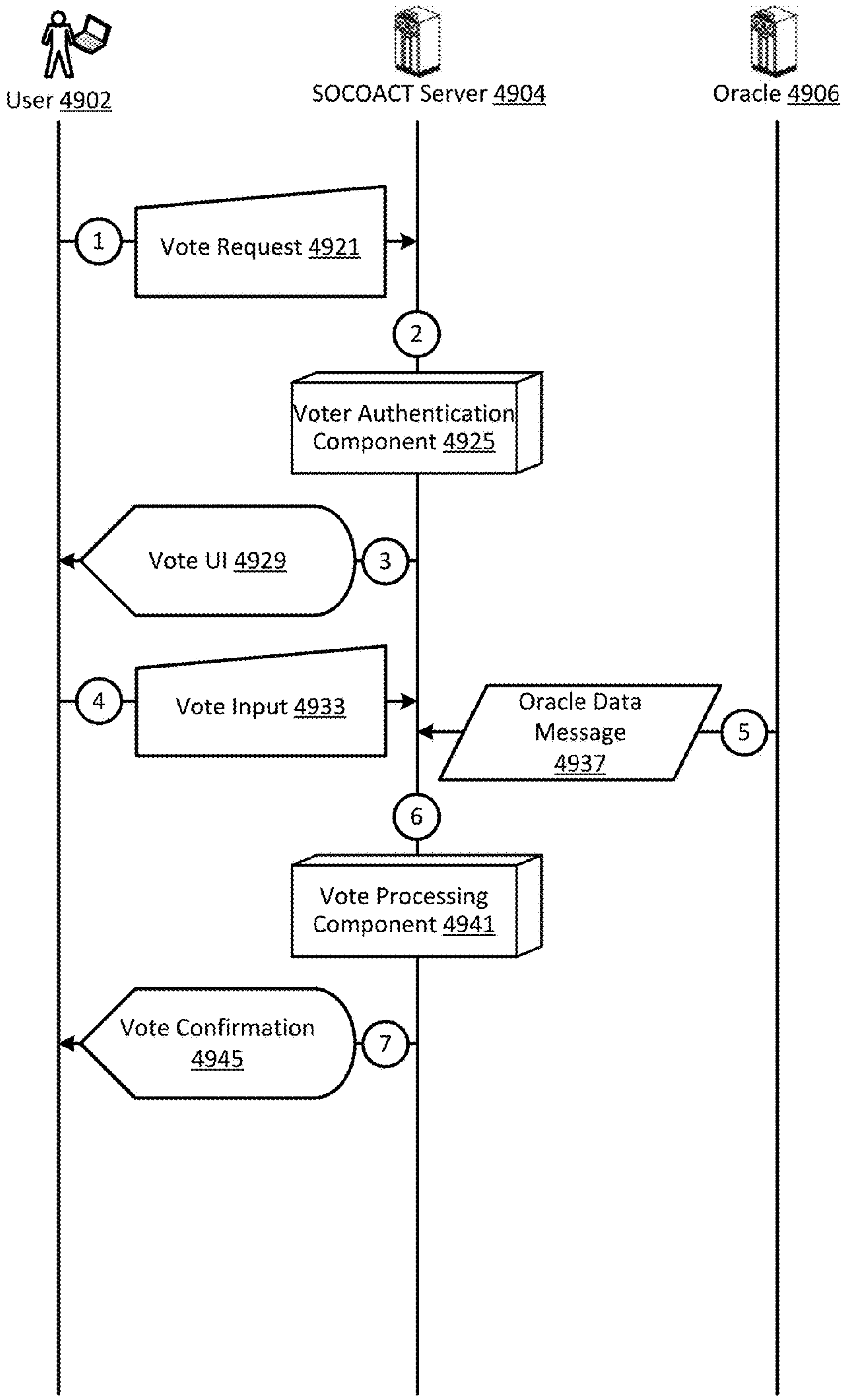
FIG. 49 shows a datagraph diagram illustrating embodiments of a data flow for the SOCOACT.

FIG. 49 shows a datagraph diagram illustrating embodiments of a data flow for the SOCOACT. In FIG. 49, a user 4902 (e.g., a voter) may use a client device (e.g., a desktop, a laptop, a tablet, a smartphone, a dedicated voting terminal) to send a crypto vote request 4921 to a SOCOACT Server 4904. For example, the user may wish to vote in a poll (e.g., a presidential election, a corporate action vote). In one implementation, the vote request may include data such as a request identifier, a user identifier, a poll identifier, authentication data, and/or the like. For example, the client may provide the following example vote request, substantially in the form of a HTTP(S) POST message including XML-formatted data, as provided below:

```
POST /vote__request.php HTTP/1.1
Host: www.server.com
Content-Type: Application/XML
Content-Length: 667
<?XML version = "1.0" encoding = "UTF-8"?>
<vote__request>
  <request__identifier>ID__request__1</request__identifier>
  <user__identifier>ID__user__1</user__identifier>
  <poll__identifier>ID__poll__1</poll__identifier>
  <authentication__data>authentication data for user (e.g., crypto
verification)</authentication__data>
</vote__request>
```

Vote request data may be used by a voter authentication (VA) component 4925 to facilitate authenticating the user and/or verifying that the user is authorized to participate in the poll. See FIG. 50 for additional details regarding the VA component.

The SOCOACT Server may provide a vote UI 4929 to the user. In various implementations, the vote UI may facilitate voting in the poll, allocating fractional votes to various options (e.g., to multiple candidates, to multiple corporate actions), specifying conditional voting selections (e.g., based on data from an oracle), specifying action voting (e.g., where the result of a conditional vote is an action such as a stock purchase), and/or the like. For example, the vote UI may be provided via a SOCOACT website or application (e.g., a mobile app).

The user may send a crypto vote input 4933 to the SOCOACT Server. For example, the user may provide vote selections via the vote UI. In one implementation, the vote input may include data such as a request identifier, a user identifier, a poll identifier, authentication data, vote selections, and/or the like. For example, the client may provide the following example vote input, substantially in the form of a HTTP(S) POST message including XML-formatted data, as provided below:

```
POST /vote__input.php HTTP/1.1
Host: www.server.com
Content-Type: Application/XML
Content-Length: 667
<?XML version = "1.0" encoding = "UTF-8"?>
<vote__input>
  <request__identifier>ID__request__2</request__identifier>
  <user__identifier>ID__user__1</user__identifier>
  <poll__identifier>ID__poll__1</poll__identifier>
  <authentication__data>authentication data for user (e.g., authentication
token)</authentication__data>
  <vote__selections>
    <vote__selection>
      <condition>Stock Price < $5</condition>
      <vote__outcome>Candidate A</vote__outcome>
    </vote__selection>
    <vote__selection>
      <condition>$5 ≤ Stock Price ≤ $7</condition>
      <vote__outcome>Candidate C</vote__outcome>
    </vote__selection>
    <vote__selection>
      <condition>Stock Price > $7</condition>
      <vote__outcome>50% for Candidate A</vote__outcome>
      <vote__outcome>50% for Candidate B</vote__outcome>
      <action>Buy 100 shares of Company X stock</action>
    </vote__selection>
  </vote__selections>
</vote__input>
```

An oracle 4906 may send an oracle data message 4937 to the SOCOACT Server. In one implementation, the provided oracle data may be utilized to determine the result of a conditional vote (e.g., of the vote stored on the blockchain in the form of a smart contract). For example, the oracle may provide the following example oracle data message, substantially in the form of a HTTP(S) POST message including XML-formatted data, as provided below:

```
POST /oracle__data__message.php HTTP/1.1
Host: www.server.com
Content-Type: Application/XML
Content-Length: 667
<?XML version = "1.0" encoding = "UTF-8"?>
<oracle__data__message>
  <source>Oracle - NASDAQ</source>
  <vote__address>1HnhWpkMHMjgt167kvgcPyurMmsCQ2WPgg</
  vote__address>
  <oracle__data>
    <stock__ticker>Company X stock ticker</stock__ticker>
    <price>$8 per share</price>
    <date__time>date and/or time of occurrence for the provided
price</date__time>
  </oracle__data>
</oracle__data__message>
```

Vote input data and/or oracle data may be used by a vote processing (VP) component 4941 to facilitate determining the user's vote outcome and/or to facilitate a vote action associated with the vote outcome. See FIG. 51 for additional details regarding the VP component.

The SOCOACT Server may send a vote confirmation 4945 to the user to confirm that the user's vote was received. For example, the SOCOACT Server may provide the following example vote confirmation, substantially in the form of a HTTP(S) POST message including XML-formatted data, as provided below:

```
POST /vote_confirmation.php HTTP/1.1
Host: www.server.com
Content-Type: Application/XML
Content-Length: 667
<?XML version = "1.0" encoding = "UTF-8"?>
<vote_confirmation>
  <response_identifier>ID_response_2</response_identifier>
  <status>OK</status>
</vote_confirmation>
```

Figure 50:
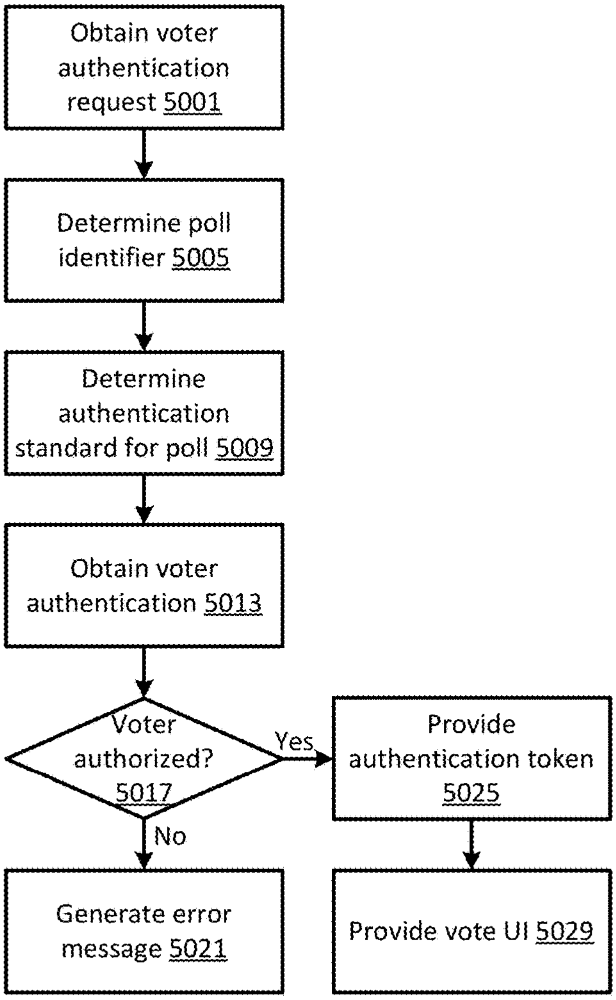
FIG. 50 shows a logic flow diagram illustrating embodiments of a voter authentication (VA) component for the SOCOACT.

FIG. 50 shows a logic flow diagram illustrating embodiments of a voter authentication (VA) component for the SOCOACT. In FIG. 50, a voter authentication request may be obtained at 5001. For example, the voter authentication request may be obtained as a result of a user using a SOCOACT website or application to request access to vote in a poll (e.g., via a vote request).

A poll identifier for the poll may be determined at 5005. In one implementation, the voter authentication request may be parsed (e.g., using PHP commands) to determine the poll identifier.

Authentication standard for the poll may be determined at 5009. In one embodiment, the authentication standard may specify the kind of identity authentication that the user should provide to verify the user's identity (e.g., to prevent someone from impersonating the user, to prevent the user from voting multiple times). For example, the user may have to log into a SOCOACT account that was created based on the user providing proof of identity, such as the user's driver's license, social security card, and an authentication code sent to the user's smartphone. In another example, the user may have to satisfy a smart contract using a private key corresponding to a public key known to belong to the user. In one implementation, the authentication standard for the poll may be retrieved from a polls database 7919*s*. For example, the authentication standard for the poll may be retrieved via a MySQL database command similar to the following:

```
SELECT authenticationStandard
FROM Polls
WHERE pollID = ID_poll_1;
```

Voter authentication may be obtained at 5013. In one implementation, the user may provide login credentials to log into the SOCOACT account. In another implementation, the user may satisfy a smart contract by transferring a crypto token (e.g., provided by the SOCOACT) from a crypto address known to belong to the user (e.g., based on the user's public key) to a special SOCOACT vote address.

A determination may be made at 5017 whether the user is authorized to vote. In one implementation, if the user provides correct voter authentication data and/or the user did not yet vote, the user may be authorized to vote. In another implementation, an authorized voters setting associated with the poll may be checked to determine whether the user is authorized to vote (e.g., the user is on a voters list). For example, the user may have to be a shareholder of Company X to be authorized to vote in a corporate election poll. If the user is not authorized to vote, an error message may be generated at 5021. For example, the user may be informed that the user is not authorized to vote and/or may be asked to provide correct voter authentication data.

If it is determined that the user is an authorized voter, the user may be provided with an authentication token. In one implementation, the authentication token may be used by the user when casting the vote. For example, the authentication token may verify that the user is an authorized voter when the user provides vote input and/or may be used by the user to vote anonymously (e.g., the authentication token may not be linked to the user's identity). A vote UI may be provided to the user at 5029. In one implementation, the user may utilize the vote UI (e.g., a smart contract generator GUI) to provide vote input associated with the poll. See FIG. 52 for an example of a vote UI that may be utilized by the voter.

Figure 51:
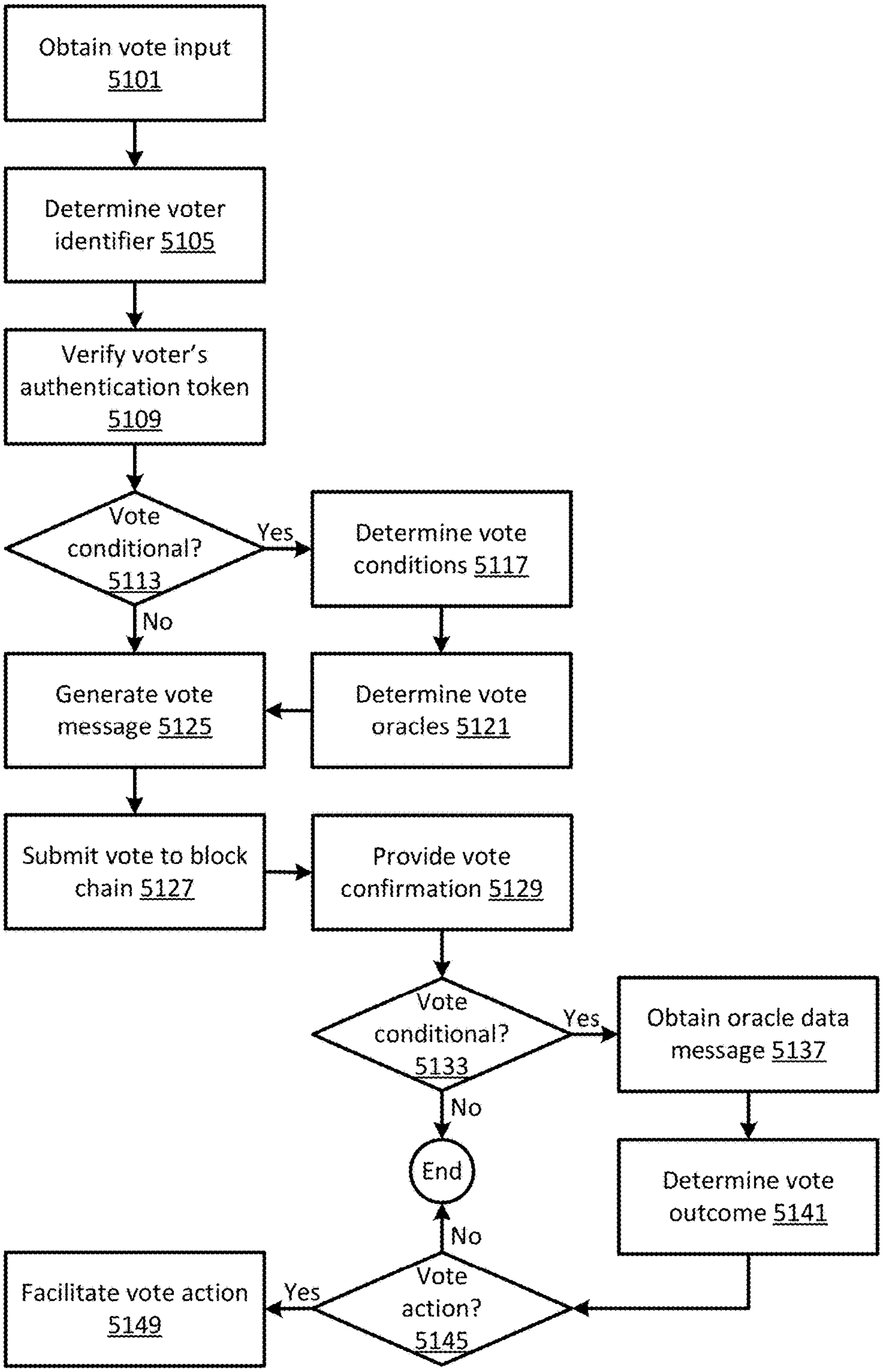
FIG. 51 shows a logic flow diagram illustrating embodiments of a vote processing (VP) component for the SOCOACT.

FIG. 51 shows a logic flow diagram illustrating embodiments of a vote processing (VP) component for the SOCOACT. In FIG. 51, a vote input may be obtained at 5101. For example, the vote input may be obtained as a result of a user casting a vote in a poll using a vote UI (e.g., using a SOCOACT website or application).

The user's voter identifier may be determined at 5105. In one implementation, the vote input may be parsed (e.g., using PHP commands) to determine the voter identifier (e.g., in a poll in which votes are not anonymous). The user's eligibility to vote may be verified at 5109. In one implementation, the user's authentication token may be verified to confirm that the authentication token is valid and/or authorizes the user to vote in the poll and/or is associated with the user's voter identifier.

A determination may be made at 5113 whether the vote submitted by the user is conditional. In one embodiment, the user's vote may not be conditional and may specify how the user voted as a fixed vote outcome. In another embodiment, the user's vote may be conditional and may specify that the user's vote depends on one or more conditions (e.g., the user's vote depends on oracle data to be provided by an oracle). In one implementation, the vote input may be parsed (e.g., using PHP commands) to determine whether the vote submitted by the user is conditional.

If it is determined that the user's vote is conditional, vote conditions associated with the user's vote (e.g., the user's vote changes depending on a company's closing stock price tomorrow) may be determined at 5117 and oracles associated with the vote conditions may be determined at 5121 (e.g., the stock price is to be provided by NASDAQ). In one implementation, the vote input may be parsed (e.g., using PHP commands) to determine vote conditions and/or oracles.

A vote message that specifies the user's vote (e.g., including vote outcomes, vote conditions, vote oracles, vote actions) may be generated at 5125 and submitted to the block chain at 5127 (e.g., stored in a votes database 7919*t*). In one embodiment, the vote message may be generated in a format compatible with submission to the block chain (e.g., as a blockchain transaction with the user's vote, as a smart contract with the user's vote outcome to be determined based on oracle data). For example, storing the user's vote on the blockchain may provide a permanent record of each user's vote and/or may facilitate tallying and/or auditing results of the poll. In some implementations, the block chain may be a permissioned ledger. In some implementation, the block chain may be public and the user's vote may be encrypted to restrict access to voting data to authorized users.

A vote confirmation may be provided to the user at 5129. The vote confirmation may be used to confirm that the user's vote was processed. For example, the vote confirmation may be displayed using a SOCOACT website or application (e.g., a mobile app).

A determination may be made at 5133 whether the vote submitted by the user is conditional. If so, oracle data for the vote may be obtained via an oracle data message from an oracle at 5137. It is to be understood that a wide variety of oracles may be utilized (e.g., stock exchanges, GPS data providers, date/time providers, crowdsourced decentralized data providers, news providers, activity monitors, RSS feeds, other oracles, etc.). In various embodiments, RSS feeds may be from sensor based devices such as a mobile phone (e.g., with data from many such devices aggregated into a feed), may be social network (e.g., Twitter, Facebook) or news feeds (e.g., which may be further filtered down by various parameters), may be market data feeds (e.g., Bloomberg's PhatPipe, Consolidated Quote System (CQS), Consolidated Tape Association (CTA), Consolidated Tape System (CTS), Dun & Bradstreet, OTC Montage Data Feed (OMDF), Reuter's Tib, Triarch, US equity trade and quote market data, Unlisted Trading Privileges (UTP) Trade Data Feed (UTDF), UTP Quotation Data Feed (UQDF), and/or the like feeds, e.g., via ITC 2.1 and/or respective feed protocols), and/or the like, and selecting an oracle may make a request to obtain the selected feed's data stream. In one implementation, a crowdsourced decentralized usage tracking provider may obtain (e.g., from smartphones of participating users) crowdsourced usage data (e.g., which soft drinks college students consume, which social media services people utilize), and provide such (e.g., combined) usage data for the vote. The obtained oracle data may be used to determine the vote outcome of the conditional vote at 5141. For example, the obtained oracle data may specify that the stock price is $8 per share, resulting in the vote outcome of 50% fractional vote for Candidate A and 50% fractional vote for Candidate B. In one implementation, this determination may be made based on the outcome of the smart contract used for the vote.

A determination may be made at 5145 whether the vote is associated with a vote action. If so, the vote action may be facilitated at 5149. It is to be understood that a wide variety of vote actions may be facilitated (e.g., restrict access to an account, release an extra key, purchase stock, vote in a certain way in another poll) based on the obtained oracle data and/or the vote outcome. In one implementation, a stock purchase and/or sale may be facilitated. For example, if the vote outcome is that the user makes a 50% fractional vote for Candidate A and 50% fractional vote for Candidate B, the vote action may be to purchase 100 shares of the company's stock. In another example, if usage data from a crowdsourced decentralized usage tracking provider oracle for the vote specifies that college students increased their consumption of Coke, the vote action may be to purchase shares of The Coca-Cola Company. In yet another example, stock purchases and/or sales may be facilitated by following stock purchases and/or sales (e.g., as specified in the obtained oracle data) of another entity (e.g., a mutual fund).

Figure 52:
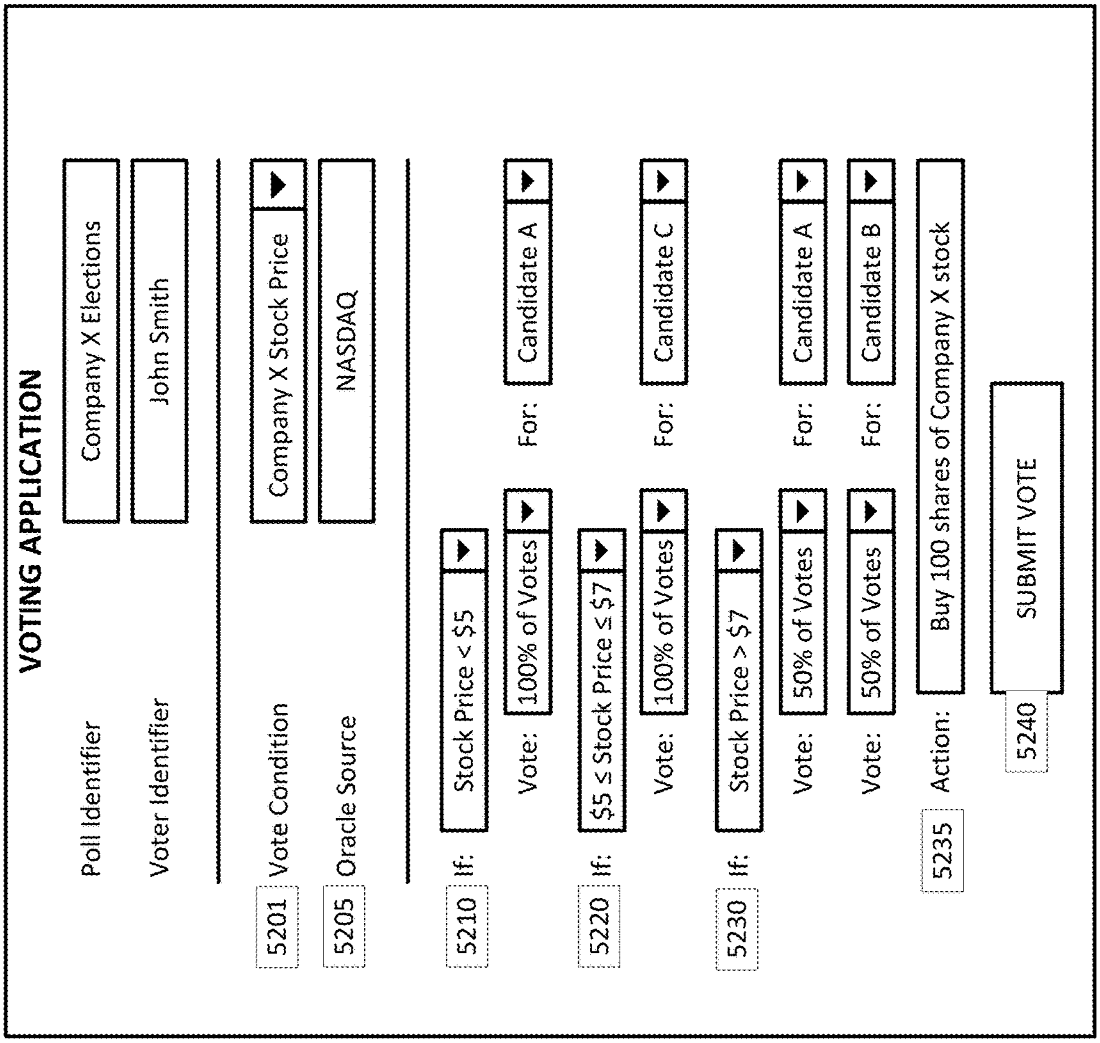
FIG. 52 shows a screenshot diagram illustrating embodiments of the SOCOACT.

FIG. 52 shows a screenshot diagram illustrating embodiments of the SOCOACT. Using the shown vote UI, a user may provide vote input and the vote may be submitted. As illustrated in FIG. 52, a user, John Smith, may utilize the shown vote UI to vote in Company X elections. As illustrated at 5201, the user specified that the user's vote is conditional on Company X stock price (e.g., at the time the poll closes) as follows: as illustrated at 5210, if the stock price is less than $5 per share, the user wishes to vote for Candidate A; as illustrated at 5220, if the stock price is between $5 and $7 per share, the user wishes to vote for Candidate C; as illustrated at 5230, if the stock price is greater than $7 per share, the user wishes to use fractional voting (e.g., to allocate the user's voting power to multiple options in a specified way) and utilize 50% of the user's voting power to vote for Candidate A and 50% of the user's voting power to vote for Candidate B. Further, as illustrated at 5235, the user specified that if the stock price is greater than $7 per share, the user wishes to execute a vote action—buy 100 shares of Company X stock. It is to be understood that a vote condition may be based on any data provided by an oracle. As illustrated at 5205, the user selected NASDAQ as the oracle that provides Company X stock price for the vote condition. The Submit Vote button 5240 may be used by the user to submit the user's vote.

Figure 53:
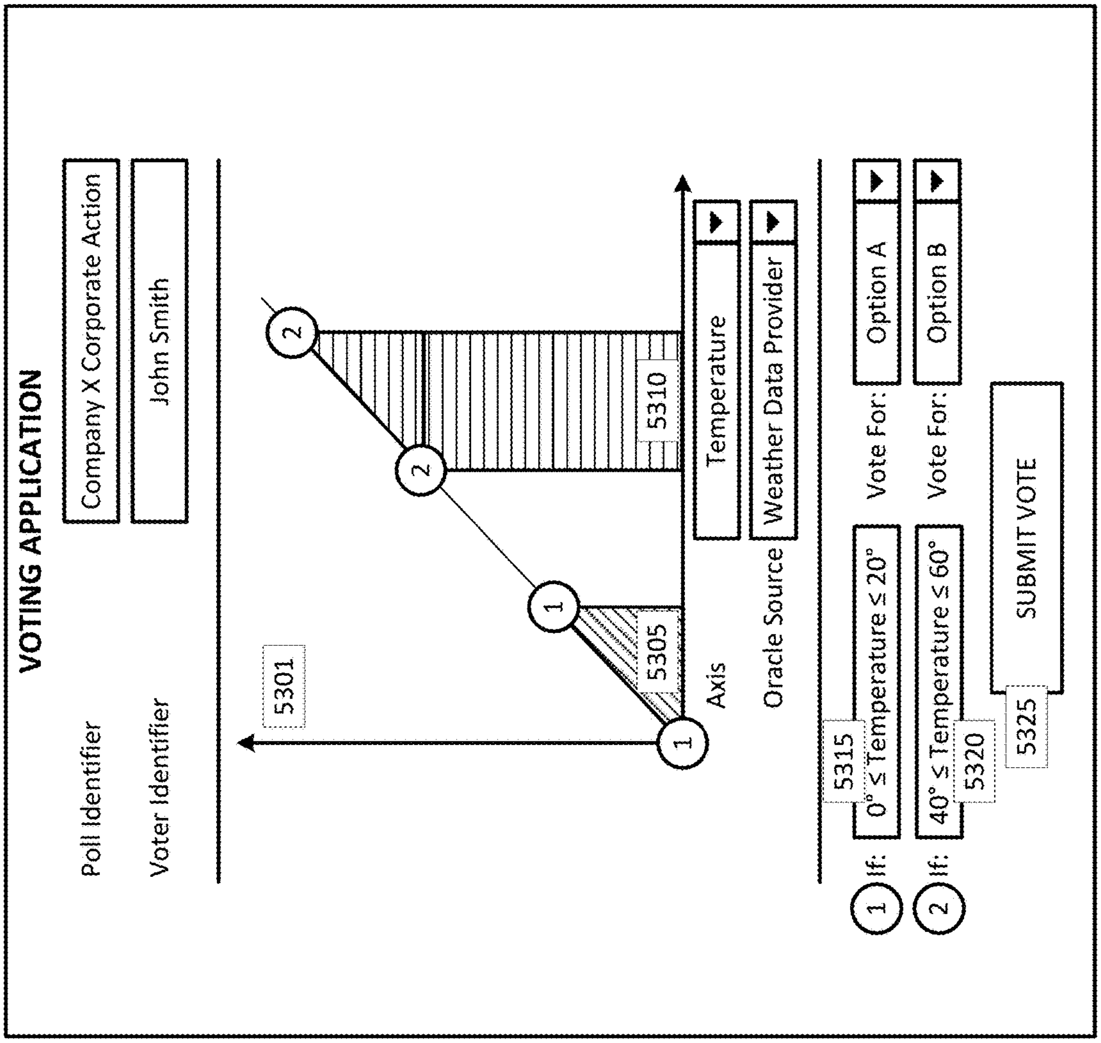
FIG. 53 shows a screenshot diagram illustrating embodiments of the SOCOACT.

FIG. 53 shows a screenshot diagram illustrating embodiments of the SOCOACT. Using the shown vote UI, a user may provide vote input and the vote may be submitted. As illustrated in FIG. 53, a user, John Smith, may utilize the shown vote UI to vote for a Company X corporate action. The user may select and utilize a graph 5301 that shows temperate as provided by a weather data provider oracle to specify that the user's vote a with regard to the corporate action is conditional on the temperature. For example, the temperate may be for a geographic region in which Company X grows crops (e.g., these crops may grow well or poorly depending on the temperature), and the user may wish to vote with regard to the corporate action involving these crops based on the reported temperature. The user's vote may be conditional on the temperature as follows: if the temperature is in the first range 5305 between 0 and 20 degrees, the user wishes to vote for Option A; if the temperature is in the second range 5310 between 40 and 60 degrees, the user wishes to vote for Option B. In one implementation, the user may utilize (e.g., click on) the graph to make these temperature range selections. For example, the user may select region 5305 on the graph to make the corresponding temperature range appear in box 5315, and the user may select region 5310 on the graph to make the corresponding temperature range appear in box 5320. The Submit Vote button 5325 may be used by the user to submit the user's vote.

Figure 54:
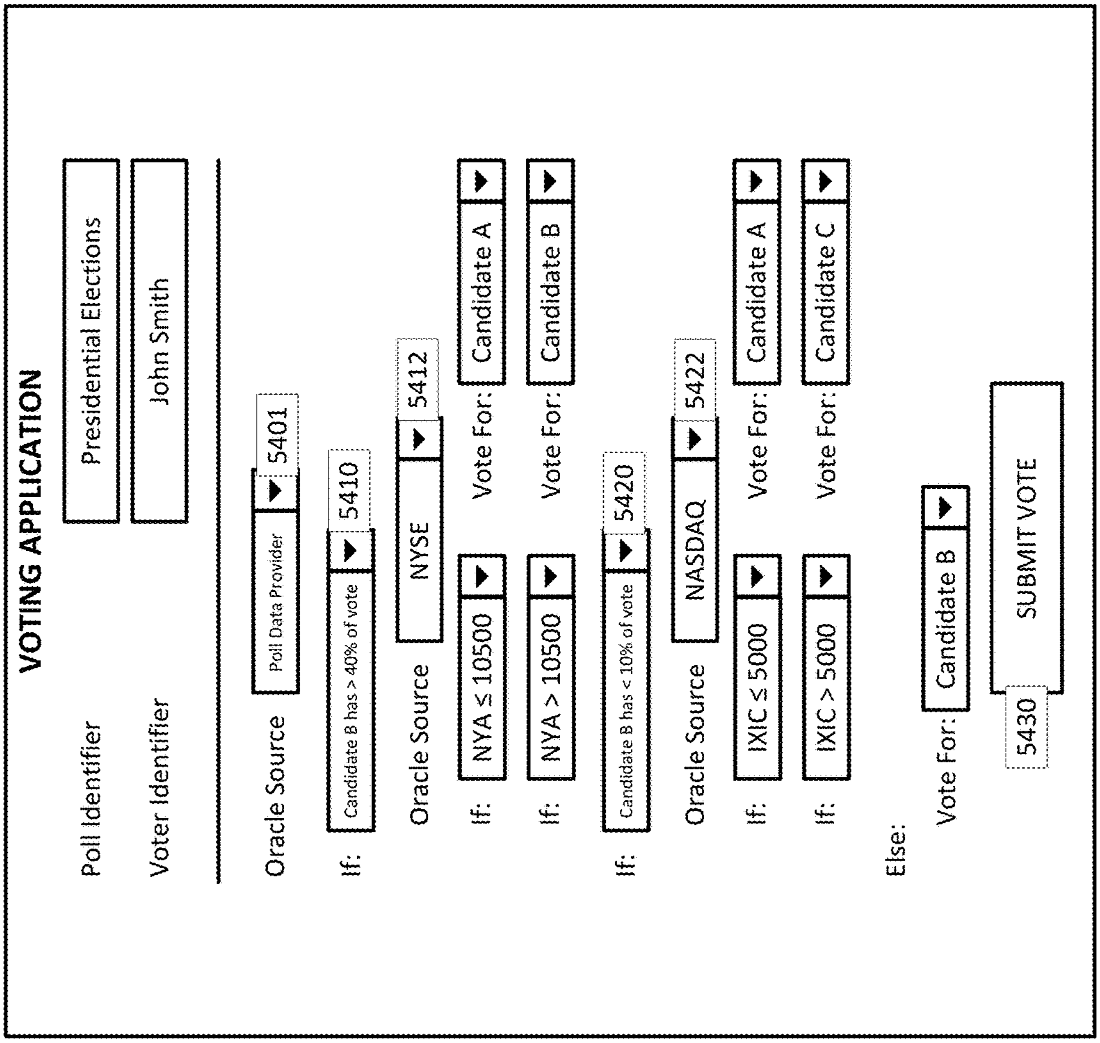
FIG. 54 shows a screenshot diagram illustrating embodiments of the SOCOACT.

FIG. 54 shows a screenshot diagram illustrating embodiments of the SOCOACT. Using the shown vote UI, a user may provide vote input and the vote may be submitted. As illustrated in FIG. 54, a user, John Smith, may utilize the shown vote UI to vote in presidential elections. The user may specify that the user's vote is conditional using cascading oracle data. As illustrated, the user's vote is conditional on vote data from a poll data provider 5401. Further, for choices 5410 and 5420, the user's vote is further conditional on oracle data from NYSE 5412 and NASDAQ 5422, respectively. As illustrated, the user's vote is conditional as follows: if oracle data from a poll data provider indicates that Candidate B currently has more than 40% of the vote, then the user's vote depends on oracle data from NYSE regarding the NYSE Composite Index—if the index is less than or equal to 10,500 the user wishes to vote for Candidate A, if the index is greater than 10,500 the user wishes to vote for Candidate B; if oracle data from a poll data provider indicates that Candidate B currently has less than 10% of the vote, then the user's vote depends on oracle data from NASDAQ regarding the NASDAQ Composite Index—if the index is less than or equal to 5,000 the user wishes to vote for Candidate A, if the index is greater than 5,000 the user wishes to vote for Candidate C; otherwise, the user wishes to vote for a Candidate B. It is to be understood that any number of cascading levels may be specified by the user based on oracle data (e.g., if the NYSE Composite Index is less than or equal to 10,500, the user's vote may be further broken down depending on additional oracle data). The Submit Vote button 5430 may be used by the user to submit the user's vote.

Figure 55:
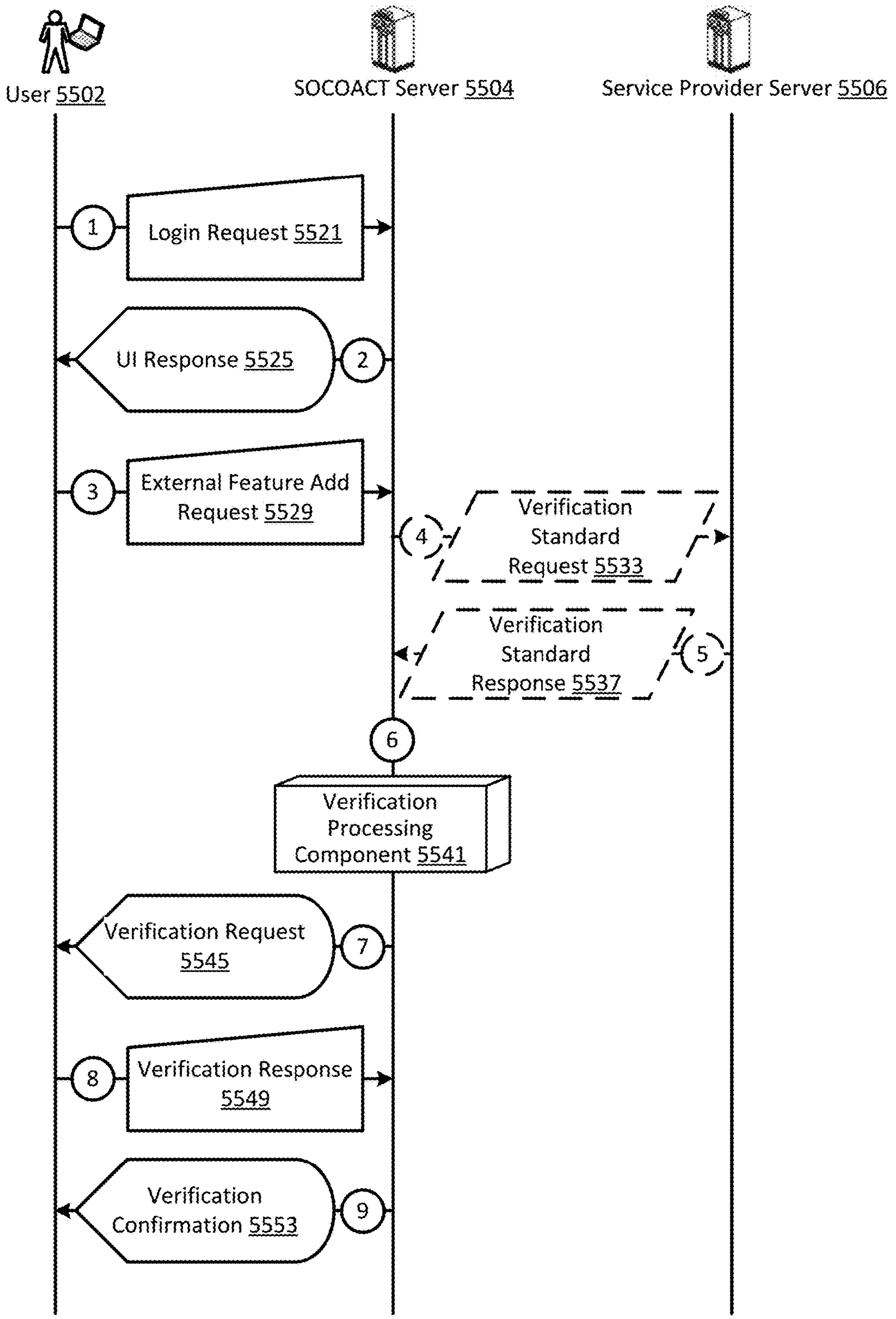
FIG. 55 shows a datagraph diagram illustrating embodiments of a data flow for the SOCOACT.

FIG. 55 shows a datagraph diagram illustrating embodiments of a data flow for the SOCOACT. In FIG. 55, a user 5502 may use a client device (e.g., a desktop, a laptop, a tablet, a smartphone) to send a login request 5521 to a SOCOACT Server 5504. For example, the user may wish to authenticate (e.g., provide login credentials) himself to make changes to the user's account (e.g., a participant account data structure stored in an accounts database 7919*a*). The SOCOACT Server may provide a UI Response 5525 to the authenticated user to facilitate user interaction with the account. For example, the UI Response may be provided via a SOCOACT website or application (e.g., a mobile app).

The user may send an external feature add request 5529 to the SOCOACT Server. For example, the user may request (e.g., via SOCOACT UI) that an account data structure datastore (e.g., a third party electronic wallet) be added to the user's account. In one implementation, the external feature add request may include data such as a request identifier, a user identifier, an external feature request type, an external feature identifier, a verification address, a linked service identifier, and/or the like. For example, the client may provide the following example external feature add request, substantially in the form of a HTTP(S) POST message including XML-formatted data, as provided below:

```
POST /external_feature_add_request.php HTTP/1.1
Host: www.server.com
Content-Type: Application/XML
Content-Length: 667
<?XML version = "1.0" encoding = "UTF-8"?>
<external_feature_add_request>
  <request_identifier>ID_request_1</request_identifier>
  <user_identifier>ID_user_1</user_identifier>
  <account_identifier>ID_account_1</account_identifier>
  <external_feature_request_type>
TYPE_ADD_EXTERNAL_ADSD</
external_feature_request_type>
  <external_feature_identifier>ID_External_ADSD_1</
external_feature_identifier>
  <verification_address>
1HnhWpkMHMjgt167kvgcPyurMmsCQ2WPgg</
verification_address>
  <linked_service_identifier>ID_voting_application_1</
linked_service_identifier>
  </external_feature_add_request>
```

The SOCOACT Server may send a verification standard request 5533 to a service provider server 5506. For example, a linked service provider may provide a linked service (e.g., a voting application) and may specify a verification standard (e.g., confirm the user's location) associated with allowing the user to utilize an external feature (e.g., a third party wallet) via the user's account when interacting with the linked service (e.g., to use the third party wallet for voter authentication). In one implementation, the verification standard request may include data such as a request identifier, a service identifier, a request type, and/or the like. For example, the SOCOACT Server may provide the following example verification standard request, substantially in the form of a HTTP(S) POST message including XML-formatted data, as provided below:

```
POST /verification_standard_request.php HTTP/1.1
Host: www.server.com
Content-Type: Application/XML
Content-Length: 667
<?XML version = "1.0" encoding = "UTF-8"?>
<verification_standard_request>
  <request_identifier>ID_request_2</request_identifier>
```

-continued

```
  <service_identifier>ID_voting_application_1</service_identifier>
  <request_type>TYPE_GET_VERIFICATION_STANDARD
  </request_type>
</verification_standard_request>
```

The service provider server may send a verification standard response 5537 to the SOCOACT Server. For example, the verification standard response may specify the verification standard utilized by the service. In one implementation, the verification standard response may include data such as a request identifier, a service identifier, voting standard data, and/or the like. For example, the service provider server may provide the following example verification standard response, substantially in the form of a HTTP(S) POST message including XML-formatted data, as provided below:

```
POST /verification_standard_response.php HTTP/1.1
Host: www.server.com
Content-Type: Application/XML
Content-Length: 667
<?XML version = "1.0" encoding = "UTF-8"?>
<verification_standard_response>
  <request_identifier>ID_response_2</request_identifier>
  <service_identifier>ID_voting_application_1</service_identifier>
  <verification_standard_data>
    <item>use base SOCOACT verification</item>
    <item>use additional location verification</item>
  </verification_standard_data>
</verification_standard_response>
```

External feature add request data and/or verification standard response data may be used by a verification processing (VEP) component 5541 to facilitate verifying that the external feature (e.g., an electronic wallet) is associated with the user (e.g., belongs to the user) and/or adding the external feature to the user's account (e.g., facilitating the use of the external feature with a linked service). See FIG. 56 for additional details regarding the VEP component.

The SOCOACT Server may send a crypto verification request 5545 to the user. In one embodiment, the SOCOACT Server may request that the user verify that the user has control over the external feature and/or may specify how the user should provide verification. See FIG. 57 for an example of a GUI that may be used to provide the crypto verification request to the user.

The user may send a crypto verification response 5549 to the SOCOACT Server. In one embodiment, the user may submit a verification transaction to the block chain to provide the crypto verification response. For example, the user may execute a transaction (e.g., via a GUI associated with the third party wallet), which includes a verification string e.g., in a note field), to transfer a verification amount from a verification address to a SOCOACT destination address.

A verification confirmation may be provided to the user at 5553. The verification confirmation may be used to confirm that the external feature was added to the user's account. For example, the verification confirmation may be displayed using a SOCOACT website or application (e.g., a mobile app).

Figure 56:
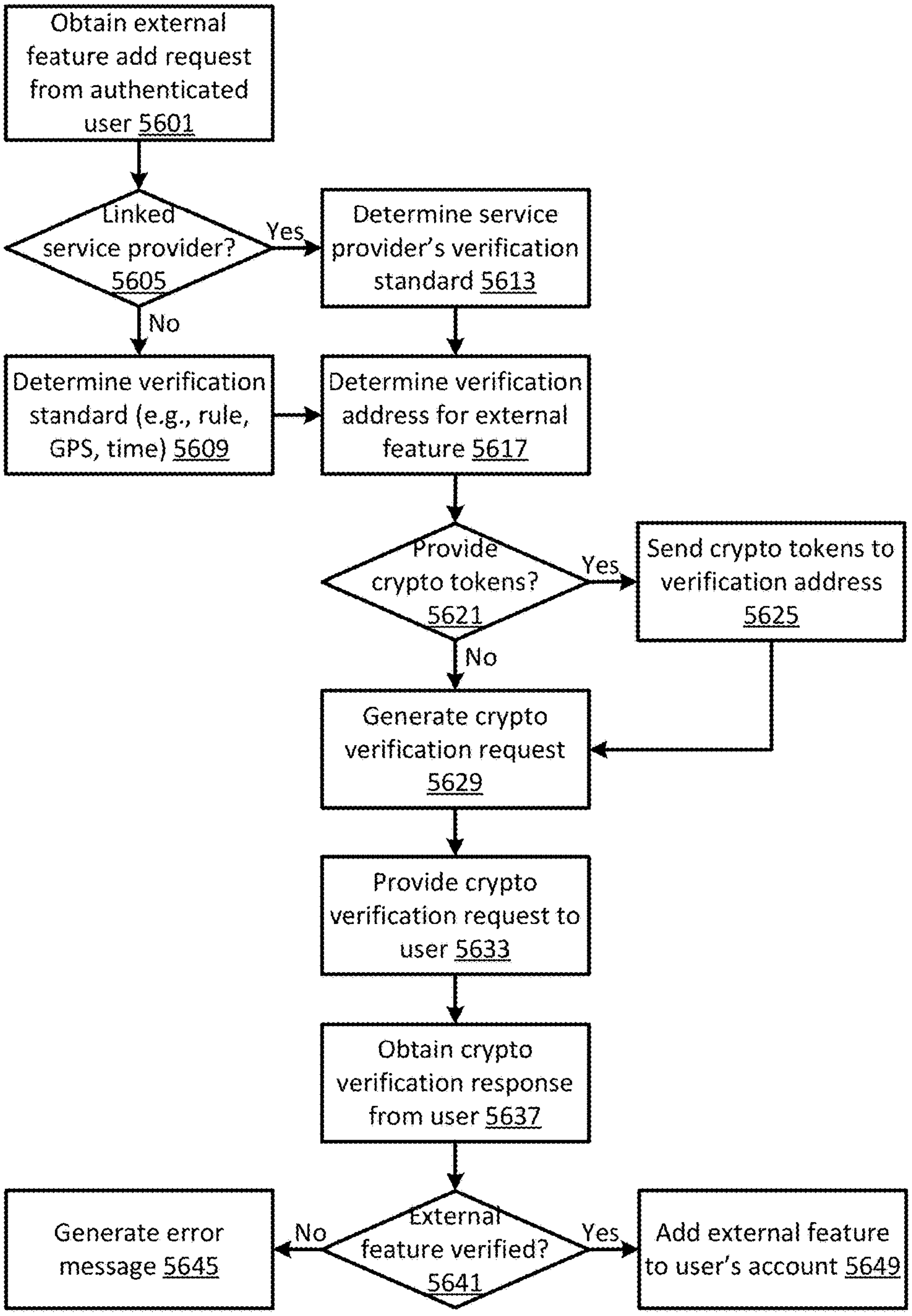
FIG. 56 shows a logic flow diagram illustrating embodiments of a verification processing (VEP) component for the SOCOACT.

FIG. 56 shows a logic flow diagram illustrating embodiments of a verification processing (VEP) component for the SOCOACT. In FIG. 56, an external feature add request may be obtained from an authenticated user at 5601. For example, the external feature add request may be obtained as a result of a user using a SOCOACT website or application to request that an external feature (e.g., a third party wallet) be added to the user's account. Accordingly, the VEP component may be utilized to verify that the user has control over the external feature (e.g., to prevent fraud).

A determination may be made at 5605 whether a linked service provider is associated with the external feature add request. In one implementation, the external feature add request may be parsed (e.g., using PHP commands) to make this determination. If it is determined that there is no linked service provider, verification standard associated with the user's account may be determined at 5609. In various embodiments, the verification standard may specify that the user should submit to the block chain a verification transaction that includes one or more of: a verification string, a verification amount, location data, a time stamp, metadata, UI triggerables, and/or the like. In some embodiments, the verification standard may specify that the verification transaction should satisfy a crypto smart rule (e.g., generated via the smart contract generator GUI). For example, the crypto smart rule (e.g., a smart contract) may specify that the verification transaction should include a verification string and the location from which the verification transaction was submitted, and that the location should be obtained from an oracle associated with the crypto smart rule (e.g., GPS data from the user's client). In one implementation, the verification standard associated with the user's account may be retrieved from an accounts database 7919*a*. For example, the verification standard associated with the user's account may be retrieved via a MySQL database command similar to the following:

```
SELECT accountVerificationStandard
FROM accounts
WHERE accountID = ID_account_1;
```

If it is determined that there is a linked service provider, the linked service provider's verification standard may be determined at 5613. In one embodiment, the linked service provider's verification standard may specify that a default SOCOACT verification standard should be used. In another embodiment, the linked service provider's verification standard may modify or replace the default SOCOACT verification standard as specified by the linked service provider. In one implementation, the linked service provider's verification standard may be obtained from a service provider server.

A verification address for the external feature may be determined at 5617. In one embodiment, the verification address is associated with the external feature (e.g., the verification address is one of the addresses associated with the third party wallet) and control over the verification address may signify control over the external feature (e.g., control over the verification address signifies control over the third party wallet). In one implementation, the external feature add request may be parsed (e.g., using PHP commands) to determine a user specified verification address. In another implementation, a verification address may be determined as a crypto address known to be associated with the external feature (e.g., based on a public key associated with the external feature).

A determination may be made at 5621 whether to provide crypto tokens for the verification transaction. For example, as part of the verification process, one or more crypto tokens (e.g., a verification data parameter) may be sent to the third party wallet and the user may be requested to send these crypto tokens back via the verification transaction. In one implementation, this determination may be made based on the determined verification standard. If it is determined that crypto tokens should be provided, the crypto tokens may be sent to the verification address at 5625. For example, crypto tokens worth $0.03 may be sent to the verification address. In another example, encrypted crypto token data (e.g., encrypted with a public key associated with the external feature) may be sent, and the user may be requested to decrypt the crypto token data (e.g., using the corresponding private key associated with the external feature) and send the decrypted crypto token data back via the verification transaction. In an alternative embodiment, the user may be requested to send one or more crypto tokens from the verification address via the verification transaction, and the crypto tokens may then be returned to the user.

A crypto verification request may be generated at 5629. In one embodiment, generating the crypto verification request may include determining verification request parameters (e.g., in accordance with the determined verification standard). In one implementation, a verification string (e.g., a captcha) for the verification request may be determined. For example, the verification string may be randomly generated. In another implementation, other verification data parameters (e.g., location, time stamp, metadata) may be determined. For example, allowed locations from which the user may submit the verification transaction (e.g., based on the user's residency) and the oracle that will provide location data may be determined. In another example, acceptable time stamp range for the verification transaction may be determined (e.g., the user is allowed to submit the verification transaction within 24 hours after the crypto verification request is generated). In yet another example, permitted metadata for the verification transaction may be determined (e.g., metadata should indicate that the verification transaction was submitted using a client device known to belong to the user, such as based on the unique identifiers of the user's client devices). In yet another implementation, a SOCOACT destination address for the verification transaction may be determined. For example, the user may be requested to transfer one or more crypto tokens (e.g., having monetary value, having specified data) from the verification address to the SOCOACT destination address via the verification transaction. In another embodiment, generating the crypto verification request may include instantiating a smart contract on the block chain. For example, the smart contract may be configured to be satisfied upon receipt of the verification transaction that is configured in accordance with instructions specified in the crypto verification request.

The crypto verification request may be provided to the user at 5633. In one embodiment, the crypto verification request may specify how the user should provide verification of control over the external feature in accordance with the determined verification request parameters. In various implementations, the crypto verification request may be displayed using a SOCOACT website or application (e.g., a mobile app), sent via email or SMS, and/or the like. See FIG. 57 for an example of a GUI that may be used to provide the crypto verification request to the user.

A crypto verification response may be obtained from the user at 5637. In one embodiment, user submission of the verification transaction to the block chain (e.g., in accordance with instructions specified in the crypto verification request) may be detected. In one implementation, transfer of crypto tokens to the SOCOACT destination address may be monitored, and the associated verification transaction may be analyzed.

A determination may be made at 5641 whether the verification transaction indicates that the user verified having control over the external feature. In one implementation, the verification transaction may be parsed to determine whether the specified verification request parameters have been satisfied. For example, the verification transaction may be parsed to determine whether the verification string is included in a note field. In another example, the verification transaction may be parsed to determine whether the verification transaction was submitted from an allowed location (e.g., as reported by an oracle). If control over the external feature has not been verified, an error message may be generated for the user at 5645. For example, the user may be informed that the user failed to verify control over the external feature and/or may be asked to resubmit the verification transaction to the block chain in accordance with instructions specified in the crypto verification request.

If control over the external feature has been verified, the external feature may be added to the user's account at 5649. For example, the external feature may be added via a MySQL database command similar to the following:

```
UPDATE accounts
SET accountExternalFeatures = "add the verified external feature to the
set of allowed external features"
WHERE accountID = ID_account_1;
```

In one implementation, the user may utilize the external feature via the user's account. For example, the user may log into the account and utilize a third party electronic wallet as the payment method for an action to buy shares for a conditional vote in a voting application.

FIG. 57 shows a screenshot diagram illustrating embodiments of the SOCOACT. Using the shown vote UI, a user may be shown crypto verification request instructions regarding how the user should provide verification of control over an external feature. As illustrated at 5701, the user's account is associated with a wallet application. As illustrated at 5705, the user requested that a third party wallet be added to the user's account. For example, the user may wish to use the account to consolidate the user's electronic wallets, so that the user may utilize either the associated wallet or any other third party wallet when paying for transactions using the account. As illustrated at 5710, the third party wallet is associated with a verification address. For example, transferring crypto tokens from the verification address may verify third party wallet ownership. As illustrated at 5715, a destination address where crypto tokens should be transferred may be specified. For example, the destination address may be a special SOCOACT address utilized to receive verification crypto tokens. As illustrated at 5720, a verification string may be specified. For example, the verification string (e.g., a captcha) should be included by the user in a specified field of a crypto verification response. As illustrated at 5725, a verification amount may be specified. For example, the verification amount may be sent to the user (e.g., once the user clicks on the OK button 5745) and the user may be requested to return the verification amount from the verification address. Additional verification data may also be requested from the user. As illustrated at 5730, the user's location may be requested to be included in the crypto verification response. For example, the user may be requested to send the crypto verification response from New York State. As illustrated at 5735, an oracle may be specified by the SOCOACT for reporting the location from which the crypto verification response is sent. For example, a smart contract associated with the crypto verification request may be instantiated (e.g., once the user clicks on the OK button 5745) with the specified oracle. As illustrated at 5740, the user may be given detailed instructions regarding how the user should provide verification of control over the third party wallet.

Figure 58:
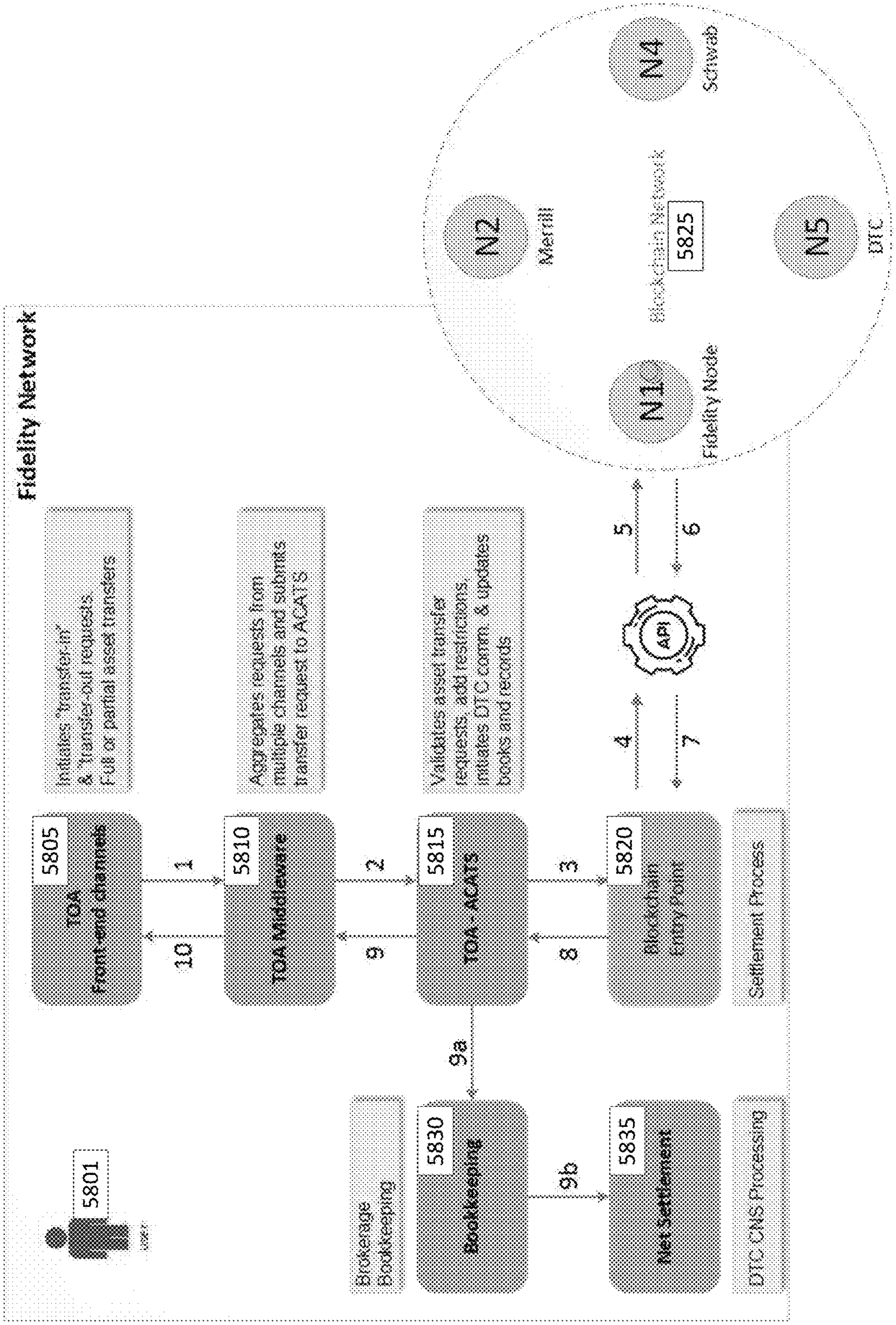
FIG. 58 shows an exemplary transfer of assets (TOA) integration model for the SOCOACT.

FIG. 58 shows an exemplary transfer of assets (TOA) integration model for the SOCOACT. In FIG. 58, a model of how SOCOACT crypto asset transfer may be integrated into a brokerage platform to facilitate broker to broker TOA is illustrated. In one embodiment, the brokerage platform may include components such as: TOA front-end channels 5805 that a user 5801 may utilize to initiate transfer-in and/or transfer-out requests (e.g., full asset transfers, partial asset transfers); TOA middleware 5810 that aggregates requests from multiple channels and submits transfer requests; and TOA-ACATS 5815 that validates TOA requests, adds restrictions, initiates communication with an agency (e.g., The Depository Trust Company (DTC)), and updates books and records. The blockchain entry point component 5820 integrates with the TOA-ACATS component, and may utilize API calls to facilitate utilization of blockchain network 5825 for settlement of transfer-in and/or transfer-out requests. In one implementation, the agency (e.g., DTC) may utilize the SOCOACT for crypto asset transfer. As such, the DTC may have a blockchain node N5 in the blockchain network. In another implementation, the agency (e.g., DTC) may not utilize the SOCOACT for crypto asset transfer. As such, the brokerage platform may include components such as: bookkeeping 5830 that facilitates brokerage bookkeeping; and net settlement 5835 that facilitates DTC Continuous Net Settlement (CNS) processing.

In one embodiment, when facilitating TOA, a delivering broker (e.g., Fidelity via Fidelity node N1), a receiving broker (e.g., Merrill via Merrill node N2), and the agency (e.g., DTC via DTC node N5) may have full visibility regarding the asset transfer. Other listener nodes (e.g., Schwab node N4) may have a copy of the transaction, but the transaction may be encrypted, such that the data is inaccessible to other brokers.

Figure 59:
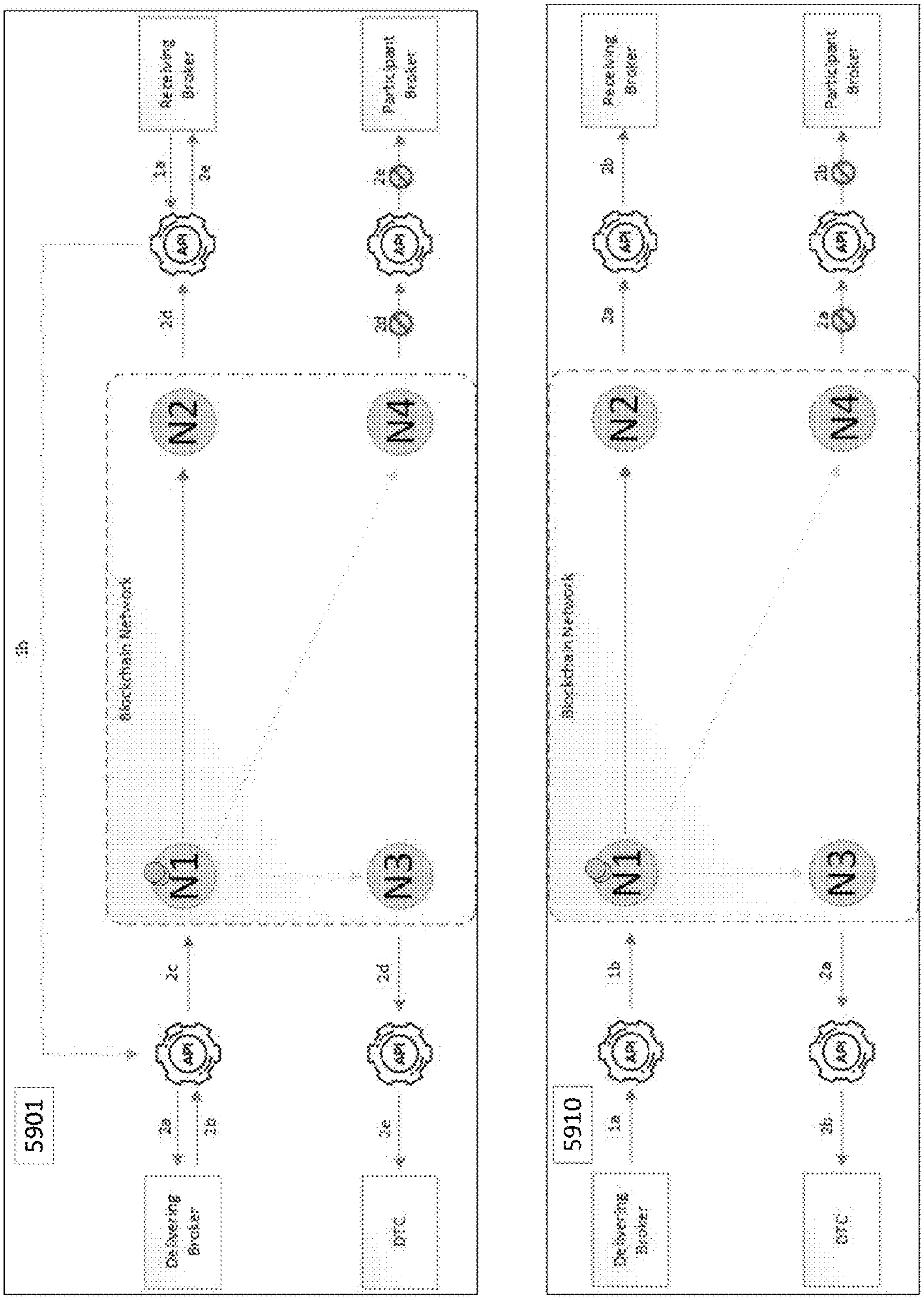
FIG. 59 shows an exemplary TOA model for the SOCOACT.

FIG. 59 shows an exemplary TOA model for the SOCOACT. Screen 5901 illustrates a model of receiving broker initiated TOA. At 1*a*, a receiving broker initiates an asset transfer, interacting with APIs connecting to a blockchain network. At 1*b*, an API call is made to a contra broker (e.g., a delivering broker) and a wallet address where the deposited assets are to be received is provided to the contra broker. At 2*a*, the API interacts with the contra broker's books and records to determine whether to accept or reject the transfer. At 2*b*, if approved, the contra broker deposits assets to the provided wallet address a of the receiving broker by making a call to the API. At 2*c*, once the transfer transaction is committed, the transaction is broadcast to the blockchain network for nodes of the blockchain network to accept the state change. At 2*d*, node N2, of the receiving broker, receives the asset deposit; node N3, of the DTC, receives the transaction and can read the asset settlement data; node N4, of another broker, receives the transaction but cannot read the asset settlement data. At 2*e*, the receiving broker and/or the DTC update their books and/or records in accordance with the transfer.

Screen 5910 illustrates a model of delivering broker initiated TOA. At 1*a*, a delivering broker initiates an asset transfer, interacting with APIs connecting to a blockchain network. At 1*b*, node N1, of the delivering broker, commits a transaction depositing assets into a receiving broker's wallet (e.g., to the omnibus wallet address associated with the receiving broker). At 2*a*, the transaction is broadcast to nodes of the blockchain network to accept the state change. Node N2, of the receiving broker, receives the asset deposit; node N3, of the DTC, receives the transaction and can read the asset settlement data; node N4, of another broker, receives the transaction but cannot read the asset settlement data. At 2*b*, the receiving broker and/or the DTC update their books and/or records in accordance with the transfer. If assets are not acceptable, the receiving broker may reject the transfer and deposit the assets back to the delivering address (e.g., to the omnibus wallet address associated with the delivering broker).

Figure 60:
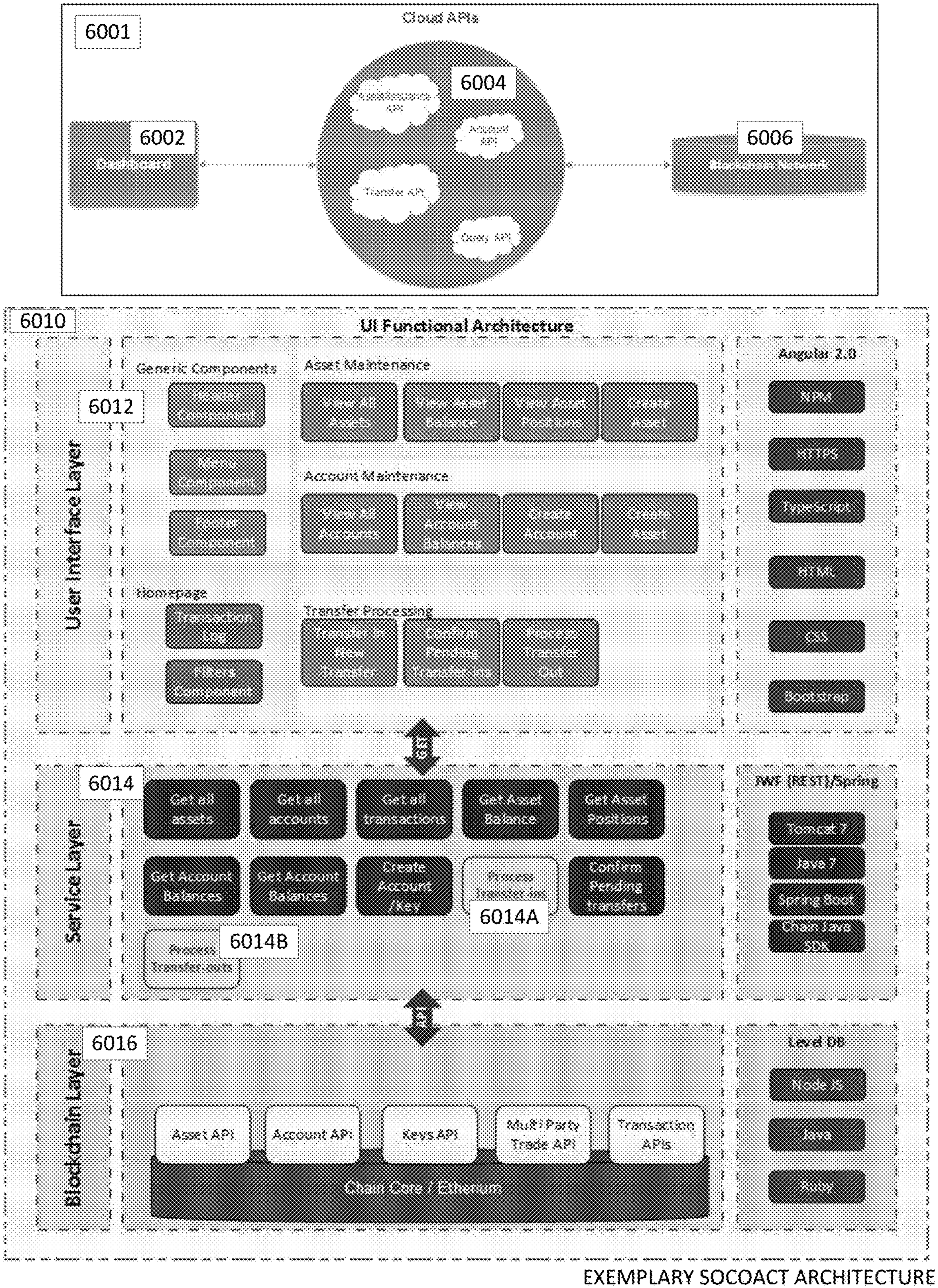
FIG. 60 shows an exemplary architecture for the SOCOACT.

FIG. 60 shows an exemplary architecture for the SOCOACT. Screen 6001 illustrates that a TOA architecture may include components such as: a dashboard 6002 that may be used by a user to initiate TOA; cloud APIs 6004 that may be utilized to facilitate TOA via a blockchain network; and a blockchain network 6006 that may be utilized to implement a permissioned ledger.

Screen 6010 illustrates that a TOA UI functional architecture may include components such as: a user interface layer 6012 that allows a user initiate TOA; a service layer 6014 (e.g., including a process transfer-ins component 6014A and a process transfer-outs component 6014B) that facilitates transforming UI requests into API calls (e.g., to facilitate transfer-ins and/or transfer-outs); and a blockchain layer 6016 that facilitates implementing a permissioned ledger (e.g., based on a blockchain platform such as Chain Core, Etherium, and/or the like).

Figure 61:
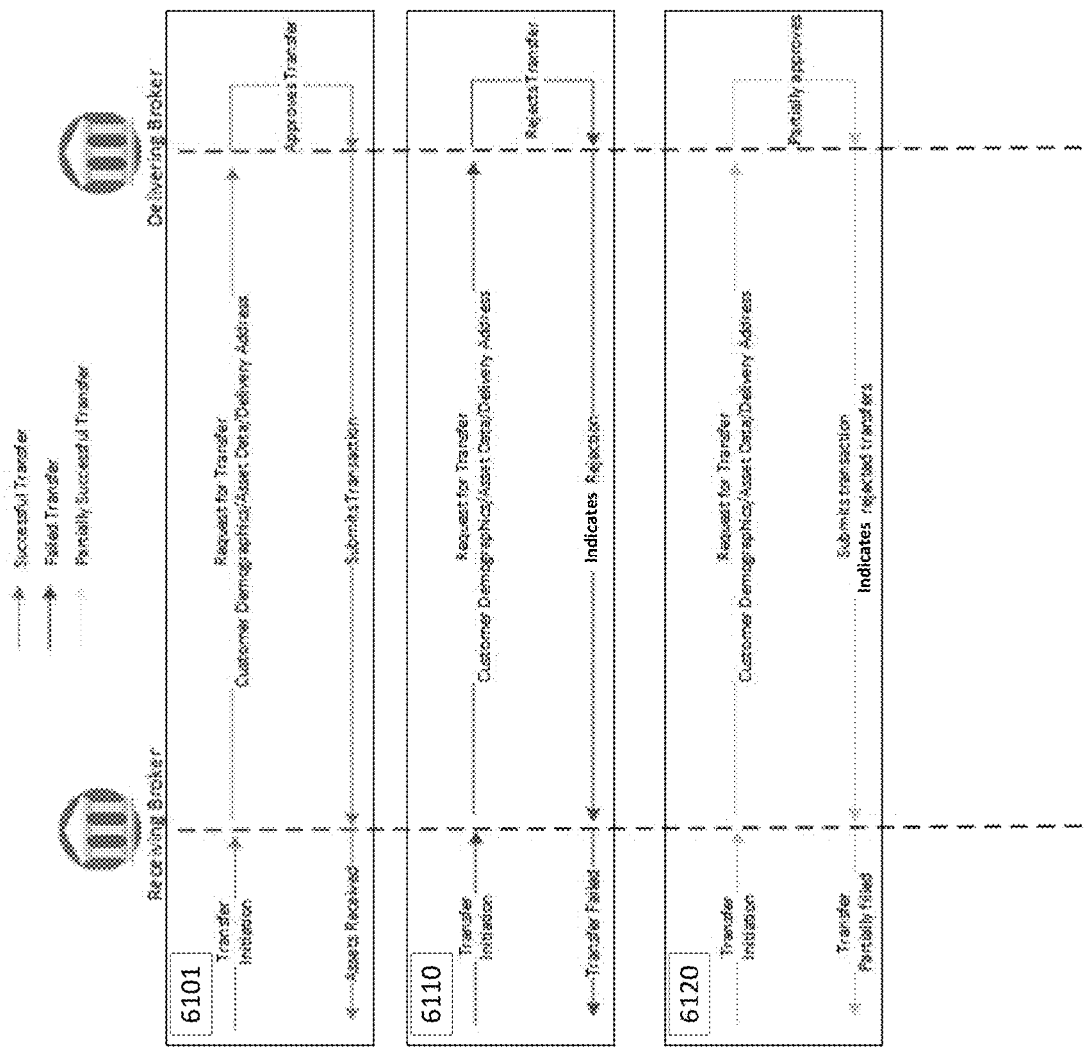
FIG. 61 shows an exemplary broker to broker API calls model for the SOCOACT.

FIG. 61 shows an exemplary broker to broker API calls model for the SOCOACT. Screen 6101 illustrates how an approved TOA may be processed. Transfer initiation may occur at the receiving broker. The receiving broker may send (e.g., via an API call) a request for transfer to the delivering broker. The request for transfer may include data such as customer demographics, asset data (e.g., description of assets to be transferred), delivery address, and/or the like. The delivering broker may utilize (e.g., verify) data provided in the request for transfer to approve (e.g., customer demographics match and assets may be transferred) the transfer. The delivering broker may submit (e.g., via a blockchain network) a transfer transaction, and the receiving broker may be notified that the assets were received.

Screen 6110 illustrates how a rejected TOA may be processed. Transfer initiation may occur at the receiving broker. The receiving broker may send (e.g., via an API call) a request for transfer to the delivering broker. The request for transfer may include data such as customer demographics, asset data (e.g., description of assets to be transferred), delivery address, and/or the like. The delivering broker may utilize (e.g., verify) data provided in the request for transfer to reject (e.g., customer demographics do not match) the transfer. The delivering broker may indicate that the transfer was rejected, and the receiving broker may be notified that the transfer failed.

Screen 6120 illustrates how a partially approved TOA may be processed. Transfer initiation may occur at the receiving broker. The receiving broker may send (e.g., via an API call) a request for transfer to the delivering broker. The request for transfer may include data such as customer demographics, asset data (e.g., description of assets to be transferred), delivery address, and/or the like. The delivering broker may utilize (e.g., verify) data provided in the request for transfer to partially approve (e.g., customer demographics match but some of the assets are nontransferable) the transfer. The delivering broker may submit (e.g., via a blockchain network) a transfer transaction that transfers transferable assets and may indicate nontransferable assets that were not transferred, and the receiving broker may be notified that the transfer was partially filled.

Figure 62:
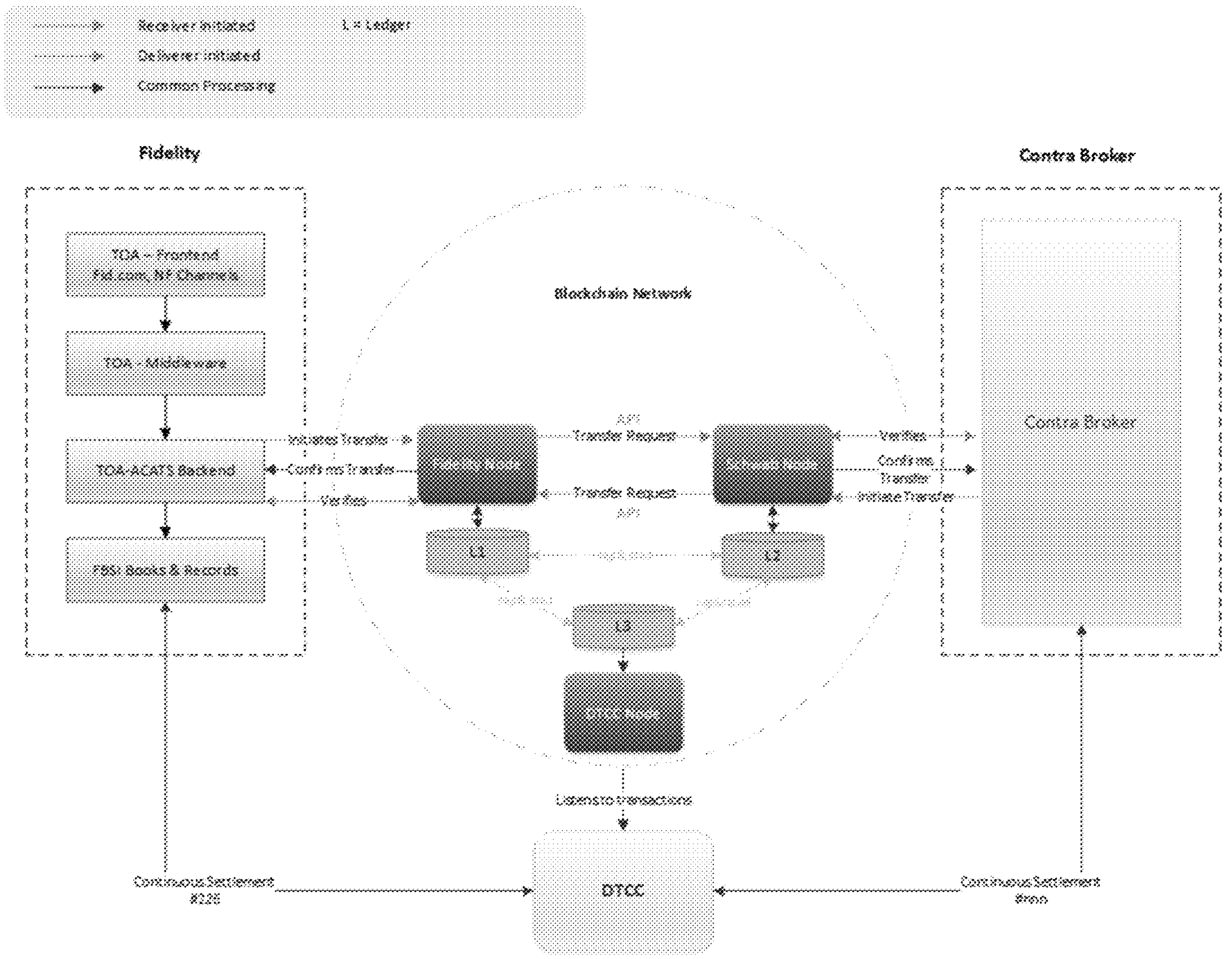
FIG. 62 shows an exemplary broker to broker API calls model for the SOCOACT.

FIG. 62 shows an exemplary broker to broker API calls model for the SOCOACT. As illustrated in FIG. 62, either a receiving broker (e.g., a contra broker) or a delivering broker (e.g., Fidelity) may initiate a TOA. A blockchain network node of the initiating broker may send a transfer request via an API call to a blockchain network node of the other broker that is a party to the TOA. The other broker may verify that the transfer should be approved and/or may submit a transfer transaction to the blockchain, and the blockchain network nodes may confirm the transfer to the brokers.

The permissioned ledger maintained by the blockchain network is replicated among the various blockchain network nodes. A blockchain network node of an agency (e.g., DTCC) associated with the blockchain network may facilitate agency interaction (e.g., wallet administration, asset definition administration, asset issuance administration, and/or the like) with the blockchain network.

Figure 63:
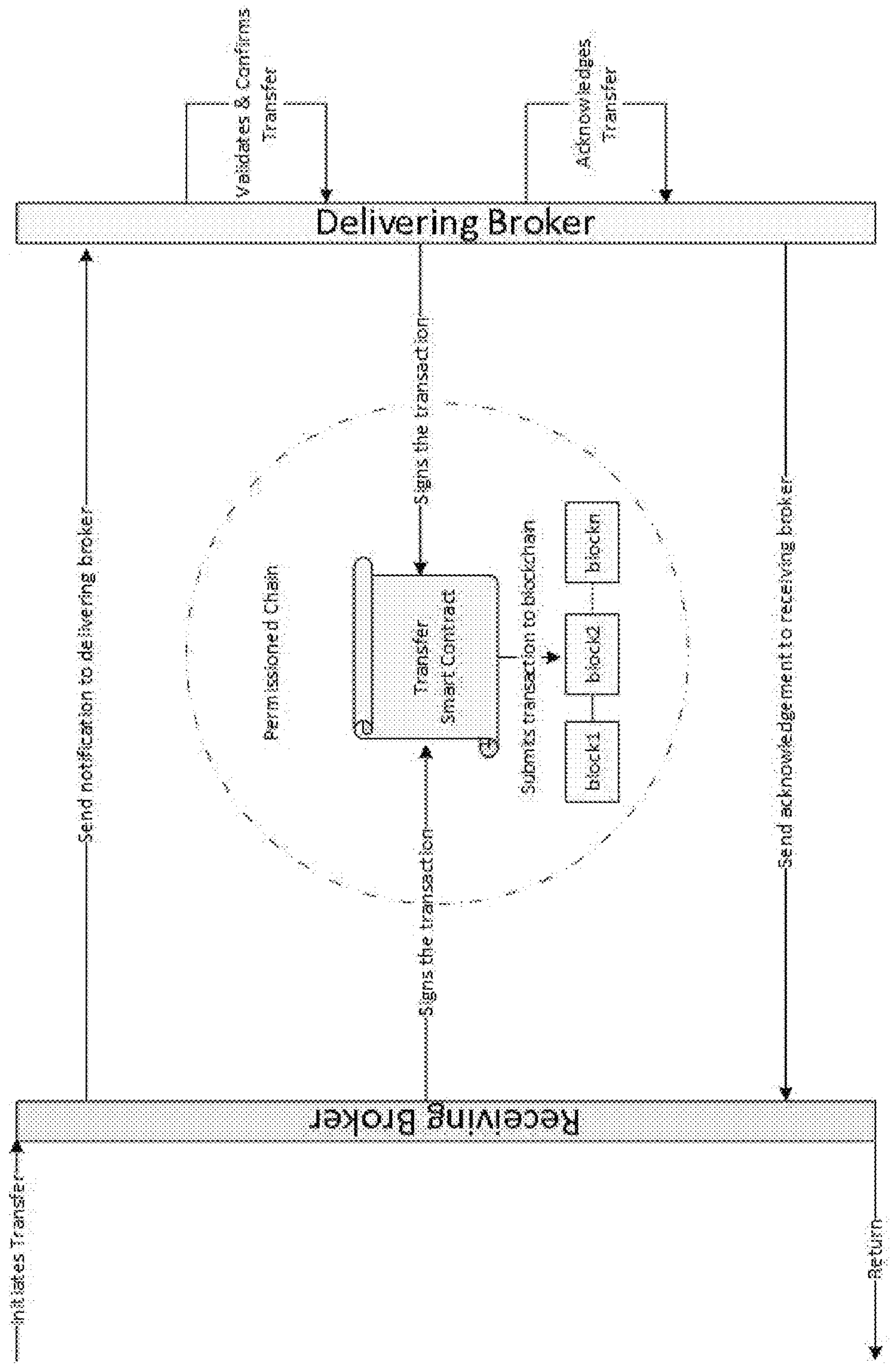
FIG. 63 shows an exemplary smart contracts model for the SOCOACT.

FIG. 63 shows an exemplary smart contracts model for the SOCOACT. As illustrated in FIG. 63, transfer initiation may occur at the receiving broker. The receiving broker may generate and sign a smart contract that facilitates asset transfer, and may send a TOA notification to the delivering broker. The TOA notification may include a contract address of the smart contract. The delivering broker may utilize (e.g., verify) data provided in the TOA notification and/or in the smart contract to approve the transfer, and may sign the smart contract to facilitate the transfer. The delivering broker may send a TOA acknowledgement to the receiving broker to indicate that the delivering broker signed the smart contract.

Figure 64:
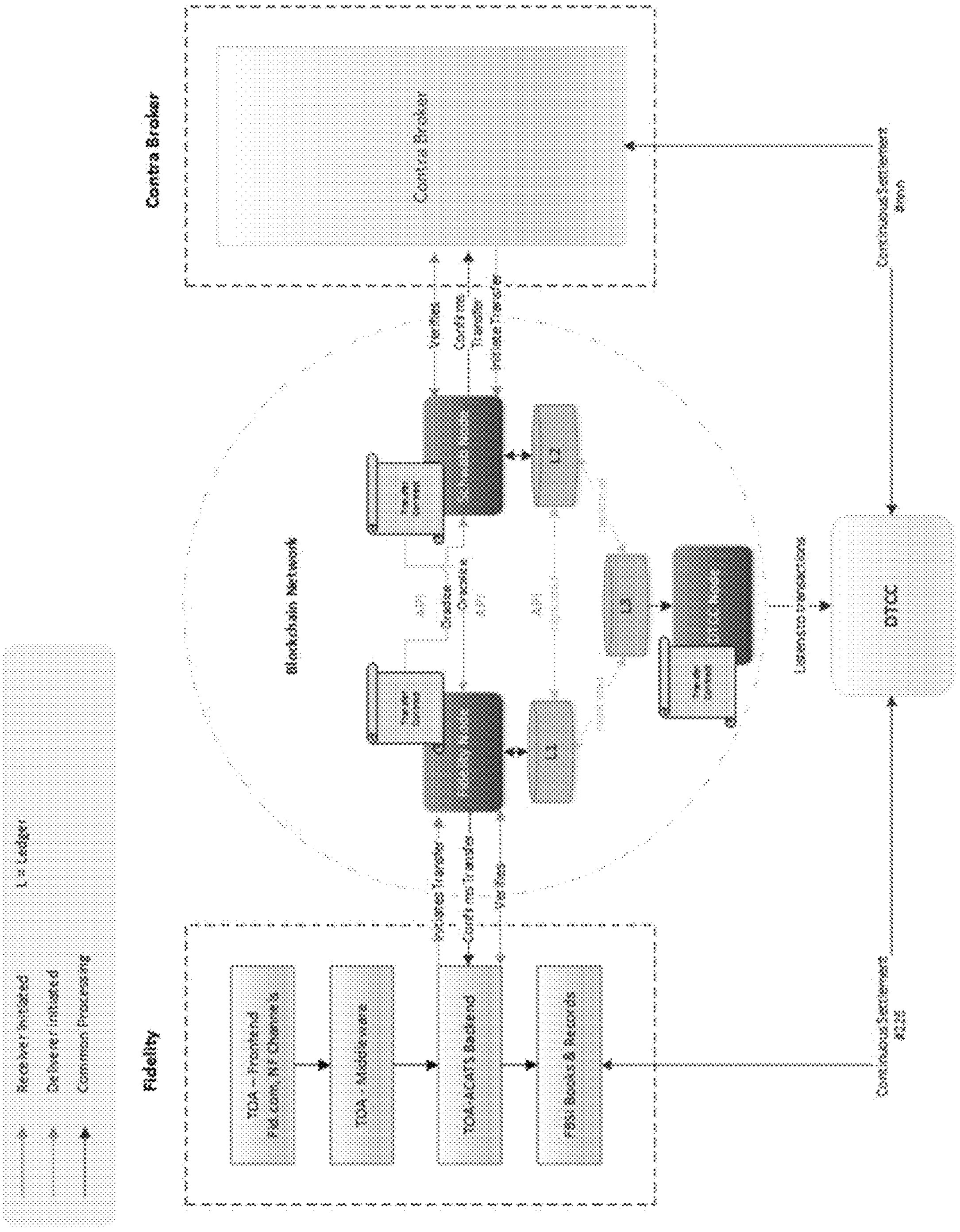
FIG. 64 shows an exemplary smart contracts model for the SOCOACT.

FIG. 64 shows an exemplary smart contracts model for the SOCOACT. As illustrated in FIG. 64, either a receiving broker (e.g., a contra broker) or a delivering broker (e.g., Fidelity) may initiate a TOA. A blockchain network node of the initiating broker may generate (e.g., on the blockchain) and sign a smart contract that facilitates asset transfer (e.g., via an API call). The smart contract may utilize a blockchain network node of the other broker that is a party to the TOA as an oracle that provides a signature (e.g., the signature may be the oracle data that unlocks the smart contract). The other broker may verify that the transfer should be approved and may sign the smart contract to facilitate the transfer (e.g., once both signatures are obtained the assets will move to the delivery address of the receiving broker), and the blockchain network nodes may confirm the transfer to the brokers.

The permissioned ledger maintained by the blockchain network is replicated among the various blockchain network nodes. A blockchain network node of an agency (e.g., DTCC) associated with the blockchain network may facilitate agency interaction (e.g., wallet administration, asset definition administration, asset issuance administration, and/or the like) with the blockchain network.

Figure 65:
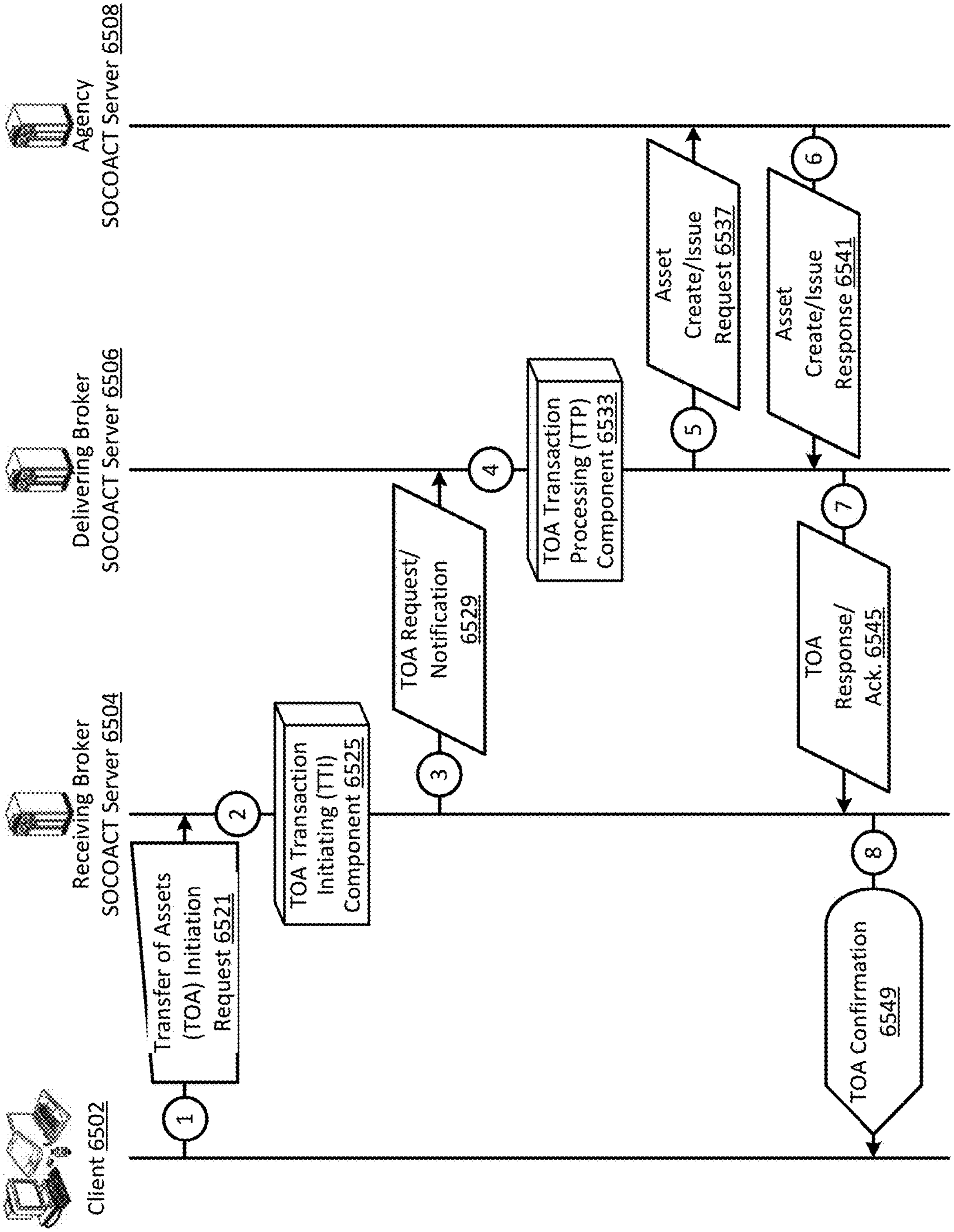
FIG. 65 shows a datagraph diagram illustrating embodiments of a data flow for the SOCOACT.

FIG. 65 shows a datagraph diagram illustrating embodiments of a data flow for the SOCOACT. In FIG. 65, a client 6502 (e.g., of a user associated with a receiving broker) may send a TOA initiation request 6521 to a receiving broker SOCOACT server 6504 to facilitate TOA of a customer's assets from a delivering broker to the receiving broker. For example, the client may be a desktop, a laptop, a tablet, a smartphone, and/or the like that is executing a client application. See FIG. 68 for an example of a GUI that may be utilized by the user to submit the TOA initiation request. In one implementation, the TOA initiation request may include data such as a request identifier, request type (e.g., full TOA, partial TOA), receiving broker information, delivering broker information, customer information, information regarding assets to be transferred, and/or the like. In one embodiment, the client may provide the following example TOA initiation request, substantially in the form of a HTTP(S) POST message including XML-formatted data, as provided below:

```
POST /TOA_initiation_request.php HTTP/1.1
Host: www.server.com
Content-Type: Application/XML
Content-Length: 667
<?XML version = "1.0" encoding = "UTF-8"?>
<TOA_initiation_request>
  <request_identifier>ID_request_1</request_identifier>
  <request_type>FULL_TOA</request_type>
  <receiving_broker_identifier>ID_broker_1</receiving_broker_identifier>
  <delivering_broker_identifier>ID_broker_2</delivering_broker_identifier>
  <customer_first_name>John</customer_first_name>
  <customer_last_name>Smith</customer_last_name>
  <customer_receiving_broker_account>ID_account_101</customer_receiving_broker_account>
  <customer_delivering_broker_account>ID_account_201</customer_delivering_broker_account>
  <requested_assets>
      <asset>
          <CUSIP>38259P508</CUSIP>
          <Symbol>GOOGL</Symbol>
          <Description>Google Corporation</Description>
          <Quantity>20 Shares</Quantity>
      </asset>
      <asset>
          <CUSIP>931142103</CUSIP>
          <Symbol>WMT</Symbol>
          <Description>Walmart Stores INC</Description>
          <Quantity>40 Shares</Quantity>
      </asset>
  </requested_assets>
</TOA_initiation_request>
```

A TOA transaction initiating (TTI) component 6525 may utilize data provided in the TOA initiation request to, when utilizing a broker to broker API calls implementation, facilitate generating and sending a TOA request to the delivering broker, or, when utilizing a smart contracts implementation, to facilitate generating a smart contract and sending a TOA notification to the delivering broker. See FIG. 66 for additional details regarding the TTI component.

In one embodiment, when utilizing a broker to broker API calls implementation, the receiving broker SOCOACT server may send a TOA request 6529 to a delivering broker SOCOACT server 6506 to facilitate the TOA. In one implementation, the TOA request may include data such as a request identifier, request type, receiving broker information, delivery address of the receiving broker, account identity verification data, customer information, information regarding assets to be transferred, and/or the like. In one embodiment, the receiving broker SOCOACT server may provide the following example TOA request, substantially in the form of a HTTP(S) POST message including XML-formatted data, as provided below:

```
POST /TOA_request.php HTTP/1.1
Host: www.server.com
Content-Type: Application/XML
Content-Length: 667
<?XML version = "1.0" encoding = "UTF-8"?>
<TOA_request>
  <request_identifier>ID_request_2</request_identifier>
  <request_type>FULL_TOA</request_type>
  <receiving_broker_identifier>ID_broker_1</receiving_broker_identifier>
  <delivery_address>1HnhWpkMHMjgt167kvgcPyurMmsCQ2WPgg</delivery_address>
  <account_identity_verification_data>aBcdEfgHijK</account_identity_verification_data>
  <customer_first_name>John</customer_first_name>
  <customer_last_name>Smith</customer_last_name>
  <customer_delivering_broker_account>ID_account_201</customer_delivering_broker_account>
  <requested_assets>
      <asset>
          <CUSIP>38259P508</CUSIP>
          <Symbol>GOOGL</Symbol>
          <Description>Google Corporation</Description>
          <Quantity>20 Shares</Quantity>
      </asset>
      <asset>
          <CUSIP>931142103</CUSIP>
          <Symbol>WMT</Symbol>
          <Description>Walmart Stores INC</Description>
          <Quantity>40 Shares</Quantity>
      </asset>
  </requested_assets>
</TOA_request>
```

In another embodiment, when utilizing a smart contracts implementation, the receiving broker SOCOACT server may send a TOA notification 6529 to the delivering broker SOCOACT server 6506 to facilitate the TOA. In one implementation, the TOA notification may include data such as a request identifier, request type, receiving broker information, smart contract address, account identity verification data, customer information, information regarding assets to be transferred, and/or the like. In one embodiment, the receiving broker SOCOACT server may provide the following example TOA notification, substantially in the form of a HTTP(S) POST message including XML-formatted data, as provided below:

```
POST /TOA_notification.php HTTP/1.1
Host: www.server.com
Content-Type: Application/XML
Content-Length: 667
<?XML version = "1.0" encoding = "UTF-8"?>
<TOA_notification>
  <request_identifier>ID_request_2</request_identifier>
  <request_type>FULL_TOA</request_type>
  <receiving_broker_identifier>ID_broker_1</receiving_broker_identifier>
  <contract_address>3HnhWpkMHMjgt167kvgcPyurMmsCQ2WPgg</contract_address>
  <account_identity_verification_data>aBcdEfgHijK</account_identity_verification_data>
  <customer_first_name>John</customer_first_name>
  <customer_last_name>Smith</customer_last_name>
  <customer_delivering_broker_account>ID_account_201</customer_delivering_broker_account>
  <requested_assets>
      <asset>
          <CUSIP>38259P508</CUSIP>
          <Symbol>GOOGL</Symbol>
          <Description>Google Corporation</Description>
          <Quantity>20 Shares</Quantity>
      </asset>
      <asset>
          <CUSIP>931142103</CUSIP>
          <Symbol>WMT</Symbol>
          <Description>Walmart Stores INC</Description>
          <Quantity>40 Shares</Quantity>
      </asset>
  </requested_assets>
</TOA_notification>
```

A TOA transaction processing (TTP) component 6533 may utilize data provided in the TOA request/notification to, when utilizing a broker to broker API calls implementation, facilitate submitting a TOA blockchain transaction to a blockchain, or, when utilizing a smart contracts implementation, to facilitate smart contract signing. See FIG. 67 for additional details regarding the TIP component.

The delivering broker SOCOACT server may send an asset create/issue request 6537 to an agency SOCOACT server 6508 to facilitate asset creation/issuance of assets to be transferred to the receiving broker. In one embodiment, when an asset definition for an asset does not exist on the blockchain, as asset create request may be sent. In one implementation, the asset create request may include data such as a request identifier, requesting broker information, information regarding assets to be created, and/or the like. In one embodiment, the delivering broker SOCOACT server may provide the following example asset create request, substantially in the form of a HTTP(S) POST message including XML-formatted data, as provided below:

```
POST /asset_create_request.php HTTP/1.1
Host: www.server.com
Content-Type: Application/XML
Content-Length: 667
<?XML version = "1.0" encoding = "UTF-8"?>
<asset_create_request>
  <request_identifier>ID_request_3</request_identifier>
  <requesting_broker_identifier>ID_broker_2</requesting_broker_identifier>
  <requested_assets>
      <asset>
          <CUSIP>38259P508</CUSIP>
          <Symbol>GOOGL</Symbol>
          <Description>Google Corporation</Description>
      </asset>
```

-continued

```
  </requested__assets>
</asset__create__request>
POST /asset__issue__request.php HTTP/1.1
Host: www.server.com
Content-Type: Application/XML
Content-Length: 667
<?XML version = "1.0" encoding = "UTF-8"?>
<asset__issue__request>
  <request__identifier>ID__request__4</request__identifier>
  <requesting__broker__identifier>ID__broker__2</requesting__broker__identifier>
  <delivery__address>1HnhWpkMHMjgt167kvgcPyurMmsCQ2WPhh</delivery__address>
  <requested__assets>
      <asset>
          <CUSIP>38259P508</CUSIP>
          <Symbol>GOOGL</Symbol>
          <Description>Google Corporation</Description>
          <Quantity>20 Shares</Quantity>
      </asset>
      <asset>
          <CUSIP>931142103</CUSIP>
          <Symbol>WMT</Symbol>
          <Description>Walmart Stores INC</Description>
          <Quantity>40 Shares</Quantity>
      </asset>
  </requested__assets>
</asset__issue__request>
```

In another embodiment, when asset units for an asset should be issued on the blockchain, as asset issue request may be sent. In one implementation, the asset issue request may include data such as a request identifier, requesting broker information, delivery address of the requesting broker, information regarding assets to be issued, and/or the like. In one embodiment, the delivering broker SOCOACT server may provide the following example asset issue request, substantially in the form of a HTTP(S) POST message including XML-formatted data, as provided below:

The agency SOCOACT server may send an asset create/issue response 6541 to the delivering broker SOCOACT server to confirm that the asset create/issue request was processed successfully.

In one embodiment, when utilizing a broker to broker API calls implementation, the delivering broker SOCOACT server may send a TOA response 6545 to the receiving broker SOCOACT server to confirm that the assets were transferred and/or to provide the transaction identifier of the TOA blockchain transaction submitted to the blockchain. In one implementation, the TOA response may include data such as a response identifier, a status, a transaction identifier, and/or the like. In one embodiment, the delivering broker SOCOACT server may provide the following example TOA response, substantially in the form of a HTTP(S) POST message including XML-formatted data, as provided below:

```
POST /TOA__response.php HTTP/1.1
Host: www.server.com
Content-Type: Application/XML
Content-Length: 667
<?XML version = "1.0" encoding = "UTF-8"?>
<TOA__response>
  <response__identifier>ID__response__2</response__identifier>
  <status>OK</status>
  <transaction__identifier>transaction identifier of the TOA blockchain
transaction</transaction__identifier>
</TOA__response>
```

In another embodiment, when utilizing a smart contracts implementation, the delivering broker SOCOACT server may send a TOA acknowledgment 6545 to the receiving broker SOCOACT server to confirm that the smart contract was countersigned. In one implementation, the TOA acknowledgment may include data such as a response identifier, a status, and/or the like. In one embodiment, the delivering broker SOCOACT server may provide the following example TOA acknowledgment, substantially in the form of a HTTP(S) POST message including XML-formatted data, as provided below:

```
POST /TOA__acknowledgment.php HTTP/1.1
Host: www.server.com
Content-Type: Application/XML
Content-Length: 667
<?XML version = "1.0" encoding = "UTF-8"?>
<TOA__acknowledgment>
  <response__identifier>ID__response__2</response__identifier>
  <status>OK</status>
</TOA__acknowledgment>
```

The receiving broker SOCOACT server may send a TOA confirmation 6549 to the client to inform the user that the assets were transferred. For example, the TOA confirmation may be displayed using a SOCOACT website or application (e.g., a mobile app). See FIG. 69 for an example of information that may be provided to the user.

Figure 66:
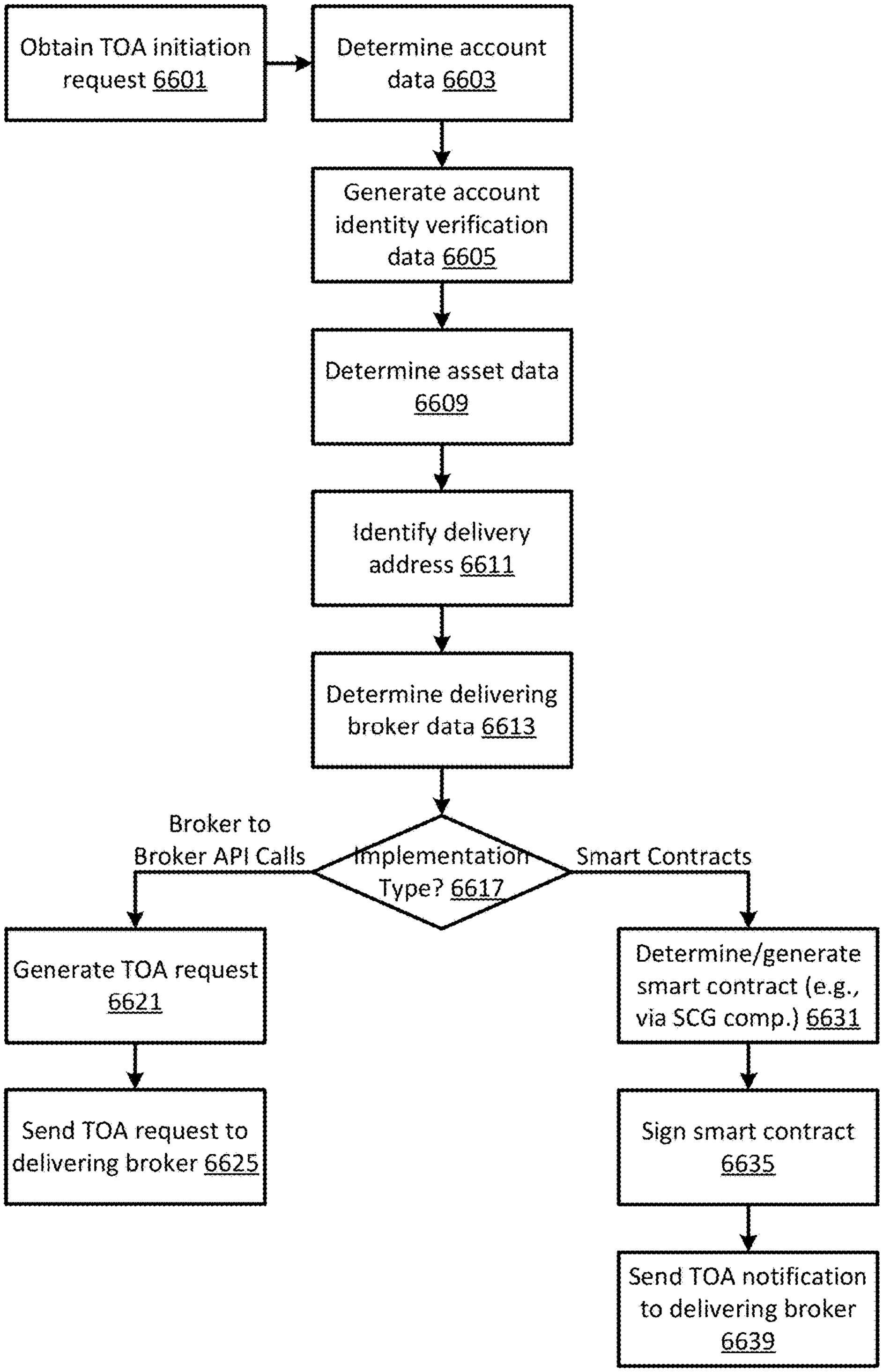
FIG. 66 shows a logic flow diagram illustrating embodiments of a TOA transaction initiating (TTI) component for the SOCOACT.

FIG. 66 shows a logic flow diagram illustrating embodiments of a TOA transaction initiating (TTI) component for the SOCOACT. In FIG. 66, a TOA initiation request may be obtained at 6601. For example, the TOA initiation request may be obtained as a result of a user (e.g., associated with a receiving broker) initiating TOA to facilitate transfer of a customer's assets from a delivering broker. See FIG. 68 for an example of a GUI that may be utilized by the user.

Account data associated with the customer may be determined at 6603. For example, account data associated with the customer may include demographics and/or other data (e.g., primary account holder's first name, primary account holder's last name, primary account holder's social security number, secondary account holder's first name, secondary account holder's last name, secondary account holder's social security number). In one implementation, the TOA initiation request may be parsed (e.g., using PHP commands) to determine the customer's account identifier (e.g., account number) at the receiving broker (e.g., based on the value of the customer_receiving_broker_account field). The determined account identifier may be used to retrieve desired account data from a database. For example, desired account data may be determined via a MySQL database command similar to the following:

```
SELECT primaryFirstName, primaryLastName, primarySSN,
  secondaryFirstName, secondaryLastName, secondarySSN
FROM users
WHERE accountID = ID_account_101;
```

Account identity verification data may be generated at 6605. In one embodiment, account identity verification data may be utilized to ensure that the identity of the customer's account at the receiving broker matches the identity of the customer's account at the delivering broker. In one implementation, account identity verification data may be generated by utilizing a hash function to generate a hash of the determined account data. See FIGS. 70-71 for additional details regarding proving identity of accounts.

Asset data associated with the TOA initiation request may be determined at 6609. In one embodiment, the asset data may include information regarding assets to be transferred to the receiving broker. In one implementation, the TOA initiation request may be parsed (e.g., using PHP commands) to determine the asset data specified by the user (e.g., based on the value of the requested_assets field).

A delivery address for the assets to be transferred may be identified at 6611. In one implementation, an omnibus wallet address associated with the receiving broker may be determined (e.g., via an API call). In another implementation, a delivery address may be generated (e.g., via an API call in accordance with Bitcoin Improvement Proposal 32 (BIP32)) for the transfer transaction.

Delivering broker data associated with the TOA initiation request may be determined at 6613. In one implementation, the TOA initiation request may be parsed (e.g., using PHP commands) to determine the delivering broker identifier (e.g., based on the value of the delivering_broker_identifier field). For example, the delivering broker identifier may be utilized when making an API call or utilizing a smart contract to identify the delivering broker counterparty to the transfer transaction. In another implementation, the TOA initiation request may be parsed (e.g., using PHP commands) to determine the customer's account identifier (e.g., account number) at the delivering broker (e.g., based on the value of the customer_delivering_broker_account field). For example, the customer's account identifier at the delivering broker may be utilized when making an API call or utilizing a smart contract to identify the account at the delivering broker from which the requested r assets should be transferred.

As shown at 6617, in one embodiment, if the TOA process is implemented using broker to broker API calls, a TOA request associated with the TOA initiation request may be generated at 6621. In one embodiment, the TOA request may instruct the delivering broker to transfer the customer's assets to the receiving broker in accordance with the specified TOA parameters. The TOA request may be sent (e.g., via an API call) to the delivering broker at 6625.

In another embodiment, if the TOA process is implemented using smart contracts, a smart contract associated with the TOA initiation request may be determined or generated at 6631. In one embodiment, the smart contract may facilitate transfer of the customer's assets from the delivering broker to the receiving broker upon receiving signatures from both brokers. In one implementation, a smart contract address of a previously generated (e.g., by the delivering broker) smart contract may be determined. In another implementation, the smart contract may be generated via a SCG component (e.g., using the signature of the delivering broker as oracle data that unlocks the smart contract). The receiving broker may sign (e.g., via an API call) the smart contract at 6635. A TOA notification may be generated and sent (e.g., via an API call) to the delivering broker at 6639. In one embodiment, the TOA notification may instruct the delivering broker to transfer the customer's assets to the receiving broker in accordance with the specified TOA parameters via the smart contract.

Figure 67:
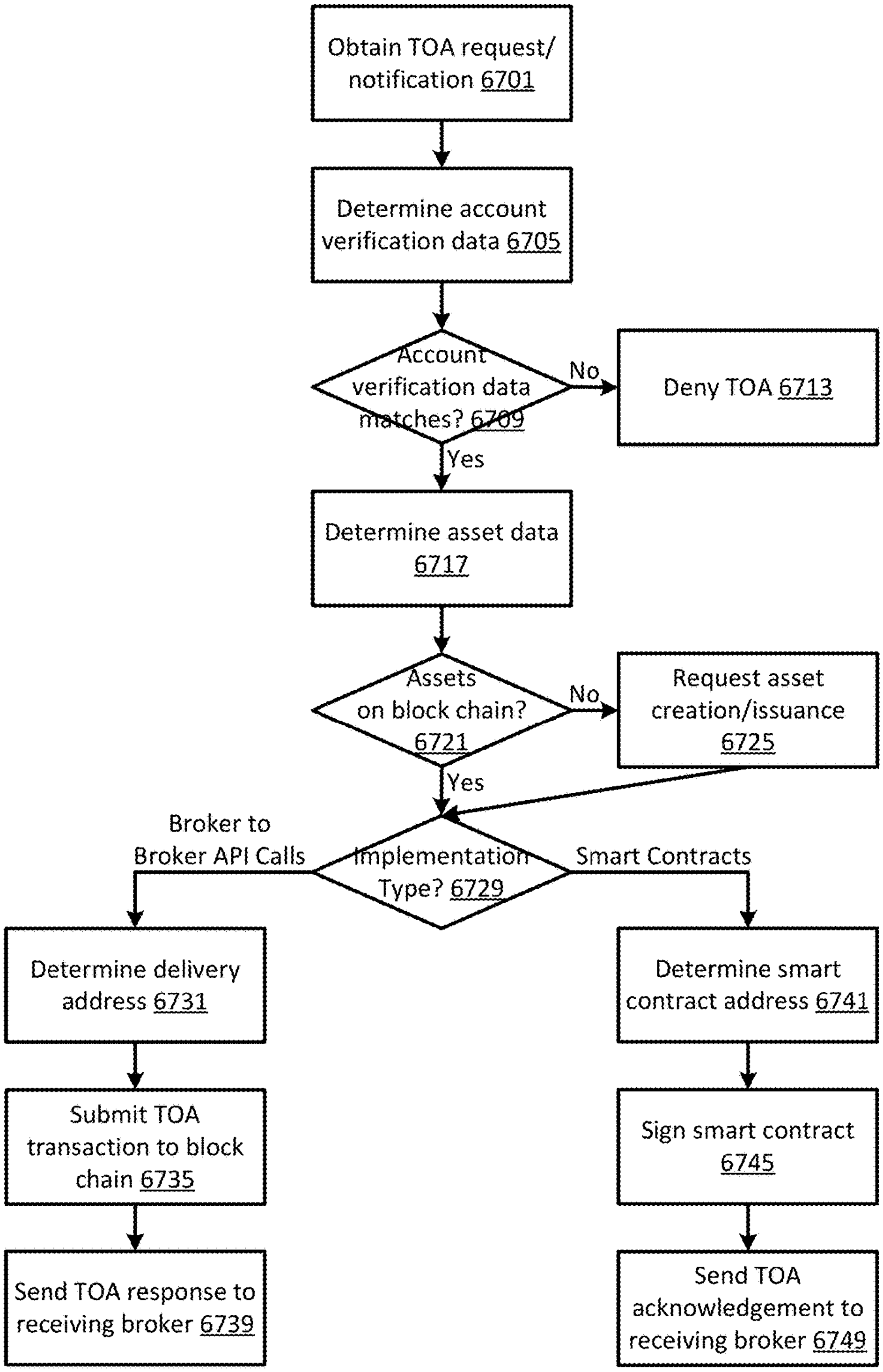
FIG. 67 shows a logic flow diagram illustrating embodiments of a TOA transaction processing (TTP) component for the SOCOACT.

FIG. 67 shows a logic flow diagram illustrating embodiments of a TOA transaction processing (TIP) component for the SOCOACT. In FIG. 67, a TOA request (e.g., if the TOA process is implemented using broker to broker API calls) or a TOA notification (e.g., if the TOA process is implemented using smart contracts) may be obtained at 6701. For example the TOA request/notification may be obtained as a result of a receiving broker requesting transfer of a customer's assets from a delivering broker.

Account verification data associated with the TOA request/notification may be determined at 6705. In one implementation, the TOA request/notification may be parsed (e.g., using PHP commands) to determine account data associated with the customer provided by the receiving broker. For example, the customer's first name, the customer's last name, and the customer's account identifier (e.g., account number) at the delivering broker may be determined (e.g., based on the values of customer_first_name, customer_last_name, and customer_delivering_broker_account fields, respectively). In another implementation, the TOA request/notification may be parsed (e.g., using PHP commands) to determine account identity verification data provided by the receiving broker (e.g., based on the value of the account_identity_verification_data field). As per description above, utilizing account identity verification data that is based on a hash function is unconventional because, as sensitive customer information (e.g., social security number) does not have to be sent in the TOA request/notification and may not be determined from a hash, data transfer is secured. As such, in some alternative implementations, account identity verification data may be placed into a smart contract (e.g., for increased efficiency and/or speed of processing the transaction) without compromising security of sensitive customer information.

A determination may be made at 6709 whether account verification data matches. In one implementation, account data associated with the customer stored by the delivering broker may be retrieved (e.g., via one or more SQL statements) and compared with account data associated with the customer provided by the receiving broker to determine whether the data matches. In another implementation, a hash of account data associated with the customer stored by the delivering broker may be generated and compared with account identity verification data (e.g., a hash) provided by the receiving broker to determine whether the data matches. See FIGS. 70-71 for additional details regarding proving identity of accounts. If the account verification data does not match, the transfer transaction may be denied at 6713. For example, the receiving broker may be notified that the TOA failed.

If the account verification data matches, asset data associated with the TOA request/notification may be determined at 6717. In one embodiment, the asset data may include information regarding assets to be transferred to the receiving broker. In one implementation, the TOA request/notification may be parsed (e.g., using PHP commands) to determine the asset data provided by the receiving broker (e.g., based on the value of the requested_assets field).

A determination may be made at 6721 whether the assets to be transferred are on the blockchain (e.g., in the delivering broker's wallet). If the assets to be transferred are not on the blockchain, blockchain asset creation and/or asset issuance for the assets to be transferred may be requested from an administrative node (e.g., a blockchain network node of an agency (e.g., DTC)) of the blockchain network at 6725. In one implementation, the customer's account (e.g., the assets to be transferred) may be set up on the blockchain. See FIGS. 72-76 for additional details regarding asset creation, asset issuance, and wallet administration.

As shown at 6729, in one embodiment, if the TOA process is implemented using broker to broker API calls, a delivery address for the assets to be transferred may be determined at 6731. In one implementation, the TOA request may be parsed (e.g., using PHP commands) to determine the delivery address provided by the receiving broker (e.g., based on the value of the delivery_address field). A TOA blockchain transaction may be submitted to the blockchain at 6735. In one embodiment, the TOA blockchain transaction may transfer the customer's assets from the delivering broker's wallet to the receiving broker's wallet. See FIG. 77 for an example of a TOA blockchain transaction. A TOA response may be sent (e.g., via an API call) to the receiving broker at 6739. In one embodiment, the TOA response may be used to confirm that the customer's assets were transferred and/or to provide the transaction identifier of the TOA blockchain transaction submitted to the blockchain.

In another embodiment, if the TOA process is implemented using smart contracts, a smart contract address of a smart contract associated with the TOA notification may be determined at 6741. In one implementation, the TOA notification may be parsed (e.g., using PHP commands) to determine the smart contract address provided by the receiving broker (e.g., based on the value of the contract_address field). The smart contract may be signed (e.g., via an API call) by the delivering broker at 6745. In one embodiment, countersigning the smart contract may trigger the transfer of the customer's assets from the delivering broker's wallet to the receiving broker's wallet. In one implementation, data specified in the TOA notification (e.g., requested assets) may be compared to data specified in the smart contract to verify that the data matches. See FIG. 78 for an example of a smart contract implementation. A TOA acknowledgement may be sent (e.g., via an API call) to the receiving broker at 6749. In one embodiment, the TOA acknowledgement may be used to confirm that the smart contract was countersigned and/or that the customer's assets were transferred.

Figure 68:
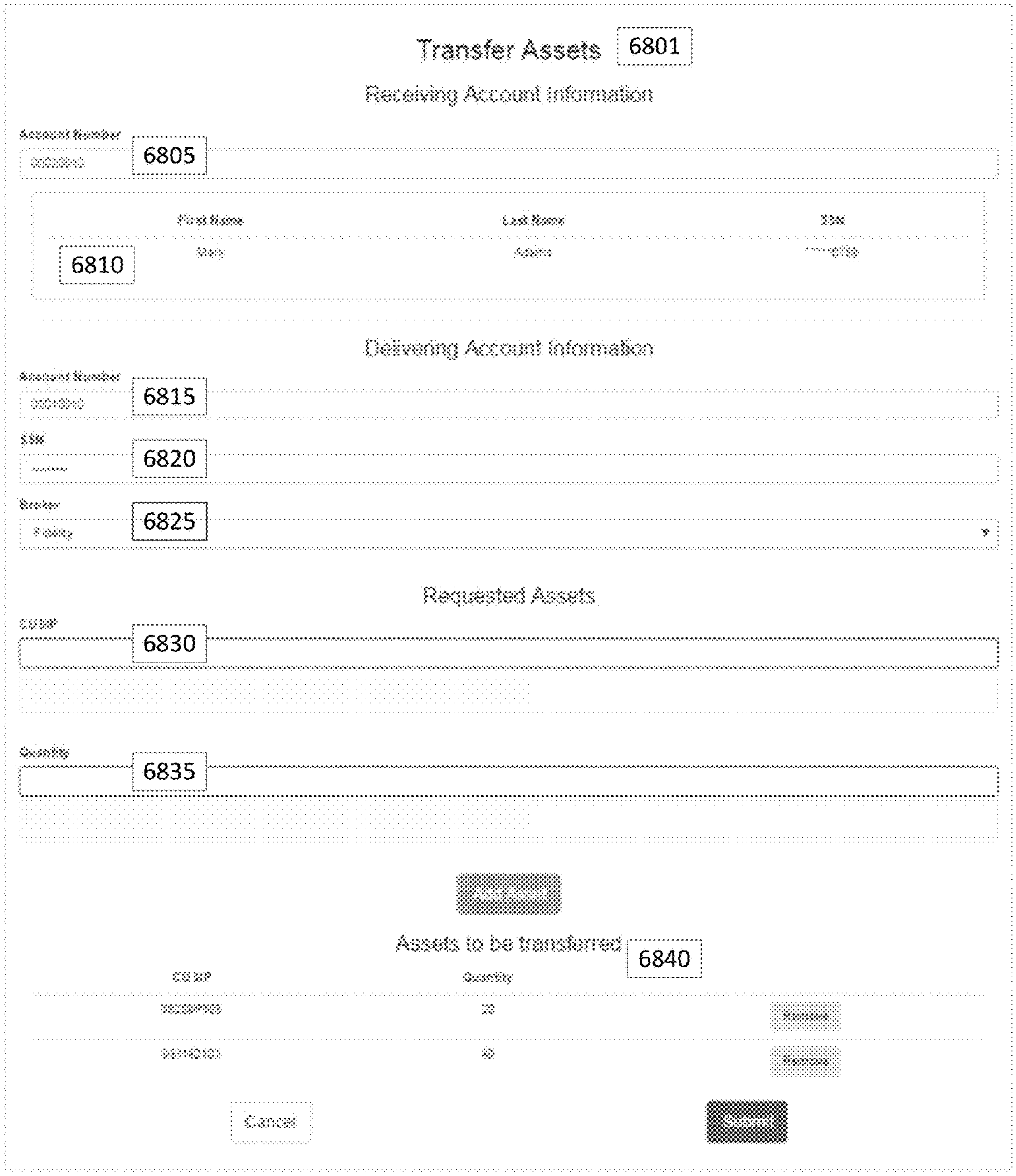
FIG. 68 shows a screenshot diagram illustrating embodiments of the SOCOACT.

FIG. 68 shows a screenshot diagram illustrating embodiments of the SOCOACT. In FIG. 68, a GUI 6801 that may be utilized by a user to submit a TOA r initiation request to facilitate transfer of a customer's assets is illustrated. The user may utilize an account number widget 6805 to specify the customer's account number at a receiving broker. Widget 6810 shows additional account data associated with the customer that may be retrieved based on the customer's account number (e.g., first name, last name, social security number).

The user may utilize account number widget 6815 to specify the customer's account number at a delivering broker. The user may utilize SSN widget 6820 to specify the customer's social security number. The user may utilize broker widget 6825 to specify the delivering broker.

The user may utilize CUSIP widget 6830 and Quantity widget 6835 to specify an identifier and a quantity, respectively, of each asset to be transferred from the delivering broker to the receiving broker. Assets to be transferred section 6840 shows assets to be transferred that have been specified by the user.

Figure 69:
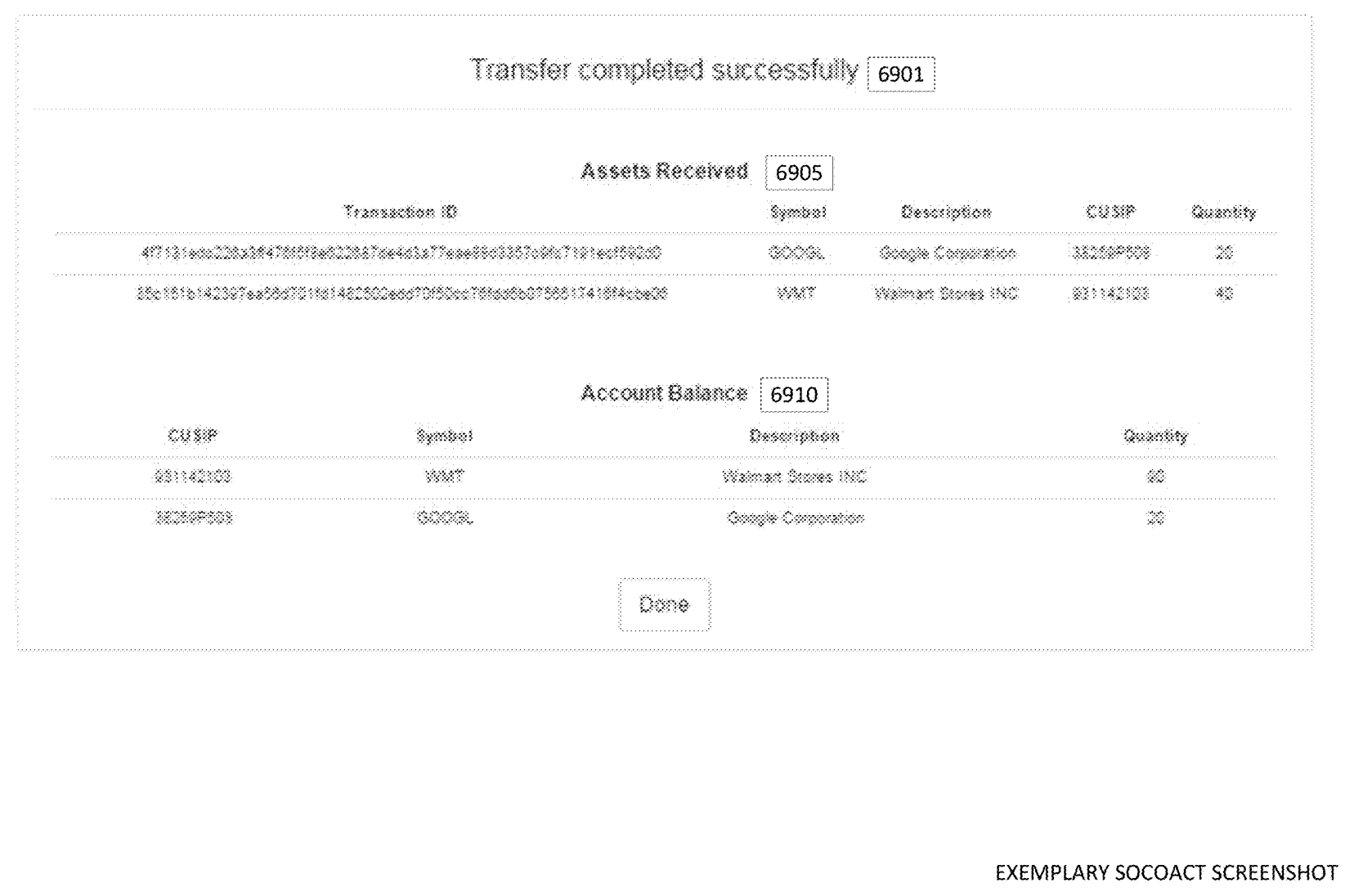
FIG. 69 shows a screenshot diagram illustrating embodiments of the SOCOACT.

FIG. 69 shows a screenshot diagram illustrating embodiments of the SOCOACT. In FIG. 69, a transaction receipt GUI 6901 that may be utilized to provide a transaction receipt for a TOA transaction is illustrated. Assets received section 6905 shows assets received by a receiving broker as a result of the TOA transaction. Account balance section 6910 shows a customer's account balance, updated to reflect the receipt of the transferred assets.

Figure 70:
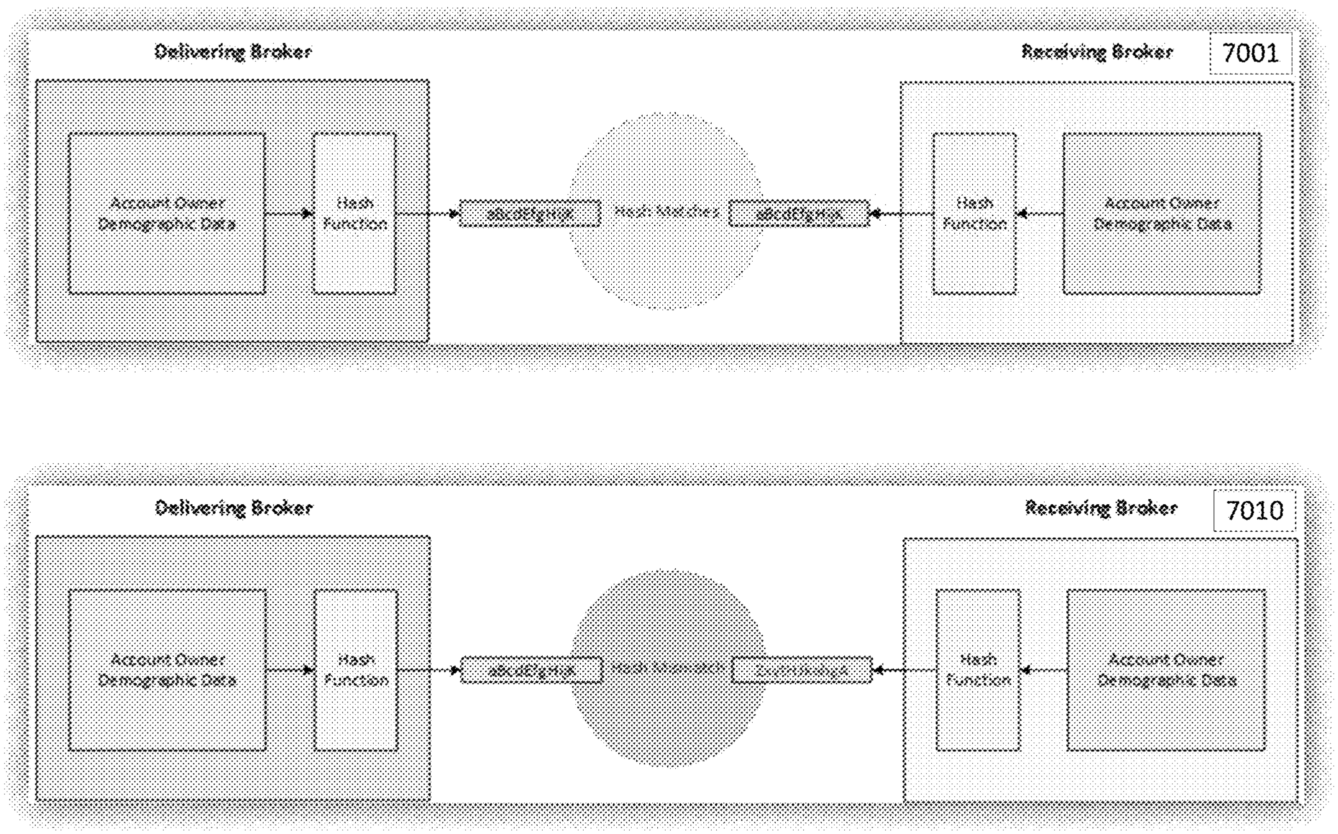
FIG. 70 shows an exemplary identity verification model for the SOCOACT.

FIG. 70 shows an exemplary identity verification model for the SOCOACT. The identity verification model may be utilized for a TOA transaction to ensure that the identity of a customer's account at a receiving broker matches the identity of the customer's account at a delivering broker (e.g., while on blockchain, instead of utilizing the DTC). In FIG. 70, a hash function may be utilized to generate a hash of the customer's account owner demographic data. Screen 7001 shows that if the hash generated by the delivering broker matches the hash generated by the receiving broker, the TOA transaction is approved. Screen 7010 shows that if the hash generated by the delivering broker does not match the hash generated by the receiving broker, the TOA transaction is denied.

Figure 71:
FIG. 71 shows an exemplary hash calculation for the SOCOACT.

FIG. 71 shows an exemplary hash calculation for the SOCOACT. In one embodiment, the hash calculation may be utilized to facilitate account identity verification. In one implementation, an id may be generated by stringing together account owner demographic data, and a hash of the id may be calculated. For example, the hash calculation may be implemented as follows:

```
@RestController
public class HashController {
  private ObjectMapper objMapper = new ObjectMapper( );
  @RequestMapping(value = "/calculateSHA256", method =
RequestMethod.POST, consumes = { "application/json" },
produces = { "application/json" })
  public String calculateSHA256(@RequestBody Identifiers id)
        throws JsonProcessingException {
      String output = null;
      String input = null;
      if (id != null) {
        input = id.getIdentifier( ).getPrimarySsn( )
            + id.getIdentifier( ).getPrimaryFirstName( )
            + id.getIdentifier( ).getPrimaryLastName( )
            + id.getIdentifier( ).getSecondarySsn( )
            + id.getIdentifier( ).getSecondaryFirstName( )
            + id.getIdentifier( ).getSecondaryLastName( );
      }
      output = objMapper.writeValueAsString(calculateSHA256(input));
      return output;
  }
  public String calculateSHA256(String base) {
      try {
        MessageDigest digest =
        MessageDigest.getInstance("SHA-256");
        byte[ ] hash = digest.digest(base.getBytes("UTF-8"));
        return Base64.encodeBytes(hash).toString( );
      } catch (Exception ex) {
        throw new RuntimeException(ex);
      }
  }
}
```

Screen 7101 shows that the result of utilizing the hash calculation on the set of account owner demographic data shown at 7105 is a hash shown at 7107. In one implementation, the following request and response may be utilized:

```
Request 1:
Method: POST
Url: http://localhost:8099/blockhash/calculateSHA256
Request Body:
{
  "CustomerIdentifiers": {"primarySsn": "123456789",
  "primaryFirstName": "John",
  "primaryLastName": "Smith",
  "secondarySsn": "111111111",
  "secondaryFirstName": "Dina",
  "secondaryLastName": "Diaz" }
}
Response 1:
pMs1Ff2oz1wzXjqQ+Dc0H1D7yBcAx/bdj391RHb9Fc8=
```

Screen 7110 shows that the result of utilizing the hash calculation on the set of account owner demographic data shown at 7115 is a hash shown at 7117. As shown, a one character difference (e.g., primary first name changed from John to Jon) results in an entirely different hash. In one implementation, the following request and response may be utilized:

```
Request 2:
Method: POST
Url: http://localhost:8099/blockhash/calculateSHA256
Request Body:
{
  "CustomerIdentifiers": {"primarySsn": "123456789",
  "primaryFirstName": "Jon",
  "primaryLastName": "Smith",
  "secondarySsn": "111111111",
  "secondaryFirstName": "Dina",
  "secondaryLastName": "Diaz" }
}
Response 2:
NqyWp3R5XjehAy1+6BrkrOHWQipsyDU03JMKTLwerFk=
```

Figure 72:
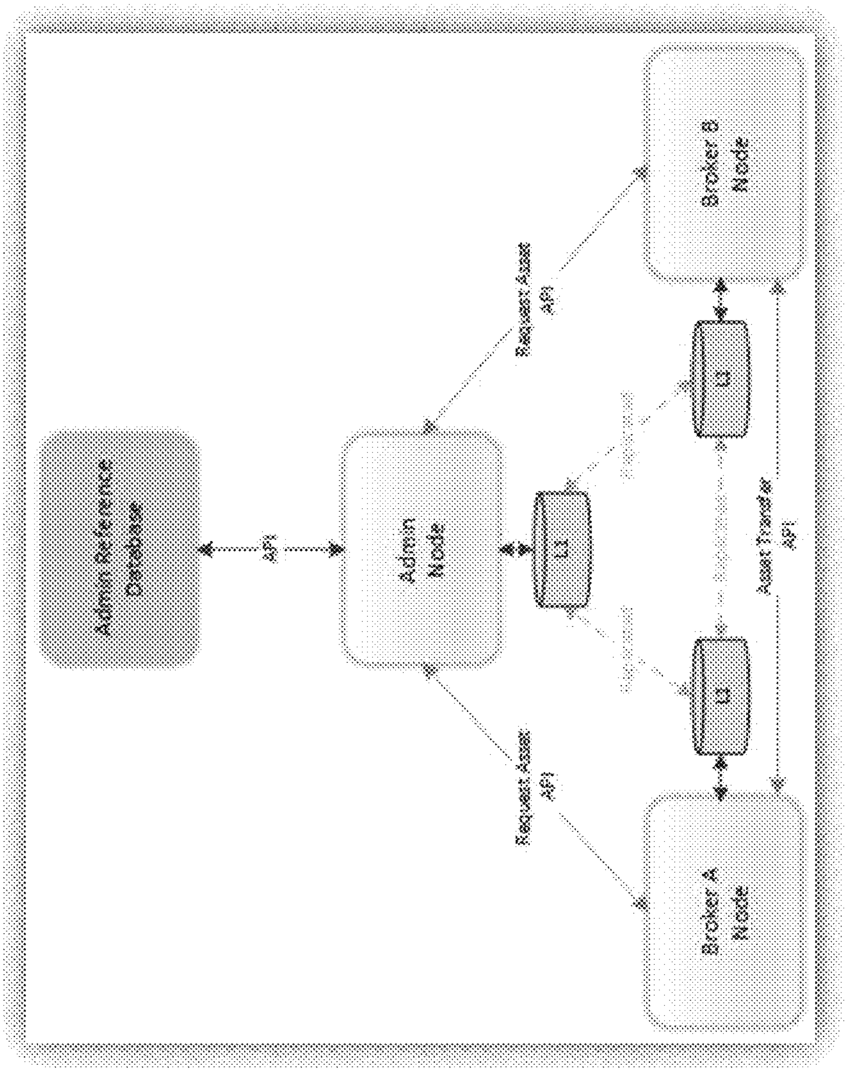
FIG. 72 shows an exemplary asset creation model for the SOCOACT.

FIG. 72 shows an exemplary asset creation model for the SOCOACT. In one embodiment, assets defined on the blockchain are unique (e.g., each asset is defined once). Accordingly, a central administrative node that controls asset definition on the blockchain may be utilized. Other parties on the blockchain may reference the asset definition of the administrative node (e.g., with data stored in an administrative reference database). In one implementation, an asset may be defined using its Committee on Uniform Securities Identification Procedures identifier (CUSIP), ticker symbol, International Securities Identification Number (ISIN), and description (e.g., 2 lines). In one implementation, a smart contract and/or a control program may be utilized to reject asset definition without an administrative key and/or for a duplicate asset (e.g., with the same CUSIP). If a broker wishes to define position data for an account onto the blockchain to facilitate TOA, and the account includes an asset that is not defined on the blockchain, the broker may make an API call to the administrative node to define the asset. The administrative node may define the asset on-demand and make the asset definition available to other nodes in the network. In one implementation, if the asset is unsupported (e.g., the asset does not have a CUSIP) the administrative node may decline to create the asset and the asset transfer may be denied (e.g., the customer associated with the asset transfer may have to liquidate the unsupported asset and transfer funds).

Figure 73:
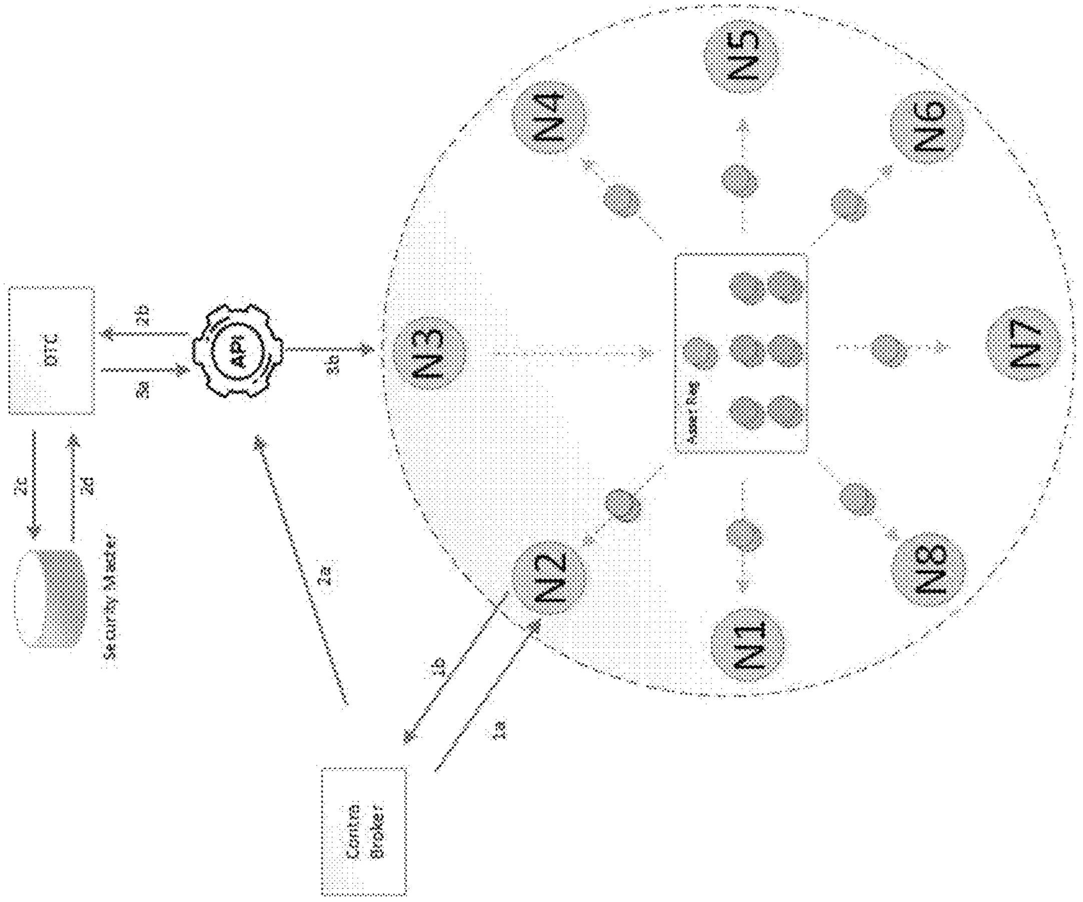
FIG. 73 shows an exemplary asset creation model for the SOCOACT.

FIG. 73 shows an exemplary asset creation model for the SOCOACT. At 1*a*, a broker may interface with blockchain node N2 to look up whether an asset is defined on the blockchain. At 1*b*, blockchain node N2 responds to the broker with the requested data. At 2*a* and 2*b*, if the asset is not defined on the blockchain, the broker calls asset creation API to request that an administrator (e.g., DTC) create an asset definition for the asset. At 2*c* and 2*d*, the administrator confirms that the asset definition may be created, and issues an asset creation request to add the asset definition to the administrative reference database (e.g., security master). At 3*a* and 3*b*, the administrator may utilize the API to invoke a smart contract in blockchain node N3 to create the asset definition on the blockchain. The smart contract may be executed in the nodes of the blockchain network to make the asset definition reference available to the nodes of the blockchain network.

Figure 74:
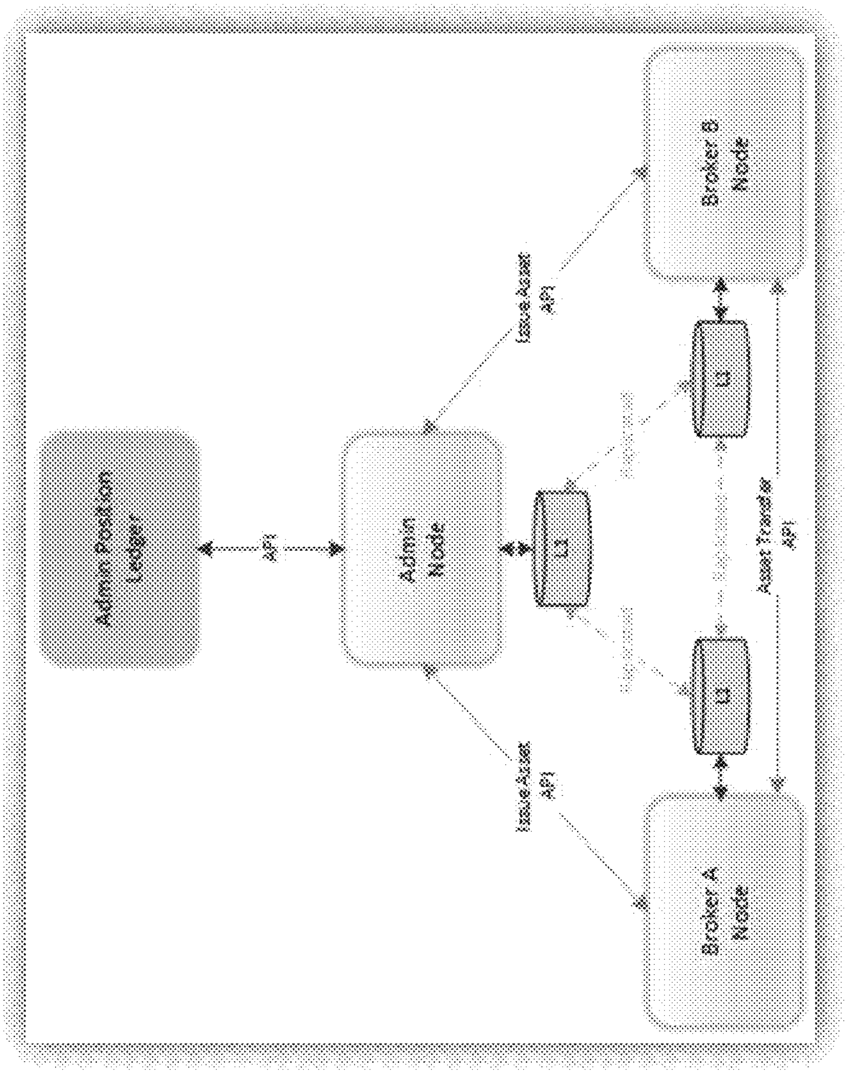
FIG. 74 shows an exemplary asset issuance model for the SOCOACT.

FIG. 74 shows an exemplary asset issuance model for the SOCOACT. In one embodiment, when an account of a customer associated with TOA is set up on the blockchain, assets to be transferred are allocated to the account (e.g., the account may be represented on the blockchain via a public key or address generated in accordance with BIP32) to facilitate tracking ownership of assets issued on the blockchain. A central administrative node that controls asset issuance (e.g., with data stored in an administrative position ledger) on the blockchain may be utilized (e.g., the same entity that controls asset definition). In one implementation, when establishing a position ledger on the blockchain, a broker node may make an asset issuance API call to the administrative node to issue new asset units (e.g., crypto tokens) based on the broker's specifications (e.g., based on the assets to be transferred). The administrative node may validate the asset issuance request (e.g., to verify the broker's identity, to verify availability of assets), and may issue the requested asset units to the broker's omnibus wallet address. In one implementation, upon receipt of the newly issued asset units, the broker may reallocate the newly issued asset units to the customer's account.

Figure 75:
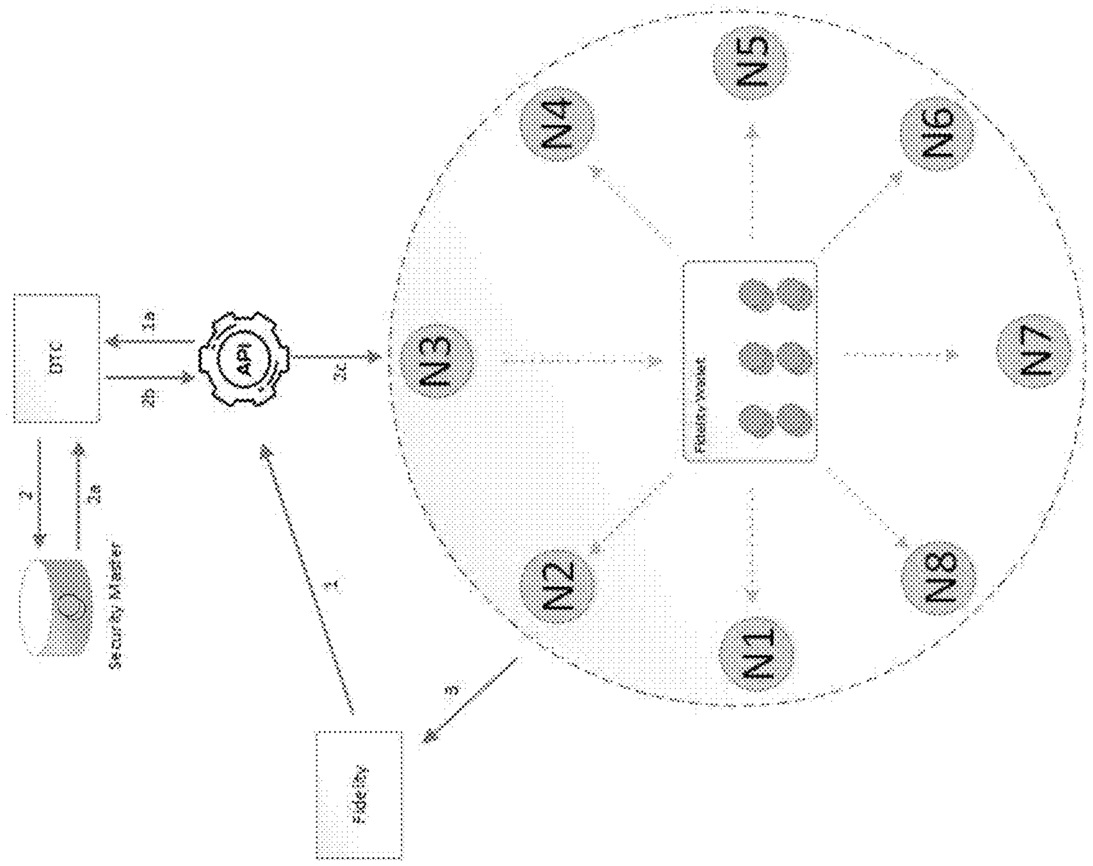
FIG. 75 shows an exemplary asset issuance model for the SOCOACT.

FIG. 75 shows an exemplary asset issuance model for the SOCOACT. At 1 and 1*a*, a broker (e.g., Fidelity) may call asset issuance API to request that an administrator (e.g., DTC) issue new asset units, while depositing assets to the blockchain. At 2, 2*a*, and 2*b*, the administrator issues an asset issuance request to add the newly created asset units to the administrative position ledger (e.g., security master). At 2*c*, the administrator may utilize the API to communicate with blockchain node N3 to add the newly created asset units to the broker's wallet (e.g., to the broker's omnibus wallet address). In one implementation, a copy of the broker's wallet is shared with the nodes of the blockchain network. The wallet may be encrypted such that the asset holdings are visible to the broker, but not to other brokers.

Figure 76:
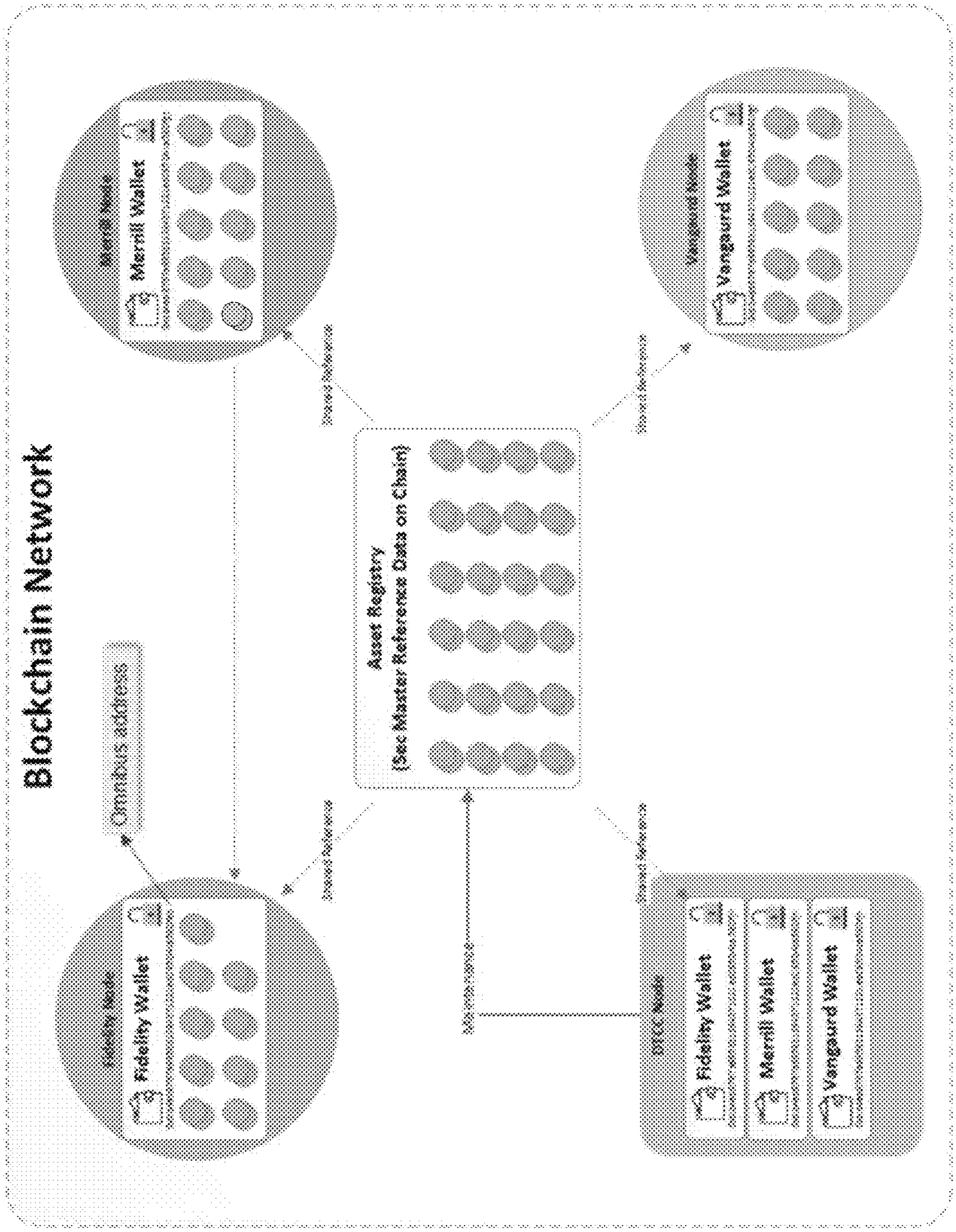
FIG. 76 shows an exemplary wallet administration model for the SOCOACT.

FIG. 76 shows an exemplary wallet administration model for the SOCOACT. In FIG. 76, each broker has an omnibus wallet address on the blockchain to which assets may be deposited based on custodial positions. An asset registry (e.g., asset definition data) may be shared across the nodes of the blockchain network. Positions data for the wallets may also be shared across the nodes of the blockchain network. The positions data may be encrypted such that full access to a wallet is restricted to the broker who owns the wallet and/or to the administrator (e.g., DTCC).

Figure 77:
FIG. 77 shows an exemplary TOA blockchain transaction for the SOCOACT.

FIG. 77 shows an exemplary TOA blockchain transaction for the SOCOACT. For example, the TOA blockchain transaction may be utilized via a blockchain platform such as Chain Core. The TOA blockchain transaction shows sample input and output JSON messages that may be utilized to move 100 units of GOOGL from one account to another. In one implementation, the control program may be the temporary receiver of the transferred assets (e.g., the generated temporary address to which the asset deposits are requested).

FIG. 78 shows an exemplary TOA smart contract for the SOCOACT. For example, the shown smart contract implementation may be utilized via a blockchain platform such as Etherium. As shown, functions may be implemented to initialize a contract with crypto tokens, to check balances, to add assets, to send assets, and/or the like.

Controller

Figure 79:
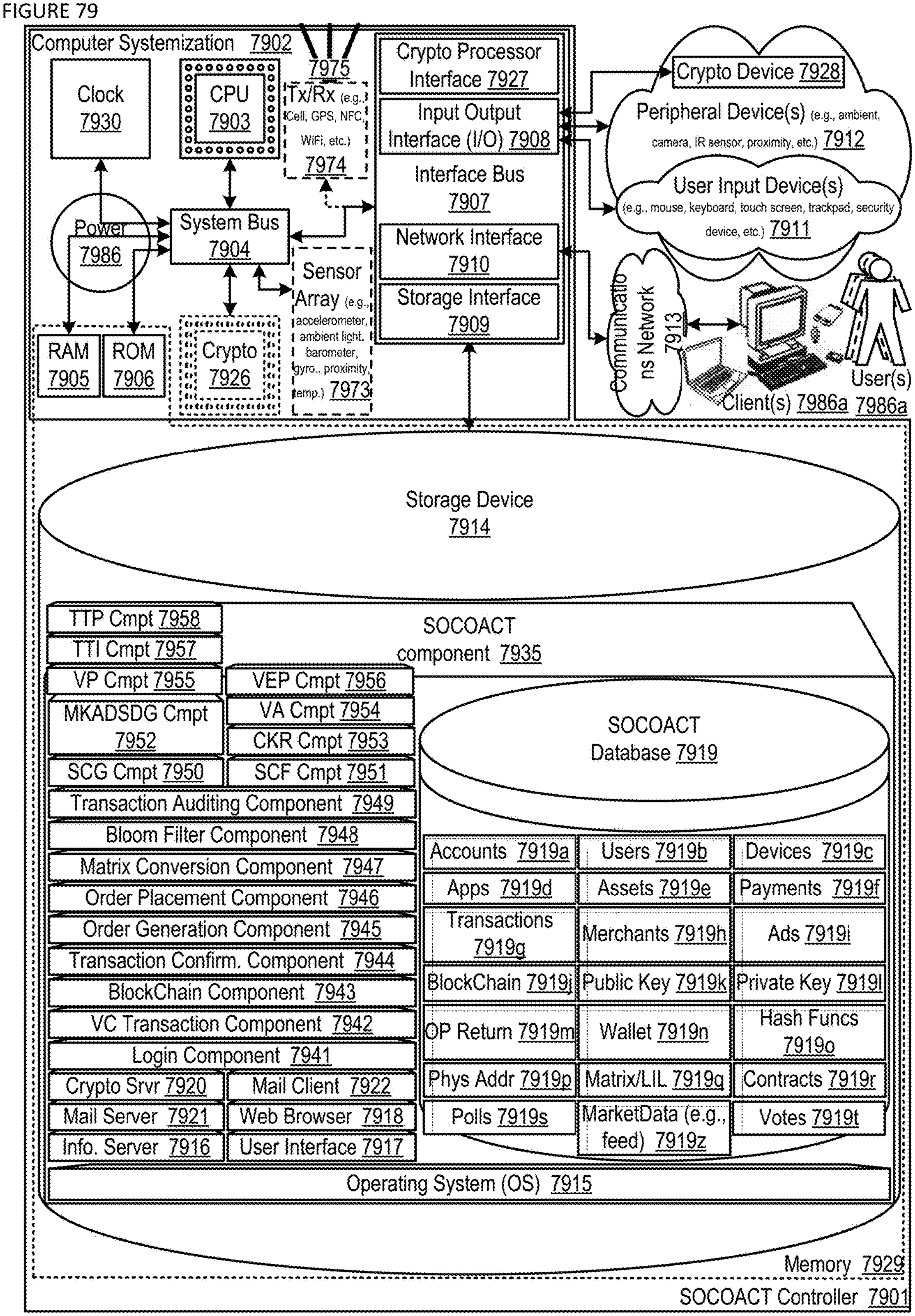
FIG. 79 shows a block diagram illustrating embodiments of a SOCOACT controller.

FIG. 79 shows a block diagram illustrating embodiments of a SOCOACT controller. In this embodiment, the SOCOACT controller 7901 may serve to aggregate, process, store, search, serve, identify, instruct, generate, match, and/or facilitate interactions in with a computer through Guided Target Transactions and Encrypted Transaction Processing and Verification technologies, and/or other related data.

Typically, users, which may be people and/or other systems, may engage information technology systems (e.g., computers) to facilitate information processing. In turn, computers employ processors to process information; such processors 7903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 7929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SOCOACT controller 7901 may be connected to and/or communicate with entities such as, but not limited to: one or more users from peripheral devices 7912 (e.g., user input devices 7911); an optional cryptographic processor device 7928; and/or a communications network 7913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SOCOACT controller 7901 may be based on computer systems that may comprise, but are not limited to, components such as: a computer systemization 7902 connected to memory 7929.

Computer Systemization

A computer systemization 7902 may comprise a clock 7930, central processing unit ("CPU(s)" and/or "processor(s)" (these terms are used interchangeable throughout the disclosure unless noted to the contrary)) 7903, a memory 7929 (e.g., a read only memory (ROM) 7906, a random access memory (RAM) 7905, etc.), and/or an interface bus 7907, and most frequently, although not necessarily, are all interconnected and/or communicating through a system bus 7904 on one or more (mother)board(s) 7902 having conductive and/or otherwise transportive circuit pathways through which instructions (e.g., binary encoded signals) may travel to effectuate communications, operations, storage, etc. The computer systemization may be connected to a power source 7986; e.g., optionally the power source may be internal. Optionally, a cryptographic processor 7926 may be connected to the system bus. In another embodiment, the cryptographic processor, transceivers (e.g., ICs) 7974, and/or sensor array (e.g., accelerometer, altimeter, ambient light, barometer, global positioning system (GPS) (thereby allowing SOCOACT controller to determine its location), gyroscope, magnetometer, pedometer, proximity, ultra-violet sensor, etc.) 7973 may be connected as either internal and/or external peripheral devices 7912 via the interface to bus I/O 7908 (not pictured) and/or directly via the interface bus 7907. In turn, the transceivers may be connected to antenna(s) 7975, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 7929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SOCOACT controller and beyond through various interfaces. Should processing requirements dictate a greater amount speed and/or capacity, distributed processors (e.g., see Distributed SOCOACT below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the SOCOACT may be achieved by implementing a microcontroller such as CAST's R8051XC2 microcontroller; Intel's MCS 51 (i.e., 8051 microcontroller); and/or the like. Also, to implement certain features of the SOCOACT, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SOCOACT component collection (distributed or otherwise) and/or features may be implemented via the microprocessor and/or via embedded components; e.g., via ASIC, coprocessor, DSP, FPGA, and/or the like. Alternately, some implementations of the SOCOACT may be implemented with embedded components that are configured and used to achieve a variety of features or signal processing.

Depending on the particular implementation, the embedded components may include software solutions, hardware solutions, and/or some combination of both hardware/software solutions. For example, SOCOACT features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SOCOACT features. A hierarchy of programmable interconnects allow logic blocks to be interconnected as needed by the SOCOACT system designer/administrator, somewhat like a one-chip r programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SOCOACT may be developed on regular FPGAs and then migrated into a fixed version that more resembles ASIC implementations. Alternate or coordinating implementations may migrate SOCOACT controller features to a final ASIC instead of or in addition to FPGAs. Depending on the implementation all of the aforementioned embedded components and microprocessors may be considered the "CPU" and/or "processor" for the SOCOACT.

Power Source

The power source 7986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 7986 is connected to at least one of the interconnected subsequent components of the SOCOACT thereby providing an electric current to all subsequent components. In one example, the power source 7986 is connected to the system bus component 7904. In an alternative embodiment, an outside power source 7986 is provided through a connection across the I/O 7908 interface. For example, a USB and/or IEEE 1394 connection carries both data and power across the connection and is therefore a suitable source of power.

Interface Adapters

Interface bus(ses) 7907 may accept, connect, and/or communicate to a number of interface adapters, conventionally although not necessarily in the form of adapter cards, such as but not limited to: input output interfaces (I/O) 7908, storage interfaces 7909, network interfaces 7910, and/or the like. Optionally, cryptographic processor interfaces 7927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 7909 may accept, communicate, and/or connect to a number of storage devices such as, but not limited to: storage devices 7914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 7910 may accept, communicate, and/or connect to a communications network 7913. Through a communications network 7913, the SOCOACT controller is accessible through remote clients 106 (e.g., computers with web browsers) by users **106*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed SOCOACT below), architectures may similarly be employed to pool, load balance, and/or otherwise decrease/increase the communicative bandwidth required by the SOCOACT controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 7910 may be used to engage with various communications network types 7913**. For example, multiple network interfaces may be employed to allow for the communication over broadcast, multicast, and/or unicast networks.

Input Output interfaces (I/O) 7908 may accept, communicate, and/or connect to user, peripheral devices 7912 (e.g., input devices 7911), cryptographic processor devices 7928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 7912 may be connected and/or communicate to I/O and/or other facilities of the like such as network interfaces, storage interfaces, directly to the interface bus, system bus, the CPU, and/or the like. Peripheral devices may be external, internal and/or part of the SOCOACT controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 7928), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 7911 often are a type of peripheral device 7912 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the SOCOACT controller may be embodied as an embedded, dedicated, and/or monitor-less (i.e., headless) device, wherein access would be provided over a network interface connection.

Cryptographic units such as, but not limited to, microcontrollers, processors 7926, interfaces 7927, and/or devices 7928 may be attached, and/or communicate with the SOCOACT controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 7929. However, memory is a fungible technology and resource, thus, any number of memory embodiments may be employed in lieu of or in concert with one another. It is to be understood that the SOCOACT controller and/or a computer systemization may employ various forms of memory 7929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 7929 will include ROM 7906, RAM 7905, and a storage device 7914. A storage device 7914 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 7929 may contain a collection of program and/or database components and/or data such as, but not limited to: operating system component(s) 7915 (operating system); information server component(s) 7916 (information server); user interface component(s) 7917 (user interface); Web browser component(s) 7918 (Web browser); database(s) 7919; mail server component(s) 7921; mail client component(s) 7922; cryptographic server component(s) 7920 (cryptographic server); the SOCOACT component(s) 7935; and/or the like (i.e., collectively a component collection). These components may be stored and accessed from the storage devices and/or from storage devices accessible through an interface bus. Although non-conventional program components such as those in the component collection, typically, are stored in a local storage device 7914, they may also be loaded and/or stored in memory such as: peripheral devices, RAM, remote storage facilities through a communications network, ROM, various forms of memory, and/or the like.

Operating System

The operating system component 7915 is an executable program component facilitating the operation of the SOCOACT controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SOCOACT controller to communicate with other entities through a communications network 7913. Various communication protocols may be used by the SOCOACT controller as a subcarrier transport mechanism for interaction, such as, but not limited to: multicast, TCP/IP, UDP, unicast, and/or the like.

Information Server

An information server component 7916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SOCOACT controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SOCOACT database 7919, operating systems, other program components, user interfaces, Web browsers, and/or the like.

Access to the SOCOACT database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SOCOACT. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search element with the proper join/select commands based on the tagged text entries, wherein the resulting command is provided over the bridge mechanism to the SOCOACT as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 7917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 7918 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SOCOACT enabled nodes. The combined application may be nugatory on systems employing standard Web browsers.

Mail Server

A mail server component 7921 is a stored program component that is executed by a CPU 7903. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SOCOACT. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the SOCOACT mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 7922 is a stored program component that is executed by a CPU 7903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 7920 is a stored program component that is executed by a CPU 7903, cryptographic processor 7926, cryptographic processor interface 7927, cryptographic processor device 7928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the SOCOACT may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SOCOACT component to engage in secure transactions if so desired. The cryptographic component facilitates the secure accessing of resources on the SOCOACT and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SOCOACT Database

The SOCOACT database component 7919 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the SOCOACT database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SOCOACT database is implemented as a data-structure, the use of the SOCOACT database 7919 may be integrated into another component such as the SOCOACT component 7935. The SOCOACT database may likewise be stored in the Blockchain or similar format. Also, the database may be implemented as a mix of data structures, objects, and relational structures. Databases may be consolidated and/or distributed in countless variations (e.g., see Distributed SOCOACT below). Portions of databases, e.g., tables, may be exported and/or imported and thus decentralized and/or integrated.

In one embodiment, the database component 7919 includes several tables 7919*a-z:*

An accounts table 7919*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, accountVerificationStandard, accountExternalFeatures, and/or the like;

A users table 7919*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, primaryFirstName, primaryLastName, primarySSN, secondaryFirstName, secondaryLastName, secondarySSN, and/or the like (the user table may support and/or track multiple entity accounts on a SOCOACT);

An devices table 7919*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 7919*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 7919*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 7919*f* includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 7919*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 7919*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 7919*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like.

A blockchain table 7919*j* includes fields such as, but not limited to: block(1) . . . block(n). The blockchain table 1819*j* may be used to store blocks that form blockchains of transactions as described herein.

A public key table 7919*k* includes fields such as, but not limited to: accountID, accountOwnerID, accountContactID, public_key. The public key table 1819*k* may be used to store and retrieve the public keys generated for clients of the SOCOACT system as described herein.

A private key table 79191 includes fields such as, but not limited to: ownerID, OwnertContact, private_key. The private keys held here will not be the private keys of register users of the SOCOACT system, but instead will be used to authentic transactions originating from the SOCOACT system.

An OpReturn table 7919*m* includes fields such as, but not limited to: transactionID, OpReturn_Value1 . . . OpReturn_Value80; where each OpReturn Value entry stores one byte in the OpReturn field for the purposes described above.

A wallet table 7919*n* includes fields such as, but not limited to: an accountID, accountOwnerID, accountContactID, transactionIDs, SourceAddress(1) . . . SourceAddress(n), BalanceAddress(1) . . . Balance address(n), validationServerSettings, recoveryPrivateKey, triggerEventType, recoverySettings. The wallet table 1819*n* may be used to store wallet information as described in the foregoing.

Hash functions table 79190 stores the hash functions that may be used by the Bloom Filter component 7948, TTI component 7957, TTP component 7958, etc., and may include fields such as: hashFunction1, hashFunction2 . . . hashFunction(n).

Physical Address table 7919*p* stores the physical address generated by Bloom filter application to source and destination addresses in a transaction, and accordingly may include the following fields: publickey, physicalAddress.

The transaction distance matrix representing all transactions undertaken via the SOCOACT are stored in a LIL or similar format, and accordingly the LIL table 7919*q* may include the following fields: sourceAddress, destinationAddress, transactionValueTimestampTuple.

A contracts table 7919*r* includes fields such as, but not limited to: contractID, contractAddress, contractType, contractParties, contractTerms, contractOracles, contractTokens, and/or the like.

A polls table 7919*s* includes fields such as, but not limited to: pollID, pollName, pollAvailableVotingOptions, pollAvailableConditions, pollAvailableActions, authenticationStandard, authorizedVoters, pollTalliedResults, and/or the like.

A votes table 7919*t* includes fields such as, but not limited to: voteID, voteAddress, voterID, voteOutcome, voteConditions, voteOracles, voteActions, associatedPollID, and/or the like.

A market_data table 7919*z* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Consolidated Quote System (CQS), Consolidated Tape Association (CTA), Consolidated Tape System (CTS), Dun & Bradstreet, OTC Montage Data Feed (OMDF), Reuter's Tib, Triarch, US equity trade and quote market data, Unlisted Trading Privileges (UTP) Trade Data Feed (UTDF), UTP Quotation Data Feed (UQDF), and/or the like feeds, e.g., via ITC 2.1 and/or respective feed protocols), for example, through Microsoft's Active Template Library and Dealing Object Technology's real-time toolkit Rtt.Multi In one embodiment, the SOCOACT database 7919 may interact with other database systems. For example, employing a distributed database system, queries and data access by search SOCOACT component may treat the combination of the SOCOACT database, an integrated data security layer database as a single database entity (e.g., see Distributed SOCOACT below).

In one embodiment, user programs may contain various user interface primitives, which may serve to update the SOCOACT. Also, various accounts may require custom database tables depending upon the environments and the types of clients the SOCOACT may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, a one may further distribute the databases over several computer systemizations and/or storage devices. Similarly, configurations of the decentralized database controllers may be varied by consolidating and/or distributing the various database components 7919*a-z*. The SOCOACT may be configured to keep track of various settings, inputs, and parameters via database controllers.

The SOCOACT database may communicate to and/or with other components in a component collection, including itself, and/or facilities of the like. Most frequently, the SOCOACT database communicates with the SOCOACT component, other program components, and/or the like. The database may contain, retain, and provide information regarding other nodes and data.

The SOCOACTs

The component 7935 is a stored program component that is executed by a CPU. In one embodiment, the SOCOACT component incorporates any and/or all combinations of the aspects of the SOCOACT that was discussed in the previous figures. As such, the SOCOACT affects accessing, obtaining and the provision of information, services, transactions, and/or the like across various communications networks. The features and embodiments of the SOCOACT discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SOCOACT's features and facilities, and in many cases reduce the costs, energy consumption/requirements, and extend the life of SOCOACT's underlying infrastructure; this has the added benefit of making the SOCOACT more reliable. Similarly, many of the features and mechanisms are designed to be easier for users to use and access, thereby broadening the audience that may enjoy/employ and exploit the feature sets of the SOCOACT; such ease of use also helps to increase the reliability of the SOCOACT. In addition, the feature sets include heightened security as noted via the Cryptographic components 7920, 7926, 7928 and throughout, making access to the features and data more reliable and secure The SOCOACT transforms transfer of assets (TOA) initiation request inputs, via SOCOACT components (e.g., Virtual Currency Component, Blockchain Component, Transaction Confirmation Component, TTI, TTP), into TOA confirmation outputs.

The SOCOACT component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SOCOACT server employs a cryptographic server to encrypt and decrypt communications. The SOCOACT component may communicate to and/or with other components in a component collection, including itself, and/or facilities of the like. Most frequently, the SOCOACT component communicates with the SOCOACT database, operating systems, other program components, and/or the like. The SOCOACT may contain, communicate, generate, obtain, and/or provide program component, system, user, and/or data communications, requests, and/or responses.

A Login Component 7941 is a stored program component that is executed by a CPU. In various embodiments, the Login Component 7941 incorporates any and/or all combinations of the aspects of logging into the SOCOACT that was discussed above with respect to FIG. 4.

A Virtual Currency Transaction Component 7942 is a stored program component that is executed by a CPU. In various embodiments, the Virtual Currency Transaction Component 7942 incorporates any and/or all combinations of the aspects of the SOCOACT that was discussed above with respect to FIG. 5.

A Blockchain Component 7943 is a stored program component that is executed by a CPU. In one embodiment, the Blockchain Component 7943 incorporates any and/or all combinations of the aspects of the SOCOACT that was discussed in the previous figures.

A Transaction Confirmation Component 7944 is a stored program component that is executed by a CPU. In one embodiment, the Transaction Confirmation Component 7944 incorporates any and/or all combinations of the aspects of the SOCOACT that was discussed above with respect to FIGS. 5 and 7.

An Order Generation Component 7945 and an Order Placement Component 7946 provide the functionalities as listed above for the SOCOACT.

Distributed SOCOACTs

The structure and/or operation of any of the SOCOACT node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SOCOACT controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for SOCOACT controller and/or SOCOACT component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SOCOACT controller may be executing a PHP script implementing a Secure Sockets Layer ("SSL") socket server via the information server, which listens to incoming communications on a server port to which a client may a send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server?side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
  $input = "";
  $input = socket_read($client, 1024);
  $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm. IBDI.doc/referenceguide295.htm and other parser implementations:

http://publib.boulder.ibm.com/infocenter/tivihelp/v2r1/index.jsp?topic=/com.ibm. IBMDI.doc/referenceguide259.htm all of which are hereby expressly incorporated by reference.

Additional embodiments include:

1. A crypto asset digitizer apparatus, comprising:
   a memory;
   a component collection in the memory, including
      a smart contract generating component; and
      a smart contract fulfillment component;
   a processor disposed in communication with the memory, and configured to issue a plurality of processing instructions from the component collection stored in the memory,
      wherein the processor issues instructions from the smart contract generating component, stored in the memory, to:

instantiate, via at least one processor, an aggregated crypto 2-party transaction trigger entry in a socially aggregated blockchain datastructure, wherein the aggregated crypto 2-party transaction trigger entry specifies at least one associated aggregated blockchain oracle that provides oracle data for evaluation via the aggregated crypto 2-party transaction trigger entry;

wherein the processor issues instructions from the smart contract fulfillment component, stored in the memory, to:

obtain, via at least one processor, a first encrypted token for the crypto 2-party transaction trigger entry from a first associated aggregated blockchain oracle, wherein the first encrypted token is for a first account data structure datastore having a crypto token asset value, wherein the first associated aggregated blockchain oracle is responsive to crypto tokens deposit activity of a first party;

obtain, via at least one processor, a second encrypted token for the crypto 2-party transaction trigger entry from a second associated aggregated blockchain oracle, wherein the second encrypted token is for a second account data structure datastore having a crypto token asset value, wherein the second associated aggregated blockchain oracle is responsive to crypto tokens deposit activity of a second party;

determine, via at least one processor, that an instantiated aggregated crypto 2-party transaction trigger entry unlock event occurred;

facilitate, via at least one processor, unlocking the instantiated aggregated crypto 2-party transaction trigger entry based on the determination, and providing the first encrypted token to the second party and providing the second encrypted token to the first party.

2. The apparatus of embodiment 1, wherein the aggregated crypto 2-party transaction trigger entry is instantiated via a smart contract generator GUI.

3. The apparatus of embodiment 2, wherein the smart contract generator GUI includes a payout structure drawing user interface component that facilitates obtaining a payout structure specification for a derivative from a user.

4. The apparatus of embodiment 3, wherein the payout structure drawing user interface component facilitates obtaining a payout structure specification for the derivative based on a plurality of axis dimensions, and wherein each of the plurality of axis dimensions is associated with an aggregated blockchain oracle specified by the user.

5. The apparatus of embodiment 1, wherein the first associated aggregated blockchain oracle and the second associated aggregated blockchain oracle are the same entity.

6. The apparatus of embodiment 1, wherein at least one associated aggregated blockchain oracle provides crowdsourced decentralized data.

7. The apparatus of embodiment 1, wherein at least one associated aggregated blockchain oracle provides combined crowdsourced decentralized weather data.

8. The apparatus of embodiment 1, wherein the instantiated aggregated crypto 2-party transaction trigger entry unlock event is receipt of the first encrypted token and of the second encrypted token.

9. The apparatus of embodiment 1, wherein the determination that the instantiated aggregated crypto 2-party transaction trigger entry unlock event occurred is made based on oracle data providable by a third associated aggregated blockchain oracle.

10. The apparatus of embodiment 9, wherein the instantiated aggregated crypto 2-party transaction trigger entry unlock event is any of: anti-ping detection, detection of excess threshold account balance in an account data structure datastore, detection of excess threshold of aggregated blockchain oracle data value, detection of excess threshold number of transactions, detection of specified micro transaction amount, excess bounds of a smart contract generator GUI generated crypto smart rule, failure to login to $4^{th}$ party website, geofence transgression, user request.

11. The apparatus of embodiment 9, wherein the first account data structure datastore or the second account data structure datastore has a crypto token asset for a trackable real world item.

12. The apparatus of embodiment 11, wherein the trackable real world item is trackable via a constant video stream.

13. The apparatus of embodiment 11, wherein the determination that the instantiated aggregated crypto 2-party transaction trigger entry unlock event occurred is conditioned on not receiving oracle data, indicating that the real world item was moved after it had been delivered to a designated location, from the third associated aggregated blockchain oracle.

14. The apparatus of embodiment 1, wherein the first encrypted token is decryptable by a private key of the second party and the second encrypted token is decryptable by a private key of the first party.

15. The apparatus of embodiment 1, further comprising:

the processor issues instructions from the smart contract fulfillment component, stored in the memory, to:

facilitate providing a crypto unlock key for decrypting the first encrypted token to the second party and a crypto unlock key for decrypting the second encrypted token to the first party.

16. A processor-readable crypto asset digitizer non-transient physical medium storing processor-executable components, the components, comprising.

a component collection stored in the medium, including.

a smart contract generating component; and a smart contract fulfillment component;

wherein the smart contract generating component, stored in the medium, includes processor-instructions to:

instantiate, via at least one processor, an aggregated crypto 2-party transaction trigger entry in a socially aggregated blockchain datastructure, wherein the aggregated crypto 2-party transaction trigger entry specifies at least one associated aggregated blockchain oracle that provides oracle data for evaluation via the aggregated crypto 2-party transaction trigger entry;

wherein the smart contract fulfillment component, stored in the medium, includes processor-issuable instructions to:

obtain, via at least one processor, a first encrypted token for the crypto 2-party transaction trigger entry from a first associated aggregated blockchain oracle, wherein the first encrypted token is for a first account data structure datastore having a crypto token asset value, wherein the first associated aggregated blockchain oracle is responsive to crypto tokens deposit activity of a first party;

obtain, via at least one processor, a second encrypted token for the crypto 2-party transaction trigger entry from a second associated aggregated blockchain oracle, wherein the second encrypted token is for a second account data structure datastore having a crypto token asset value, wherein the second associated aggregated blockchain oracle is responsive to crypto tokens deposit activity of a second party;

determine, via at least one processor, that an instantiated aggregated crypto 2-party transaction trigger entry unlock event occurred;

facilitate, via at least one processor, unlocking the instantiated aggregated crypto 2-party transaction trigger entry based on the determination, and providing the first encrypted token to the second party and providing the second encrypted token to the first party.

17. The medium of embodiment 16, wherein the aggregated crypto 2-party transaction trigger entry is instantiated via a smart contract generator GUI.

18. The medium of embodiment 17, wherein the smart contract generator GUI includes a payout structure drawing user interface component that facilitates obtaining a payout structure specification for a derivative from a user.

19. The medium of embodiment 18, wherein the payout structure drawing user interface component facilitates obtaining a payout structure specification for the derivative based on a plurality of axis dimensions, and wherein each of the plurality of axis dimensions is associated with an aggregated blockchain oracle specified by the user.

20. The medium of embodiment 16, wherein the first associated aggregated blockchain oracle and the second associated aggregated blockchain oracle are the same entity.

21. The medium of embodiment 16, wherein at least one associated aggregated blockchain oracle provides crowdsourced decentralized data.

22. The medium of embodiment 16, wherein at least one associated aggregated blockchain oracle provides combined crowdsourced decentralized weather data.

23. The medium of embodiment 16, wherein the instantiated aggregated crypto 2-party transaction trigger entry unlock event is receipt of the first encrypted token and of the second encrypted token.

24. The medium of embodiment 16, wherein the determination that the instantiated aggregated crypto 2-party transaction trigger entry unlock event occurred is made based on oracle data providable by a third associated aggregated blockchain oracle.

25. The medium of embodiment 24, wherein the instantiated aggregated crypto 2-party transaction trigger entry unlock event is any of: anti-ping detection, detection of excess threshold account balance in an account data structure datastore, detection of excess threshold of aggregated blockchain oracle data value, detection of excess threshold number of transactions, detection of specified micro transaction amount, excess bounds of a smart contract generator GUI generated crypto smart rule, failure to login to $4^{th}$ party website, geofence transgression, user request.

26. The medium of embodiment 24, wherein the first account data structure datastore or the second account data structure datastore has a crypto token asset for a trackable real world item.

27. The medium of embodiment 26, wherein the trackable real world item is trackable via a constant video stream.

28. The medium of embodiment 26, wherein the determination that the instantiated aggregated crypto 2-party transaction trigger entry unlock event occurred is conditioned on not receiving oracle data, indicating that the real world item was moved after it had been delivered to a designated location, from the third associated aggregated blockchain oracle.

29. The medium of embodiment 16, wherein the first encrypted token is decryptable by a private key of the second party and the second encrypted token is decryptable by a private key of the first party.

30. The medium of embodiment 16, further comprising:

the smart contract fulfillment component, stored in the medium, includes processor-issuable instructions to:

facilitate providing a crypto unlock key for decrypting the first encrypted token to the second party and a crypto unlock key for decrypting the second encrypted token to the first party.

31. A processor-implemented crypto asset digitizer system, comprising:

smart contract generating component means, to:

instantiate, via at least one processor, an aggregated crypto 2-party transaction trigger entry in a socially aggregated blockchain datastructure, wherein the aggregated crypto 2-party transaction trigger entry specifies at least one associated aggregated blockchain oracle that provides oracle data for evaluation via the aggregated crypto 2-party transaction trigger entry;

smart contract fulfillment component means, to:

obtain, via at least one processor, a first encrypted token for the crypto 2-party transaction trigger entry from a first associated aggregated blockchain oracle, wherein the first encrypted token is for a first account data structure datastore having a crypto token asset value, wherein the first associated aggregated blockchain oracle is responsive to crypto tokens deposit activity of a first party;

obtain, via at least one processor, a second encrypted token for the crypto 2-party transaction trigger entry from a second associated aggregated blockchain oracle, wherein the second encrypted token is for a second account data structure datastore having a crypto token asset value, wherein the second associated aggregated blockchain oracle is responsive to crypto tokens deposit activity of a second party;

determine, via at least one processor, that an instantiated aggregated crypto 2-party transaction trigger entry unlock event occurred;

facilitate, via at least one processor, unlocking the instantiated aggregated crypto 2-party transaction trigger entry based on the determination, and providing the first encrypted token to the second party and providing the second encrypted token to the first party.

32. The system of embodiment 31, wherein the aggregated crypto 2-party transaction trigger entry is instantiated via a smart contract generator GUI.
33. The system of embodiment 32, wherein the smart contract generator GUI includes a payout structure drawing user interface component that facilitates obtaining a payout structure specification for a derivative from a user.
34. The system of embodiment 33, wherein the payout structure drawing user interface component facilitates obtaining a payout structure specification for the derivative based on a plurality of axis dimensions, and wherein each of the plurality of axis dimensions is associated with an aggregated blockchain oracle specified by the user.
35. The system of embodiment 31, wherein the first associated aggregated blockchain oracle and the second associated aggregated blockchain oracle are the same entity.
36. The system of embodiment 31, wherein at least one associated aggregated blockchain oracle provides crowdsourced decentralized data.
37. The system of embodiment 31, wherein at least one associated aggregated blockchain oracle provides combined crowdsourced decentralized weather data.
38. The system of embodiment 31, wherein the instantiated aggregated crypto 2-party transaction trigger entry unlock event is receipt of the first encrypted token and of the second encrypted token.
39. The system of embodiment 31, wherein the determination that the instantiated aggregated crypto 2-party transaction trigger entry unlock event occurred is made based on oracle data providable by a third associated aggregated blockchain oracle.
40. The system of embodiment 39, wherein the instantiated aggregated crypto 2-party transaction trigger entry unlock event is any of: anti-ping detection, detection of excess threshold account balance in an account data structure datastore, detection of excess threshold of aggregated blockchain oracle data value, detection of excess threshold number of transactions, detection of specified micro transaction amount, excess bounds of a smart contract generator GUI generated crypto smart rule, failure to login to $4^{th}$ party website, geofence transgression, user request.
41. The system of embodiment 39, wherein the first account data structure datastore or the second account data structure datastore has a crypto token asset for a trackable real world item.
42. The system of embodiment 41, wherein the trackable real world item is trackable via a constant video stream.
43. The system of embodiment 41, wherein the determination that the instantiated aggregated crypto 2-party transaction trigger entry unlock event occurred is conditioned on not receiving oracle data, indicating that the real world item was moved after it had been delivered to a designated location, from the third associated aggregated blockchain oracle.
44. The system of embodiment 31, wherein the first encrypted token is decryptable by a private key of the second party and the second encrypted token is decryptable by a private key of the first party.
45. The system of embodiment 31, further comprising:
    smart contract fulfillment component means, to:
        facilitate providing a crypto unlock key for decrypting the first encrypted token to the second party and a crypto unlock key for decrypting the second encrypted token to the first party.
46. A processor-implemented crypto asset digitizer method, comprising
    executing processor-implemented smart contract generating component instructions to:
        instantiate, via at least one processor, an aggregated crypto 2-party transaction trigger entry in a socially aggregated blockchain datastructure, wherein the aggregated crypto 2-party transaction trigger entry specifies at least one associated aggregated blockchain oracle that provides oracle data for evaluation via the aggregated crypto 2-party transaction trigger entry;
    executing processor-implemented smart contract fulfillment component instructions to:
        obtain, via at least one processor, a first encrypted token for the crypto 2-party transaction trigger entry from a first associated aggregated blockchain oracle, wherein the first encrypted token is for a first account data structure datastore having a crypto token asset value, wherein the first associated aggregated blockchain oracle is responsive to crypto tokens deposit activity of a first party;
        obtain, via at least one processor, a second encrypted token for the crypto 2-party transaction trigger entry from a second associated aggregated blockchain oracle, wherein the second encrypted token is for a second account data structure datastore having a crypto token asset value, wherein the second associated aggregated blockchain oracle is responsive to crypto tokens deposit activity of a second party;
        determine, via at least one processor, that an instantiated aggregated crypto 2-party transaction trigger entry unlock event occurred;
        facilitate, via at least one processor, unlocking the instantiated aggregated crypto 2-party transaction trigger entry based on the determination, and providing the first encrypted token to the second party and providing the second encrypted token to the first party.
47. The method of embodiment 46, wherein the aggregated crypto 2-party transaction trigger entry instantiated via a smart contract generator GUI.
48. The method of embodiment 47, wherein the smart contract generator GUI includes a payout structure drawing user interface component that facilitates obtaining a payout structure specification for a derivative from a user.
49. The method of embodiment 48, wherein the payout structure drawing user interface component facilitates obtaining a payout structure specification for the derivative based on a plurality of axis dimensions, and wherein each of the plurality of axis dimensions is associated with an aggregated blockchain oracle specified by the user.
50. The method of embodiment 46, wherein the first associated aggregated blockchain oracle and the second associated aggregated blockchain oracle are the same entity.
51. The method of embodiment 46, wherein at least one associated aggregated blockchain oracle provides crowdsourced decentralized data.
52. The method of embodiment 46, wherein at least one associated aggregated blockchain oracle provides combined crowdsourced decentralized weather data.

53. The method of embodiment 46, wherein the instantiated aggregated crypto 2-party transaction trigger entry unlock event is receipt of the first encrypted token and of the second encrypted token.
54. The method of embodiment 46, wherein the determination that the instantiated aggregated crypto 2-party transaction trigger entry unlock event occurred is made based on oracle data providable by a third associated aggregated blockchain oracle.
55. The method of embodiment 54, wherein the instantiated aggregated crypto 2-party transaction trigger entry unlock event is any of: anti-ping detection, detection of excess threshold account balance in an account data structure datastore, detection of excess threshold of aggregated blockchain oracle data value, detection of excess threshold number of transactions, detection of specified micro transaction amount, excess bounds of a smart contract generator GUI generated crypto smart rule, failure to login to $4^{th}$ party website, geofence transgression, user request.
56. The method of embodiment 54, wherein the first account data structure datastore or the second account data structure datastore has a crypto token asset for a trackable real world item.
57. The method of embodiment 56, wherein the trackable real world item is trackable via a constant video stream.
58. The method of embodiment 56, wherein the determination that the instantiated aggregated crypto 2-party transaction trigger entry unlock event occurred is conditioned on not receiving oracle data, indicating that the real world item was moved after it had been delivered to a designated location, from the third associated aggregated blockchain oracle.
59. The method of embodiment 46, wherein the first encrypted token is decryptable by a private key of the second party and the second encrypted token is decryptable by a private key of the first party.
60. The method of embodiment 46, further comprising:
executing processor-implemented smart contract fulfillment component instructions to:
facilitate providing a crypto unlock key for decrypting the first encrypted token to the second party and a crypto unlock key for decrypting the second encrypted token to the first party.
101. A crypto voting apparatus, comprising
a memory;
a component collection in the memory, including:
a processor disposed in communication with the memory, and configured to issue a plurality of processing instructions from the component collection stored in the memory,
wherein the processor issues instructions from the component collection, stored in the memory, to:
obtain crypto vote request from a voter,
determine voter eligibility for crypto voting;
search crypto vote database for eligible voting events for voter,
generate crypto vote user interface (UI) and provide the crypto vote UI to the voter,
obtain crypto vote selections from the voter, wherein the crypto vote selections are stored on a socially aggregated blockchain datastructure and include fractional crypto votes and crypto smart rules and associated aggregated blockchain oracles aggregating values;
evaluate the crypto votes including fractional crypto votes and crypto smart rules;
determine voting outcomes based on evaluation of the crypto votes.
102 The apparatus of embodiment 101, wherein the aggregated crypto trigger is any of: anti-ping detection, detection of excess threshold account balance, detection of excess threshold of aggregated blockchain oracle value, detection of excess threshold number of transactions, detection of specified micro transaction amount, excess bounds of a UI generated crypto smart rule, failure to login to $4^{th}$ party website, geofence transgression, user request.
103. The apparatus of embodiment 101, further, comprising
instantiate an aggregated crypto trigger in a socially aggregated blockchain datastructure and an associated aggregated blockchain oracle via socially blockchain entry component from crypto smart rule generator user interface (UI), wherein the associated aggregated blockchain oracle obtains socially aggregated values via socially aggregated blockchain datastructure entries for evaluation by the aggregated crypto trigger
provide voting outcomes to voting outcome requestors;
execute the instantiated aggregated triggers based on the determined voting outcomes;
execute crypto smart rules based on the determined voting outcomes.
104. A crypto recovery key apparatus, comprising:
a memory;
a component collection in the memory, including
a processor disposed in communication with the memory, and configured to issue a plurality of processing instructions from the component collection stored in the memory,
wherein the processor issues instructions from the component collection, stored in the memory, to:
obtain a crypto multi key wallet instantiation request from a user,
generate a multi key crypto wallet with multiple keys;
provide a $3^{rd}$ party public crypto key message for the multi key crypto wallet to the user, wherein the $3^{rd}$ party public crypto key message includes a $3^{rd}$ party public crypto key and is configured to allow the user to generate a private crypto key for the crypto multi key wallet and to instantiate the crypto multi key crypto wallet;
instantiate an aggregated crypto wallet failsafe trigger in a socially aggregated blockchain datastructure and an associated aggregated blockchain oracle via socially blockchain entry component from crypto smart rule generator user interface (UI), wherein the associated aggregated blockchain oracle obtains socially aggregated values via socially aggregated blockchain datastructure entries for evaluation by the aggregated crypto wallet failsafe trigger;
determine if aggregated crypto wallet failsafe trigger event occurred;
provide $3^{rd}$ party key to multi key crypto wallet upon determination of aggregated crypto wallet failsafe trigger event.
105. The apparatus of embodiment 104, wherein the aggregated crypto wallet failsafe trigger is any of: anti-ping detection, detection of excess threshold account balance, detection of excess threshold of aggregated blockchain oracle value, detection of excess threshold number of transactions, detection of specified micro transaction amount, excess bounds of a UI generated crypto smart rule, failure to login to $4^{th}$ party website, geofence transgression, user request.

106. A crypto asset digitizer apparatus, comprising:

a memory;

a component collection in the memory, including a processor disposed in communication with the memory, and configured to issue a plurality of processing instructions from the component collection stored in the memory, wherein the processor issues instructions from the component collection, stored in the memory, to:

instantiate an aggregated crypto 2-party transaction trigger in a socially aggregated blockchain datastructure and an associated aggregated blockchain oracle via socially blockchain entry component from crypto smart rule generator user interface (UI), wherein the associated aggregated blockchain oracle obtains socially aggregated values via socially aggregated blockchain datastructure entries for evaluation by the aggregated crypto 2-party transaction trigger, provide a crypto unlock key to the 2-party transaction trigger entry to a first party account;

provide a crypto unlock key to the 2-party transaction trigger entry to a second party account;

obtain an first encrypted token for the crypto 2-party transaction trigger form the first party account, wherein the encrypted token is for an account having an asset value;

obtain an second encrypted token for the crypto 2-party transaction trigger form the second party account;

determine an instantiated aggregated crypto 2-party transaction trigger event occurred;

unlock instantiated aggregated crypto 2-party transaction trigger entry based on determination and provide the first encrypted token to the second party and provide the second encrypted token to the first party;

provide aggregated 2-party transaction trigger values for unlocking tokens to first and second parties for unlocking encrypted tokens for access to token accounts.

107. The apparatus of embodiment 106, wherein the aggregated crypto 2-party transaction trigger is any of: anti-ping detection, detection of excess threshold account balance, detection of excess threshold of aggregated blockchain oracle value, detection of excess threshold number of transactions, detection of specified micro transaction amount, excess bounds of a UI generated crypto smart rule, failure to login to $4^{th}$ party website, geofence transgression, user request.

108. A crypto smart rules generator apparatus, comprising:

a memory;

a component collection in the memory, including a processor disposed in communication with the memory, and configured to issue a plurality of processing instructions from the component collection stored in the memory, wherein the processor issues instructions from the component collection, stored in the memory, to:

obtain selection for a crypto smart rule type form a user, provide a crypto smart rule generator user interface (UI) for the selection type;

obtain threshold constraint selections from the user, generate crypto smart rule from the constraint selections;

instantiate an aggregated crypto smart rules trigger in a socially aggregated blockchain datastructure and an associated aggregated blockchain oracle via socially blockchain entry component from the threshold constraint selections and crypto smart rule type obtained from crypto smart rule generator UI, wherein the associated aggregated blockchain oracle obtains socially aggregated values via socially aggregated blockchain datastructure entries for evaluation by the aggregated crypto trigger.

109. The apparatus of embodiment 108, wherein the aggregated crypto smart rules trigger is any of: anti-ping detection, detection of excess threshold account balance, detection of excess threshold of aggregated blockchain oracle value, detection of excess threshold number of transactions, detection of specified micro transaction amount, excess bounds of a UI generated crypto smart rule, failure to login to $4^{th}$ party website, geofence transgression, user request.

110. A crypto user authentication apparatus, comprising:

a memory;

a component collection in the memory, including a processor disposed in communication with the memory, and configured to issue a plurality of r processing instructions from the component collection stored in the memory, wherein the processor issues instructions from the component collection, stored in the memory, to:

obtain a user authentication request with a crypto wallet identifier from a requestor, cause an instantiation of a micro transaction to a crypto wallet associated to the crypto wallet identifier, wherein the micro transaction is of a crypto currency and wherein the transaction is any of a deposit or withdrawal type of a specified crypto trigger rule;

determine the specified amount of the micro transaction matches the specified crypto trigger rule;

provide indication of user authentication to the requestor.

111. The apparatus of embodiment 110, wherein the specified crypto trigger rule is an aggregated crypto smart rules trigger and is any of: anti-ping detection, detection of excess threshold account balance, detection of excess threshold of aggregated blockchain oracle value, detection of excess threshold number of transactions, detection of specified micro transaction amount, excess bounds of a UI generated crypto smart rule, failure to login to $4^{th}$ party website, geofence transgression, user request.

112. The apparatus of embodiment 111, wherein instantiation of the micro transaction is initiated by the requestor.

113. The apparatus of embodiment 112, wherein the specified amount is specified by the requestor.

114. The apparatus of embodiment 111, wherein the specified amount is specified by the requestor.

115. The apparatus of embodiment 114, wherein instantiation of the micro transaction is initiated by the requestor.

201. A crypto recovery key apparatus, comprising
a memory;
a component collection in the memory, including:
a multiple key account data structure datastore generating component; and
a crypto key recovery component;
a processor disposed in communication with the memory, and configured to issue a plurality of processing instructions from the component collection stored in the memory,
wherein the processor issues instructions from the multiple key account data structure datastore generating component, stored in the memory, to:
obtain, via at least one processor, a multiple key account data structure datastore generation request from a user,
determine, via at least one processor, a set of crypto public keys for a multiple key account data structure datastore;
instantiate, via at least one processor, the multiple key account data structure datastore in a socially aggregated blockchain datastructure using the determined set of crypto public keys;
associate, via at least one processor, a crypto recovery private key with the multiple key account data structure datastore;
set, via at least one processor, trigger event recovery settings for the multiple key account data structure datastore;
wherein the processor issues instructions from the crypto key recovery component, stored in the memory, to:
obtain, via at least one processor, a trigger event message associated with the multiple key account data structure datastore;
determine, via at least one processor, recovery settings associated with a trigger event specified in the trigger event message;
retrieve, via at least one processor, the crypto recovery private key; and
facilitate, via at least one processor, a recovery action, specified in the recovery settings, associated with the trigger event using the crypto recovery private key.

202. The apparatus of embodiment 201, wherein the multiple key account data structure datastore generation request specifies the set of crypto public keys and the crypto recovery private key.

203. The apparatus of embodiment 201, wherein the crypto recovery private key is encrypted.

204. The apparatus of embodiment 201, wherein instructions to instantiate the multiple key account data structure datastore in the socially aggregated blockchain datastructure further include instructions to add a multisignature address associated with the determined set of crypto public keys to the multiple key account data structure datastore.

205. The apparatus of embodiment 204, wherein the crypto recovery private key corresponds to a crypto public key in the set of crypto public keys.

206. The apparatus of embodiment 201, wherein the set of crypto public keys is a set of two crypto public keys, wherein the set of crypto public keys includes a normal use crypto public key and a recovery crypto public key.

207. The apparatus of embodiment 201, wherein the trigger event message is obtained from an aggregated blockchain oracle.

208. The apparatus of embodiment 207, wherein the aggregated blockchain oracle provides crowdsourced decentralized data.

209. The apparatus of embodiment 201, wherein the trigger event is any of: user request, occurrence of geofence constraint violation, anti-ping detection, occurrence of time range fencing violation, occurrence of transaction/consumption constraint violation, occurrence of account balance constraint violation, occurrence of specified oracle data value, occurrence of a smart contract generator GUI generated crypto smart rule violation, detection of fraud, detection of a specified vote, detection of a specified vote result, detection of a request to add an external feature to an account, detection of a specified crypto verification response, failure to login to $4^{th}$ party website.

210. The apparatus of embodiment 201, wherein instructions to retrieve the crypto recovery private key further include instructions to decrypt the crypto recovery private key using a decryption key provided by a validation server associated with the multiple key account data structure datastore.

211. The apparatus of embodiment 201, wherein instructions to facilitate the recovery action further include instructions to transfer crypto tokens associated with the multiple key account data structure datastore to a specified location.

212. The apparatus of embodiment 211, wherein the specified location is another multiple key account data structure datastore associated with the user.

213. The apparatus of embodiment 211, wherein the specified location is a specified multisignature address associated with the user, wherein the specified multisignature address is not associated with the multiple key account data structure datastore 214. The apparatus of embodiment 201, wherein instructions to facilitate the recovery action further include instructions to provide the crypto recovery private key to the user.

215. The apparatus of embodiment 201, wherein the trigger event recovery settings are obtained from the user via a smart contract generator GUI.

216. A processor-readable crypto recovery key non-transient physical medium storing processor-executable components, the components, comprising:
a component collection stored in the medium, including:
a multiple key account data structure datastore generating component; and
a crypto key recovery component;
wherein the multiple key account data structure datastore generating component, stored in the medium, includes processor-issuable instructions to:
obtain, via at least one processor, a multiple key account data structure datastore generation request from a user,
determine, via at least one processor, a set of crypto public keys for a multiple key account data structure datastore;
instantiate, via at least one processor, the multiple key account data structure datastore in a socially aggregated blockchain datastructure using the determined set of crypto public keys;

associate, via at least one processor, a crypto recovery private key with the multiple key account data structure datastore;

set, via at least one processor, trigger event recovery settings for the multiple key account data structure datastore;

wherein the crypto key recovery component, stored in the medium, includes processor-issuable instructions to:

obtain, via at least one processor, a trigger event message associated with the multiple key account data structure datastore;

determine, via at least one processor, recovery settings associated with a trigger event specified in the trigger event message;

retrieve, via at least one processor, the crypto recovery private key; and facilitate, via at least one processor, a recovery action, specified in the recovery settings, associated with the trigger event using the crypto recovery private key.

217. The medium of embodiment 216, wherein the multiple key account data structure datastore a generation request specifies the set of crypto public keys and the crypto recovery private key.

218. The medium of embodiment 216, wherein the crypto recovery private key is encrypted.

219. The medium of embodiment 216, wherein instructions to instantiate the multiple key account data structure datastore in the socially aggregated blockchain datastructure further include instructions to add a multisignature address associated with the determined set of crypto public keys to the multiple key account data structure datastore.

220. The medium of embodiment 219, wherein the crypto recovery private key corresponds to a crypto public key in the set of crypto public keys.

221. The medium of embodiment 216, wherein the set of crypto public keys is a set of two crypto public keys, wherein the set of crypto public keys includes a normal use crypto public key and a recovery crypto public key.

222. The medium of embodiment 216, wherein the trigger event message is obtained from an aggregated blockchain oracle.

223. The medium of embodiment 222, wherein the aggregated blockchain oracle provides crowdsourced decentralized data.

224. The medium of embodiment 216, wherein the trigger event is any of: user request, occurrence of geofence constraint violation, anti-ping detection, occurrence of time range fencing violation, occurrence of transaction/consumption constraint violation, occurrence of account balance constraint violation, occurrence of specified oracle data value, occurrence of a smart contract generator GUI generated crypto smart rule violation, detection of fraud, detection of a specified vote, detection of a specified vote result, detection of a request to add an external feature to an account, detection of a specified crypto verification response, failure to login to $4^{th}$ party website.

225. The medium of embodiment 216, wherein instructions to retrieve the crypto recovery private key further include instructions to decrypt the crypto recovery private key using a decryption key provided by a validation server associated with the multiple key account data structure datastore.

226. The medium of embodiment 216, wherein instructions to facilitate the recovery action further include instructions to transfer crypto tokens associated with the multiple key account data structure datastore to a specified location.

227. The medium of embodiment 226, wherein the specified location is another multiple key account data structure datastore associated with the user.

228. The medium of embodiment 226, wherein the specified location is a specified multisignature address associated with the user, wherein the specified multisignature address is not associated with the multiple key account data structure datastore 229. The medium of embodiment 216, wherein instructions to facilitate the recovery action further include instructions to provide the crypto recovery private key to the user.

230. The medium of embodiment 216, wherein the trigger event recovery settings are obtained from the user via a smart contract generator GUI.

231. A processor-implemented crypto recovery key system, comprising:

multiple key account data structure datastore generating component means, to:

obtain, via at least one processor, a multiple key account data structure datastore generation request from a user, determine, via at least one processor, a set of crypto public keys for a multiple key account data structure datastore;

instantiate, via at least one processor, the multiple key account data structure datastore in a socially aggregated blockchain datastructure using the determined set of crypto public keys;

associate, via at least one processor, a crypto recovery private key with the multiple key account data structure datastore;

set, via at least one processor, trigger event recovery settings for the multiple key account data structure datastore;

crypto key recovery component means, to:

obtain, via at least one processor, a trigger event message associated with the multiple key account data structure datastore;

determine, via at least one processor, recovery settings associated with a trigger event specified in the trigger event message;

retrieve, via at least one processor, the crypto recovery private key; and facilitate, via at least one processor, a recovery action, specified in the recovery settings, associated with the trigger event using the crypto recovery private key.

232. The system of embodiment 231, wherein the multiple key account data structure datastore generation request specifies the set of crypto public keys and the crypto recovery private key.

233. The system of embodiment 231, wherein the crypto recovery private key is encrypted.

234. The system of embodiment 231, wherein means to instantiate the multiple key account data structure datastore in the socially aggregated blockchain datastructure further include means to add a multisignature address associated with the determined set of crypto public keys to the multiple key account data structure datastore.

235. The system of embodiment 234, wherein the crypto recovery private key corresponds to a crypto public key in the set of crypto public keys.

236. The system of embodiment 231, wherein the set of crypto public keys is a set of two crypto public keys, wherein the set of crypto public keys includes a normal use crypto public key and a recovery crypto public key.

237. The system of embodiment 231, wherein the trigger event message is obtained from an aggregated blockchain oracle.

238. The system of embodiment 237, wherein the aggregated blockchain oracle provides crowdsourced decentralized data.

239. The system of embodiment 231, wherein the trigger event is any of: user request, occurrence of geofence constraint violation, anti-ping detection, occurrence of time range fencing violation, occurrence of transaction/consumption constraint violation, occurrence of account balance constraint violation, occurrence of specified oracle data value, occurrence of a smart contract generator GUI generated crypto smart rule violation, detection of fraud, detection of a specified vote, detection of a specified vote result, detection of a request to add an external feature to an account, detection of a specified crypto verification response, failure to login to $4^{th}$ party website.

240. The system of embodiment 231, wherein means to retrieve the crypto recovery private key further include means to decrypt the crypto recovery private key using a decryption key provided by a validation server associated with the multiple key account data structure datastore.

241. The system of embodiment 231, wherein means to facilitate the recovery action further include means to transfer crypto tokens associated with the multiple key account data structure datastore to a specified location.

242. The system of embodiment 241, wherein the specified location is another multiple key account data structure datastore associated with the user.

243. The system of embodiment 241, wherein the specified location is a specified multisignature address associated with the user, wherein the specified multisignature address is not associated with the multiple key account data structure datastore 244. The system of embodiment 231, wherein means to facilitate the recovery action further include means to provide the crypto recovery private key to the user.

245. The system of embodiment 231, wherein the trigger event recovery settings are obtained from the user via a smart contract generator GUI.

246. A processor-implemented crypto recovery key method, comprising.

executing processor-implemented multiple key account data structure datastore generating component instructions to:

obtain, via at least one processor, a multiple key account data structure datastore generation request from a user, determine, via at least one processor, a set of crypto public keys for a multiple key account data structure datastore;

instantiate, via at least one processor, the multiple key account data structure datastore in a a socially aggregated blockchain datastructure using the determined set of crypto public keys;

associate, via at least one processor, a crypto recovery private key with the multiple key account data structure datastore;

set, via at least one processor, trigger event recovery settings for the multiple key account data structure datastore;

executing processor-implemented crypto key recovery component instructions to:

obtain, via at least one processor, a trigger event message associated with the multiple key account data structure datastore;

determine, via at least one processor, recovery settings associated with a trigger event specified in the trigger event message;

retrieve, via at least one processor, the crypto recovery private key; and facilitate, via at least one processor, a recovery action, specified in the recovery settings, associated with the trigger event using the crypto recovery private key.

247. The method of embodiment 246, wherein the multiple key account data structure datastore generation request specifies the set of crypto public keys and the crypto recovery private key.

248. The method of embodiment 246, wherein the crypto recovery private key is encrypted.

249. The method of embodiment 246, wherein instructions to instantiate the multiple key account data structure datastore in the socially aggregated blockchain datastructure further include instructions to add a multisignature address associated with the determined set of crypto public keys to the multiple key account data structure datastore.

250. The method of embodiment 249, wherein the crypto recovery private key corresponds to a crypto public key in the set of crypto public keys.

251. The method of embodiment 246, wherein the set of crypto public keys is a set of two crypto public keys, wherein the set of crypto public keys includes a normal use crypto public key and a recovery crypto public key.

252. The method of embodiment 246, wherein the trigger event message is obtained from an aggregated blockchain oracle.

253. The method of embodiment 252, wherein the aggregated blockchain oracle provides r crowdsourced decentralized data.

254. The method of embodiment 246, wherein the trigger event is any of: user request, occurrence of geofence constraint violation, anti-ping detection, occurrence of time range fencing violation, occurrence of transaction/consumption constraint violation, occurrence of account balance constraint violation, occurrence of specified oracle data value, occurrence of a smart contract generator GUI generated crypto smart rule violation, detection of fraud, detection of a specified vote, detection of a specified vote result, detection of a request to add an external feature to an account, detection of a specified crypto verification response, failure to login to $4^{th}$ party website.

255. The method of embodiment 246, wherein instructions to retrieve the crypto recovery private key further include instructions to decrypt the crypto recovery private key using a decryption key provided by a validation server associated with the multiple key account data structure datastore.

256. The method of embodiment 246, wherein instructions to facilitate the recovery action further include instructions to transfer crypto tokens associated with the multiple key account data structure datastore to a specified location.

257. The method of embodiment 256, wherein the specified location is another multiple key account data structure datastore associated with the user.

258. The method of embodiment 256, wherein the specified location is a specified multisignature address associated with the user, wherein the specified multisignature address is not associated with the multiple key account data structure datastore 259. The method of embodiment 246, wherein instructions to facilitate the recovery action further include instructions to provide the crypto recovery private key to the user.

260. The method of embodiment 246, wherein the trigger event recovery settings are obtained from the user via a smart contract generator GUI.

301. A crypto voting apparatus, comprising:

a memory;

a component collection in the memory, including a voter authentication component; and a vote processing component;

a processor disposed in communication with the memory, and configured to issue a plurality of processing instructions from the component collection stored in the memory, wherein the processor issues instructions from the voter authentication component, stored in the memory, to:

obtain, via at least one processor, a crypto vote request associated with a poll from a user, obtain, via at least one processor, voter authentication from the user, determine, via at least one processor, that the user is authorized to vote in the poll based on the obtained voter authentication data;

generate, via at least one processor, an authentication token for the authorized user, generate, via at least one processor, a crypto vote user interface (UI) and provide the crypto vote UI to the user, wherein the processor issues instructions from the vote processing component, stored in the memory, to:

obtain, via at least one processor, a crypto vote input from the user, wherein the crypto vote input specifies a conditional vote, wherein the conditional vote includes a set of vote conditions, and wherein each vote condition in the set of vote conditions is associated with a vote outcome and with an aggregated blockchain oracle;

instantiate, via at least one processor, the conditional vote in a socially aggregated blockchain datastructure;

determine, via at least one processor, that a vote condition in the set of vote conditions has been satisfied by evaluating aggregated blockchain oracle data provided by the aggregated blockchain oracle associated with the determined vote condition; and determine, via at least one processor, vote outcome of the conditional vote as the vote outcome associated with the determined vote condition.

302. The apparatus of embodiment 301, wherein instructions to obtain voter authentication further include instructions to obtain login credentials for an account created based on the user providing proof of identity.

303. The apparatus of embodiment 301, wherein instructions to obtain voter authentication further include instructions to detect that the user satisfied a smart contract instantiated in the socially aggregated blockchain datastructure.

304. The apparatus of embodiment 303, wherein the user satisfies the smart contract by transferring a crypto token from a crypto address known to belong to the user.

305. The apparatus of embodiment 301, wherein instructions to determine that the user is authorized to vote in the poll further include instructions to detect that the user is on a voters list associated with the poll.

306. The apparatus of embodiment 301, wherein the authentication token is generated such that the user's identity cannot be determined from the authentication token.

307. The apparatus of embodiment 301, wherein the crypto vote UI is a smart contract generator GUI.

308. The apparatus of embodiment 301, wherein an aggregated blockchain oracle is any of: a market data provider, a GPS data provider, a date/time provider, a crowdsourced decentralized data provider, a news provider, an activity monitor, an RSS feed.

309. The apparatus of embodiment 301, wherein a vote outcome associated with a vote condition is a fractional vote that specifies a plurality of vote outcomes and a voting power portion allocated to each of the plurality of vote outcomes.

310. The apparatus of embodiment 301, wherein the instantiated conditional vote is encrypted.

311. The apparatus of embodiment 301, wherein the evaluated aggregated blockchain oracle data is combined crowdsourced decentralized product usage data.

312. The apparatus of embodiment 301, further comprising:

the processor issues instructions from the vote processing component, stored in the memory, to:

facilitate a vote action associated with the determined vote outcome of the conditional vote.

313. The apparatus of embodiment 312, wherein the vote action is any of: restrict access to an account, release an extra key, purchase stock, vote in a specified way in another poll.

314. The apparatus of embodiment 312, wherein the evaluated aggregated blockchain oracle data includes securities transactions associated with an entity.

315. The apparatus of embodiment 314, wherein the vote action is to replicate the securities transactions of the entity.

316. A processor-readable crypto voting non-transient physical medium storing processor-executable components, the components, comprising:

a component collection stored in the medium, including a voter authentication component; and a vote processing component;

wherein the voter authentication component, stored in the medium, includes processor-issuable instructions to:

obtain, via at least one processor, a crypto vote request associated with a poll from a user, obtain, via at least one processor, voter authentication from the user, determine, via at least one processor, that the user is authorized to vote in the poll based on the obtained voter authentication data;

generate, via at least one processor, an authentication token for the authorized user, generate, via at least one processor, a crypto vote user interface (UI) and provide the crypto vote UI to the user, wherein the vote processing component, stored in the medium, includes processor-issuable instructions to:

obtain, via at least one processor, a crypto vote input from the user, wherein the crypto vote input specifies a conditional vote, wherein the conditional vote includes a set of vote conditions, and wherein each vote condition in the set of vote conditions is associated with a vote outcome and with an aggregated blockchain oracle;

instantiate, via at least one processor, the conditional vote in a socially aggregated blockchain datastructure;

determine, via at least one processor, that a vote condition in the set of vote conditions has been satisfied by evaluating aggregated blockchain oracle data provided by the aggregated blockchain oracle associated with the determined vote condition; and determine, via at least one processor, vote outcome of the conditional vote as the vote outcome associated with the determined vote condition.

317. The medium of embodiment 316, wherein instructions to obtain voter authentication further include instructions to obtain login credentials for an account created based on the user providing proof of identity.

318. The medium of embodiment 316, wherein instructions to obtain voter authentication further include instructions to detect that the user satisfied a smart contract instantiated in the socially aggregated blockchain datastructure.

319. The medium of embodiment 318, wherein the user satisfies the smart contract by transferring a crypto token from a crypto address known to belong to the user.

320. The medium of embodiment 316, wherein instructions to determine that the user is authorized to vote in the poll further include instructions to detect that the user is on a voters list associated with the poll.

321. The medium of embodiment 316, wherein the authentication token is generated such that the user's identity cannot be determined from the authentication token.

322. The medium of embodiment 316, wherein the crypto vote UI is a smart contract generator GUI.

323. The medium of embodiment 316, wherein an aggregated blockchain oracle is any of: a market data provider, a GPS data provider, a date/time provider, a crowdsourced decentralized data provider, a news provider, an activity monitor, an RSS feed.

324. The medium of embodiment 316, wherein a vote outcome associated with a vote condition is a fractional vote that specifies a plurality of vote outcomes and a voting power portion allocated to each of the plurality of vote outcomes.

325. The medium of embodiment 316, wherein the instantiated conditional vote is encrypted.

326. The medium of embodiment 316, wherein the evaluated aggregated blockchain oracle data is combined crowdsourced decentralized product usage data.

327. The medium of embodiment 316, further comprising.

the vote processing component, stored in the medium, includes processor-issuable instructions to:

facilitate a vote action associated with the determined vote outcome of the conditional vote.

328. The medium of embodiment 327, wherein the vote action is any of: restrict access to an account, release an extra key, purchase stock, vote in a specified way in another poll.

329. The medium of embodiment 327, wherein the evaluated aggregated blockchain oracle data includes securities transactions associated with an entity.

330. The medium of embodiment 329, wherein the vote action is to replicate the securities transactions of the entity.

331. A processor-implemented crypto voting system, comprising:

voter authentication component means, to:

obtain, via at least one processor, a crypto vote request associated with a poll from a user, obtain, via at least one processor, voter authentication from the user, determine, via at least one processor, that the user is authorized to vote in the poll based on the obtained voter authentication data;

generate, via at least one processor, an authentication token for the authorized user, generate, via at least one processor, a crypto vote user interface (UI) and provide the crypto vote UI to the user, vote processing component means, to:

obtain, via at least one processor, a crypto vote input from the user, wherein the crypto vote input specifies a conditional vote, wherein the conditional vote includes a set of vote conditions, and wherein each vote condition in the set of vote conditions is associated with a vote outcome and with an aggregated blockchain oracle;

instantiate, via at least one processor, the conditional vote in a socially aggregated blockchain datastructure;

determine, via at least one processor, that a vote condition in the set of vote conditions has been satisfied by evaluating aggregated blockchain oracle data provided by the aggregated blockchain oracle associated with the determined vote condition; and determine, via at least one processor, vote outcome of the conditional vote as the vote outcome associated with the determined vote condition.

332. The system of embodiment 331, wherein means to obtain voter authentication further include means to obtain login credentials for an account created based on the user providing proof of identity.

333. The system of embodiment 331, wherein means to obtain voter authentication further include means to detect that the user satisfied a smart contract instantiated in the socially aggregated blockchain datastructure.

334. The system of embodiment 333, wherein the user satisfies the smart contract by transferring a crypto token from a crypto address known to belong to the user.

335. The system of embodiment 331, wherein means to determine that the user is authorized to vote in the poll further include means to detect that the user is on a voters list associated with the poll.

336. The system of embodiment 331, wherein the authentication token is generated such that the user's identity cannot be determined from the authentication token.

337. The system of embodiment 331, wherein the crypto vote UI is a smart contract generator GUI.

338. The system of embodiment 331, wherein an aggregated blockchain oracle is any of: a market data provider, a GPS data provider, a date/time provider, a crowdsourced decentralized data provider, a news provider, an activity monitor, an RSS feed.

339. The system of embodiment 331, wherein a vote outcome associated with a vote condition is a fractional vote that specifies a plurality of vote outcomes and a voting power portion allocated to each of the plurality of vote outcomes.

340. The system of embodiment 331, wherein the instantiated conditional vote is encrypted.

341. The system of embodiment 331, wherein the evaluated aggregated blockchain oracle data is combined crowdsourced decentralized product usage data.

342. The system of embodiment 331, further comprising. the vote processing component means, to:

facilitate a vote action associated with the determined vote outcome of the conditional vote.

343. The system of embodiment 342, wherein the vote action is any of: restrict access to an account, release an extra key, purchase stock, vote in a specified way in another poll.

344. The system of embodiment 342, wherein the evaluated aggregated blockchain oracle data includes securities transactions associated with an entity.

345. The system of embodiment 344, wherein the vote action is to replicate the securities transactions of the entity.

346. A processor-implemented crypto voting method, comprising executing processor-implemented voter authentication component instructions to:

obtain, via at least one processor, a crypto vote request associated with a poll from a user, obtain, via at least one processor, voter authentication from the user, determine, via at least one processor, that the user is authorized to vote in the poll based on the obtained voter authentication data;

generate, via at least one processor, an authentication token for the authorized user, generate, via at least one processor, a crypto vote user interface (UI) and provide the crypto vote UI to the user, executing processor-implemented vote processing component instructions to:

obtain, via at least one processor, a crypto vote input from the user, wherein the crypto vote input specifies a conditional vote, wherein the conditional vote includes a set of vote conditions, and wherein each vote condition in the set of vote conditions is associated with a vote outcome and with an aggregated blockchain oracle;

instantiate, via at least one processor, the conditional vote in a socially aggregated blockchain datastructure;

determine, via at least one processor, that a vote condition in the set of vote conditions has been satisfied by evaluating aggregated blockchain oracle data provided by the aggregated blockchain oracle associated with the determined vote condition; and determine, via at least one processor, vote outcome of the conditional vote as the vote outcome associated with the determined vote condition.

347. The method of embodiment 346, wherein instructions to obtain voter authentication further include instructions to obtain login credentials for an account created based on the user providing proof of identity.

348. The method of embodiment 346, wherein instructions to obtain voter authentication further include instructions to detect that the user satisfied a smart contract instantiated in the socially aggregated blockchain datastructure.

349. The method of embodiment 348, wherein the user satisfies the smart contract by transferring a crypto token from a crypto address known to belong to the user.

350. The method of embodiment 346, wherein instructions to determine that the user is authorized to vote in the poll further include instructions to detect that the user is on a voters list associated with the poll.

351. The method of embodiment 346, wherein the authentication token is generated such that the user's identity cannot be determined from the authentication token.

352. The method of embodiment 346, wherein the crypto vote UI is a smart contract generator GUI.

353. The method of embodiment 346, wherein an aggregated blockchain oracle is any of: a market data provider, a GPS data provider, a date/time provider, a crowdsourced decentralized data provider, a news provider, an activity monitor, an RSS feed.

354. The method of embodiment 346, wherein a vote outcome associated with a vote condition is a fractional vote that specifies a plurality of vote outcomes and a voting power portion allocated to each of the plurality of vote outcomes.

355. The method of embodiment 346, wherein the instantiated conditional vote is encrypted.

356. The method of embodiment 346, wherein the evaluated aggregated blockchain oracle data is combined crowdsourced decentralized product usage data.

357. The method of embodiment 346, further comprising:

executing processor-implemented vote processing component instructions to:

facilitate a vote action associated with the determined vote outcome of the conditional vote.

358. The method of embodiment 357, wherein the vote action is any of: restrict access to an account, release an extra key, purchase stock, vote in a specified way in another poll.

359. The method of embodiment 357, wherein the evaluated aggregated blockchain oracle data includes securities transactions associated with an entity.

360. The method of embodiment 359, wherein the vote action is to replicate the securities transactions of the entity.

401. A crypto verification apparatus, comprising.

a memory;

a component collection in the memory, including.

a verification processing component;

a processor disposed in communication with the memory, and configured to issue a plurality of processing instructions from the component collection stored in the memory, wherein the processor issues instructions from the verification processing component, stored in the memory, to:

obtain, via at least one processor, an external feature add request associated with a participant account data structure from an authenticated user, wherein the external feature add request identifies an external feature to associate with the participant account data structure;

determine, via at least one processor, a verification standard for the external feature add request;

determine, via at least one processor, verification data parameters to obtain from the a authenticated user based on the determined verification standard, wherein the verification data parameters include a specification of one or more crypto tokens to be transferred by the authenticated user, determine, via at least one processor, a verification address for the external feature;

generate, via at least one processor, a crypto verification request that specifies the verification data parameters to obtain from the authenticated user and the verification address from which the one or more crypto tokens are to be transferred;

provide, via at least one processor, the crypto verification request to the authenticated user, obtain, via at least one processor, a crypto verification response from the authenticated user, wherein the crypto verification response comprises a verification transaction in a socially aggregated blockchain datastructure; and modify, via at least one processor, the participant account data structure to indicate association with the external feature based on determining that the verification transaction satisfies the specified verification data parameters.

402. The apparatus of embodiment 401, wherein the participant account data structure is associated with a multiple key account data structure datastore.

403. The apparatus of embodiment 401, wherein the external feature is a third party electronic wallet.

404. The apparatus of embodiment 401, wherein the external feature add request specifies a linked service where the external feature is to be utilized.

405. The apparatus of embodiment 404, wherein the verification standard is specific to the linked service.

406. The apparatus of embodiment 401, wherein the verification standard is based on a smart contract generator GUI generated crypto smart rule.

407. The apparatus of embodiment 401, wherein the verification data parameters include one or more of: a verification string, a verification amount, location data, a time stamp, metadata, UI triggerables.

408. The apparatus of embodiment 403, further comprising:

the processor issues instructions from the verification processing component, stored in the memory, to:

transfer the one or more crypto tokens to the third party electronic wallet.

409. The apparatus of embodiment 408, wherein the one or more crypto tokens include encrypted crypto token data encrypted with a public key associated with the third party electronic wallet.

410. The apparatus of embodiment 401, wherein instructions to generate a crypto verification request further include instructions to instantiate a crypto smart contract in a socially aggregated blockchain datastructure.

411. The apparatus of embodiment 410, wherein instructions to determine that the verification transaction satisfies the specified verification data parameters further include instructions to detect that the verification transaction satisfies the crypto smart contract instantiated in the socially aggregated blockchain datastructure.

412. The apparatus of embodiment 410, wherein the crypto smart contract specifies an aggregated blockchain oracle associated with a verification data parameter.

413. The apparatus of embodiment 412, wherein an aggregated blockchain oracle is any of: a market data provider, a GPS data provider, a date/time provider, a crowdsourced decentralized data provider, a news provider, an activity monitor, an RSS feed.

414. The apparatus of embodiment 413, wherein an RSS feed is any of: an aggregated mobile phone data feed, a social network feed, a news feed, a market data feed.

415. The apparatus of embodiment 412, wherein instructions to determine that the verification transaction satisfies the specified verification data parameters further include instructions to detect that the verification transaction satisfies the crypto smart contract instantiated in the socially aggregated blockchain datastructure based on oracle data provided by the aggregated blockchain oracle.

416. A processor-readable crypto verification non-transient physical medium storing processor-executable components, the components, comprising:

a component collection stored in the medium, including a verification processing component;

wherein the verification processing component, stored in the medium, includes processor-issuable instructions to:

obtain, via at least one processor, an external feature add request associated with a participant account data structure from an authenticated user, wherein the external feature add request identifies an external feature to associate with the participant account data structure;

determine, via at least one processor, a verification standard for the external feature add request;

determine, via at least one processor, verification data parameters to obtain from the authenticated user based on the determined verification standard, wherein the verification data parameters include a specification of one or more crypto tokens to be transferred by the authenticated user, determine, via at least one processor, a verification address for the external feature;

generate, via at least one processor, a crypto verification request that specifies the verification data parameters to obtain from the authenticated user and the verification address from which the one or more crypto tokens are to be transferred;

provide, via at least one processor, the crypto verification request to the authenticated user, obtain, via at least one processor, a crypto verification response from the authenticated user, wherein the crypto verification response comprises a verification transaction in a socially aggregated blockchain datastructure; and modify, via at least one processor, the participant account data structure to indicate association with the external feature based on determining that the verification transaction satisfies the specified verification data parameters.

417. The medium of embodiment 416, wherein the participant account data structure is associated with a multiple key account data structure datastore.

418. The medium of embodiment 416, wherein the external feature is a third party electronic wallet.

419. The medium of embodiment 416, wherein the external feature add request specifies a linked service where the external feature is to be utilized.

420. The medium of embodiment 419, wherein the verification standard is specific to the linked service.

421. The medium of embodiment 416, wherein the verification standard is based on a smart contract generator GUI generated crypto smart rule.

422. The medium of embodiment 416, wherein the verification data parameters include one or more of: a verification string, a verification amount, location data, a time stamp, metadata, UI triggerables.

423. The medium of embodiment 418, further comprising:

the verification processing component, stored in the medium, includes processor-issuable instructions to:

transfer the one or more crypto tokens to the third party electronic wallet.

424. The medium of embodiment 423, wherein the one or more crypto tokens include encrypted crypto token data encrypted with a public key associated with the third party electronic wallet.

425. The medium of embodiment 416, wherein instructions to generate a crypto verification request further include instructions to instantiate a crypto smart contract in a socially aggregated blockchain datastructure.

426. The medium of embodiment 425, wherein instructions to determine that the verification transaction satisfies the specified verification data parameters further include instructions to detect that the verification transaction satisfies the crypto smart contract instantiated in the socially aggregated blockchain datastructure.

427. The medium of embodiment 425, wherein the crypto smart contract specifies an aggregated blockchain oracle associated with a verification data parameter.

428. The medium of embodiment 427, wherein an aggregated blockchain oracle is any of: a market data provider, a GPS data provider, a date/time provider, a crowdsourced decentralized data provider, a news provider, an activity monitor, an RSS feed.

429. The medium of embodiment 428, wherein an RSS feed is any of: an aggregated mobile phone data feed, a social network feed, a news feed, a market data feed.

430. The medium of embodiment 427, wherein instructions to determine that the verification transaction satisfies the specified verification data parameters further include instructions to detect that the verification transaction satisfies the crypto smart contract instantiated in the socially aggregated blockchain datastructure based on oracle data provided by the aggregated blockchain oracle.

431. A processor-implemented crypto verification system, comprising:

verification processing component means, to:

obtain, via at least one processor, an external feature add request associated with a participant account data structure from an authenticated user, wherein the external feature add request identifies an external feature to associate with the participant account data structure;

determine, via at least one processor, a verification standard for the external feature add request;

determine, via at least one processor, verification data parameters to obtain from the authenticated user based on the determined verification standard, wherein the verification data parameters include a specification of one or more crypto tokens to be transferred by the authenticated user, determine, via at least one processor, a verification address for the external feature;

generate, via at least one processor, a crypto verification request that specifies the verification data parameters to obtain from the authenticated user and the verification address from which the one or more crypto tokens are to be transferred;

provide, via at least one processor, the crypto verification request to the authenticated user, obtain, via at least one processor, a crypto verification response from the authenticated user, wherein the crypto verification response comprises a verification transaction in a socially aggregated blockchain datastructure; and modify, via at least one processor, the participant account data structure to indicate association with the external feature based on determining that the verification transaction satisfies the specified verification data parameters.

432. The system of embodiment 431, wherein the participant account data structure is associated with a multiple key account data structure datastore.

433. The system of embodiment 431, wherein the external feature is a third party electronic wallet.

434. The system of embodiment 431, wherein the external feature add request specifies a linked service where the external feature is to be utilized.

435. The system of embodiment 434, wherein the verification standard is specific to the linked r service.

436. The system of embodiment 431, wherein the verification standard is based on a smart contract generator GUI generated crypto smart rule.

437. The system of embodiment 431, wherein the verification data parameters include one or more of: a verification string, a verification amount, location data, a time stamp, metadata, UI triggerables.

438. The system of embodiment 433, further comprising:

verification processing component means, to:

transfer the one or more crypto tokens to the third party electronic wallet.

439. The system of embodiment 438, wherein the one or more crypto tokens include encrypted crypto token data encrypted with a public key associated with the third party electronic wallet.

440. The system of embodiment 431, wherein means to generate a crypto verification request further include means to instantiate a crypto smart contract in a socially aggregated blockchain datastructure.

441. The system of embodiment 440, wherein means to determine that the verification transaction satisfies the specified verification data parameters further include means to detect that the verification transaction satisfies the crypto smart contract instantiated in the socially aggregated blockchain datastructure.

442. The system of embodiment 440, wherein the crypto smart contract specifies an aggregated blockchain oracle associated with a verification data parameter.

443. The system of embodiment 442, wherein an aggregated blockchain oracle is any of: a market data provider, a GPS data provider, a date/time provider, a crowdsourced decentralized data provider, a news provider, an activity monitor, an RSS feed.

444. The system of embodiment 443, wherein an RSS feed is any of: an aggregated mobile phone data feed, a social network feed, a news feed, a market data feed.

445. The system of embodiment 442, wherein means to determine that the verification transaction satisfies the specified verification data parameters further include means to detect that the verification transaction satisfies the crypto smart contract instantiated in the socially aggregated blockchain datastructure based on oracle data provided by the aggregated blockchain oracle.

446. A processor-implemented crypto verification method, comprising:

executing processor-implemented verification processing component instructions to:

obtain, via at least one processor, an external feature add request associated with a participant account data structure from an authenticated user, wherein the external feature add request identifies an external feature to associate with the participant account data structure;

determine, via at least one processor, a verification standard for the external feature add request;

determine, via at least one processor, verification data parameters to obtain from the authenticated user based on the determined verification standard, wherein the verification data parameters include a specification of one or more crypto tokens to be transferred by the authenticated user, determine, via at least one processor, a verification address for the external feature;

generate, via at least one processor, a crypto verification request that specifies the verification data parameters to obtain from the authenticated user and the verification address from which the one or more crypto tokens are to be transferred;

provide, via at least one processor, the crypto verification request to the authenticated user, obtain, via at least one processor, a crypto verification response from the authenticated user, wherein the crypto verification response comprises a verification transaction in a socially aggregated blockchain datastructure; and modify, via at least one processor, the participant account data structure to indicate association with the external feature based on determining that the verification transaction satisfies the specified verification data parameters.

447. The method of embodiment 446, wherein the participant account data structure is associated with a multiple key account data structure datastore.

448. The method of embodiment 446, wherein the external feature is a third party electronic wallet.

449. The method of embodiment 446, wherein the external feature add request specifies a linked service where the external feature is to be utilized.

450. The method of embodiment 449, wherein the verification standard is specific to the linked r service.

451. The method of embodiment 446, wherein the verification standard is based on a smart contract generator GUI generated crypto smart rule.

452. The method of embodiment 446, wherein the verification data parameters include one or more of: a verification string, a verification amount, location data, a time stamp, metadata, UI triggerables.

453. The method of embodiment 448, further comprising:

executing processor-implemented verification processing component instructions to:

transfer the one or more crypto tokens to the third party electronic wallet.

454. The method of embodiment 453, wherein the one or more crypto tokens include encrypted crypto token data encrypted with a public key associated with the third party electronic wallet.

455. The method of embodiment 446, wherein instructions to generate a crypto verification request further include instructions to instantiate a crypto smart contract in a socially aggregated blockchain datastructure.

456. The method of embodiment 455, wherein instructions to determine that the verification transaction satisfies the specified verification data parameters further include instructions to detect that the verification transaction satisfies the crypto smart contract instantiated in the socially aggregated blockchain datastructure.

457. The method of embodiment 455, wherein the crypto smart contract specifies an aggregated blockchain oracle associated with a verification data parameter.

458. The method of embodiment 457, wherein an aggregated blockchain oracle is any of: a market data provider, a GPS data provider, a date/time provider, a crowdsourced decentralized data provider, a news provider, an activity monitor, an RSS feed.

459. The method of embodiment 458, wherein an RSS feed is any of: an aggregated mobile phone data feed, a social network feed, a news feed, a market data feed.

460. The method of embodiment 457, wherein instructions to determine that the verification transaction satisfies the specified verification data parameters further include instructions to detect that the verification transaction satisfies the crypto smart contract instantiated in the socially aggregated blockchain datastructure based on oracle data provided by the aggregated blockchain oracle.

501. A crypto smart rules generator apparatus, comprising:

a memory;

a component collection in the memory, including a smart contract generating component;

a processor disposed in communication with the memory, and configured to issue a plurality of processing instructions from the component collection stored in the memory, wherein the processor issues instructions from the smart contract generating component, stored in the memory, to:

obtain, via at least one processor, a selection, from a user, of a crypto smart rule type for a crypto smart rule associated with an aggregated crypto transaction trigger entry;

provide, via at least one processor, a crypto smart rule generator user interface (UI) for the selected crypto smart rule type;

obtain, via at least one processor, a selection, from the user via the UI, of a threshold constraint for the crypto smart rule;

obtain, via at least one processor, a selection, from the user via the UI, of an aggregated blockchain oracle that provides oracle data for evaluation via the aggregated crypto transaction trigger entry for the crypto smart rule;

generate, via at least one processor, the aggregated crypto transaction trigger entry based on the selected threshold constraint and the selected aggregated blockchain oracle for the crypto smart rule; and instantiate, via at least one processor, the aggregated crypto transaction trigger entry in a socially aggregated blockchain datastructure.

502. The apparatus of embodiment 501, wherein the aggregated blockchain oracle is another aggregated crypto transaction trigger entry in a socially aggregated blockchain datastructure.

503. The apparatus of embodiment 501, wherein the aggregated blockchain oracle is any of: a market data provider, a GPS data provider, a date/time provider, a crowdsourced decentralized data provider, a news provider, an activity monitor, an RSS feed.

504. The apparatus of embodiment 503, wherein an RSS feed is any of: an aggregated mobile phone data feed, a social network feed, a news feed, a market data feed.

505. The apparatus of embodiment 501, wherein the aggregated blockchain oracle provides crowdsourced decentralized data.

506. The apparatus of embodiment 501, wherein the threshold constraint associated with the instantiated aggregated crypto transaction trigger entry is based on any of: anti-ping detection, detection of excess threshold account balance in an account data structure datastore, detection of excess threshold of aggregated blockchain oracle data value, detection of excess threshold number of transactions, detection of specified micro transaction amount, excess bounds of a smart contract generator GUI generated crypto smart rule, failure to login to $4^{th}$ party website, geofence transgression, user request.

507. The apparatus of embodiment 501, wherein the threshold constraint is cascading and includes at least two levels.

508. The apparatus of embodiment 501, wherein the instantiated aggregated crypto transaction trigger entry is configured to facilitate an action upon satisfaction of the crypto smart rule, wherein the action is any of: exchange assets between counterparties, restrict access to an account data structure datastore, release an extra key associated with an account data structure datastore, purchase stock, vote in a specified way.

509. The apparatus of embodiment 501, wherein the UI includes a chart component.

510. The apparatus of embodiment 501, wherein the UI includes a geographic map component.

511. A processor-readable crypto smart rules generator non-transient physical medium storing processor-executable components, the components, comprising:

a component collection stored in the medium, including a smart contract generating component;

wherein the smart contract generating component, stored in the medium, includes processor-issuable instructions to:

obtain, via at least one processor, a selection, from a user, of a crypto smart rule type for a crypto smart rule associated with an aggregated crypto transaction trigger entry;

provide, via at least one processor, a crypto smart rule generator user interface (UI) for the selected crypto smart rule type;

obtain, via at least one processor, a selection, from the user via the UI, of a threshold constraint for the crypto smart rule;

obtain, via at least one processor, a selection, from the user via the UI, of an aggregated blockchain oracle that provides oracle data for evaluation via the aggregated crypto transaction trigger entry for the crypto smart rule;

generate, via at least one processor, the aggregated crypto transaction trigger entry based on the selected threshold constraint and the selected aggregated blockchain oracle for the crypto smart rule; and instantiate, via at least one processor, the aggregated crypto transaction trigger entry in a socially aggregated blockchain datastructure.

512. The medium of embodiment 511, wherein the aggregated blockchain oracle is another aggregated crypto transaction trigger entry in a socially aggregated blockchain datastructure.

513. The medium of embodiment 511, wherein the aggregated blockchain oracle is any of: a market data provider, a GPS data provider, a date/time provider, a crowdsourced decentralized data provider, a news provider, an activity monitor, an RSS feed.

514. The medium of embodiment 513, wherein an RSS feed is any of: an aggregated mobile phone data feed, a social network feed, a news feed, a market data feed.

515. The medium of embodiment 511, wherein the aggregated blockchain oracle provides crowdsourced decentralized data.

516. The medium of embodiment 511, wherein the threshold constraint associated with the instantiated aggregated crypto transaction trigger entry is based on any of: anti-ping detection, detection of excess threshold account balance in an account data structure datastore, detection of excess threshold of aggregated blockchain oracle data value, detection of excess threshold number of transactions, detection of specified micro transaction amount, excess bounds of a smart contract generator GUI generated crypto smart rule, failure to login to $4^{th}$ party website, geofence transgression, user request.

517. The medium of embodiment 511, wherein the threshold constraint is cascading and includes at least two levels.

518. The medium of embodiment 511, wherein the instantiated aggregated crypto transaction trigger entry is configured to facilitate an action upon satisfaction of the crypto smart rule, wherein the action is any of: exchange assets between counterparties, restrict access an account data structure datastore, release an extra key associated with an account data structure datastore, purchase stock, vote in a specified way.

519. The medium of embodiment 511, wherein the UI includes a chart component.

520. The medium of embodiment 511, wherein the UI includes a geographic map component.

521. A processor-implemented crypto smart rules generator system, comprising:

smart contract generating component means, to:

obtain, via at least one processor, a selection, from a user, of a crypto smart rule type for a crypto smart rule associated with an aggregated crypto transaction trigger entry;

provide, via at least one processor, a crypto smart rule generator user interface (UI) for the selected crypto smart rule type;

obtain, via at least one processor, a selection, from the user via the UI, of a threshold constraint for the crypto smart rule;

obtain, via at least one processor, a selection, from the user via the UI, of an aggregated blockchain oracle that provides oracle data for evaluation via the aggregated crypto transaction trigger entry for the crypto smart rule;

generate, via at least one processor, the aggregated crypto transaction trigger entry based on the selected threshold constraint and the selected aggregated blockchain oracle for the crypto smart rule; and instantiate, via at least one processor, the aggregated crypto transaction trigger entry in a socially aggregated blockchain datastructure.

522. The system of embodiment 521, wherein the aggregated blockchain oracle is another a aggregated crypto transaction trigger entry in a socially aggregated blockchain datastructure.

523. The system of embodiment 521, wherein the aggregated blockchain oracle is any of: a market data provider, a GPS data provider, a date/time provider, a crowdsourced decentralized data provider, a news provider, an activity monitor, an RSS feed.

524. The system of embodiment 523, wherein an RSS feed is any of: an aggregated mobile phone data feed, a social network feed, a news feed, a market data feed.

525. The system of embodiment 521, wherein the aggregated blockchain oracle provides crowdsourced decentralized data.

526. The system of embodiment 521, wherein the threshold constraint associated with the instantiated aggregated crypto transaction trigger entry is based on any of: anti-ping detection, detection of excess threshold account balance in an account data structure datastore, detection of excess threshold of aggregated blockchain oracle data value, detection of excess threshold number of transactions, detection of specified micro transaction amount, excess bounds of a smart contract generator GUI generated crypto smart rule, failure to login to 4$^{th}$ party website, geofence transgression, user request.

527. The system of embodiment 521, wherein the threshold constraint is cascading and includes at least two levels.

528. The system of embodiment 521, wherein the instantiated aggregated crypto transaction trigger entry is configured to facilitate an action upon satisfaction of the crypto smart rule, wherein the action is any of: exchange assets between counterparties, restrict access to an account data structure datastore, release an extra key associated with an account data structure datastore, purchase stock, vote in a specified way.

529. The system of embodiment 521, wherein the UI includes a chart component.

530. The system of embodiment 521, wherein the UI includes a geographic map component.

531. A processor-implemented crypto smart rules generator method, comprising:

executing processor-implemented smart contract generating component instructions to:

obtain, via at least one processor, a selection, from a user, of a crypto smart rule type for a crypto smart rule associated with an aggregated crypto transaction trigger entry;

provide, via at least one processor, a crypto smart rule generator user interface (UI) for the selected crypto smart rule type;

obtain, via at least one processor, a selection, from the user via the UI, of a threshold constraint for the crypto smart rule;

obtain, via at least one processor, a selection, from the user via the UI, of an aggregated blockchain oracle that provides oracle data for evaluation via the aggregated crypto transaction trigger entry for the crypto smart rule;

generate, via at least one processor, the aggregated crypto transaction trigger entry based on the selected threshold constraint and the selected aggregated blockchain oracle for the crypto smart rule; and instantiate, via at least one processor, the aggregated crypto transaction trigger entry in a socially aggregated blockchain datastructure.

532. The method of embodiment 531, wherein the aggregated blockchain oracle is another aggregated crypto transaction trigger entry in a socially aggregated blockchain datastructure.

533. The method of embodiment 531, wherein the aggregated blockchain oracle is any of: a market data provider, a GPS data provider, a date/time provider, a crowdsourced decentralized data provider, a news provider, an activity monitor, an RSS feed.

534. The method of embodiment 533, wherein an RSS feed is any of: an aggregated mobile phone data feed, a social network feed, a news feed, a market data feed.

535. The method of embodiment 531, wherein the aggregated blockchain oracle provides crowdsourced decentralized data.

536. The method of embodiment 531, wherein the threshold constraint associated with the instantiated aggregated crypto transaction trigger entry is based on any of: anti-ping detection, detection of excess threshold account balance in an account data structure datastore, detection of excess threshold of aggregated blockchain oracle data value, detection of excess threshold number of transactions, detection of specified micro transaction amount, excess bounds of a smart contract generator GUI generated crypto smart rule, failure to login to 4$^{th}$ party website, geofence transgression, user request.

537. The method of embodiment 531, wherein the threshold constraint is cascading and includes at least two levels.

538. The method of embodiment 531, wherein the instantiated aggregated crypto transaction trigger entry is configured to facilitate an action upon satisfaction of the crypto smart rule, wherein the action is any of: exchange assets between counterparties, restrict access to an account data structure datastore, release an extra key associated with an account data structure datastore, purchase stock, vote in a specified way.

539. The method of embodiment 531, wherein the UI includes a chart component.

540. The method of embodiment 531, wherein the UI includes a geographic map component.

601. A crypto asset transfer processing apparatus, comprising:

a memory;
a component collection in the memory, including
a transfer of assets transaction processing component;
a processor disposed in communication with the memory, and configured to issue a plurality of processing instructions from the component collection stored in the memory,
wherein the processor issues instructions from the transfer of assets transaction processing component, stored in the memory, to:
obtain, via at least one processor, a crypto asset transfer notification associated with an account, wherein the crypto asset transfer notification is sent to a first entity from a second entity;
determine, via at least one processor, account verification data specified in the crypto asset transfer notification, wherein the account verification data is generated by the second entity;
retrieve, via at least one processor, a set of account data associated with the account, wherein the set of account data is stored by the first entity;
generate, via at least one processor, a hash of the retrieved set of account data;
verify, via at least one processor, that the determined account verification data matches the generated hash;
determine, via at least one processor, a requested asset specified in the crypto asset transfer notification;
make, via at least one processor, an API call to generate a crypto token asset for the requested asset in a socially aggregated blockchain datastructure, wherein the API call facilitates transfer of the generated crypto token asset to an account data structure datastore associated with the first entity;
determine, via at least one processor, an address of an aggregated crypto transaction trigger entry specified in the crypto asset transfer notification, wherein the aggregated crypto transaction trigger entry is configured to facilitate transfer of the generated crypto token asset from the account data structure datastore associated with the first entity to an account data structure datastore associated with the second entity upon satisfaction of a crypto smart rule; and
provide, via at least one processor, oracle data that satisfies the crypto smart rule via the determined address of the aggregated crypto transaction trigger entry.

602. The apparatus of embodiment 601, wherein the first entity is a delivering broker and the second entity is a receiving broker.

603. The apparatus of embodiment 601, wherein the account verification data is generated by the second entity using a hash of a set of account data, associated with the account, stored by the second entity.

604. The apparatus of embodiment 601, wherein the set of account data associated with the account is a set of demographic data associated with the account's owner.

605. The apparatus of embodiment 601, wherein the hash of the retrieved set of account data is generated by utilizing a hash function on a string formed by concatenating each data item in the set of account data in a specified order.

606. The apparatus of embodiment 601, wherein the requested asset is specified using a security identifier.

607. The apparatus of embodiment 606, wherein the security identifier is one of: a CUSIP, a ticker symbol, an ISIN.

608. The apparatus of embodiment 601, wherein the API call to generate a crypto token asset for the requested asset includes an asset creation request for the requested asset to an administrative node that controls asset definition for the socially aggregated blockchain datastructure.

609. The apparatus of embodiment 601, wherein the API call to generate a crypto token asset for the requested asset includes an asset issuance request for the requested asset to an administrative node that controls asset issuance for the socially aggregated blockchain datastructure.

610. The apparatus of embodiment 609, wherein positions data for the account data structure datastore associated with the first entity is encrypted such that access is restricted to the first entity and to an administrative entity associated with the administrative node.

611. The apparatus of embodiment 601, wherein the aggregated crypto transaction trigger entry includes an omnibus address associated with the second entity.

612. The apparatus of embodiment 611, wherein the second entity transfers the crypto token asset, transferred via the aggregated crypto transaction trigger entry, to an address generated for the account.

613. The apparatus of embodiment 601, wherein the aggregated crypto transaction trigger entry includes an address associated with the second entity generated for the account.

614. The apparatus of embodiment 601, wherein the oracle data is provided via an API call.

615. The apparatus of embodiment 601, wherein the oracle data that satisfies the crypto smart rule is a signature of the first entity.

616. A processor-readable crypto asset transfer processing non-transient physical medium storing processor-executable components, the components, comprising:
a component collection stored in the medium, including:
a transfer of assets transaction processing component;
wherein the transfer of assets transaction processing component, stored in the medium, includes processor-issuable instructions to:
obtain, via at least one processor, a crypto asset transfer notification associated with an account, wherein the crypto asset transfer notification is sent to a first entity from a second entity;
determine, via at least one processor, account verification data specified in the crypto asset transfer notification, wherein the account verification data is generated by the second entity;
retrieve, via at least one processor, a set of account data associated with the account, wherein the set of account data is stored by the first entity;
generate, via at least one processor, a hash of the retrieved set of account data;
verify, via at least one processor, that the determined account verification data matches the generated hash;
determine, via at least one processor, a requested asset specified in the crypto asset transfer notification;

make, via at least one processor, an API call to generate a crypto token asset for the requested asset in a socially aggregated blockchain datastructure, wherein the API call facilitates transfer of the generated crypto token asset to an account data structure datastore associated with the first entity;

determine, via at least one processor, an address of an aggregated crypto transaction trigger entry specified in the crypto asset transfer notification, wherein the aggregated crypto transaction trigger entry is configured to facilitate transfer of the generated crypto a token asset from the account data structure datastore associated with the first entity to an account data structure datastore associated with the second entity upon satisfaction of a crypto smart rule; and provide, via at least one processor, oracle data that satisfies the crypto smart rule via the determined address of the aggregated crypto transaction trigger entry.

617. The medium of embodiment 616, wherein the first entity is a delivering broker and the second entity is a receiving broker.

618. The medium of embodiment 616, wherein the account verification data is generated by the second entity using a hash of a set of account data, associated with the account, stored by the second entity.

619. The medium of embodiment 616, wherein the set of account data associated with the account is a set of demographic data associated with the account's owner.

620. The medium of embodiment 616, wherein the hash of the retrieved set of account data is generated by utilizing a hash function on a string formed by concatenating each data item in the set of account data in a specified order.

621. The medium of embodiment 616, wherein the requested asset is specified using a security identifier.

622. The medium of embodiment 621, wherein the security identifier is one of: a CUSIP, a ticker symbol, an ISIN.

623. The medium of embodiment 616, wherein the API call to generate a crypto token asset for the requested asset includes an asset creation request for the requested asset to an administrative node that controls asset definition for the socially aggregated blockchain datastructure.

624. The medium of embodiment 616, wherein the API call to generate a crypto token asset for the requested asset includes an asset issuance request for the requested asset to an administrative node that controls asset issuance for the socially aggregated blockchain datastructure.

625. The medium of embodiment 624, wherein positions data for the account data structure datastore associated with the first entity is encrypted such that access is restricted to the first entity and to an administrative entity associated with the administrative a node.

626. The medium of embodiment 616, wherein the aggregated crypto transaction trigger entry includes an omnibus address associated with the second entity.

627. The medium of embodiment 626, wherein the second entity transfers the crypto token asset, transferred via the aggregated crypto transaction trigger entry, to an address generated for the account.

628. The medium of embodiment 616, wherein the aggregated crypto transaction trigger entry includes an address associated with the second entity generated for the account.

629. The medium of embodiment 616, wherein the oracle data is provided via an API call.

630. The medium of embodiment 616, wherein the oracle data that satisfies the crypto smart rule is a signature of the first entity.

631. A processor-implemented crypto asset transfer processing system, comprising.

a transfer of assets transaction processing component means, to:

obtain, via at least one processor, a crypto asset transfer notification associated with an account, wherein the crypto asset transfer notification is sent to a first entity from a second entity;

determine, via at least one processor, account verification data specified in the crypto asset transfer notification, wherein the account verification data is generated by the second entity;

retrieve, via at least one processor, a set of account data associated with the account, wherein the set of account data is stored by the first entity;

generate, via at least one processor, a hash of the retrieved set of account data;

verify, via at least one processor, that the determined account verification data matches the generated hash;

determine, via at least one processor, a requested asset specified in the crypto asset transfer notification;

make, via at least one processor, an API call to generate a crypto token asset for the requested asset in a socially aggregated blockchain datastructure, wherein the API call facilitates transfer of the generated crypto token asset to an account data a structure datastore associated with the first entity;

determine, via at least one processor, an address of an aggregated crypto transaction trigger entry specified in the crypto asset transfer notification, wherein the aggregated crypto transaction trigger entry is configured to facilitate transfer of the generated crypto token asset from the account data structure datastore associated with the first entity to an account data structure datastore associated with the second entity upon satisfaction of a crypto smart rule; and provide, via at least one processor, oracle data that satisfies the crypto smart rule via the determined address of the aggregated crypto transaction trigger entry.

632. The system of embodiment 631, wherein the first entity is a delivering broker and the second entity is a receiving broker.

633. The system of embodiment 631, wherein the account verification data is generated by the second entity using a hash of a set of account data, associated with the account, stored by the second entity.

634. The system of embodiment 631, wherein the set of account data associated with the account is a set of demographic data associated with the account's owner.

635. The system of embodiment 631, wherein the hash of the retrieved set of account data is generated by utilizing a hash function on a string formed by concatenating each data item in the set of account data in a specified order.

636. The system of embodiment 631, wherein the requested asset is specified using a security identifier.

637. The system of embodiment 636, wherein the security identifier is one of: a CUSIP, a ticker symbol, an ISIN.

638. The system of embodiment 631, wherein the API call to generate a crypto token asset for the requested asset includes an asset creation request for the requested asset to an administrative node that controls asset definition for the socially aggregated blockchain datastructure.

639. The system of embodiment 631, wherein the API call to generate a crypto token asset for the requested asset includes an asset issuance request for the requested asset to an administrative node that controls asset issuance for the socially aggregated blockchain datastructure.

640. The system of embodiment 639, wherein positions data for the account data structure datastore associated with the first entity is encrypted such that access is restricted to the first entity and to an administrative entity associated with the administrative node.

641. The system of embodiment 631, wherein the aggregated crypto transaction trigger entry includes an omnibus address associated with the second entity.

642. The system of embodiment 641, wherein the second entity transfers the crypto token asset, transferred via the aggregated crypto transaction trigger entry, to an address generated for the account.

643. The system of embodiment 631, wherein the aggregated crypto transaction trigger entry includes an address associated with the second entity generated for the account.

644. The system of embodiment 631, wherein the oracle data is provided via an API call.

645. The system of embodiment 631, wherein the oracle data that satisfies the crypto smart rule is a signature of the first entity.

646. A processor-implemented crypto asset transfer processing method, comprising.

executing processor-implemented transfer of assets transaction processing component instructions to:

obtain, via at least one processor, a crypto asset transfer notification associated with an account, wherein the crypto asset transfer notification is sent to a first entity from a second entity;

determine, via at least one processor, account verification data specified in the crypto asset transfer notification, wherein the account verification data is generated by the second entity;

retrieve, via at least one processor, a set of account data associated with the account, wherein the set of account data is stored by the first entity;

generate, via at least one processor, a hash of the retrieved set of account data;

verify, via at least one processor, that the determined account verification data matches the generated hash;

determine, via at least one processor, a requested asset specified in the crypto asset transfer notification;

make, via at least one processor, an API call to generate a crypto token asset for the requested asset in a socially aggregated blockchain datastructure, wherein the API call facilitates transfer of the generated crypto token asset to an account data structure datastore associated with the first entity;

determine, via at least one processor, an address of an aggregated crypto transaction trigger entry specified in the crypto asset transfer notification, wherein the aggregated crypto transaction trigger entry is configured to facilitate transfer of the generated crypto token asset from the account data structure datastore associated with the first entity to an account data structure datastore associated with the second entity upon satisfaction of a crypto smart rule; and provide, via at least one processor, oracle data that satisfies the crypto smart rule via the determined address of the aggregated crypto transaction trigger entry.

647. The method of embodiment 646, wherein the first entity is a delivering broker and the second entity is a receiving broker.

648. The method of embodiment 646, wherein the account verification data is generated by the second entity using a hash of a set of account data, associated with the account, stored by the second entity.

649. The method of embodiment 646, wherein the set of account data associated with the account is a set of demographic data associated with the account's owner.

650. The method of embodiment 646, wherein the hash of the retrieved set of account data is generated by utilizing a hash function on a string formed by concatenating each data item in the set of account data in a specified order.

651. The method of embodiment 646, wherein the requested asset is specified using a security identifier.

652. The method of embodiment 651, wherein the security identifier is one of: a CUSIP, a ticker symbol, an ISIN.

653. The method of embodiment 646, wherein the API call to generate a crypto token asset for the requested asset includes an asset creation request for the requested asset to an administrative node that controls asset definition for the socially aggregated blockchain datastructure.

654. The method of embodiment 646, wherein the API call to generate a crypto token asset for the requested asset includes an asset issuance request for the requested asset to an administrative node that controls asset issuance for the socially aggregated blockchain datastructure.

655. The method of embodiment 654, wherein positions data for the account data structure datastore associated with the first entity is encrypted such that access is restricted to the first entity and to an administrative entity associated with the administrative node.

656. The method of embodiment 646, wherein the aggregated crypto transaction trigger entry includes an omnibus address associated with the second entity.

657. The method of embodiment 656, wherein the second entity transfers the crypto token asset, transferred via the aggregated crypto transaction trigger entry, to an address generated for the account.

658. The method of embodiment 646, wherein the aggregated crypto transaction trigger entry includes an address associated with the second entity generated for the account.

659. The method of embodiment 646, wherein the oracle data is provided via an API call.

660. The method of embodiment 646, wherein the oracle data that satisfies the crypto smart rule is a signature of the first entity.

1001. A migration displacement tracking apparatus, comprising:
a memory;
a component collection in any of memory and communication, including.
a migration component;
a processor disposed in communication with the memory, and configured to issue a plurality of processing instructions from the component collection stored in the memory,
wherein a processor issues instructions from the migration component, stored in the memory, to:
obtain a unique wallet identifier from a migrant wallet source associated with a user,
obtain a geographic transaction request from the migrant wallet source;
commit the geographic transaction request to a distributed block chain database configured to propagate the geographic transaction request across a distributed block chain database network;
provide a starting displacement region at an initial time;
provide a target displacement region at a subsequent time;
query the distributed block chain database for users matching a starting displacement region at the initial time;
select a subset of lost or displaced users at the target displacement region at the subsequent time from the results of the query;
identify lost users from the query that were not in the selected subset.

1002. The apparatus of embodiment 1001, wherein the transaction request includes a number of additional fields specified in an 80 byte transaction payload.

1003. The apparatus of embodiment 1002, wherein the fields include longitude and latitude.

1004. The apparatus of embodiment 1002, wherein the additional fields include attributes.

1005. The apparatus of embodiment 1004, wherein the additional fields include size.

1006. The apparatus of embodiment 1004, wherein attributes include nationality.

1007. The apparatus of embodiment 1004, wherein attributes include the user's identification information.

1008. A processor-readable migration displacement tracking non-transient medium storing processor-executable components, the components comprising
a component collection stored in the medium, including:
a migration component;
wherein the component collection, stored in the medium, includes processor-issuable instructions to:
obtain a unique wallet identifier from a migrant wallet source associated with a user,
obtain a geographic transaction request from the migrant wallet source;
commit the geographic transaction request to a distributed block chain database configured to propagate the geographic transaction request across a distributed block chain database network;
provide a starting displacement region at an initial time;
provide a target displacement region at a subsequent time;
query the distributed block chain database for users matching a starting displacement region at the initial time;
select a subset of lost or displaced users at the target displacement region at the subsequent time from the results of the query;
identify lost users from the query that were not in the selected subset.

1009. The processor-readable migration displacement tracking non-transient medium of embodiment 1008, wherein the transaction request includes a number of additional fields specified in an 80 byte transaction payload.

1010. The processor-readable migration displacement tracking non-transient medium of embodiment 1009, wherein the fields include longitude and latitude.

1011. The processor-readable migration displacement tracking non-transient medium of embodiment 1009, wherein the additional fields include attributes.

1012. The processor-readable migration displacement tracking non-transient medium of embodiment 1011, wherein the additional fields include size.

1013. The processor-readable migration displacement tracking non-transient medium of embodiment 1011, wherein attributes include nationality.

1014. The processor-readable migration displacement tracking non-transient medium of embodiment 1011, wherein attributes include the user's identification information.

1015. A processor-implemented migration displacement tracking method, comprising.
executing processor-implemented migration component instructions to:
obtain a unique wallet identifier from a migrant wallet source associated with a user,
obtain a geographic transaction request from the migrant wallet source;
commit the geographic transaction request to a distributed block chain database configured to propagate the geographic transaction request across a distributed block chain database network;
provide a starting displacement region at an initial time;
provide a target displacement region at a subsequent time;
query the distributed block chain database for users matching a starting displacement region at the initial time;
select a subset of lost or displaced users at the target displacement region at the subsequent time from the results of the query;
identify lost users from the query that were not in the selected subset.

1016. The processor-implemented migration displacement tracking method of embodiment 1015, wherein the transaction request includes a number of additional fields specified in an 80 byte transaction payload.

1017. The processor-implemented migration displacement tracking method of embodiment 1016, wherein the fields include longitude and latitude.

1018. The processor-implemented migration displacement tracking method of embodiment 1016, wherein the additional fields include attributes.

1019. The processor-implemented migration displacement tracking method of embodiment 1016, wherein the additional fields include size.

1020. The processor-implemented migration displacement tracking method of embodiment 1016, wherein attributes include nationality.

1021. The processor-implemented migration displacement tracking method of embodiment 1016, wherein attributes include the user's identification information.

1022. A processor-implemented migration displacement tracking system, comprising
a migration component means, to:
obtain a unique wallet identifier from a migrant wallet source associated with a user,
obtain a geographic transaction request from the migrant wallet source;
commit the geographic transaction request to a distributed block chain database configured to propagate the geographic transaction request across a distributed block chain database network;
provide a starting displacement region at an initial time;
provide a target displacement region at a subsequent time;
query the distributed block chain database for users matching a starting displacement region at the initial time;
select a subset of lost or displaced users at the target displacement region at the subsequent time from the results of the query;
identify lost users from the query that were not in the selected subset.

1023. The processor-implemented migration displacement tracking system of embodiment 1022, wherein the transaction request includes a number of additional fields specified in an 80 byte transaction payload.

1024. The processor-implemented migration displacement tracking system of embodiment 1022, wherein the fields include longitude and latitude.

1025. The processor-implemented migration displacement tracking system of embodiment 1022, wherein the additional fields include attributes.

1026. The processor-implemented migration displacement tracking system of embodiment 1022, wherein the additional fields include size.

1027. The processor-implemented migration displacement tracking system of embodiment 1022, wherein attributes include nationality.

1028. The processor-implemented migration displacement tracking system of embodiment 1022, wherein attributes include the user's identification information.

1029. A point-to-point payment guidance apparatus, comprising:
a memory;
a component collection in any of memory and communication, including
a point-to-point guidance component;
a processor disposed in communication with the memory, and configured to issue a plurality of processing instructions from the component collection stored in the memory,
wherein a processor issues instructions from the point-to-point guidance component, stored in the memory, to:
obtain a target wallet identifier registration at a beacon;
register the target wallet identifier with the beacon;
obtain a unique wallet identifier from a migrant wallet source associated with a user at the beacon;
obtain a target transaction request at the beacon from the migrant wallet source;
commit the target transaction request for the amount specified in the target transaction request to a distributed block chain database configured to propagate the target transaction request across a distributed block chain database network for payment targeted to the target wallet identifier registered at the beacon.

1030. The apparatus of embodiment 1029, wherein the beacon is registered to an organization.

1031. The apparatus of embodiment 1030, wherein the target wallet identifier is of an employee of the organization.

1032. The apparatus of embodiment 1031, further, comprising: verify the target wallet identifier is associated with the organization.

1033. The apparatus of embodiment 1032, wherein the verification includes identifying the target wallet identifier exists in the organization's database.

1034. The apparatus of embodiment 1032, wherein the verification includes authentication credentials.

1035. The apparatus of embodiment 1034, wherein the authentication credentials are digitally signed.

1036. The apparatus of embodiment 1034, wherein the authentication credentials are encrypted.

1037. The apparatus of embodiment 1034, wherein the registration of the target wallet occurs upon the verification.

1038. The apparatus of embodiment 1029, wherein the target transaction request includes a number of additional fields specified in an 80 byte transaction payload.

1039. The apparatus of embodiment 1038, wherein the fields include a tip amount.

1040. The apparatus of embodiment 1038, wherein the fields include the beacon's unique identifier.

1041. The apparatus of embodiment 1038, wherein the fields include the target wallet identifier.

1042. The apparatus of embodiment 1038, wherein the fields include the user's identification information.

1043. The apparatus of embodiment 1029, wherein the beacon is a target mobile user device with access to a target user's target wallet associated with the target wallet identifier.

1044. The apparatus of embodiment 1029, wherein the unique wallet identifier's source is a source mobile user device with access to a user's source wallet associated with the unique wallet identifier.

1045. The apparatus of embodiment 1038, wherein the fields include a transaction amount.

1046. The apparatus of embodiment 1038, wherein the fields include a transaction item.

1047. The apparatus of embodiment 1029, wherein the beacon may be integral to a device.

1048. The apparatus of embodiment 1047, wherein the integration may be through a smart device having a processor and wireless communication.

1049. The apparatus of embodiment 1047, wherein the integration may be by affixing a beacon to the device.

1050. The apparatus of embodiment 1047, wherein the beacon may be affixed to a utility meter.

1051. The apparatus of embodiment 1047, wherein the beacon affixed to a utility meter may be read by a user.

1052. The apparatus of embodiment 1047, wherein the beacon affixed to a utility meter may be read by a user and outstanding usage may be paid by the user.

1053. The apparatus of embodiment 1047, wherein the beacon affixed to a utility meter is a refrigerator at a hotel, and usage metrics include items consumed by the user.

1054. The apparatus of embodiment 1047, wherein the beacon affixed to a utility meter is a thermostat at a hotel, and usage metrics include items consumed by the user.

1055. The apparatus of embodiment 1047, wherein the beacon affixed to a utility meter is a television at a hotel, and usage metrics include items viewed by the user.

1056. The apparatus of embodiment 1047, wherein the beacon affixed to a utility meter is a button affixed to consumables at a hotel, and usage metrics include items consumed by the user.

1057. A processor-readable point-to-point payment guidance non-transient medium storing processor-executable components, the components, comprising:

a component collection stored in the medium, including:

a point-to-point guidance component;

wherein the component collection, stored in the medium, includes processor-issuable instructions to:

obtain a target wallet identifier registration at a beacon;

register the target wallet identifier with the beacon;

obtain a unique wallet identifier from a wallet source associated with a user at the beacon;

a obtain a target transaction request at the beacon from the wallet source;

commit the target transaction request for the amount specified in the target transaction request to a distributed block chain database configured to propagate the target transaction request across a distributed block chain database network for payment targeted to the target wallet identifier registered at the beacon.

1058. The processor-readable point-to-point payment guidance non-transient medium of embodiment 1057, wherein the beacon is registered to an organization.

1059. The processor-readable point-to-point payment guidance non-transient medium of embodiment 1058, wherein the target wallet identifier is of an employee of the organization.

1060. The processor-readable point-to-point payment guidance non-transient medium of embodiment 1059, further, comprising instructions to verify the target wallet identifier is associated with the organization.

1061. The processor-readable point-to-point payment guidance non-transient medium of embodiment 1060, wherein the verification includes identifying the target wallet identifier exists in the organization's database.

1062. The processor-readable point-to-point payment guidance non-transient medium of embodiment 1060, wherein the verification includes authentication credentials.

1063. The processor-readable point-to-point payment guidance non-transient medium of embodiment 1062, wherein the authentication credentials are digitally signed.

1064. The processor-readable point-to-point payment guidance non-transient medium of embodiment 1062, wherein the authentication credentials are encrypted.

11065. The processor-readable point-to-point payment guidance non-transient medium of embodiment 1060, wherein the registration of the target wallet occurs upon the verification.

1066. The processor-readable point-to-point payment guidance non-transient medium of embodiment 1057, wherein the target transaction request includes a number of additional fields specified in an 80 byte transaction payload.

1067. The processor-readable point-to-point payment guidance non-transient medium of a embodiment 1066, wherein the fields include a tip amount.

1068. The processor-readable point-to-point payment guidance non-transient medium of embodiment 1066, wherein the fields include the beacon's unique identifier.

1069. The processor-readable point-to-point payment guidance non-transient medium of embodiment 1066, wherein the fields include the target wallet identifier.

1070. The processor-readable point-to-point payment guidance non-transient medium of embodiment 1066, wherein the fields include the user's identification information.

1071. The processor-readable point-to-point payment guidance non-transient medium of embodiment 1057, wherein the beacon is a target mobile user device with access to a target user's target wallet associated with the target wallet identifier.

1072. The processor-readable point-to-point payment guidance non-transient medium of embodiment 1057, wherein the unique wallet identifier's source is a source mobile user device with access to a user's source wallet associated with the unique wallet identifier.

1073. The processor-readable point-to-point payment guidance non-transient medium of embodiment 1066, wherein the fields include a transaction amount.

1074. The processor-readable point-to-point payment guidance non-transient medium of embodiment 1066, wherein the fields include a transaction item.

1075. The processor-readable point-to-point payment guidance non-transient medium of embodiment 1057, wherein the beacon may be integral to a device.

1076. The processor-readable point-to-point payment guidance non-transient medium of embodiment 1057, wherein the integration may be through a smart device having a processor and wireless communication.

1077. The processor-readable point-to-point payment guidance non-transient medium of embodiment 1057, wherein the integration may be by affixing a beacon to the device.

1078. The processor-readable point-to-point payment guidance non-transient medium of embodiment 1057, wherein the beacon may be affixed to a utility meter.

1079. The processor-readable point-to-point payment guidance non-transient medium of embodiment 1057, wherein the beacon affixed to a utility meter may be read by a user.

1080. The processor-readable point-to-point payment guidance non-transient medium of embodiment 1057, wherein the beacon affixed to a utility meter may be read by a user and outstanding usage may be paid by the user.

1081. The processor-readable point-to-point payment guidance non-transient medium of embodiment 1057, wherein the beacon affixed to a utility meter is a refrigerator at a hotel, and usage metrics include items consumed by the user.

1082. The processor-readable point-to-point payment guidance non-transient medium of embodiment 1057, wherein the beacon affixed to a utility meter is a thermostat at a hotel, and usage metrics include items consumed by the user.

1083. The processor-readable point-to-point payment guidance non-transient medium of embodiment 1057, wherein the beacon affixed to a utility meter is a television at a hotel, and usage metrics include items viewed by the user.

1084. The processor-readable point-to-point payment guidance non-transient medium of embodiment 1057, wherein the beacon affixed to a utility meter is a button affixed to consumables at a hotel, and usage metrics include items consumed by the user.

1085. A processor-implemented point-to-point payment guidance method, comprising:

executing processor-implemented point-to-point guidance component instructions to:

obtain a target wallet identifier registration at a beacon;

register the target wallet identifier with the beacon;

obtain a unique wallet identifier from a wallet source associated with a user at the beacon;

obtain a target transaction request at the beacon from the migrant wallet source;

commit the target transaction request for the amount specified in the target transaction request to a distributed block chain database configured to propagate the target transaction request across a distributed block chain database network for payment targeted to the target wallet identifier registered at the beacon.

1086. The processor-implemented point-to-point payment guidance method of embodiment 1085, wherein the beacon is registered to an organization.

1087. The processor-implemented point-to-point payment guidance method of embodiment 1085, wherein the target wallet identifier is of an employee of the organization.

1088. The processor-implemented point-to-point payment guidance method of embodiment 1085, further comprising:

instructions to verify the target wallet identifier is associated with the organization.

1089. The processor-implemented point-to-point payment guidance method of embodiment 1088, wherein the verification includes identifying the target wallet identifier exists in the organization's database.

1090. The processor-implemented point-to-point payment guidance method of embodiment 1088, wherein the verification includes authentication credentials.

1091. The processor-implemented point-to-point payment guidance method of embodiment 1090, wherein the authentication credentials are digitally signed.

1092. The processor-implemented point-to-point payment guidance method of embodiment 1090, wherein the authentication credentials are encrypted.

1093. The processor-implemented point-to-point payment guidance method of embodiment 1090, wherein the registration of the target wallet occurs upon the verification.

1094. The processor-implemented point-to-point payment guidance method of embodiment 1088, wherein the target transaction request includes a number of additional fields specified in an 80 byte transaction payload.

1095. The processor-implemented point-to-point payment guidance method of embodiment 1094, wherein the fields include a tip amount.

1096. The processor-implemented point-to-point payment guidance method of embodiment 1094, wherein the fields include the beacon's unique identifier.

1097. The processor-implemented point-to-point payment guidance method of embodiment 1094, wherein the fields include the target wallet identifier.

1098. The processor-implemented point-to-point payment guidance method of embodiment 1094, wherein the fields include the user's identification information.

1099. The processor-implemented point-to-point payment guidance method of embodiment 1094, wherein the beacon is a target mobile user device with access to a target user's target wallet associated with the target wallet identifier.

1100. The processor-implemented point-to-point payment guidance method of embodiment 1094, wherein the unique wallet identifier's source is a source mobile user device with access to a user's source wallet associated with the unique wallet identifier.

1101. The processor-implemented point-to-point payment guidance method of embodiment 1094, a wherein the fields include a transaction amount.

1102. The processor-implemented point-to-point payment guidance method of embodiment 1094, wherein the fields include a transaction item.

1103. The processor-implemented point-to-point payment guidance method of embodiment 1094, wherein the beacon may be integral to a device.

1104. The processor-implemented point-to-point payment guidance method of embodiment 1094, wherein the integration may be through a smart device having a processor and wireless communication.

1105. The processor-implemented point-to-point payment guidance method of embodiment 1094, wherein the integration may be by affixing a beacon to the device.

1106. The processor-implemented point-to-point payment guidance method of embodiment 1094, wherein the beacon may be affixed to a utility meter.

1107. The processor-implemented point-to-point payment guidance method of embodiment 1094, wherein the beacon affixed to a utility meter may be read by a user.

1108. The processor-implemented point-to-point payment guidance method of embodiment 1094, wherein the beacon affixed to a utility meter may be read by a user and outstanding usage may be paid by the user.

1109. The processor-implemented point-to-point payment guidance method of embodiment 1094, wherein the beacon affixed to a utility meter is a refrigerator at a hotel, and usage metrics include items consumed by the user.

1110. The processor-implemented point-to-point payment guidance method of embodiment 1094, wherein the beacon affixed to a utility meter is a thermostat at a hotel, and usage metrics include items consumed by the user.

1111. The processor-implemented point-to-point payment guidance method of embodiment 1094, wherein the beacon affixed to a utility meter is a television at a hotel, and usage metrics include items viewed by the user.

1112. The processor-implemented point-to-point payment guidance method of embodiment 1094, wherein the beacon affixed to a utility meter is a button affixed to consumables at a hotel, and usage metrics include items consumed by the user.

1113. A processor-implemented point-to-point payment guidance system, comprising:
- a point-to-point guidance component means, to:
  - obtain a target wallet identifier registration at a beacon;
  - register the target wallet identifier with the beacon;
  - obtain a unique wallet identifier from a wallet source associated with a user at the beacon;
  - obtain a target transaction request at the beacon from the wallet source;
  - commit the target transaction request for the amount specified in the target transaction request to a distributed block chain database configured to propagate the target transaction request across a distributed block chain database network for payment targeted to the target wallet identifier registered at the beacon.

1114. The processor-implemented point-to-point payment guidance system of embodiment 1113, wherein the beacon is registered to an organization.

1115. The processor-implemented point-to-point payment guidance system of embodiment 1113, wherein the target wallet identifier is of an employee of the organization.

1116. The processor-implemented point-to-point payment guidance system 92, further comprising: instructions to verify the target wallet identifier is associated with the organization.

1117. The processor-implemented point-to-point payment guidance system of embodiment 1116, wherein the verification includes identifying the target wallet identifier exists in the organization's database.

1118. The processor-implemented point-to-point payment guidance system of embodiment 1116, wherein the verification includes authentication credentials.

1119. The processor-implemented point-to-point payment guidance system of embodiment 1116, wherein the authentication credentials are digitally signed.

1120. The processor-implemented point-to-point payment guidance system of embodiment 1116, wherein the authentication credentials are encrypted.

1121. The processor-implemented point-to-point payment guidance system of embodiment 1116, wherein the registration of the target wallet occurs upon the verification.

1122. The processor-implemented point-to-point payment guidance system of embodiment 1116, wherein the target transaction request includes a number of additional fields specified in an 80 byte transaction payload.

1123. The processor-implemented point-to-point payment guidance system of embodiment 1122, wherein the fields include a tip amount.

1124. The processor-implemented point-to-point payment guidance system of embodiment 1122, wherein the fields include the beacon's unique identifier.

1125. The processor-implemented point-to-point payment guidance system of embodiment 1122, wherein the fields include the target wallet identifier.

1126. The processor-implemented point-to-point payment guidance system of embodiment 1122, wherein the fields include the user's identification information.

1127. The processor-implemented point-to-point payment guidance system of embodiment 1116, wherein the beacon is a target mobile user device with access to a target user's target wallet associated with the target wallet identifier.

1128. The processor-implemented point-to-point payment guidance system of embodiment 1116, wherein the unique wallet identifier's source is a source mobile user device with access to a user's source wallet associated with the unique wallet identifier.

1129. The processor-implemented point-to-point payment guidance system of embodiment 1116, wherein the fields include a transaction amount.

1130. The processor-implemented point-to-point payment guidance system of embodiment 1116, wherein the fields include a transaction item.

1131. The processor-implemented point-to-point payment guidance system of embodiment 1116, wherein the beacon is integral to a device.

1132. The processor-implemented point-to-point payment guidance system of embodiment 1116, wherein the integration may be through a smart device having a processor and wireless communication.

1133. The processor-implemented point-to-point payment guidance system of embodiment 1116, wherein the integration may be by affixing a beacon to the device.

1134. The processor-implemented point-to-point payment guidance system of embodiment 1116, wherein the beacon may be affixed to a utility meter.

1135. The processor-implemented point-to-point payment guidance system of embodiment 1116, wherein the beacon affixed to a utility meter may be read by a user.

1136. The processor-implemented point-to-point payment guidance system of embodiment 1116, wherein the beacon affixed to a utility meter may be read by a user and outstanding usage may be paid by the user.

1137. The processor-implemented point-to-point payment guidance system of embodiment 1116, wherein the beacon affixed to a utility meter is a refrigerator at a hotel, and usage metrics include items consumed by the user.

1138. The processor-implemented point-to-point payment guidance system of embodiment 1116, wherein the beacon affixed to a utility meter is a thermostat at a hotel, and usage metrics include items consumed by the user.

1139. The processor-implemented point-to-point payment guidance system of embodiment 1116, wherein the beacon affixed to a utility meter is a television at a hotel, and usage metrics include items viewed by the user.

1140. The processor-implemented point-to-point payment guidance system of embodiment 1116, wherein the beacon affixed to a utility meter is a button affixed to consumables, and usage metrics include items consumed by the user.

1141. A point-to-point payment guidance apparatus, comprising.
- a component collection stored in the medium, including:

a memory;

a component collection in any of memory and communication, including.

a point-to-point guidance component;

a processor disposed in communication with the memory, and configured to issue a plurality of processing instructions from the component collection stored in the memory, wherein a processor issues instructions from the component collection, stored in the memory, to obtain a payment source wallet identifier associated with a user at a beacon integrated with a product used by the user, which product periodically requires replenishment;

register the payment source wallet identifier with the beacon;

monitor a use or consumption of the product;

when a use or consumption reaches a threshold level, transmit an order for a replenishment of the product to a supplier of the product; and transmit a destination address for the supplier to receive a payment from the payment source wallet identifier for the replenishment of the product to a distributed blockchain database configured to propagate the transaction request to a distributed blockchain database network for payment targeted to the destination address provided by the beacon.

1142. The apparatus of embodiment 1141, wherein the payment source wallet identifier includes a plurality of source addresses of the user, and wherein the user may select one or more sources addresses from which to provide a payment.

1143. The apparatus of embodiment 1141, wherein the transaction request includes a number of additional fields specified in an 80 byte transaction payload.

1144. The apparatus of embodiment 1143, wherein the additional fields store at least one of public key or a hash of the public key of the user.

1145. The apparatus of embodiment 1144, wherein the fields include data that may be queried by the user using the public key to confirm the transaction request and payment amount.

1146. The apparatus of embodiment 1143, wherein the fields include a unique identifier of the beacon.

1147. The apparatus of embodiment 1143, wherein the fields include the target wallet identifier.

1148. The apparatus of embodiment 1143, wherein the fields include the user's identification information.

1149. The apparatus of embodiment 1143, wherein the fields include a transaction amount.

1150. The apparatus of embodiment 1066, wherein the fields include a micropayment amount.

1151. The apparatus of embodiment 1141, wherein the beacon is integrated with the product 1152. The apparatus of embodiment 1141, wherein the beacon is separate from the product 1153. The apparatus of embodiment 1141, wherein the integration may be by affixing a beacon to the product.

1154. A processor-readable point-to-point payment guidance non-transient medium storing processor-executable components, the components, comprising:

a component collection stored in the medium, including a point-to-point guidance component;

wherein the component collection, stored in the medium, includes processor-issuable instructions to:

obtain a payment source wallet identifier associated with a user at a beacon integrated with a product used by the user, which product periodically requires replenishment;

register the payment source wallet identifier with the beacon;

monitor a use or consumption of the product;

when a use or consumption reaches a threshold level, transmit an order for a replenishment of the product to a supplier of the product; and transmit a destination address for the supplier to receive a payment from the payment source wallet identifier for the replenishment of the product to a distributed blockchain database configured to propagate the transaction request to a distributed blockchain database network for payment targeted to the destination address provided by the beacon.

1155. The processor-readable point-to-point payment guidance non-transient medium of embodiment 1154, wherein the payment source wallet identifier includes a plurality of source addresses of the user, and wherein the user may select one or more sources addresses from which to provide a payment.

1156. The processor-readable point-to-point payment guidance non-transient medium of embodiment 1154, wherein the transaction request includes a number of additional fields specified in an 80 byte transaction payload.

1157. The processor-readable point-to-point payment guidance non-transient medium of embodiment 1156, wherein the additional fields store at least one of public key or a hash of the public key of the user.

1158. The processor-readable point-to-point payment guidance non-transient medium of embodiment 1157, wherein the fields include data that may be queried by the user using the public key to confirm the transaction request and payment amount.

1159. The processor-readable point-to-point payment guidance non-transient medium of embodiment 1156, wherein the fields include a unique identifier of the beacon.

1160. The processor-readable point-to-point payment guidance non-transient medium of embodiment 1156, wherein the fields include the target wallet identifier.

1161. The processor-readable point-to-point payment guidance non-transient medium of embodiment 1156, wherein the fields include the user's identification information.

1162. The processor-readable point-to-point payment guidance non-transient medium of a embodiment 1156, wherein the fields include a transaction amount.

1163. The processor-readable point-to-point payment guidance non-transient medium of embodiment 1066, wherein the fields include a micropayment amount.

1164. The processor-readable point-to-point payment guidance non-transient medium of embodiment 1154, wherein the beacon is integrated with the product 1165. The processor-readable point-to-point payment guidance non-transient medium of embodiment 1154, wherein the beacon is separate from the product 1166. The processor-readable point-to-point payment guidance non-transient medium of embodiment 1154, wherein the integration may be by affixing a beacon to the product.

1167. A point-to-point payment guidance method, comprising:

obtaining a payment source wallet identifier associated with a user at a beacon integrated with a product used by the user, which product periodically requires replenishment;

registering the payment source wallet identifier with the beacon;

monitoring a use or consumption of the product;

when a use or consumption reaches a threshold level, transmitting an order for a replenishment of the product to a supplier of the product; and transmitting a destination address for the supplier to receive a payment from the payment source wallet identifier for the replenishment of the product to a distributed blockchain database configured to propagate the transaction request to a distributed blockchain database network for payment targeted to the destination address provided by the beacon.

1168. The method of embodiment 1167, wherein the payment source wallet identifier includes a plurality of source addresses of the user, and wherein the user may select one or more sources addresses from which to provide a payment.

1169. The method of embodiment 1167, wherein the transaction request includes a number of additional fields specified in an 80 byte transaction payload.

1170. The method of embodiment 1169, wherein the additional fields store at least one of public key or a hash of the public key of the user.

1171. The method of embodiment 1170, wherein the fields include data that may be queried by the user using the public key to confirm the transaction request and payment amount.

1172. The method of embodiment 1169, wherein the fields include a unique identifier of the beacon.

1173. The method of embodiment 1169, wherein the fields include the target wallet identifier.

1174. The method of embodiment 1169, wherein the fields include the user's identification information.

1175. The method of embodiment 1169, wherein the fields include a transaction amount.

1176. The method of embodiment 1169, wherein the fields include a micropayment amount.

1177. The method of embodiment 1167, wherein the beacon is integrated with the product 1178. The method of embodiment 1167, wherein the beacon is separate from the product 1179. The method of embodiment 1167, wherein the integration may be by affixing a beacon to the product.

1180. A point-to-point payment guidance system, comprising.

means for obtaining a payment source wallet identifier associated with a user at a beacon integrated with a product used by the user, which product periodically requires replenishment;

means for registering the payment source wallet identifier with the beacon;

means for monitoring a use or consumption of the product;

means for transmitting an order for a replenishment of the product to a supplier of the product when a use or consumption reaches a threshold level; and means for transmitting a destination address for the supplier to receive a payment from the payment source wallet identifier for the replenishment of the product to a distributed blockchain database configured to propagate the transaction request to a distributed blockchain database network for payment targeted to the destination address provided by the beacon.

1181. The system of embodiment 1180, wherein the payment source wallet identifier includes a plurality of source addresses of the user, and wherein the user may select one or more sources addresses from which to provide a payment.

1182. The system of embodiment 1180, wherein the transaction request includes a number of additional fields specified in an 80 byte transaction payload.

1183. The system of embodiment 1182, wherein the additional fields store at least one of public key or a hash of the public key of the user.

1184. The system of embodiment 1183, wherein the fields include data that may be queried by the user using the public key to confirm the transaction request and payment amount.

1185. The system of embodiment 1182, wherein the fields include a unique identifier of the beacon.

1186. The system of embodiment 1182, wherein the fields include the target wallet identifier.

1187. The system of embodiment 1182, wherein the fields include the user's identification information.

1188. The system of embodiment 1182, wherein the fields include a transaction amount.

1189. The system of embodiment 1182, wherein the fields include a micropayment amount.

1190. The system of embodiment 1180, wherein the beacon is integrated with the product.

1191. The system of embodiment 1180, wherein the beacon is separate from the product.

1192. The system of embodiment 1180, wherein the integration may be by affixing a beacon to the product.

In order to address various issues and advance the art, the entirety of this application for Asynchronous Crypto Asset Transfer and Social Aggregating, Fractionally Efficient Transfer Guidance, Conditional Triggered Transaction, Datastructures, Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a individual and/or enterprise user, database configuration and/or relational model, data type, data transmission and/or network framework, syntax structure, and/or the like, various embodiments of the SOCOACT, may be implemented that enable a great deal of flexibility and customization. For example, aspects of the may be adapted for monetary and non-monetary transactions. While various embodiments and discussions of the have included Guided Target Transactions and Encrypted Transaction Processing and Verification, however, it is to be understood that the embodiments described herein may be readily configured and/or customized for a wide variety of other applications and/or implementations.

What is claimed is:

1. A crypto asset transfer processing apparatus, comprising:

at least one memory;

a component collection stored in the at least one memory:

any of at least one processor disposed in communication with the at least one memory, the any of at least one processor executing processor-executable instructions from the component collection, storage of the component collection structured with processor-executable instructions comprising:

obtain a inter-entity crypto asset transfer notification associated with an account, and the inter-entity crypto asset transfer notification is structured as sending to a first entity from a second entity;

determine account verification data from the inter-entity crypto asset transfer notification, and the account verification data is generated by the second entity;

retrieve a set of account data associated with the account, and the set of account data is stored by the first entity;

generate a hash of the retrieved set of account data;

verify that the determined account verification data matches the generated hash;

determine a requested asset from the inter-entity crypto asset transfer notification;

make an API call generating a crypto token asset for the requested asset in a socially aggregated blockchain datastructure, and the API call facilitates transfer of the generated crypto token asset to an account data structure datastore associated with the first entity;

determine an address of an aggregated crypto transaction trigger entry from the inter-entity crypto asset transfer notification, and the aggregated crypto transaction trigger entry is structured as facilitating transfer of the generated crypto token asset from the account data structure datastore associated with the first entity to an account data structure datastore associated with the second entity upon satisfaction of a crypto smart rule; and provide oracle data that satisfies the crypto smart rule via the determined address of the aggregated crypto transaction trigger entry.

2. The apparatus of claim 1, further comprising: the first entity is a delivering broker and the second entity is a receiving broker.

3. The apparatus of claim 1, further comprising: the account verification data is generated by the second entity using a hash of a set of account data, associated with the account, stored by the second entity.

4. The apparatus of claim 1, further comprising: the set of account data associated with the account is a set of demographic data associated with the account's owner.

5. The apparatus of claim 1, further comprising: the hash of the retrieved set of account data is generated by utilizing a hash function on a string formed by concatenating each data item in the set of account data in a specified order.

6. The apparatus of claim 1, further comprising: the requested asset is specified using a security identifier.

7. The apparatus of claim 6, further comprising: the security identifier is one of: a CUSIP, a ticker symbol, an ISIN.

8. The apparatus of claim 1, further comprising: the API call generating a crypto token asset for the requested asset includes an asset creation request for the requested asset to an administrative node that controls asset definition for the socially aggregated blockchain datastructure.

9. The apparatus of claim 1, further comprising: the API call generating a crypto token asset for the requested asset includes an asset issuance request for the requested asset to an administrative node that controls asset issuance for the socially aggregated blockchain datastructure.

10. The apparatus of claim 9, further comprising: positions data for the account data structure datastore associated with the first entity is encrypted such that access is restricted to the first entity and to an administrative entity associated with the administrative node.

11. The apparatus of claim 1, further comprising: the aggregated crypto transaction trigger entry includes an omnibus address associated with the second entity.

12. The apparatus of claim 11, further comprising: the second entity transfers the crypto token asset, transferred via the aggregated crypto transaction trigger entry, to an address generated for the account.

13. The apparatus of claim 1, further comprising: the aggregated crypto transaction trigger entry includes an address associated with the second entity generated for the account.

14. The apparatus of claim 1, further comprising: the oracle data is provided via an API call.

15. The apparatus of claim 1, further comprising: the oracle data that satisfies the crypto smart rule is a signature of the first entity.

16. A crypto asset transfer processing processor-readable, non-transient medium, the medium storing a component collection, storage of the component collection structured with processor-executable instructions comprising:

obtain a inter-entity crypto asset transfer notification associated with an account, the inter-entity crypto asset transfer notification is structured as sending to a first entity from a second entity;

determine account verification data from the inter-entity crypto asset transfer notification, the account verification data is generated by the second entity;

retrieve a set of account data associated with the account, the set of account data is stored by the first entity;

generate a hash of the retrieved set of account data;

verify that the determined account verification data matches the generated hash;

determine a requested asset from the inter-entity crypto asset transfer notification;

make an API call generating a crypto token asset for the requested asset in a socially aggregated blockchain datastructure, the API call facilitates transfer of the generated crypto token asset to an account data structure datastore associated with the first entity;

determine an address of an aggregated crypto transaction trigger entry from the inter-entity crypto asset transfer notification, the aggregated crypto transaction trigger entry is structured as facilitating transfer of the generated crypto token asset from the account data structure datastore associated with the first entity to an account data structure datastore associated with the second entity upon satisfaction of a crypto smart rule; and provide oracle data that satisfies the crypto smart rule via the determined address of the aggregated crypto transaction trigger entry.

17. A crypto asset transfer processing processor-implemented system, comprising:

means to store a component collection;

means to process processor-executable instructions from the component collection, storage of the component collection structured with processor-executable instructions comprising:

obtain a inter-entity crypto asset transfer notification associated with an account, the inter-entity crypto asset transfer notification is structured as sending to a first entity from a second entity;

determine account verification data from the inter-entity crypto asset transfer notification, the account verification data is generated by the second entity;

retrieve a set of account data associated with the account, the set of account data is stored by the first entity;

generate a hash of the retrieved set of account data;

verify that the determined account verification data matches the generated hash;

determine a requested asset from the inter-entity crypto asset transfer notification;

make an API call generating a crypto token asset for the requested asset in a socially aggregated blockchain datastructure, the API call facilitates transfer of the generated crypto token asset to an account data structure datastore associated with the first entity;

determine an address of an aggregated crypto transaction trigger entry from the inter-entity crypto asset transfer notification, the aggregated crypto transaction trigger entry is structured as facilitating transfer of the generated crypto token asset from the account data structure datastore associated with the first entity to an account data structure datastore associated with the second entity upon satisfaction of a crypto smart rule; and provide oracle data that satisfies the crypto smart rule via the determined address of the aggregated crypto transaction trigger entry.

18. A crypto asset transfer processing processor-implemented process, including processing processor-executable instructions via any of at least one processor from a component collection stored in at least one memory, storage of the component collection structured with processor-executable instructions comprising:

obtain a inter-entity crypto asset transfer notification associated with an account, the inter-entity crypto asset transfer notification is structured as sending to a first entity from a second entity;

determine account verification data from the inter-entity crypto asset transfer notification, the account verification data is generated by the second entity;

retrieve a set of account data associated with the account, the set of account data is stored by the first entity;

generate a hash of the retrieved set of account data;

verify that the determined account verification data matches the generated hash;

determine a requested asset from the inter-entity crypto asset transfer notification;

make an API call generating a crypto token asset for the requested asset in a socially aggregated blockchain datastructure, the API call facilitates transfer of the generated crypto token asset to an account data structure datastore associated with the first entity;

determine an address of an aggregated crypto transaction trigger entry from the inter-entity crypto asset transfer notification, the aggregated crypto transaction trigger entry is structured as facilitating transfer of the generated crypto token asset from the account data structure datastore associated with the first entity to an account data structure datastore associated with the second entity upon satisfaction of a crypto smart rule; and provide oracle data that satisfies the crypto smart rule via the determined address of the aggregated crypto transaction trigger entry.

* * * * *